(12) United States Patent
Hitomi et al.

(10) Patent No.: US 7,219,634 B2
(45) Date of Patent: May 22, 2007

(54) SPARK IGNITION ENGINE CONTROL DEVICE

(75) Inventors: Mitsuo Hitomi, Aki-gun (JP); Toshiaki Nishimoto, Aki-gun (JP); Yoshiyuki Shinya, Aki-gun (JP); Kouji Sumida, Aki-gun (JP); Takayoshi Hayashi, Aki-gun (JP); Noriyuki Iwata, Aki-gun (JP); Kouji Asanomi, Aki-gun (JP); Taketoshi Yamauchi, Aki-gun (JP); Keiji Araki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/472,563

(22) PCT Filed: Jan. 31, 2003

(86) PCT No.: PCT/JP03/00962

§ 371 (c)(1),
(2), (4) Date: Sep. 27, 2004

(87) PCT Pub. No.: WO03/064838

PCT Pub. Date: Aug. 7, 2003

(65) Prior Publication Data

US 2005/0022755 A1    Feb. 3, 2005

(30) Foreign Application Priority Data

| Jan. 31, 2002 | (JP) | 2002-024548 |
| Feb. 6, 2002 | (JP) | 2002-029836 |
| Jun. 25, 2002 | (JP) | 2002-185242 |
| Aug. 6, 2002 | (JP) | 2002-228790 |
| Aug. 12, 2002 | (JP) | 2002-234589 |
| Aug. 12, 2002 | (JP) | 2002-235206 |
| Sep. 24, 2002 | (JP) | 2002-278022 |
| Sep. 26, 2002 | (JP) | 2002-281293 |
| Sep. 30, 2002 | (JP) | 2002-287886 |
| Oct. 4, 2002 | (JP) | 2002-292875 |
| Oct. 8, 2002 | (JP) | 2002-294835 |
| Nov. 21, 2002 | (JP) | 2002-338214 |

(51) Int. Cl.
*F02B 41/34* (2006.01)

(52) U.S. Cl. ............. 123/58.8; 123/295; 123/299; 123/300; 123/301

(58) Field of Classification Search .......... 123/58.8, 123/64, 295, 299, 301, 302, 308
See application file for complete search history.

(56) References Cited

U.S. PATENT DOCUMENTS

| 4,159,700 | A | * | 7/1979 | McCrum ............. 123/58.8 |
| 4,194,472 | A | * | 3/1980 | Amano et al. ......... 123/274 |
| 6,877,464 | B2 | * | 4/2005 | Hitomi et al. ......... 123/58.8 |
| 6,923,149 | B2 | * | 8/2005 | Nishimoto et al. ..... 123/58.8 |
| 6,971,343 | B2 | * | 12/2005 | Hitomi et al. ......... 123/58.8 |
| 2004/0168655 | A1 | * | 9/2004 | Hitomi et al. ......... 123/58.8 |

FOREIGN PATENT DOCUMENTS

| JP | 59-49742 | 4/1984 |
| JP | 03-145557 | 6/1991 |
| JP | 06-257477 | 9/1994 |
| JP | 07-269381 | 10/1995 |
| JP | 10-231744 | 9/1998 |
| JP | 10-274085 | 10/1998 |
| JP | 11-343874 | 12/1999 |
| JP | 2000-320333 | 11/2000 |
| JP | 2001-082229 | 3/2001 |
| JP | 2001-152919 | 6/2001 |
| JP | 2001-159338 | 6/2001 |
| JP | 2001-207887 | 8/2001 |
| JP | 2002-130006 | 5/2002 |
| JP | 2002-155780 | 5/2002 |
| JP | 2002-285844 | 10/2002 |
| JP | 3711941 B2 | 8/2005 |

OTHER PUBLICATIONS

Official Action dated Oct. 31, 2006, which issued in connection with related Japanese Patent Application No. 2002-292875 (citing four references, of which: two are included herewith and two are cited in the IDS filed on Jul. 14, 2006).

Notice of Reasons of Rejection, mailed on Dec. 26, 2006, in connection with Japanese Patent Application No. 2002-185242, and English translation thereof.

* cited by examiner

*Primary Examiner*—Marguerite McMahon
(74) *Attorney, Agent, or Firm*—Nixon Peabody LLP; Donald R. Studebaker

(57) ABSTRACT

For the purpose of improving the fuel efficiency by lean combustion and enhancing the fuel efficiency improvement effects by performing compression ignition efficiently in some cylinders, a multi-cylinder spark ignition engine is constructed such that exhaust gas, that is exhausted from preceding cylinders 2A, 2D on the exhaust stroke side among pairs of cylinders whose exhaust stroke and intake stroke overlap in a low load, low rotational speed region, is directly introduced through an inter-cylinder gas passage 22 into following cylinders 2B, 2C on the intake stroke side and only gas exhausted from the following cylinders 2B, 2C is fed to an exhaust passage 20, which is provided with a three-way catalyst 24. Combustion controller is provided that controls the combustion of each of the cylinders such that combustion is conducted by forced ignition in a condition in which the air/fuel ratio is a lean air/fuel ratio which is larger by a prescribed amount than the stoichiometric air/fuel ratio in the preceding cylinders 2A, 2D and, in the following cylinders 2B, 2C, fuel is supplied to burnt gas of lean air/fuel ratio introduced from the preceding cylinders 2A, 2D and combustion is conducted by compression ignition.

77 Claims, 49 Drawing Sheets

SPARK IGNITION ENGINE CONTROL DEVICE

TECHNICAL FIELD

The present invention relates to a control device for a spark ignition engine and in more detail relates to a device that controls the combustion condition in the cylinders of a multi-cylinder engine in order to improve fuel consumption and reduce emissions.

BACKGROUND ART

Techniques are previously known for improving fuel consumption in spark ignition engines by performing combustion under lean air/fuel ratio conditions, in which the air/fuel ratio of the mixture in the cylinders is larger than the stoichiometric air/fuel ratio (or theoretical air/fuel ration). For example, as illustrated in Laid-open Japanese Patent Application No. H. 10-274085, a technique is known in which an injection valve that injects fuel directly into the combustion chamber is provided and super-lean combustion is produced by conducting stratified charge combustion in the low rotational speed low load region etc. Specifically, such stratified charge combustion consists in altering the composition ratio of the mixture in the vicinity of the spark plug in the ignition period by injecting fuel in the compression stroke, while controlling the rate of air intake and rate of fuel injection such as to produce a condition in the combustion chamber as a whole that is much leaner than the stoichiometric air/fuel ratio, and performing combustion with forced ignition by the spark plug in this condition.

When super-lean combustion is performed by stratified charge combustion as described above, thermal efficiency is improved and the air intake rate becomes large, reducing the intake negative pressure and thereby greatly improving fuel consumption. Also, in such a super-lean stratified charge combustion condition, even if some of the air that is present in excess is replaced by EGR, fully satisfactory combustion is still achieved, so a comparatively large amount of EGR may be employed and this is thereby beneficial in lowering NOx etc. Thus, even though this large amount of EGR is introduced, the benefit of a lowered pumping loss is still obtained and thermal efficiency is also increased compared with ordinary combustion in which the air intake rate and EGR rate are controlled without layering; the benefit of improved fuel consumption is thereby obtained.

However, when stratified charge combustion is performed, although, as the air/fuel ratio is made leaner, improved fuel consumption is obtained up to a certain point, if the mixture becomes leaner than a certain degree, the combustion rate becomes too low, with the result that the combustion occurring in the vicinity of the final period does not contribute to work, so, contrariwise, fuel consumption tends to deteriorate. Thus, there were limits to the extent to which fuel consumption improvement could be achieved by increasing leanness in stratified charge combustion.

Compression ignition has been studied as another technique for improving fuel consumption. This compression ignition consists in self-ignition of fuel at high temperature and high pressure in a combustion chamber in the latter period of the compression stroke, in the same way as in the case of a diesel engine. If such compression ignition is performed, even under conditions of a super-lean air/fuel ratio or conditions of introduction of a large amount of EGR, combustion occurs at once throughout the entire combustion chamber. Slow combustion, which does not contribute to work, is thereby avoided, which is beneficial in improving fuel consumption.

However, in an ordinary spark ignition engine (gasoline engine), forced ignition for combustion is necessary and the temperature and pressure within the combustion chamber in the vicinity of the top dead center in compression are not elevated to a sufficient degree to produce compression ignition; thus special expedients must be adopted if the temperature or pressure in the combustion chamber is to be raised to the considerable degree necessary to achieve compression ignition. However, in a conventional spark ignition engine, it is difficult to raise the temperature or pressure in the combustion chamber to such an extent as to produce compression ignition in the low load region where fuel consumption improvement is required while yet preventing knocking in the high load region, so implementation of such a technique has not been achieved.

In view of the aforementioned problems, the present invention provides a control device for a spark ignition engine wherein the benefit of improved fuel consumption is produced by lean combustion and, in addition, the benefit of improved fuel consumption is increased by effectively performing compression ignition in a portion of the cylinders.

DISCLOSURE OF THE INVENTION

According to the present invention, in a multi-cylinder spark ignition engine wherein the cylinders are arranged to perform a cycle comprising intake, compression, expansion and exhaustion strokes with prescribed phase differences, at least in a low load, low rotational speed region, a gas flow path is constituted in a two-cylinder connected condition such that burnt gas exhausted from a preceding cylinder (or a leading cylinder) which is a cylinder on the exhaust stroke side in a pair of cylinders whose exhaustion stroke and intake stroke overlap is arranged to be directly introduced into a following cylinder which is a cylinder on the intake stroke side through an inter-cylinder gas passage and gas exhausted from this following cylinder is arranged to be fed to an exhaust passage; and combustion controller is provided that controls combustion in each cylinder such that at least in part of the operating region of the operating region in which said two-cylinder connected condition is produced, combustion is performed by forced ignition in said preceding cylinder in a condition with a lean air/fuel ratio which is larger by a prescribed amount than the stoichiometric air/fuel ratio while fuel is supplied in an amount corresponding to the following cylinder to the burnt gas generated by combustion in this preceding cylinder, and combustion is performed by compression self-ignition in the following cylinder.

If such a construction is adopted, at least in the low load, low rotational speed region thermal efficiency is raised by lean combustion in the preceding cylinder and pumping loss is diminished, making it possible to obtain a considerable fuel costs improvement effect. Also, in the case of the following cylinder, combustion is conducted by supplying fuel to the burnt gas of lean air/fuel ratio introduced from the preceding cylinder, so, since this burnt gas is at high temperature, the temperature in the combustion chamber rises to such a degree that compression ignition can be achieved in the final period of the compression stroke and compression ignition is therefore performed. Thus, by introducing burnt gas, the same condition is produced in the following cylinder as if a large amount of EGR were introduced but, since combustion is performed rapidly by compression ignition even in such a condition, the combustion contributes efficiently to the work and fuel costs are greatly improved by this and by the decreased pumping losses.

In a device according to the present invention, preferably the air/fuel ratio of the following cylinder when in said two-cylinder connected condition is made to be at or below the stoichiometric air/fuel ratio and a three-way catalyst or oxidation catalyst is provided in the exhaust passage connected with this following cylinder.

In this way, although combustion is conducted in the preceding cylinder with a lean air/fuel ratio, since gas of below the stoichiometric air/fuel ratio is introduced into the exhaust passage, a lean $NO_x$ catalyst is unnecessary and problems such as compromise of the fuel costs improvement effect or sulfur poisoning, due to temporary enrichment of the air/fuel ratio, are obviated.

Also, if a fuel injection valve is provided that injects fuel directly into the cylinder in respect of said preceding cylinder and, when in said two-cylinder connected condition, fuel is injected in the compression stroke from said fuel injection valve and stratified charge combustion is performed by forced ignition while keeping a lean air/fuel ratio in the preceding cylinder, combustion with a super-lean air/fuel ratio becomes possible by stratified charge combustion in the preceding cylinder, increasing the fuel costs improvement effect.

If the air/fuel ratio of the preceding cylinder when in said two-cylinder connected condition is twice or more the stoichiometric air/fuel ratio, an ample fuel costs improvement effect can be obtained by lean combustion in the preceding cylinder and burnt gas containing a large amount of excess air is delivered to the following cylinder from the preceding cylinder, which is beneficial for combustion in the following cylinder.

Also, preferably the air/fuel ratio of the following cylinder when in said two-cylinder connected condition is a lean air/fuel ratio greater than the stoichiometric air/fuel ratio.

In this way, combustion is performed rapidly by compression ignition in the following cylinder while keeping a lean air/fuel ratio, so the amount of $NO_x$ generated is diminished and the fuel costs improvement effect is increased.

Preferably, when in said two-cylinder connected condition, uniform combustion is performed by injecting fuel in the following cylinder in the intake stroke. If this is done, burnt gas of lean air/fuel ratio and fuel are uniformly mixed in the following cylinder, so that combustion can be satisfactorily performed by compression self-ignition.

Also, preferably, there is provided flow path changeover means whereby in a high load, high rotational speed operating region, the flow paths of new air and gas are changed over such that the intake port and exhaust port of each of the cylinders are made to be independent, so that new air is introduced into the intake port of each cylinder from an intake passage and exhaust gas exhausted from the exhaust port of each cylinder is fed to said exhaust passage and combustion controller is arranged to make the air/fuel ratio of each of the cylinders the stoichiometric air/fuel ratio or less than this and to cause combustion to be performed by forced ignition in each of the cylinders in said high load, high rotational speed operating region.

In this way, it is possible to prevent the heat load on the following cylinder becoming excessively high and to ensure output performance in the high load, high rotational speed operating region.

If this is done, preferably, in said preceding cylinder, there are provided an intake port that communicates with said intake passage, a first exhaust port that communicates with said exhaust passage and a second exhaust port that communicates with the inter-cylinder gas passage and, in said following cylinder there are provided a first intake port that communicates with said intake passage, a second intake port that communicates with said inter-cylinder gas passage and an exhaust port that communicates with said exhaust passage and, as said flow path changeover means, there are provided a valve deactivating mechanism that changes over the operating condition and deactivated condition respectively of the first and second exhaust valves that open and close the first and second exhaust ports of said preceding cylinder and of the first and second intake valves that open and close the first and second intake ports of the following cylinder; and valve stop mechanism controller that, in a low load, low rotational speed region, puts said first exhaust valve and said first intake valve in deactivated condition and puts said second exhaust valve and said second intake valve in operating condition and, in a high load, high rotational speed operating condition, puts said first exhaust valve and said first intake valve in operating condition and said second exhaust valve and said second intake valve in deactivated condition.

In this way, by control of the valve deactivation mechanism, changeover of flow path can easily be effected in accordance with the operating condition in the low load, low rotational speed region or on the high load side/high rotational speed side.

Also, in a device according to the present invention, it is effective to provide combustion condition controller that exercise control such that the control mode whereby combustion is performed in said two-cylinder connected condition is the special operating mode and, in at least part of the operating region of the region that is put in the special operating mode, the fuel supply rates in respect of both the leading and following cylinders are controlled such that the fuel supply rate in the preceding cylinder is greater, while the air/fuel ratio during combustion in said following cylinder is substantially the stoichiometric air/fuel ratio, thereby making the air/fuel ratio when combustion is conducted in the preceding cylinder a value of less than twice the stoichiometric air/fuel ratio and conducting combustion in the preceding cylinder by forced ignition and conducting combustion in the following cylinder by compression self-ignition.

If this is done, since the gas that is exhausted to the exhaust passage from the following cylinder is of the stoichiometric air/fuel ratio, cleansing of the exhaust gas can be achieved fully satisfactorily simply by a three-way catalyst and, by making the air/fuel ratio of the preceding cylinder a value of less than twice the stoichiometric air/fuel ratio by making the fuel supply rate in respect of the preceding cylinder larger, the temperature of the gas that is introduced into the following cylinder from the preceding cylinder is increased, thereby improving the self-ignition capability of the following cylinder and increasing the amount of burnt gas constituents corresponding to EGR in this gas, etc, and so improving the knocking suppression effect.

Preferably, in said special operating mode, in the intermediate speed region of the operating region in which the following cylinder is made to perform compression self-ignition, the air/fuel ratio when conducting combustion in the preceding cylinder is made to be a value of substantially twice the stoichiometric air/fuel ratio, or more than this.

If this is done, the fuel costs improvement effect is increased in the intermediate speed region of the operating region in which the following cylinder is made to perform compression self-ignition in the special operating mode.

If, in this way, in said special operating mode, in the operating region on the low speed side of the intermediate speed region of the operating region in which the following cylinder is made to perform compression self-ignition, the air/fuel ratio when conducting combustion in the preceding cylinder is made to be a value of less than twice the stoichiometric air/fuel ratio, the self-ignition capability in the operating region on low speed side of the intermediate region of the operating region in which the following cylinder is made to perform compression self-ignition in the special operating mode is improved.

Furthermore, if, in said special operating mode, in the operating region on the high speed side of the intermediate speed region of the operating region in which the following cylinder is made to perform compression self-ignition, the air/fuel ratio when conducting combustion in the preceding cylinder is made to be a value of less than twice the stoichiometric air/fuel ratio, occurrence of knocking is suppressed in the operating region on the high speed side of the intermediate speed region of the operating region in which the following cylinder is made to perform compression self-ignition in the special operating mode.

Also, preferably, in said special operating mode, in the intermediate load region of the operating region in which the following cylinder is made to perform compression self-ignition, the air/fuel ratio when conducting combustion in the preceding cylinder is made to be a value of substantially twice the stoichiometric air/fuel ratio, or more than this.

In this way, the fuel costs improvement effect in the intermediate region of the operating region in which the following cylinder is made to perform compression self-ignition in the special operating mode is increased.

Also, preferably, in said special operating mode, in the intermediate speed/intermediate load region of the operating region in which the following cylinder is made to perform compression self-ignition, the air/fuel ratio when conducting combustion in the preceding cylinder is made to be a value of substantially twice the stoichiometric air/fuel ratio, or more than this.

In this way, the fuel costs improvement effect in the intermediate speed/intermediate load region of the operating region in which the following cylinder is made to perform compression self-ignition in the special operating mode is increased.

Also, in said special operating mode, in the operating region in which the following cylinder is made to perform compression self-ignition, the air/fuel ratio when conducting combustion in the preceding cylinder may suitably be made smaller as the load becomes lower.

In this way, the tendency for compression self-ignition to become more difficult as the load becomes lower in the operating region in which the following cylinder is made to perform compression self-ignition in the special operating mode is compensated.

Suitably also, when the engine temperature is low, in the entire operating region in which the following cylinder is made to perform compression self-ignition in said special operating mode, the air/fuel ratio when conducting combustion in the preceding cylinder is made to be less than twice the stoichiometric air/fuel ratio.

In this way, compression self-ignition can be achieved even at low engine temperature.

It is also effective to provide a fuel injection controller that causes, in an operating region in which the following cylinder is made to perform compression self-ignition, in the case where there is an operating condition in which knocking is likely to occur, the combustion control means to retard the injection time of the fuel with respect to the following cylinder compared with the case where there is an operating condition in which knocking is unlikely to occur.

If this is done, in the operating region in which the following cylinder is made to perform compression self-ignition, in an operating condition in which knocking is likely to occur, the fuel injection time in regard to the following cylinder is relatively retarded, thereby suppressing activation of the mixture and so effectively preventing occurrence of knocking caused by the self-ignition capability of the mixture becoming too high. Also, in an operating region in which the following cylinder is made to perform compression self-ignition, in an operating condition in which knocking is unlikely to occur, the injection time of the fuel in respect of the following cylinder is relatively advanced, so occurrence of misfiring in the following cylinder due to activation of the mixture is effectively prevented and an improvement in thermal efficiency can be achieved by maintaining the compression self-ignition capability.

Suitably also, in an operating region in which the following cylinder is made to perform compression self-ignition in said special operating mode, in an operating condition in which knocking is likely to occur, the injection time of the fuel in respect of the following cylinder is set more on the retarded side of the compression stroke as the likelihood of knocking increases.

If this is done, occurrence of knocking in an operating region where knocking is liable to occur due to high temperature of the combustion chamber of the following cylinder in the region where the following cylinder is made to perform compression self-ignition can be effectively prevented by suppressing activation of the mixture to an appropriate extent by relatively retarding the injection time of the fuel in regard to the following cylinder so that it is set in the latter half of the compression stroke.

Suitably also, in an operating region in which the following cylinder is made to perform compression self-ignition in said special operating mode, in an operating condition in which knocking is likely to occur, injection of fuel into the following cylinder is performed in divided fashion and the latter injection time of the fuel in this divided injection is set in the latter half of the compression.

If this is done, in an operating region in which the following cylinder is made to perform compression self-ignition, activation of the mixture is suppressed to an appropriate extent, making it possible to effectively prevent occurrence of knocking while preventing occurrence of misfiring.

Suitably also, in a region in which the following cylinder is made to perform compression self-ignition, the likelihood of occurrence of knocking or the intensity of knocking is ascertained and the latter injection time in said divided fuel injection is retarded so as to approach more closely the compression top dead center as the likelihood of occurrence of this knocking or the intensity of knocking increases.

If this is done, in an operating region in which the following cylinder is made to perform compression self-ignition, activation of the mixture is suppressed to an appropriate extent, making it possible to effectively prevent occurrence of knocking while preventing occurrence of misfiring.

Suitably also, in a region in which the following cylinder is made to perform compression self-ignition, in an operating condition in which knocking is likely to occur, injection of fuel into the following cylinder is performed in divided fashion and the latter injection rate of the fuel in this divided injection is set to a larger value than the former injection rate.

If this is done, in an operating region in which the following cylinder is made to perform compression self-ignition, occurrence of knocking is effectively prevented while preventing occurrence of misfiring.

Preferably, if this is done, in a region in which the following cylinder is made to perform compression self-ignition, the likelihood of occurrence of knocking is ascertained and the ratio of the latter injection period rate with respect to the total injection rate of fuel injected in the following cylinder is changed so as to be increased as the likelihood of occurrence of such knocking becomes higher.

If this is done, in an operating region in which the following cylinder is made to perform compression self-ignition, occurrence of knocking is more effectively prevented by further suppressing activation of the mixture.

Suitably also, in a region in which the following cylinder is made to perform compression self-ignition, when the engine is in an operating region on the high load side, a condition in which knocking is likely to occur is identified.

If this is done, in an operating region in which the following cylinder is made to perform compression self-ignition, the injection time of the fuel in regard to the following cylinder is appropriately controlled.

Suitably also, if fuel of low octane value is employed, in a region in which the following cylinder is made to perform compression self-ignition, this is identified as a condition in which knocking is likely to occur.

In this way, in a region in which the following cylinder is made to perform compression self-ignition, the injection time of the fuel with regard to the following cylinder is appropriately controlled.

If this is done, suitably there is provided swirl generating means that generates swirl such that a strong intensity of turbulence is maintained in the latter half of the compression stroke in a region in which the following cylinder is made to perform compression self-ignition, in an operating condition in which knocking is likely to occur.

If this is done, in an operating region in which the following cylinder is made to perform compression self-ignition, the effect of improving the combustibility by maintaining a strong intensity of turbulence in the latter half of the compression stroke and the effect of suppressing knocking by retarding the injection time of the fuel in regard to the following cylinder so that it approaches more closely to the compression top dead center can be combined.

Suitably also, swirl is generated in the combustion chamber by directing the tip portion of the inter-cylinder gas passage in the cylinder tangential direction of the following cylinder in plan view and introducing burnt gas into the following cylinder from said inter-cylinder gas passage in the intake stroke of the following cylinder.

In this way, a fully satisfactory combustible condition of the following cylinder is maintained by forming swirl such that a strong intensity of turbulence is maintained in the latter half of the compression stroke, by introducing burnt gas exhausted from the preceding cylinder into the following cylinder with the inter-cylinder gas passage in a conducting condition in the following cylinder intake stroke in a region in which the following cylinder is made to perform compression self-ignition.

Also, it is effective if a combustion control means of the device according to the present invention effects control, in at least part of the operating region that has been put into said special operating mode, combustion is conducted by compression self-ignition in the following cylinder, and, in a high load region in the region in which this compression self-ignition is performed, the air/fuel ratio of the preceding cylinder is made relatively rich compared with the region on the low load side of this and a new air introduction intake valve that introduces new air into the following cylinder is opened, thereby introducing new air into the following cylinder in addition to the burnt gas that is fed from said preceding cylinder.

If this is done, if, in a region on the high load side in the region where the following cylinder is made to perform compression self-ignition, the air/fuel ratio of the preceding cylinder is made comparatively rich and the oxygen concentration in the burnt gas introduced into the following cylinder correspondingly falls, new air is then introduced into the following cylinder by opening the new air introduction intake valve, so that compression self-ignition in the following cylinder is thereby appropriately conducted by eliminating the deficiency of new air in the following cylinder and occurrence of knocking is effectively prevented by increasing the amount of burnt gas constituents introduced into the following cylinder and engine output is thereby guaranteed.

Preferably, in a region on the low load side in the operating region in which the following cylinder is made to perform compression self-ignition in said special operating mode, the new air introduction intake valve is maintained in closed condition; and, in a region on the high load side in said compression self-ignition region, the new air introduction intake valve is opened in the vicinity of the intake top dead center of the following cylinder and is closed during the course of the intake stroke of the following cylinder.

If this is done, in the low load region in the region in which the following cylinder is made to perform compression self-ignition, the oxygen concentration in the burnt gas that is introduced into this following cylinder being maintained at a high value by making the air/fuel ratio of the preceding cylinder comparatively lean, the air/fuel ratio in the following cylinder can be prevented from becoming lean by keeping the new air introduction intake valve in a closed condition. Also, by opening the new air introduction intake valve in the vicinity of the intake of top dead center of the following cylinder in a region on the high load side in the compression self-ignition region, efficient introduction of new air into the following cylinder and by stopping introduction of new air by closing this during the intake stroke of the following cylinder, smooth introduction of the burnt gas that is fed from the preceding cylinder into the following cylinder are achieved.

Preferably, in a region on the high load side in the operating region in which the following cylinder is made to perform compression self-ignition in said special operating mode, the burnt gas introduction valve of the following cylinder is opened during the course of the intake stroke and the new air introduction intake valve is opened prior to the opening time of this burnt gas introduction valve.

If this is done, in a region on the high load side in the operating region in which the following cylinder is made to perform compression self-ignition, new air is efficiently introduced into the following cylinder and the burnt gas introduction valve is then closed during the course of the intake stroke of the following cylinder, thereby ensuring that the burnt gas that is fed from the preceding cylinder is introduced into the following cylinder.

Preferably, in a region on the high load side in the operating region in which the following cylinder is made to perform compression self-ignition, control is exercised such as to increase the ratio of the new air intake rate with respect to the total gas rate introduced into the following cylinder, in response to enrichment of the air/fuel ratio of the preceding cylinder, compared with a region on the low load side thereof.

Also, in a region on the high load side in the region in which the following cylinder is made to perform compression self-ignition, the ratio of the rate of introduction of new air with respect to the total gas rate introduced into the following cylinder is controlled so as to be raised in response to the enrichment of the air/fuel ratio of the preceding cylinder compared with a region on the low load side thereof.

In this way, in a region on the high load side in the operating region in which the following cylinder is made to perform compression self-ignition, if the air/fuel ratio of the preceding cylinder is comparatively enriched and the oxygen concentration in the gas introduced into the following cylinder corresponding falls, the ratio of the rate of new air introduction with respect to the total gas rate introduced into the following cylinder is raised, so that deficiency of new air in the following cylinder is efficiently eliminated and compression self-ignition in the following cylinder thereby appropriately performed and occurrence of knocking effectively prevented by suppressing rise in temperature in the following cylinder.

Also, preferably, at least in a region in which the following cylinder is made to perform compression self-ignition, the air/fuel ratio of the following cylinder is controlled such that the oxygen concentration in the exhaust gas that is exhausted from the following cylinder is a value corresponding to the combustion condition of the stoichiometric air/fuel ratio.

In this way, at least in the region in which the following cylinder is made to perform compression self-ignition, albeit combustion is conducted with a lean air/fuel ratio in the preceding cylinder, only burnt gas of the following cylinder that has been burnt with the stoichiometric air/fuel ratio is fed to the exhaust passage.

Also, in a device according to the present invention, it is effective if the combustion control means effects control such that the total injection rate of fuel injected into the two cylinders i.e. said preceding cylinder and following cylinder is increased in response to increase in engine load; and control is exercised such that in said following cylinder, combustion is conducted by compression self-ignition in at least part of the operating region in which said special operating mode is produced and, in said preceding cylinder, control is exercised such that stratified charge lean combustion is conducted with the injected fuel put in a stratified charge condition in an intermediate/low load region of the operating region in which compression self-ignition of said following cylinder is performed; and control is exercised such that, on the high load side of the operating region in which this stratified charge lean combustion is conducted, uniform lean combustion is conducted in a condition with the injected fuel uniformly dispersed.

In this way, control is exercised so as to change over the combustion condition in the preceding cylinder in accordance with the load region of the engine, so improvement in fuel costs can be appropriately achieved while yet effectively preventing knocking. For example, in an operating region in which combustion self-ignition is performed in the following cylinder, in an intermediate/low load region in which the total injection rate of fuel is relatively small, further improvement in fuel costs can be achieved while maintaining combustion stability with stratified charge lean combustion. In contrast, on the high load side of this intermediate/low load region, by making the air/fuel ratio a relatively smaller value as the total fuel injection rate is increased and conducting uniform lean combustion, a lower combustion temperature can be achieved than in the case of a uniform lean condition with the same air/fuel ratio condition and occurrence of knocking in the following cylinder can be prevented by suppressing the rise of temperature of the burnt gas introduced into the following cylinder, or lowering this, and the region in which compression self-ignition of the following cylinder is feasible can be expanded. As a result, the fuel costs improvement effect can be further increased.

Preferably, in the operating region on the high load side where combustion is conducted in a uniform lean condition in the preceding cylinder, the air/fuel ratio of said preceding cylinder is made to be a value of substantially twice the stoichiometric air/fuel ratio, or a value smaller than this.

If this is done, it might be feared that misfiring could occur if the air/fuel ratio under uniform lean conditions in the preceding cylinder becomes higher than prescribed, but combustion is stabilized by making the air/fuel ratio substantially twice the stoichiometric air/fuel ratio, or a value smaller than this, and the rise in temperature of the burnt gas introduced into the following cylinder is suppressed.

Also, preferably, in a low load operating region of the intermediate/low load operating region in which stratified charge lean combustion is conducted in said preceding cylinder, the air/fuel ratio of said preceding cylinder is made to be a value of substantially twice the stoichiometric air/fuel ratio, or a value smaller than this.

If this is done, in an intermediate/low load region where the fuel injection rate is small, the temperature of the burnt gas introduced into the following cylinder is raised by the stratified charge lean combustion, so the range in which compression self-ignition in the following cylinder is feasible can be expanded on the low load side.

Suitably also, in a low load operating region of the intermediate/low load operating region in which stratified charge lean combustion is conducted in said preceding cylinder, if compression self-ignition in said following cylinder is difficult, control is exercised such that the air/fuel ratio of said preceding cylinder is made to be substantially twice the stoichiometric air/fuel ratio or a value smaller than this and the combustion mode in the preceding cylinder is shifted from the stratified charge lean condition to said uniform lean condition and the ignition mode in said following cylinder is shifted from compression self-ignition to forced ignition.

If this is done, in cases where, if the engine has not been sufficiently warmed up etc, compression self-ignition in the following cylinder is difficult, the air/fuel ratio of the preceding cylinder is reduced, thereby raising the temperature of the burnt gas introduced into the following cylinder; also, by using uniform lean combustion an adverse effect on fuel costs concomitant with this air/fuel ratio condition is suppressed and the shift from forced ignition of the following cylinder to compression self-ignition can be made earlier.

Also, in a device according to the present invention, it is effective if the flow paths of intake and exhaust are arranged to be capable of being changed over, these flow paths being arranged be capable of being changed over in operating mode between an ordinary operating mode in which each of the cylinders are put in an independent condition in which combustion is conducted respectively independently in each of the cylinders and a special operating mode in which combustion is conducted in said two-cylinder connected condition; comprising: first fuel injection means that supplies fuel independently in respect of each of the cylinders when in said ordinary operating mode; second fuel injection means whereby it is made possible to supply fuel in an amount corresponding to that of the following cylinder in respect of said burnt gas prior to introduction thereof into the following cylinder after completion of combustion in said preceding cylinder, when in said special operating mode; and the combustion controller that, when in said ordinary operating mode, conduct combustion in a condition with the air/fuel ratio in each cylinder made to be the stoichiometric air/fuel ratio by supplying fuel by said first fuel injection means and, when in the special operating mode, conduct combustion in the preceding cylinder by forced ignition in a condition with the air/fuel ratio made to be a lean air/fuel ratio greater by a prescribed amount than the stoichiometric air/fuel ratio, by supplying fuel by said first fuel injection means and that control combustion such as to conduct combustion by compression self-ignition in each cylinder by introducing gas in a condition of the stoichiometric air/fuel ratio by supplying fuel in the following cylinder to said burnt gas by said second fuel injection means.

In this way, in the preceding cylinder, thermal efficiency is raised by lean combustion and pumping loss is diminished and, in the following cylinder, compression self-ignition is performed by supplying fuel to the burnt gas from the preceding cylinder; in this way, combustion is conducted rapidly so that the combustion contributes efficiently to the work i.e. the benefits of efficient combustion and diminished pumping loss are obtained and, as a result, fuel costs are considerably improved. In addition, after completion of combustion in the preceding cylinder, fuel in an amount corresponding to that for the following cylinder is supplied thereto in regard to the following cylinder and is thereby introduced into the following cylinder in a condition in which the mixture is thoroughly mixed with the high temperature burnt gas; as a result, the capability for self-ignition in the following cylinder is improved.

In this case, preferably, said first fuel injection means is arranged such as to inject fuel directly into the combustion chamber in respect of said preceding cylinder and the first fuel injection means of said preceding cylinder also serves as said second fuel injection means, when in said special operating mode, by constituting said fuel controller such that supply of fuel for the following cylinder in respect of said burnt gas is performed by said first fuel injection means of the preceding cylinder during the exhaustion stroke of this cylinder.

In this way, since the fuel is supplied in respect of the burnt gas at an early stage, the burnt gas and the mixture are introduced into the following cylinder in a condition in which they are more effectively mixed, so the self-ignition capability in the following cylinder is effectively increased. Also, by supplying fuel in an amount corresponding to that for the following cylinder by the first fuel injection means of the preceding cylinder, this basic construction can be utilized without modification for example in a direct injection type engine provided with an injector (fuel injection means) for in-cylinder injection into each cylinder, making it possible to apply the present invention in a way that is consistent with general objectives.

If this is done, said first fuel injection means may be arranged such that fuel is injected into an intake passage in respect of said following cylinder. That is, since, in regard to the preceding cylinder, the first fuel injection means may be arranged so as to be capable of injection into the cylinder, in regard to the following cylinder, the first fuel injection means may be arranged so as to inject fuel into an intake passage.

Suitably also, said second fuel injection means is provided at some point along said inter-cylinder gas passage and fuel is supplied thereby in an amount corresponding to that of the following cylinder in respect of said burnt gas after exhaustion from the preceding cylinder prior to introduction thereof into the following cylinder.

In this way, better activation is achieved by supplying fuel in an amount corresponding to that of the following cylinder in the special operating mode to the burnt gas flowing through the inter-cylinder gas passage.

Suitably also, said fuel controller, when in said special operating mode, is constituted such as to be capable of changing over the fuel injection mode between the first injection mode in which combustion is conducted by compression ignition by supplying fuel in an amount corresponding to the following cylinder in respect of said burnt gas by the first fuel injection means of this following cylinder after introduction of burnt gas into the following cylinder from said preceding cylinder; and a second injection mode in which combustion is conducted by compression self-ignition by supplying fuel in an amount corresponding to the following cylinder by said second fuel injection means in respect of said burnt gas prior to introduction thereof into the following cylinder after completion of combustion in said preceding cylinder and is constituted such as to determine the degree of capability of self-ignition of the following cylinder from information relating to the operating condition and to be capable of changing over the fuel injection mode in accordance with the results of this determination.

In this way, the self-ignition capability of the following cylinder in the special operating mode is increased by changing over the fuel injection mode in accordance with operating condition.

If this is done, said combustion controller may be constituted such as to put said injection mode into the second injection mode when in an operating condition wherein the degree of capability for self-ignition of the following cylinder is low.

In this way, combustion stability in the following cylinder is improved by raising the self-ignition capability in the following cylinder due to a mixing effect of the burnt gas and the mixture, when in an operating condition in which the degree of self-ignition capability of the following cylinder is low.

Suitably also, said fuel injection means is constituted such as to determine that the operating condition is one in which the degree of capability for self-ignition is low if the cylinder temperature is below a specified temperature after warming up operation.

If this is done, the capability for self-ignition in the following cylinder is raised by putting the fuel injection mode in the second injection mode on ascertaining that there is an operating condition in which the self-ignition capability is low when the cylinder temperature is below the specified temperature and the cylinder temperature is low after warm-up operation.

Suitably also, said combustion controller is constituted such as to determine that the operating condition is one in which the degree of capability for self-ignition is low when in a very low load region.

If this is done, the capability for self-ignition in the following cylinder is raised by putting the fuel injection mode in the second injection mode on ascertaining that there is an operating condition in which the self-ignition capability is low when, in a very low load region, the fuel injection rate is low.

It is also effective if, in a device according to the present invention, there are provided a preceding cylinder intake valve whereby new air is introduced into said preceding cylinder and a burnt gas introduction valve whereby burnt gas is introduced into said following cylinder from said inter-cylinder gas passage when in said two-cylinder connected condition and in at least a prescribed region on the low load side of said operating region that is in a two-cylinder connected condition, the interval between the intake stroke bottom dead center of said following cylinder and the closure time of said burnt gas introduction valve is set to be shorter than the interval between the intake stroke bottom dead center of said preceding cylinder and the closure time of said preceding cylinder intake valve.

If this is done, at least in a prescribed region on the low load side in the operating region which is in a two-cylinder connected condition, the closure time of the burnt gas introduction valve of the following cylinder is closed earlier than in the case of new air intake in the preceding cylinder, so the effective compression ratio of the following cylinder is increased, facilitating self-ignition are due to the rise in cylinder temperature. Consequently, even in a low load region where the capability for self-ignition is low, due to difficulty in raising the cylinder temperature, the capability for self-ignition is improved and combustion by compression self-ignition can be further expanded into the low load region, so promoting further improvement in fuel costs and exhaust cleansing.

Preferably, in this case, there is provided a following cylinder exhaust valve that exhausts exhaust gas of said following cylinder and in at least a prescribed region on the low load side of said operating region that is in a two-cylinder connected condition, the opening time of said burnt gas introduction valve is set to be the intake stroke top dead center of said following cylinder, while said following cylinder exhaust valve is open until the top dead center of the exhaust stroke of said following cylinder.

If this is done, the overlap of valve opening of the following cylinder exhaust valve and the burnt gas introduction valve is shortened, with the result that so-called "blow through", in which burnt gas that is introduced into the following cylinder is directly exhausted to the exhaust passage through the exhaust valve of the following cylinder is prevented and the effective compression ratio of the following cylinder is increased, increasing the self-ignition capability and promoting further improvement in fuel costs and exhaust cleansing.

Preferably also, in a prescribed region on the high load side of said operating region that is in a two-cylinder connected condition, the closure time of said burnt gas introduction valve is set on the delayed side from this time when in the prescribed region on the low load side.

If this is done, when, conversely, there is a risk of occurrence of abnormal combustion such as knocking with unnecessarily high cylinder temperature the cylinder temperature may be lowered by decreasing the effective compression ratio of the following cylinder by delaying the closure time of the burnt gas introduction valve; abnormal combustion can thereby be prevented and the operating region in which combustion can be conducted by compression self-ignition thereby expanded.

Preferably, also, in a prescribed region on the high load, high rotational speed side of said operating region that is in a two-cylinder connected condition, the closure time of said burnt gas introduction valve is set on the delayed side from this time when in the prescribed region on the low load, low rotational speed side.

If this is done, control may be performed taking into account speed of rotation also; more precise and appropriate control of the compression self-ignition capability can thereby be achieved.

Preferably also, a burnt gas exhaust valve is provided that exhausts burnt gas of said preceding cylinder to said inter-cylinder gas passage when in said two-cylinder connected condition and in the operating region that is in said two-cylinder connected condition, the closure time of said burnt gas exhaust valve is set on the advancing side of the closure time of said burnt gas introduction valve and while maintaining the open period of said burnt gas exhaust valve and the open period of said burnt gas introduction valve at fixed prescribed values, the opening time of said burnt gas exhaust valve and the opening time of said burnt gas introduction valve are set so as to vary forwards and backwards in accordance with engine load while maintaining the difference of these times fixed.

In this way, when under comparatively low load, the effective compression ratio of the following cylinder is increased by advancing the closure time of the burnt gas introduction valve and since the closure time of the burnt gas exhaust valve is then on the advancing side of the closure time of the burnt gas introduction valve, the amount of burnt gas left behind in the preceding cylinder is increased, increasing the cylinder temperature, with the result that the cylinder temperature of the following cylinder rises due to rise in temperature of the burnt gas; the compression self-ignition region can thereby be expanded on the low load side.

In contrast, under comparatively high load, the opening period as a whole is retarded and the closure of the burnt gas introduction valve is retarded, thereby diminishing the effective compression ratio of the following cylinder and lowering the burnt gas temperature by decreasing internal EGR of the preceding cylinder; abnormal combustion of the following cylinder is thus prevented, thereby making it possible to expand the compression self-ignition region on the high load side. As a result, improvement of fuel costs and exhaust gas cleansing can be further promoted.

It should be noted that, since the time difference of these valve opening times is arranged to be maintained constant, with the opening period of the burnt gas exhaust valve and the opening period of the burnt gas introduction valve maintained at fixed prescribed values, in an engine of a construction in which the opening/closure times of each of the cylinders are uniquely set by the shape of the cams relating to opening/closure of the respective valves, there is no need for cam changeover etc and the same cams can always be employed as the cams relating to the respective valves. Variation of the valve opening times can be achieved by varying the phase of the crankshaft and the camshaft that rotates integrally with the cams that relate to opening/closure of these valves, so the construction of the engine in question can be simplified compared with the case where the respective cams are controlled independently and this therefore makes possible reductions in size, weight and costs.

Also, in a device according to the present invention, it is effective if, when in said two-cylinder connected condition there are provided a preceding cylinder intake valve that introduces new air into said preceding cylinder and a burnt gas introduction valve that introduces burnt gas into said following cylinder from said inter-cylinder gas passage and in at least a prescribed region on the low load side of the operating region that is in said two-cylinder connected condition, the open period of said burnt gas introduction valve is set so as to be shorter than the open period of said preceding cylinder intake valve.

In this way, when in a running condition under comparatively low load, the open period of the burnt gas introduction valve of the following cylinder can be made shorter than the open period of the preceding cylinder intake valve, so the closure time of the burnt gas introduction valve can be made relatively earlier, thereby making it possible to increase the effective compression ratio of the following cylinder. Consequently, even in a low load region where the capability for compression ignition is low due to difficulty in raising the cylinder temperature, the self-ignition capability can be improved by increasing the effective compression ratio of the following cylinder, thereby further improving fuel costs and promoting exhaust gas cleansing.

Also, in a device according to the present invention, it is effective if the device is constituted such that, in said two-cylinder connected condition and in a prescribed region on the comparatively low load side of the operating region in which combustion is conducted by compression self-ignition in the following cylinder, combustion is conducted by compression self-ignition in said preceding cylinder while increasing the amount of internal EGR of said preceding cylinder and the internal EGR ratio is decreased with increase in load.

In this way, in a prescribed region of comparatively low load in the operating region in which combustion is conducted by compression self-ignition and the following cylinder, in a condition in which high temperature burnt gas is left behind in the preceding cylinder, this is carried over to the next intake stroke and compression stroke, so the cylinder temperature rises, facilitating compression self-ignition so that combustion is conducted by compression self-ignition; in this way, high thermal efficiency and an NOx suppression effect can be obtained in the same way as in the case of the following cylinder, conferring the benefit of further improvement in fuel costs and an exhaust gas cleansing effect.

It should be noted that, in addition to diminution of the rate of new air by increase in the amount of internal EGR in the preceding cylinder, the injection rate becomes comparatively low due to combustion with a lean air/fuel ratio; however, the region in which the internal EGR increases in the preceding cylinder is made to be a prescribed region on the comparatively low load side, so the required output can be obtained even with a comparatively small fuel injection rate.

Preferably, if this is done, in part or all of the operating region in which combustion is conducted by compression self-ignition in both said preceding cylinder and said following cylinder, the closure time of the burnt gas exhaust valve that exhausts burnt gas to said inter-cylinder gas passage in the exhaust stroke provided in said preceding cylinder is set earlier than the top dead center of the exhaust stroke of said preceding cylinder.

In this way, in a condition in which a large amount of burnt gas is left behind in the cylinder, this can be carried over into the next intake stroke and compression stroke.

If this is done, preferably, in part or all of the operating region in which combustion is conducted by compression self-ignition in both said preceding cylinder and said following cylinder, said combustion controller sets the injection time of fuel into said preceding cylinder later than the closure time of said burnt gas exhaust valve and in the vicinity of the top dead center of the exhaust stroke.

If this is done, since fuel is injected into the preceding cylinder in which a large amount of burnt gas is left behind, activation of the fuel by the high temperature of this burnt gas can be achieved and, in addition, activation is promoted since fuel injection is performed early, in the vicinity of the top dead center of the exhaust stroke; the compression self-ignition capability can thereby be improved. It should be noted that there is no possibility of the injected fuel being directly exhausted, since the fuel injection is performed after closure of the burnt gas exhaust valve.

Preferably also, in part or all of the operating region in which combustion is conducted by compression self-ignition in both said preceding cylinder and said following cylinder, said combustion controller exercises control such that the air/fuel ratio in said following cylinder is substantially a lean air/fuel ratio.

If this done, combustion is conducted with a lean air/fuel ratio not only in the preceding cylinder but also in the following cylinder, so thermal efficiency can be further raised and generation of NOx suppressed; in addition, generation of NOx is further suppressed by compression self-ignition, enabling the exhaust cleansing performance to be further improved.

Preferably, if this is done, the catalyst for exhaust gas cleansing provided in said exhaust passage consists solely of a three-way catalyst or solely of a three-way catalyst and oxidation catalyst.

In this way, generation of NOx is suppressed to a fully satisfactory extent due to the effect of the lean air/fuel ratio in both the preceding cylinder and following cylinder and due to the compression self-ignition, so fully satisfactory exhaust gas cleansing performance can be obtained with only a three-way catalyst or only a three-way catalyst and an oxidation catalyst; a lean NOx catalyst is therefore unnecessary.

It is also effective if there is provided a burnt gas introduction valve that introduces burnt gas from said inter-cylinder gas passage in the intake stroke when in said two-cylinder connected condition, provided in said following cylinder, and a following cylinder intake valve that introduces new air in the intake stroke when in said two-cylinder connected condition, provided in said following cylinder; and in part all of the operating region in which combustion is conducted by compression self-ignition in both said preceding cylinder and said following cylinder, the opening time of said burnt gas introduction valve is set on the delayed side of the top dead center of the intake stroke of this following cylinder and said following cylinder intake valve is arranged to open earlier than the opening time of said burnt gas introduction valve.

In this way, since, apart from burnt gas, new air is also introduced into the following cylinder from the following cylinder intake valve, even if, due to increase in the amount of internal EGR in the preceding cylinder, there is little oxygen in the burnt gas that is introduced into the following cylinder, the output generated in the following cylinder can be increased. Also, since the limit of increase of the amount of internal EGR in the preceding cylinder is increased, the region in which compression self-ignition in the preceding cylinder is feasible is expanded.

It should be noted that, since the burnt gas introduction valve is opened later than the following cylinder intake valve, direct exhaustion of the burnt gas through the following cylinder intake valve is prevented.

Preferably, if this is done, said preceding cylinder is of the long stroke type and comprises a preceding cylinder intake valve that introduces new air in the intake stroke when in said two-cylinder connected condition and in part or all of the operating region in which combustion is conducted by compression self-ignition in both said preceding cylinder and said following cylinder the closure time of said burnt gas exhaust valve and said burnt gas introduction valve is set on the delayed side of the top dead center of the exhaust stroke of said preceding cylinder and the opening time of said preceding cylinder intake valve is set earlier than the top dead center of the intake stroke of this preceding cylinder.

If this is done, the mixed flow rate of the new air and the burnt gas is increased by increasing the opening overlap period of the burnt gas exhaust valve and the preceding cylinder intake valve in the preceding cylinder, thereby enabling the amount of internal EGR to be increased.

Also, even if the opening overlap period is increased, interference thereof can be prevented by shortening the period for which the piston is in the vicinity of the top dead center, by adopting a long stroke type cylinder.

Also, it is effective if there is provided a supercharger that supercharges the intake in respect of said preceding cylinder and in part or all of the operating region in which combustion is conducted by compression self-ignition in at least said preceding cylinder and said following cylinder, supercharging is performed using said supercharger.

In this way, the rate of introduction of new air in the preceding cylinder is increased and, concomitantly, the amount of internal EGR can also be increased and the intake temperature further raised by supercharging, thereby making it possible to expand the operating region in which combustion is conducted by compression self-ignition in the preceding cylinder and so making possible a further improvement in fuel costs.

Preferably also, in a prescribed region on the comparatively high load side of said operating region in which combustion is conducted by compression self-ignition in said following cylinder, said combustion controller conducts combustion by forced ignition in said preceding cylinder and, when in an operating region in which combustion is conducted by compression self-ignition in both said preceding cylinder and said following cylinder, performs setting such that the air/fuel ratio of said preceding cylinder is substantially larger.

In this way, in a comparatively high load region, the rate of introduction of new air can be increased by decreasing the internal EGR ratio in the preceding cylinder, so that, even if the cylinder temperature drops, combustion is conducted by forced ignition, so stable combustion can be achieved.

Also, if combustion in the preceding cylinder is conducted by compression self-ignition, even if the air/fuel ratio is a lean air/fuel ratio, it is necessary that this should be kept comparatively on the rich side but there is no particular need for this after changeover to forced ignition, so by setting a large air/fuel ratio in the preceding cylinder and setting the following cylinder comparatively on the rich side to perform combustion using compression self-ignition, which has a correspondingly better thermal efficiency, further improvement in fuel costs can be achieved.

BEST MODE FOR CARRYING OUT THE INVENTION

Embodiments of the invention are described below with reference to the drawings.

Figure 1:
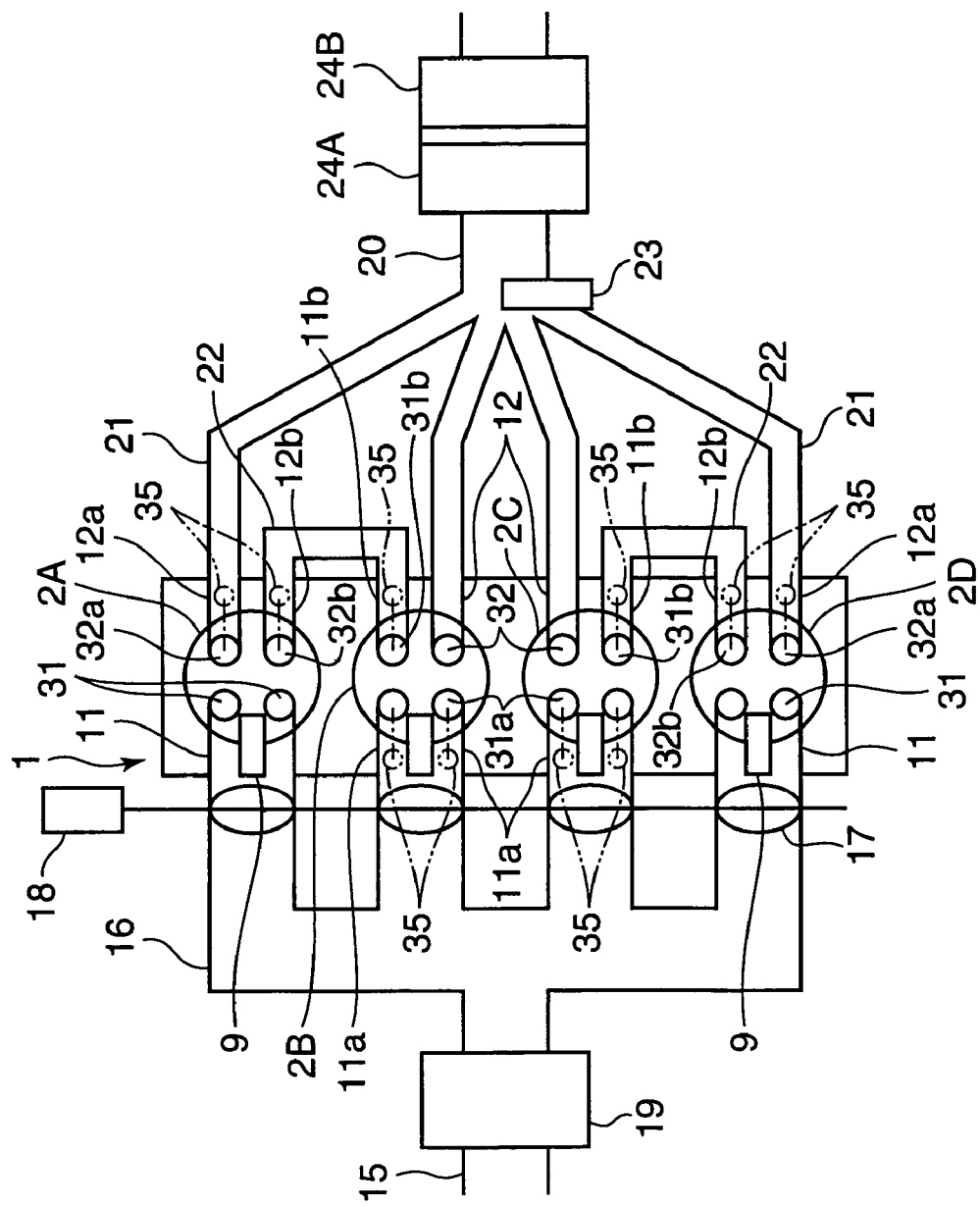
FIG. 1 is a diagrammatic plan view of an entire engine comprising a device according to an embodiment of the present invention.
Figure 2:
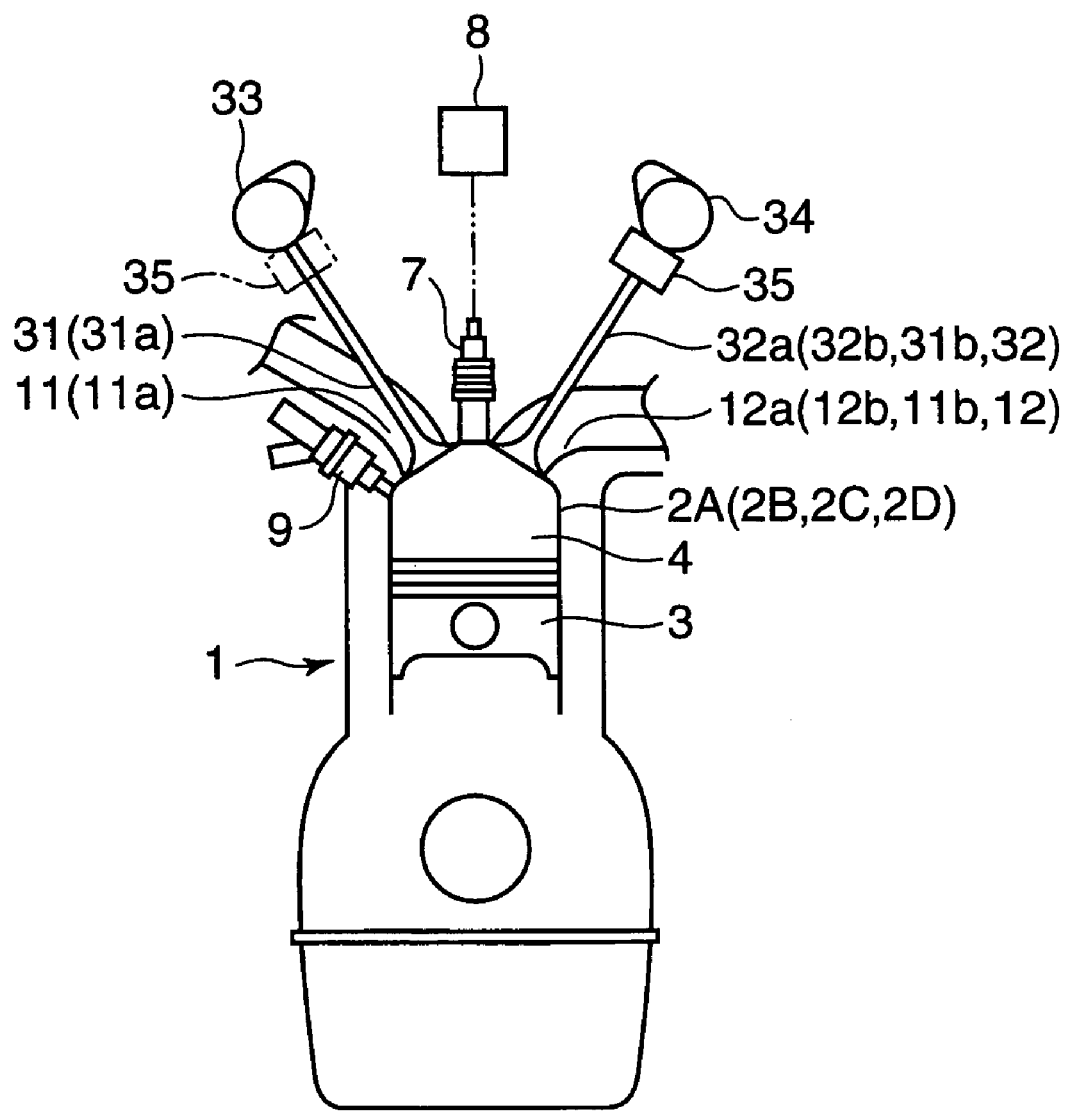
FIG. 2 is a diagrammatic cross-sectional view of a main engine unit etc.

FIG. 1 shows diagrammatically the construction of an engine according to an embodiment of the present invention and FIG. 2 shows diagrammatically the construction of one cylinder of a main engine body 1 and an intake/exhaust valve etc provided in respect of this. In these Figures, the main engine body 1 comprises a plurality of cylinders; in the embodiment shown, there are four cylinders 2A to 2D. A piston 3 is inserted into each of the cylinders 2A to 2D, a combustion chamber 4 being formed above the piston 3.

A spark plug 7 is provided at the top of the combustion chamber 4 of each cylinder 2, the tip of this plug facing the interior of the combustion chamber 4. An ignition circuit 8 capable of controlling the ignition time by electronic control is connected with this spark plug 7.

A fuel ignition valve 9 that directly injects fuel into the combustion chamber 4 is provided at the side of the combustion chamber 4. This fuel-injection valve 9 incorporates a needle valve and a solenoid, not shown, and is constructed such that, by input of a pulse signal, to be described, drive is effected to open the valve for a time corresponding to the pulse width at the time of this pulse input so as to inject fuel in an amount depending on the valve opening period. The fuel supply system is constituted such that fuel is supplied through a fuel supply passage etc by a fuel pump, outside the Figure, to this fuel-injection valve 9 and that a fuel pressure that is higher than the pressure within the combustion chamber is applied in the compression stroke.

Also, by opening of intake ports 11, 11a, 11b and exhaust ports 12, 12a, 12b with respect to the combustion chamber 4 of the respective cylinders 2A to 2D, an air intake passage 15 and exhaust passage 20 etc are connected with these ports and these ports are arranged to be opened and closed by means of intake valves 31, 31a, 31b and exhaust valves 32, 32a, 32b.

Figure 5:
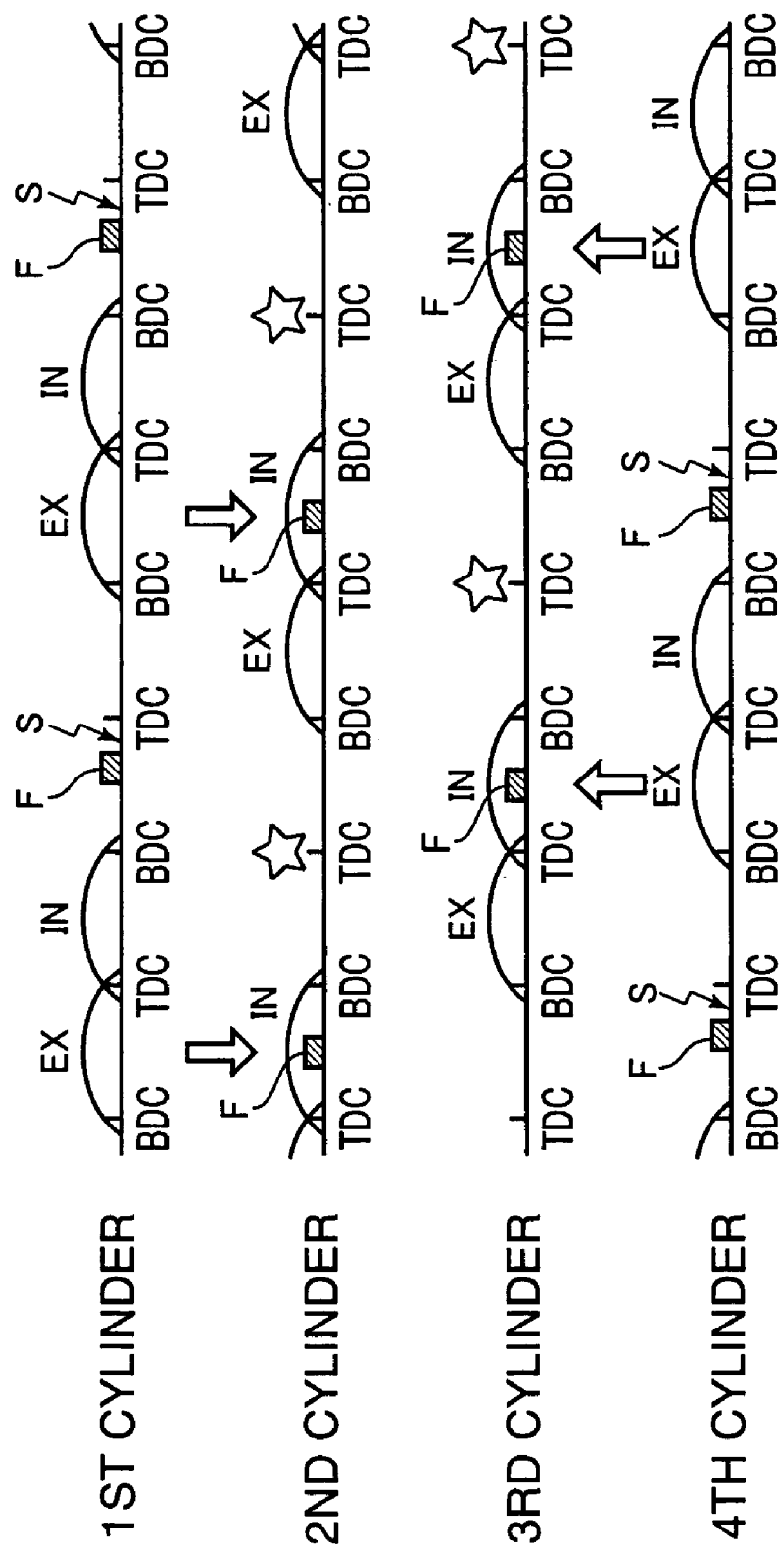
FIG. 5 is a view showing the exhaust stroke, intake stroke, fuel injection period and ignition period etc of each cylinder.

The cylinders are arranged to perform a cycle comprising intake, compression, expansion and exhaust strokes with prescribed phase differences. In the case of a four-cylinder engine, if the cylinders are identified as a first cylinder 2A, a second cylinder 2B, a third cylinder 2C and four-cylinder 2D from one end in the direction of the arrangement of the cylinders, as shown in FIG. 5, the aforesaid cycle is arranged to be performed with crank angle phase differences of 180° in each case, in the order: first cylinder 2A, third cylinder 2C, fourth cylinder 2D and second cylinder 2B. In FIG. 5, EX is the exhaust stroke and IN is the intake stroke; also, F represents fuel injection and S represents forced ignition; the asterisks in the Figure indicate that compression ignition is performed.

In a pair of cylinders whose exhaust stroke and intake stroke overlap, there is provided an inter-cylinder gas passage 22 such that burnt gas can be directly fed from the cylinder which is on the exhaust stroke side when the exhaust stroke and intake stroke overlap (in the specification, this will be termed the preceding cylinder) to the cylinder on the side of the intake stroke (in the specification this will be termed the following cylinder). In the four-cylinder engine of this embodiment, as shown in FIG. 5, the exhaust stroke (EX) of the first cylinder 2A and the intake stroke (IN) of the second cylinder 2B overlap and the exhaust stroke (EX) of the fourth cylinder 2D and the intake stroke (IN) of the third cylinder 2C overlap, so the first cylinder 2A and second cylinder 2B and the fourth cylinder 2D and third cylinder 2C respectively constitute pairs, the first cylinder 2A and fourth cylinder 2D being preceding cylinders, while the second cylinder 2B and third cylinder 2C are following cylinders.

Specifically, the intake/exhaust ports of each cylinder and the intake passage, exhaust passage and inter-cylinder passage connected thereto are constructed as follows.

The preceding cylinders i.e. the first cylinder 2A and fourth cylinder 2D are respectively provided with an intake port 11 for introduction of new air, a first exhaust port 12a for delivering burnt gas (exhaust gas) to the exhaust passage, and a second exhaust port 12b for feeding out burnt gas to the following cylinders. Also, the following cylinders i.e. the second cylinder 2B and third cylinder 2C are respectively provided with a first intake port 11a for introducing new air, a second intake port 11b for introducing burnt gas from the preceding cylinders and an exhaust port 32 for delivering burnt gas to the exhaust passage.

In the example shown in FIG. 1, two per cylinder of the intake port 11 in the first and fourth cylinders 2A and 2D and the first intake port 11a in the second and third cylinders 2B and 2C are provided in parallel on the left-hand side of the combustion chamber, and a first exhaust port. 12a and second exhaust port 12b in the first and fourth cylinders 2A and 2D and a second intake port 11b and exhaust port 12b in the second and third cylinders 2B and 2C are provided in parallel on the right-hand side of the combustion chamber.

The downstream end of the branch intake passage 16 for each cylinder in the intake passage 15 is connected with the intake port 11 in the first and fourth cylinders 2A and 2D and with the first intake port 11a in the second and third cylinders 2B and 2C. In the vicinity of the downstream end of each branch intake passage 16 there are provided multiple linked throttle valves 17 that are mutually linked by means of a common shaft, these multiple linked throttle valve 17 being driven by means of an actuator 18 in response to a control signal, to adjust the air intake rate. An airflow sensor 19 is provided that detects the air intake flow rate in the common air intake passage upstream of the merging section in the intake passage 15.

The upstream end of a branched exhaust passage 21 for each cylinder in the exhaust passage 20 is connected to the first exhaust ports 12a in the first and fourth cylinders 2A and 2D and to the exhaust ports 12 in the second and third cylinders 2B and 2C. Also, respective inter-cylinder gas passages 22 are provided between the first cylinder 2A and second cylinder 2B and between the third cylinder 2C and fourth cylinder 2D. The upstream end of the inter-cylinder gas passage 22 is connected with the second exhaust ports 12b of the first and fourth cylinders 2A and 2D, which are the preceding cylinders, and the downstream end of the inter-cylinder gas passage 22 is connected with the second intake port 11b of the second and third cylinders 2B and 2C, which are the following cylinders.

The aforementioned inter-cylinder gas passages 22 are comparatively short passages that make connections between mutually adjacent cylinders, so that the amount of heat radiated whilst the gas exhausted from the preceding cylinders passes through these passages 22 is kept to a comparatively low level.

An $O_2$ sensor 23 is provided that detects the air/fuel ratio by detecting the oxygen concentration in the exhaust gas in the merging section downstream of the branched exhaust passage 21 in the exhaust passage 20. In addition, an exhaust gas cleaning catalyst is provided in the exhaust passage 21 downstream of the $O_2$ sensor 23; in this embodiment, a lean NOx catalyst 24A and three-way catalyst 24B are provided. The lean NOx catalyst 24A has an NOx cleansing ability even at lean air/fuel ratios and comprises for example an occlusion-type lean NOx catalyst that adsorbs NOx in an excess oxygen atmosphere and performs release and reduction of NOx in an atmosphere of lowered oxygen concentration. Also, as is generally known, the three-way catalyst 24B is a catalyst that shows a high cleansing ability in respect of HC, CO and NOx when the air/fuel ratio of the exhaust gas is in the vicinity of the stoichiometric air/fuel ratio (i.e. the excess air ratio $\lambda$ is $\lambda=1$).

The intake/exhaust valves that open/close the intake/exhaust ports of the cylinders and the valve actuation mechanisms of these are as follows.

The intake port 11, first exhaust port 12a and second exhaust port 12b at the first and fourth cylinders 2A and 2D are respectively provided with an intake valve 31, first exhaust valve 32a and second exhaust valve 32b and the first intake port 11a, second intake port 11b and exhaust port 12 at the second and third cylinders 2A and 2B are respectively provided with a first intake valve 31a, second intake valve 31b and exhaust valve 32. Also, in order that the intake stroke and exhaust stroke of the cylinders should be performed with the prescribed phase differences described above, these intake/exhaust valves are driven so as to open/close with prescribed timings by means of a valve actuation mechanism comprising respective camshafts 33 and 34 etc.

In addition, of these intake/exhaust valves, the first exhaust valve 32a, second exhaust valve 32b, first intake valve 31a and second intake valve 31b are provided with a valve deactivating mechanism 35 that changes over the valves between an actuated condition and a deactivated condition. This valve deactivating mechanism 35 is not shown in detail, since it is previously known, but is for example such that a hydraulic chamber capable of supplying/draining hydraulic fluid in respect of a tappet interposed between a valve shaft and cam of camshafts 33 and 34 is provided wherein, in a condition in which hydraulic fluid is supplied to this hydraulic fluid chamber, operation of the cam is transmitted to the valve, causing the valve to be subjected to opening/closing operation, whereas, when the hydraulic fluid is drained from the hydraulic fluid chamber, operation of the cam is no longer transmitted to the valve, with the result that the valve is deactivated.

Figure 3:
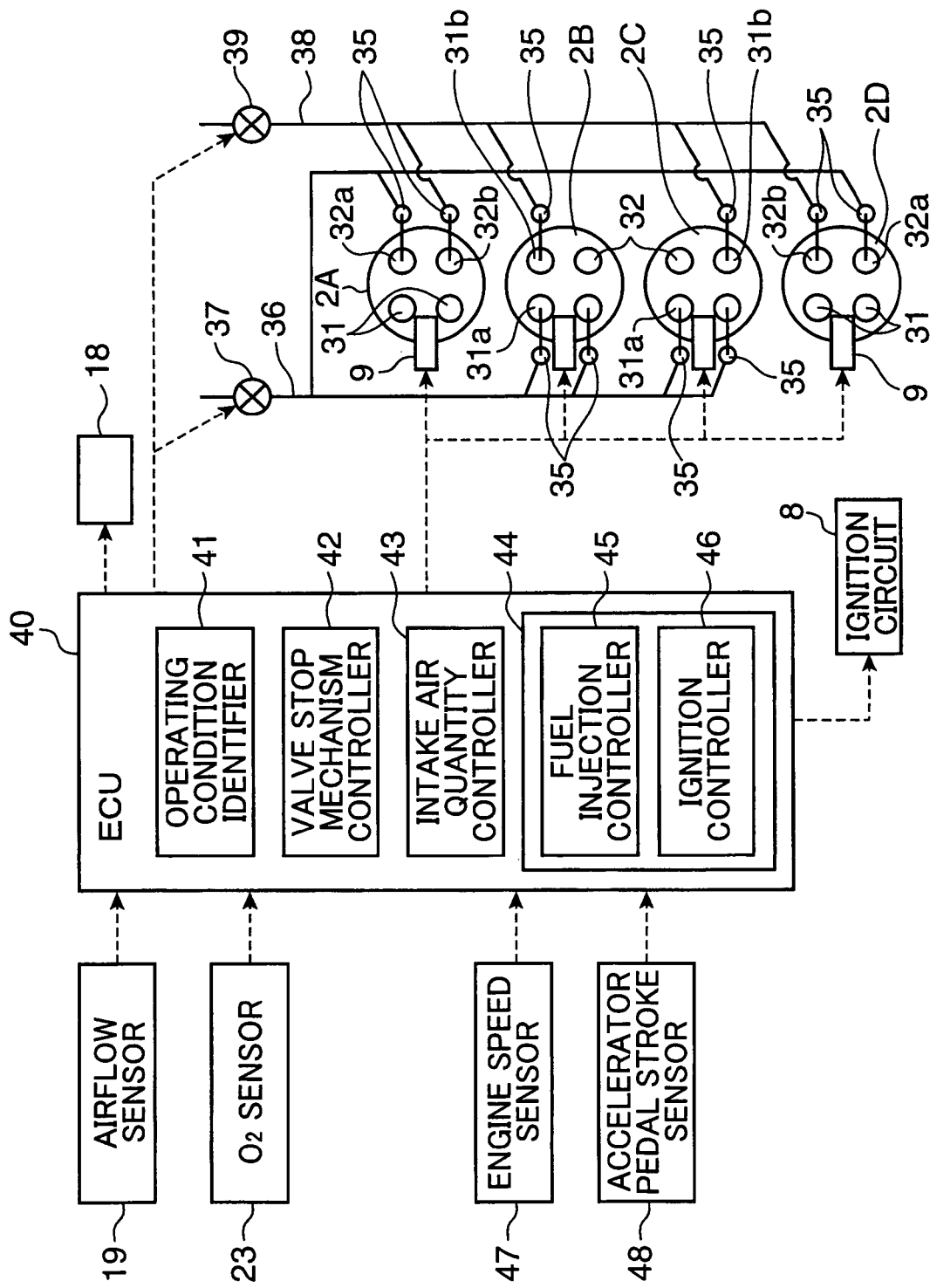
FIG. 3 is a block diagram of a control system.

The passage 36 for hydraulic fluid supply/draining in respect of the valve deactivating mechanism 35 of the first exhaust valve 32a and the valve deactivating mechanism 35 of the first intake valve 31a is provided with a first control valve 37 and the passage 38 for hydraulic fluid supply/draining in respect of the valve deactivating mechanism 35 of the second exhaust valve 32b and the valve deactivating mechanism 35a of the second intake valve 31b is provided with a second control valve 39, respectively (see FIG. 3).

FIG. 3 shows the layout of the drive and control systems. In this Figure, an ECU (control unit) 40 for engine control, comprising a microcomputer etc, inputs signals from an airflow sensor 19 and $O_2$ sensor 23; in addition, it inputs signals from a engine speed sensor 47 that detects the engine rotational speed, and an accelerator pedal stroke sensor 48 etc that detects the degree of opening of the accelerator (amount of depression of the accelerator pedal), for ascertaining the operating condition. Also, control signals are output from this ECU 40 to the fuel injection valves 9, the actuators 18 of the multiple linked throttle valves 17 and the first and second control valves 39 mentioned above.

The ECU 40 comprises operating condition identifier 41, valve stop mechanism controller 42, air intake rate controller 43 and combustion controller 44.

Figure 4:
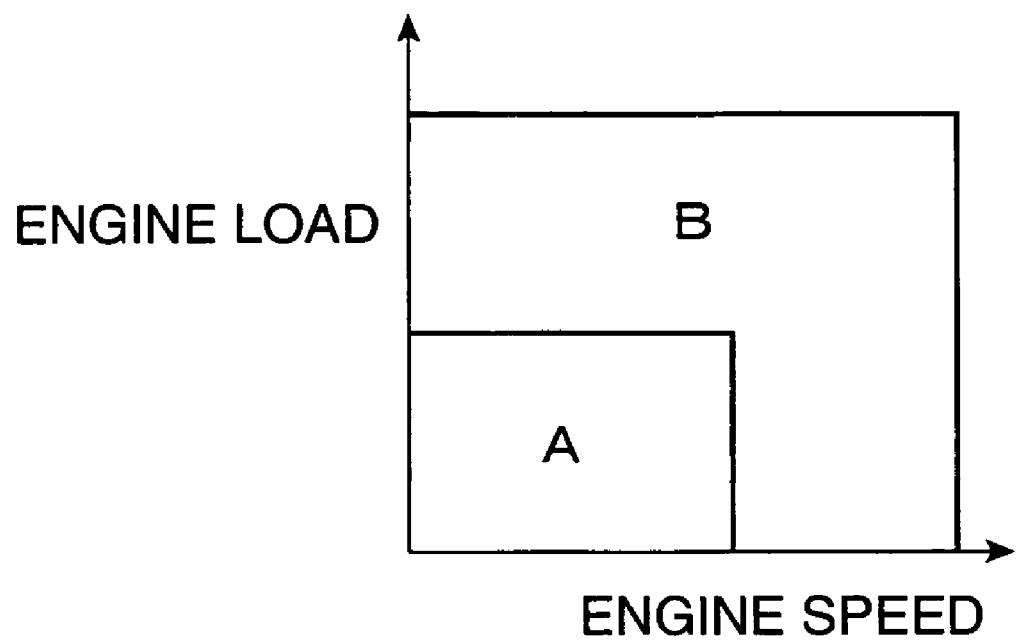
FIG. 4 is a diagram showing an example of operating region setting for control in accordance with the operating condition.

The operating condition identifier 41 ascertains which region the operating condition is in i.e. whether the operating condition is in the operating region A on the low load, low rotational speed side, or in the operating condition B on the high load or high rotational speed side, as shown in FIG. 4, by examining the operating condition of the engine (engine rotational speed and engine load) by means of the signals from the engine speed sensor 45 and accelerator pedal stroke sensor 46 etc. Then, based on the results of this determination, in the operating region A on the low load, low rotational speed side, a special operating mode is selected in which combustion is effected with the burnt gas exhausted from the preceding (leading) cylinders in the exhaust stroke fed directly to the following cylinders, which are in the intake stroke but, in the operating region B on the high load or high rotational speed side, the ordinary operating mode is selected in which combustion is effected with the cylinders respectively operated independently.

The valve stop mechanism controller 42 controls the valve deactivation mechanisms 35 as follows by controlling the control valves 37, 39 depending on whether the operating condition is in the operating region A on the low load, low rotational speed side (i.e. the case where the special operating mode is selected) or is in the operating region B on the high load or high rotational speed side (i.e. in the case where the ordinary operating mode is selected).

Operating region A: condition in which the first exhaust valve 32a and first intake valve 31a are deactivated
condition in which the second exhaust valve 32b and the second intake valve 31b are actuated Operating condition B: condition in which the first exhaust valve 32a and first intake valve 31a are actuated
condition in which the second exhaust valve 32b and the second intake valve 31b are deactivated Flow path changeover means whereby the gas flow path is changed over as described in detail hereinbelow is constituted by this valve stop mechanism controller 42 and the valve deactivation mechanisms 35 which are controlled thereby.

The air intake rate controller 43 controls the degree of opening (degree of throttle opening) of the throttle valves 17 by controlling the actuators 18, finds a target air intake rate from a map or the like in accordance with the operating condition and controls the degree of throttle opening in accordance with this target air intake rate. In this case, in the low load, low operating speed operating region A, as will be described, in a condition with introduction of intake air from the branched intake passage 16 in the following cylinders (second and third cylinders 2B and 2C) being cut off, combustion is performed with the ratio between the excess air in the gas that is introduced from the preceding cylinders and the fuel that is newly supplied being a lean air/fuel ratio, the degree of opening of the throttle is adjusted such that air that is more by a prescribed amount than the quantity of air that is necessary for combustion of the fuel in accordance with the required torque for the two leading and following cylinders (i.e. air of a quantity in the stoichiometric air/fuel ratio (or theoretical air/fuel ratio) with respect to the quantity of fuel for the two cylinders) is supplied to the preceding cylinders (first and fourth cylinders 2A and 2D).

The combustion controller 44 comprises fuel injection controller 45 and ignition controller 46; the fuel injection controller 45 controls the fuel injection rate from the fuel injection valves 9 provided in each cylinder 2A to 2D and the injection timing in accordance with the operating condition of the engine; the injection controller 46 performs control such as control of the ignition time and ignition deactivation etc in accordance with the operating condition. Thus, control of combustion (control of fuel injection and control of ignition) is altered in particular in the case where the operating condition is in operating region A and where the operating condition is in operating condition B in FIG. 4.

Specifically, when the operating condition is in operating region A on the low load, low rotational speed side, the fuel injection rate is controlled such that the air/fuel ratio is a lean air/fuel ratio, larger than the stoichiometric air/fuel ratio, preferably about twice or more the stoichiometric air/fuel ratio, and, in the compression step, an injection timing is set such that the fuel injection results in layering of the mixture and an ignition timing is set such that the forced ignition is performed in the vicinity of the compression top dead center. In contrast, in the case of the following cylinders (second and third cylinders 2B and 2C), fuel is supplied in respect of the burnt gas of the lean air/fuel ratio introduced from the preceding cylinders and, also after supply of fuel, the fuel injection rate is controlled and, in the intake step, the injection timing is set such that fuel is injected such as to produce an air/fuel ratio that is leaner than the stoichiometric air/fuel ratio and forced ignition is deactivated so that compression ignition is performed.

Also, when the operating condition is in the operating region B on the high load side or high rotational speed side, the fuel injection rate is controlled such that the air/fuel ratio of the cylinders 2A to 2D is at or below the stoichiometric air/fuel ratio: for example, in most of the region of this operating region B, the air/fuel ratio may be made to be the stoichiometric air/fuel ratio and, in the fully open load operating region and the vicinity thereof, may be made to be richer than the stoichiometric air/fuel ratio. In this case, the injection timing is set such that a uniform mixture is produced by injection of fuel to the cylinders 2A to 2D in the intake step and such that forced ignition is produced in the cylinders 2A to 2D.

The operation of a device according to this embodiment as described above will now be described with reference to FIG. 5 to FIG. 7.

Figure 6:
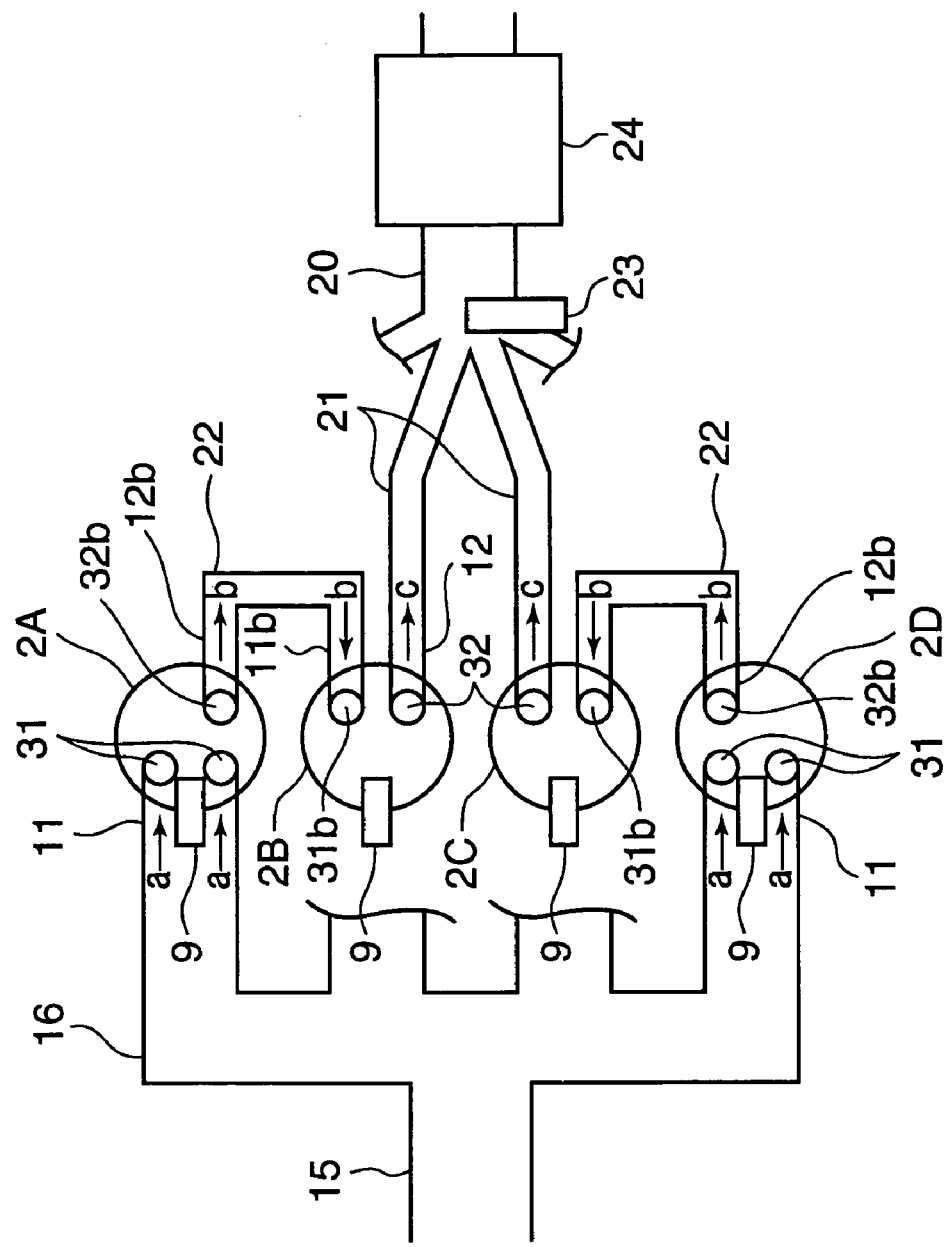
FIG. 6 is a diagram showing a flow path for substantially new air and gas during low load, low rotational speed operation.

In the operating region A on the low load, low rotational speed side, a flow path of substantially new air and gas as shown in FIG. 6 is produced by putting the device in a special operating mode, in which, as described above, the first exhaust valve 32a and the first intake valve 31a are in deactivated condition and the second exhaust valve 32b and second intake valve 31b are in actuated condition. Thus, a two-cylinder connection condition is produced whereby burnt gas that is exhausted from the preceding cylinders (first and fourth cylinders) 2A to 2D is directly introduced into the following cylinders (second and third cylinders) 2B and 2C through the inter-cylinder gas passages 22 and only the gas exhausted from these following cylinders 2B, 2C is fed to the exhaust passage 20.

In this condition, new air is introduced (arrow a in FIG. 6) from the intake passages 15 in the respective intake strokes to the preceding cylinders 2A, 2D and fuel is injected in the compression stroke whilst performing feedback control of the fuel injection rate such that the air/fuel ratio detected by a linear $O_2$ sensor 25 in the preceding cylinders 2A, 2D is a super-lean air/fuel ratio of substantially twice or more of the stoichiometric air/fuel ratio and stratified charge combustion is effected (see FIG. 5) with this super-lean air/fuel ratio by performing ignition at a prescribed ignition time.

After this, in the period in which the intake stroke of the preceding cylinders 2A and 2D and the exhaust stroke of the following cylinders 2B and 2C overlap, burnt gas exhausted from the preceding cylinders 2A, 2D is fed to the following cylinders 2B, 2C through the gas passages 22 (white arrow in FIG. 5 and arrow b in FIG. 6). Then, in the following cylinders 2B, 2C, fuel is supplied to the burnt gas of lean air/fuel ratio introduced from the preceding cylinders 2A, 2D and fuel is injected in the intake step whilst controlling the fuel injection rate such as to produce an air/fuel ratio that is leaner than the stoichiometric air/fuel ratio, and compression ignition is then performed by rise of pressure and temperature in the combustion chamber in the vicinity of the top dead center of the compression stroke.

In this case, since the high temperature burnt gas that is exhausted from the preceding cylinders 2A, 2D is immediately introduced into the following cylinders 2B, 2C through the short inter-cylinder gas passages 22, the temperature in the combustion chamber in the intake stroke in the following cylinders 2B, 2C becomes high, so that the temperature within the combustion chamber rises to an extent such as to comfortably enable self-ignition of the mixture in the vicinity of the top dead center of the final period of the compression stroke by a further rise in pressure and temperature from this condition in the compression stroke. Furthermore, since the aforesaid burnt gas is thoroughly mixed and uniformly distributed during the period from its being exhausted from the preceding cylinders 2A, 2D up to its being introduced into the following cylinders 2B, 2C, and, in addition, the fuel that is injected in the intake stroke is uniformly dispersed in the entire combustion chamber during the final period of the compression stroke, a uniform mixture distribution condition that satisfies the ideal simultaneous compression ignition condition is obtained.

Thus, in the following cylinders 2B, 2C, a large amount of burnt gas constituents corresponding to EGR gas is contained and, even under the condition that the air/fuel ratio is lean, combustion is performed rapidly by simultaneous compression ignition; thermal efficiency is thereby greatly increased.

That is, in the preceding cylinders 2A, 2D, thermal efficiency is raised by stratified charge combustion with a super-lean ratio and pumping loss is lowered; moreover, in the following cylinders 2B, 2C, thermal efficiency is raised by performing compression ignition in a uniform mixture condition while keeping the air/fuel ratio lean and the benefit of lowered pumping loss is obtained in the same way as with the preceding cylinders 2A, 2D. By these actions, fuel consumption is greatly improved.

Furthermore, since compression ignition in the following cylinders 2B, 2C is achieved by utilizing the heat of the burnt gas that is exhausted from the preceding cylinders 2A, 2D, there is no need to provide special heating means or to greatly elevate the engine compression ratio and compression ignition can be effectively performed over a wide operating range.

After combustion in the following cylinders 2B, 2C, the gas is exhausted to the exhaust passage 20 and cleansing of the exhaust gas is performed by a lean NOx catalyst 24A etc provided in the exhaust passage 20.

Also, the rate of generation of NOx in the preceding cylinders 2A, 2D is restrained to a comparatively low level by making the air/fuel ratio therein a lean air/fuel,ratio of substantially twice or more the stoichiometric air/fuel ratio and generation of NOx in the following cylinders 2B, 2C is fully satisfactorily restrained by producing a condition equivalent to that in which a large quantity of EGR is performed, by introducing burnt gas from the preceding cylinders 2A, 2D. This is also advantageous in reducing emissions.

Figure 7:
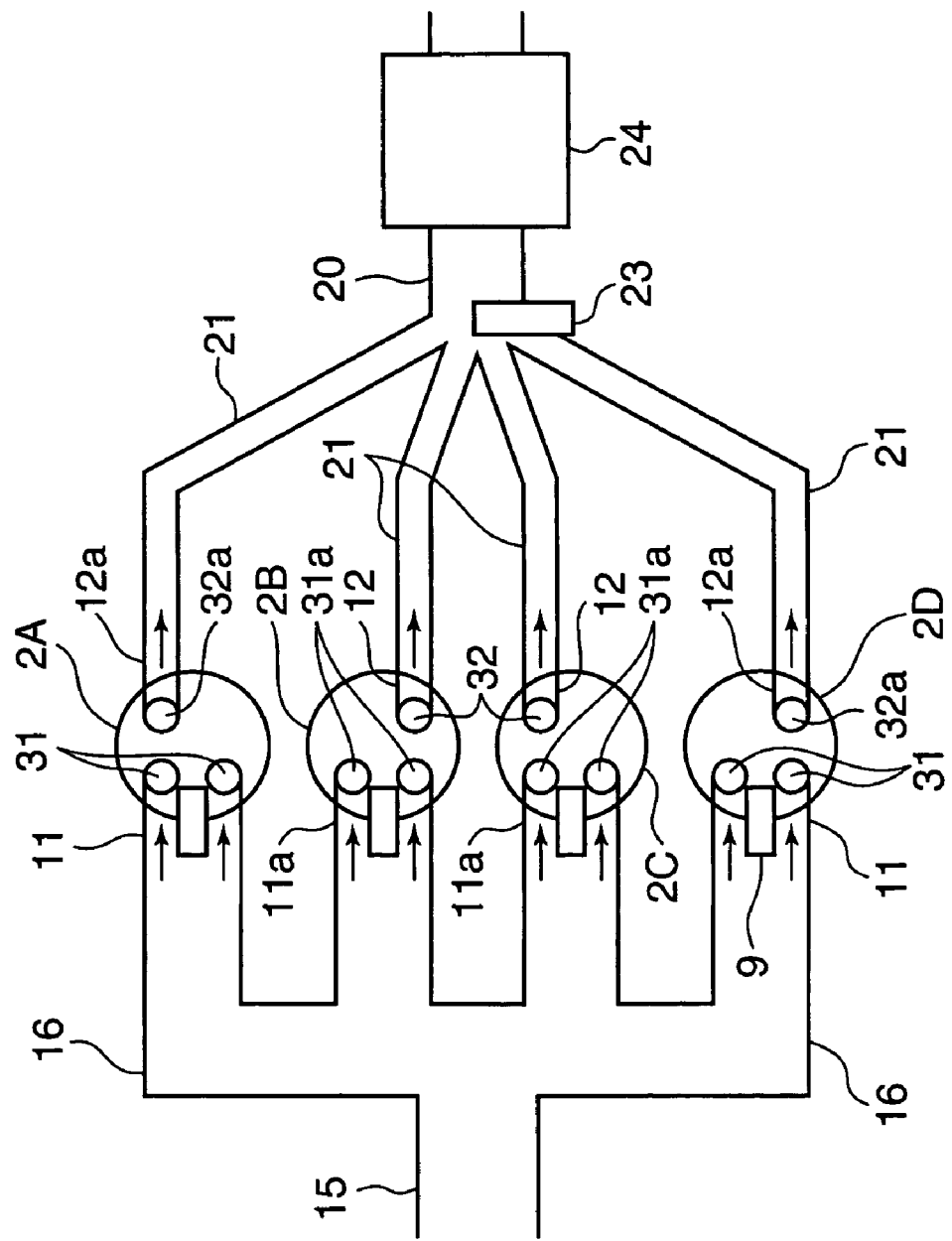
FIG. 7 is a diagram showing a flow path for substantially new air and gas in an operating region on the high load, high/low rotational speed side.

In contrast, in the operating region B on the high load side or high rotational speed side, the device is put in the ordinary operating mode, in which, as described above, the first exhaust valve 32a and first intake valve 31a are put into actuated condition while the second exhaust valve 32b and second intake valve 31b are put into deactivated condition, thereby producing a flow path for substantially new air and gas as shown in FIG. 7, in which the intake ports 31, 31a and exhaust ports 12a, 12 of the cylinders 2A to 2D are substantially independent, so that new air is introduced into the intake ports 31, 31a of the cylinders 2A to 2D from the intake passage 15 and burnt gas is exhausted to the exhaust passage 20 from the exhaust ports 31, 31a of the cylinders 2A to 2D. In this case, output performance is ensured by controlling the intake air rate and fuel-injection rate such that the air/fuel ratio is the stoichiometric air/fuel ratio or is richer than this.

Figure 8:
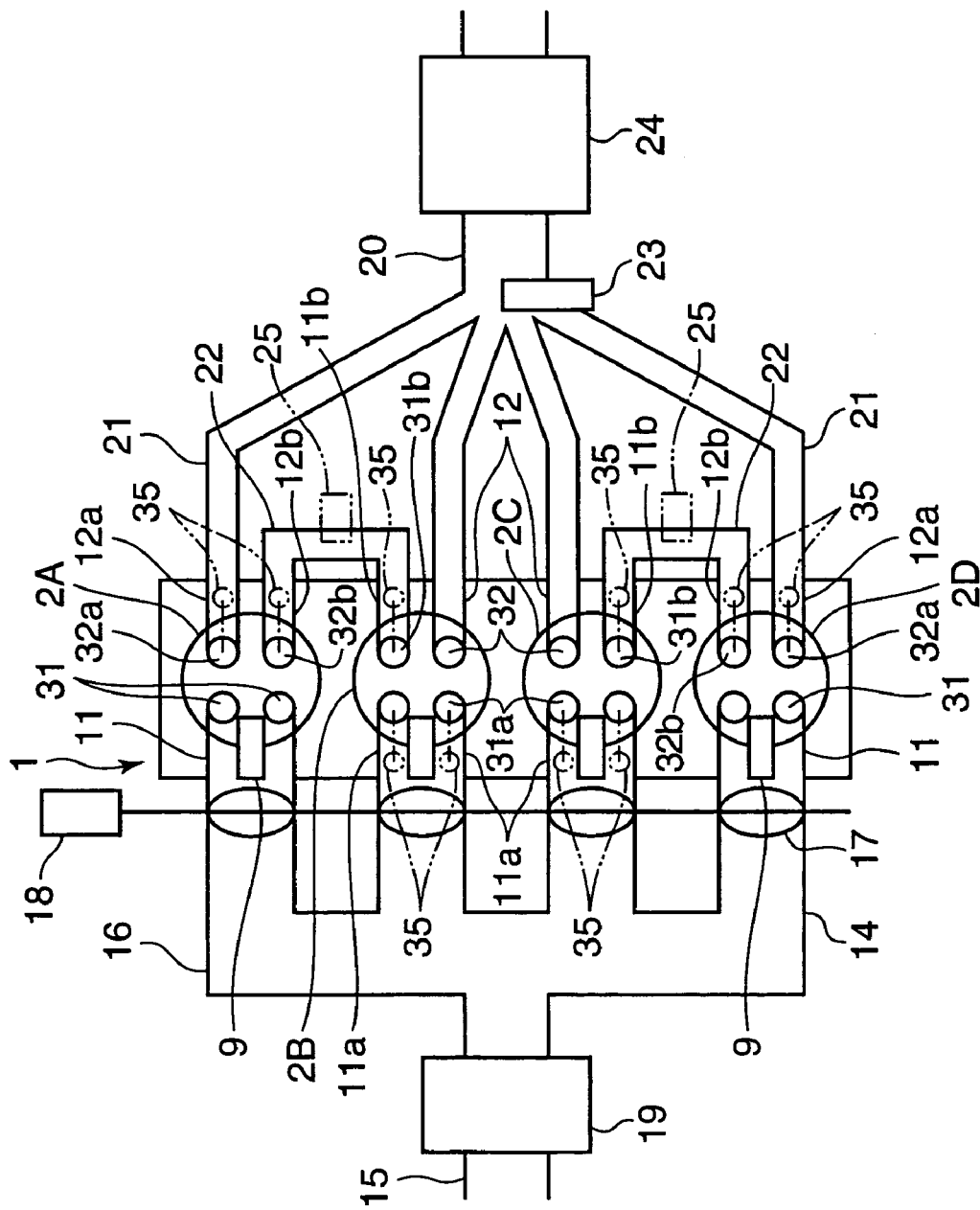
FIG. 8 is a diagrammatic plan view of an entire engine showing a modified example in which the catalyst etc provided in the exhaust passage is changed from that shown in FIG. 1.

In the above embodiment, in the low rotational speed, low load operating region A, the fuel injection rate is controlled such that the air/fuel ratio of the following cylinders 2B, 2C is leaner than the stoichiometric air/fuel ratio, but it would also be possible to control the fuel injection rate such that the air/fuel ratio in the following cylinders 2B, 2C is at or below or the stoichiometric air/fuel ratio. In this case, as shown in FIG. 8, only a three-way catalyst 24B is provided in the exhaust passage 20, or an oxidation catalyst may be provided. Preferably, also, the $O_2$ sensor 23 provided in the merging section of the exhaust passage 20 is a $\lambda O_2$ sensor whose output changes abruptly in the vicinity of the stoichiometric air/fuel ratio and the fuel injection rate to the following cylinders 2B, 2C is subjected to feedback control in accordance with the output of this $O_2$ sensor 23. In addition, a linear $O_2$ sensor 25 whose output changes in linear fashion in response to the oxygen concentration is provided in the inter-cylinder gas passage 22 and the fuel injection rate to the preceding cylinders 2A, 2D whose air/fuel ratio is made to be a prescribed lean air/fuel ratio is subjected to feedback control in accordance with the output thereof.

In this way, since only gas of the stoichiometric air/fuel ratio is exhausted to the exhaust passage 20 from the following cylinders 2B, 2C, there is no need to provide a lean NOx catalyst and fully satisfactory exhaust cleansing performance can be secured simply by means of a three-way catalyst 24B (or oxidation catalyst).

Also, since there is no need to provide a lean NOx catalyst, there is no need to perform temporary enrichment of the air/fuel ratio in order to release or reduce NOx when the amount of NOx occlusion of the lean NOx catalyst builds up, so compromise of the improvement in fuel costs is avoided. Furthermore, the problem of sulfur poisoning of the lean NOx catalyst cannot occur.

Also, although, in the above embodiment, the fuel injection valves of the various cylinders were of the direct injection type in which fuel is directly injected into the combustion chamber, in regard to the following cylinders it would be possible for fuel to be injected in the intake stroke even in the operating region A of low load, low rotational speed, so the fuel injection valves provided in the following cylinders could be of a type whereby fuel is injected into the intake passage through the intake port.

Also, although, in the above embodiment, it was arranged for the flow path of the new air and gas to be changed over by the flow path changeover means in accordance with whether the operating condition was in the operating region A on the low load, low rotational speed side or whether the operating condition was in the operating region B on the high load side or high rotational speed side, it would also be possible to arrange for the flow path of new air and gas to be in the aforesaid condition with two cylinders connected throughout the entire operating region.

Figure 9:
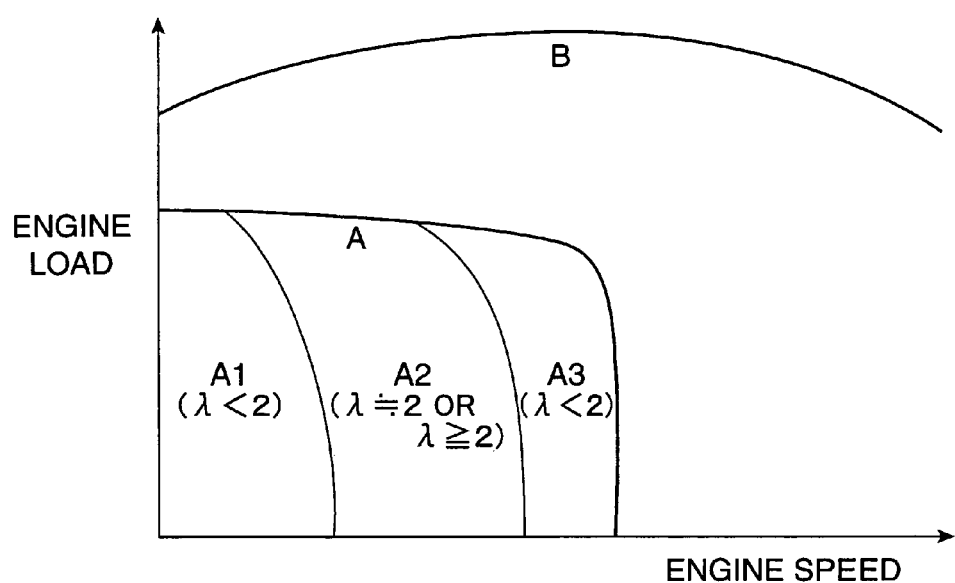
FIG. 9 is a diagram showing an example of operating region setting for exercising control in accordance with the operating condition in accordance with another embodiment.

FIG. 9 shows the setting of operating regions for control in accordance with a further embodiment of the present invention. In this embodiment, the operating region which was put in two-cylinder connected condition is divided into a plurality of regions and the air/fuel ratio of the preceding cylinders (ratio of the fuel injection rate in the case of the preceding cylinders and the fuel injection rate in the case of the following cylinders) is changed in accordance with these regions.

Figure 10:
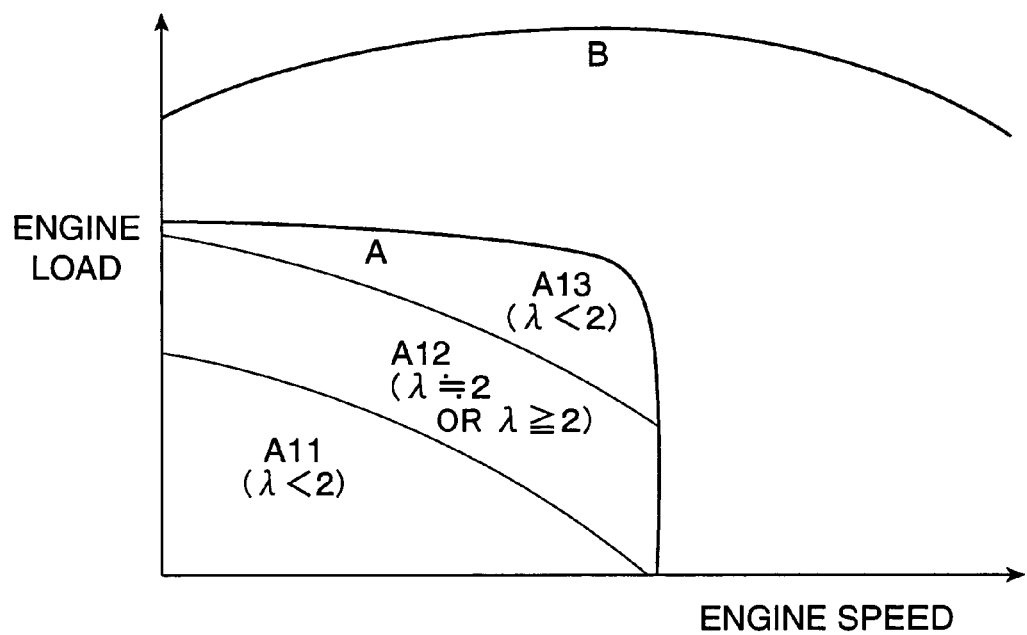
FIG. 10 is a diagram showing a second example in regard to operating region setting for exercising control in accordance with the operating condition.

In this embodiment also, the entire engine is constituted as in FIG. 1 or FIG. 8. Also, the control and drive systems are constituted as in FIG. 3 and the operating condition identifier 41 included in the ECU 40 ascertains which operating region the operating condition is in i.e. whether the operating condition is in the operating region A on the low load, low rotational speed side or in the operating condition B on the high load or high rotational speed side as shown in FIG. 10. However, in addition, when in the operating region A in which the special operating mode is selected, it is arranged to ascertain whether the operating condition is in a low speed region A1, intermediate speed region A2 or high speed region A3 of this region A.

Also, as the control exercised in the special operating mode, when the operating condition is in the operating region A on the low load, low rotational speed side, the combustion condition controller 44 included in the ECU 40 controls the fuel injection rate in respect of the preceding cylinders (first and fourth cylinders 2A and 2D) such that the air/fuel ratio is a lean air/fuel ratio greater than the stoichiometric air/fuel ratio and, in the compression stroke, sets the injection timing such that layering of the mixture is performed by the fuel injection and sets the ignition timing such that forced ignition is performed in the vicinity of the compression top dead center. On the other hand, in respect of the following cylinders (second and third cylinders 2B and 2C) fuel is supplied in respect of the burnt gas of the lean air/fuel ratio that is introduced from the preceding cylinders and the fuel injection rate is controlled such that the air/fuel ratio is substantially the stoichiometric air/fuel ratio and also the injection timing is set such that fuel is injected in the intake stroke and forced ignition is deactivated in order to perform compression self-ignition.

Furthermore, in this operating region A, the ratio of the fuel injection rate in respect of the preceding cylinders (first and fourth cylinders 2A, 2D) and the fuel injection rate in respect of the following cylinders (second and third cylinders 2B, 2C) is altered in accordance with the operating condition such that compression self-ignition is satisfactorily performed in the following cylinders, while adjusting the sum of the fuel injection rates in respect of both of the pair of cylinders to a rate at which the air/fuel ratio is the stoichiometric air/fuel ratio for the rate of introduction of air to the preceding cylinders.

Specifically, in the intermediate speed region A2 of this operating region A, it is arranged to make the air/fuel ratio during combustion in the preceding cylinders of the order of twice the stoichiometric air/fuel ratio ($\lambda$=approximately 2, expressed in terms of the excess air ratio $\lambda$, when A/F≈30) or more than twice the stoichiometric air/fuel ratio (excess air ratio $\lambda$ is $\lambda$>2), by making the fuel injection rate in respect of the preceding cylinders and the fuel injection rate in respect of the following cylinders substantially the same, or by making the fuel injection rate in respect of the following cylinders a little larger. Also, in the low speed region A1 of this operating region A, it is arranged to make the air/fuel ratio during combustion in the preceding cylinders less than twice the stoichiometric air/fuel ratio (the air excess ratio $\lambda$ is $1<\lambda<2$), for example A/F≈25, by making the fuel injection rate in respect of the preceding cylinders more than the fuel injection rate in respect of the following cylinders. And in the high speed region A3 of this operating region A, it is arranged to make the air/fuel ratio during combustion in the preceding cylinders less than twice the stoichiometric air/fuel ratio (the air excess ratio $\lambda$ is $1<\lambda<2$), for example A/F≈25, by making the fuel injection rate in respect of the preceding cylinders more than the fuel injection rate in respect of the following cylinders.

Next, the operation of a device according to this embodiment will be described.

In a device according to this embodiment also, in the low load, low rotational speed operating region A, the device is put into the special operating mode, in which combustion is effected in the two-cylinder connected condition, and, in the high load or high rotational speed operating region, the device is put into the ordinary operating mode, in which combustion is performed with the intake ports and exhaust ports of the respective cylinders in an independent condition. Thus, in the special operating mode, combustion in the preceding cylinders is conducted with a super-lean air/fuel ratio whereas, in the following cylinders, combustion is conducted by compression self-ignition.

In particular, in the special operating mode, compression self-ignition can be performed effectively over a wide operating range, by adjusting the ratio of the fuel injection rate in respect of the preceding cylinders (first and fourth cylinders 2A and 2D) and the fuel injection rate in respect of the following cylinders (second and third cylinders 2B, 2C) as described above in accordance with the operating condition.

That is, in the low speed region A1 of the operating region A in which the special operating mode is conducted, basically a condition obtains in which the temperature in the combustion chamber is lower than in the case of the intermediate and high speed regions A2 and A3, so compression self-ignition is difficult to carry out, but, in the low speed region A1, control is exercised such that the air/fuel ratio of the preceding cylinders is a value of less than twice the stoichiometric air/fuel ratio by making the fuel-injection rate in respect of the preceding cylinders larger than that of the following cylinders, while adjusting the air/fuel ratio during combustion in the following cylinders to be substantially of the stoichiometric air/fuel ratio, so, compared with the case where the air/fuel ratio of the preceding cylinders is made to be twice the stoichiometric air/fuel ratio (i.e. the case where the injection rates of the preceding cylinders and following cylinders are the same), the temperature of the gas that is fed into the following cylinders from the preceding cylinders is raised. As a result, compression self-ignition is performed effectively even in the low speed region A1.

Also, in the high speed region A3 of the operating region A that has been put in the special operating mode, excessive rise of the combustion temperature would tend to produce knocking, but, in this region also, the fuel injection rate in respect of the preceding cylinders is made larger than that in respect of the following cylinders so that the air/fuel ratio of the preceding cylinders is controlled to be a value smaller than twice the stoichiometric air/fuel ratio. In this way, although the temperature of the gas that is introduced into the following cylinders rises compared with the case where the air/fuel ratio of the preceding cylinders is made to be twice the stoichiometric air/fuel ratio (i.e. the case where the injection rates of the preceding cylinders and following cylinders are the same), the amount of burnt gas constituents corresponding to EGR in the gas that is introduced into the following cylinders is increased and the fuel injection rate in respect of the following cylinders becomes small. As a result, the energy that is generated by combustion in the following cylinders becomes small, so knocking is suppressed.

Thus, although, if, by making the fuel injection rate in respect of the preceding cylinders more than that in respect of the following cylinders, the air/fuel ratio of the preceding cylinders is controlled so as to be a value smaller than twice the stoichiometric air/fuel ratio, this is advantageous in respect of compression self-ignition and knocking prevention compared with the case where the air/fuel ratio of the preceding cylinders is made to be twice the stoichiometric air/fuel ratio (i.e. the case where the injection rates of the preceding cylinders and following cylinders are the same), on the other hand, it is somewhat disadvantageous in regard to achievement of improved fuel costs by a stratified charge lean burn in the preceding cylinders and in regard to torque balance between the leading and following cylinders. Accordingly, in the intermediate speed region A2 in which compression self-ignition of the following cylinders is easily produced by the special operating mode and knocking is unlikely, the fuel injection rate is controlled so as to produce a value of the air/fuel ratio of the preceding cylinders of substantially twice the stoichiometric air/fuel ratio, or a value larger than this, so as to be advantageous in respect of improvement of fuel costs and torque balance.

It should be noted that, although, in the example shown in FIG. 9, the operating region A that was put into the special operating mode was divided into a low speed region A1, intermediate speed region A2 and high speed region A3 and the air/fuel ratio of the preceding cylinders (i.e. the ratio of the fuel injection rate in respect of the preceding cylinders and the fuel injection rate in respect of the following cylinders) altered in these regions A1, A2 and A3, it would also be possible, as shown in FIG. 10, to divide the operating region A that was put into the special operating mode into a low load region A11, intermediate load region A12 and high load region A13. In this case, control of the fuel injection rate is performed such that in the aforesaid intermediate load region A12 the air/fuel ratio of the preceding cylinders is made to be a value of substantially twice the stoichiometric air/fuel ratio or a value larger than this, while the air/fuel ratio of the preceding cylinders in the low load region A11 and high load region A13 is made to be a value less than twice the stoichiometric air/fuel ratio (for example A/F≈25).

Figure 11:
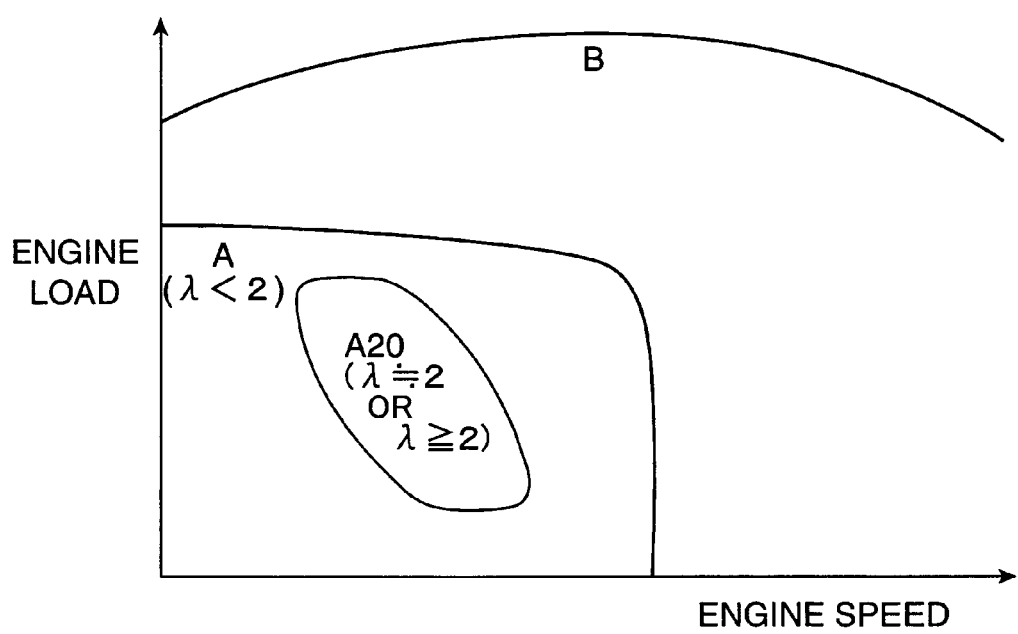
FIG. 11 is a diagram showing a third example in regard to operating region setting for exercising control in accordance with the operating condition.

Alternatively, as shown in FIG. 11, in the intermediate load region A20 of the operating region A that was put in the special operating mode, the air/fuel ratio of the preceding cylinders may be controlled to a value that is substantially twice the stoichiometric air/fuel ratio or is larger than this and in the other operating regions the air/fuel ratio of the preceding cylinders may be controlled to be a value that is smaller than twice the stoichiometric air/fuel ratio.

In these examples also, in the low load region etc of the operating region A that was put in the special operating mode, in which the temperature in the combustion chamber is comparatively low, compression self-ignition becomes possible due to the rise in temperature of the gas that is introduced into the following cylinders from the preceding cylinders and knocking is suppressed due to the reduced generation of energy of the following cylinders in the high load region etc where knocking is likely to occur; a condition is also produced that is beneficial in respect of improvement of fuel costs and torque balance in the intermediate load region A12 or intermediate speed, intermediate load region A20.

Although, in the examples shown in FIG. 9, FIG. 10 and FIG. 11 above, in a plurality of operating regions in an operating region A that was put into the special operating mode, it was arranged to change over the air/fuel ratio of the preceding cylinders between a value of substantially twice the stoichiometric air/fuel ratio or larger than this and a value smaller than this, it could be arranged to change the air/fuel ratio of the preceding cylinders progressively in accordance with the operating condition whilst keeping the air/fuel ratio larger than the stoichiometric air/fuel ratio.

In this case, in at least a low load region of the operating region A, the air/fuel ratio during combustion in the preceding cylinders is made smaller as the load becomes lower. Alternatively, in at least a low speed region of the operating region A, the air/fuel ratio during combustion in the preceding cylinders is made smaller as the speed becomes lower.

Figure 12:
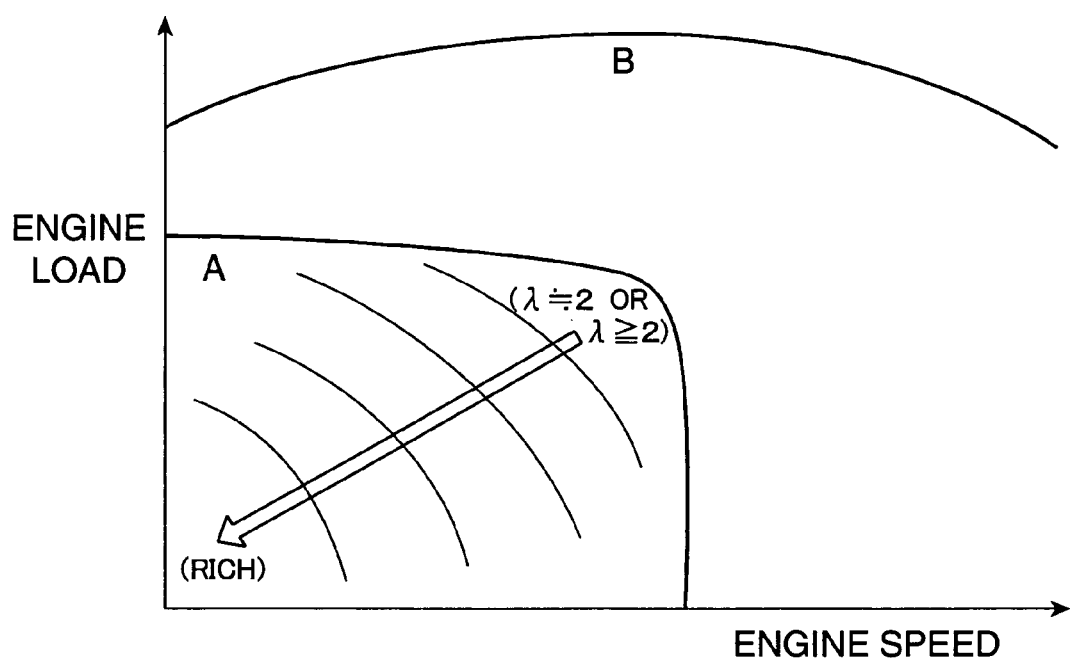
FIG. 12 is a diagram showing a fourth example in regard to operating region setting for exercising control in accordance with the operating condition.

For example, when the likelihood of knocking on the high speed, high load side of the operating region A which has been put into the special operating mode has been reduced by the provision of cooling means in the inter-cylinder gas passages 22, as shown in FIG. 12, the air/fuel ratio of the preceding cylinders may be made to be a value of substantially twice the stoichiometric air/fuel ratio or a value larger than this on the high speed, high load side of the operating region A which has been put into the special operating mode and the air/fuel ratio of the preceding cylinders may be arranged to be changed to the rich side and as the engine rotational speed or load becomes lower.

In this way, in the operating region A that was put into the special operating mode, the condition in which compression self-ignition is possible may be ensured by raising the temperature of the gas that is fed into the following cylinders from the preceding cylinders so as to compensate for the tendency for the temperature within the combustion chamber of the following cylinders to become lower as the engine rotational speed (or load) becomes lower.

Figure 13:
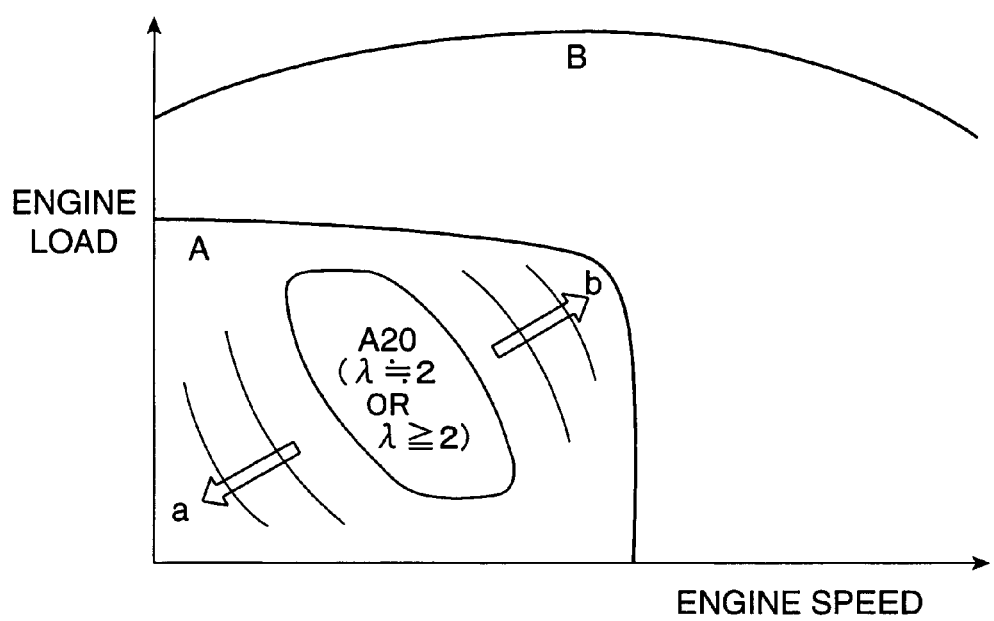
FIG. 13 is a diagram showing a fifth example in regard to operating region setting for exercising control in accordance with the operating condition.

Also, as shown in FIG. 13, control may be exercised such as to make the air/fuel ratio of the preceding cylinders in the intermediate speed, intermediate load region A20 of the operating region A that was put in the special operating mode a value of substantially twice the stoichiometric air/fuel ratio or greater than this and to progressively reduce the air/fuel ratio during combustion in the preceding cylinders as this region is departed from towards the low speed, low load side (direction of the arrow a) or towards the high speed, high load side (direction of the arrow b).

In this way, on the low speed, low load side of the operating region A that is put into the special operating mode, an excellent effect in terms of ensuring a condition in which compression self-ignition is possible and an excellent effect in terms of suppressing knocking on the high speed, high load side are obtained.

Also, in addition to control in accordance with the operating condition in the operating region A that was put in the special operating mode as described above, it may be arranged to alter the air/fuel ratio of the preceding cylinders in accordance with the temperature condition of the engine. For example, in cases where the engine temperature is low even after engine warm-up (cases where the temperature of the engine cooling water is below the prescribed temperature) it is preferable to make the air/fuel ratio of the preceding cylinders less than twice the stoichiometric air/fuel ratio in the entire region in the operating region A that has been put into the special operating mode. In this way, it is possible to ensure a condition in which compression self-ignition is possible by raising the temperature of the gas that is introduced into the following cylinders from the preceding cylinders even when the engine temperature is comparatively low.

Also, although, in the above examples, it is arranged to perform combustion by compression self-ignition in the following cylinders over the entire region of the operating region A that was put into the special operating mode, it would also be possible to arrange to perform combustion in the following cylinders by forced ignition by performing ignition using a spark plug 7 in a prescribed ignition period in part of the operating region A that was put into the special operating mode, for example in an extremely low speed, low load region where it is difficult for the temperature and pressure within the combustion chamber to achieve a condition in which compression self-ignition is possible. Alternatively, it would also be possible to arrange to perform combustion by forced ignition in the following cylinders when the engine temperature is low.

Figure 14:
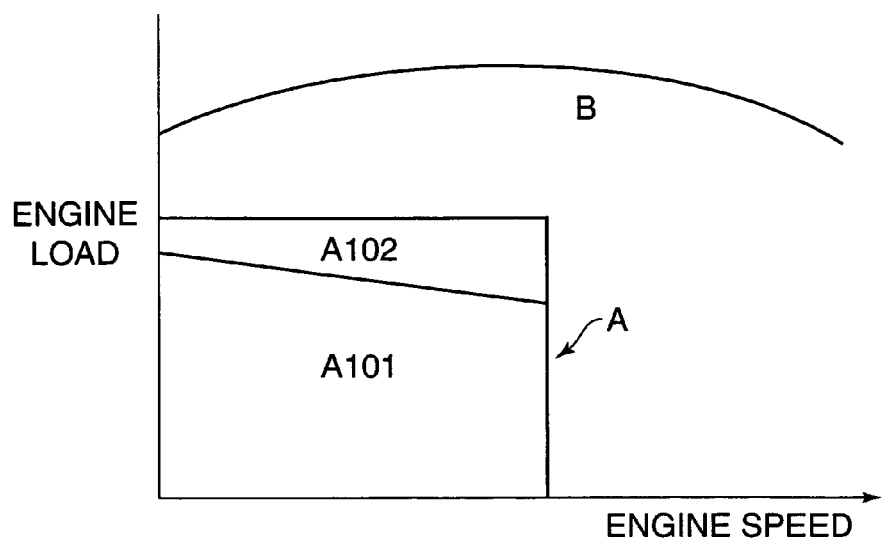
FIG. 14 is a diagram showing an example of setting of operating region for exercising control in accordance with the operating condition in accordance with yet a further embodiment.
Figure 15:
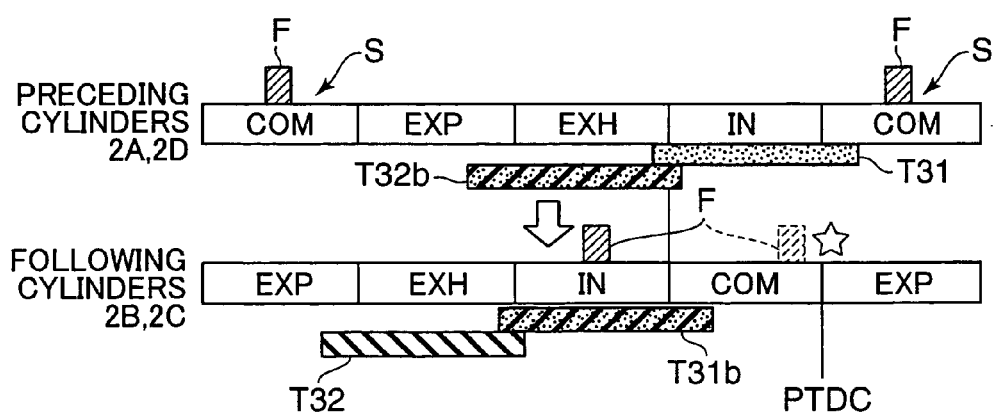
FIG. 15 is a diagram showing the combustion cycle of a preceding cylinder and a following cylinder.
Figure 16:
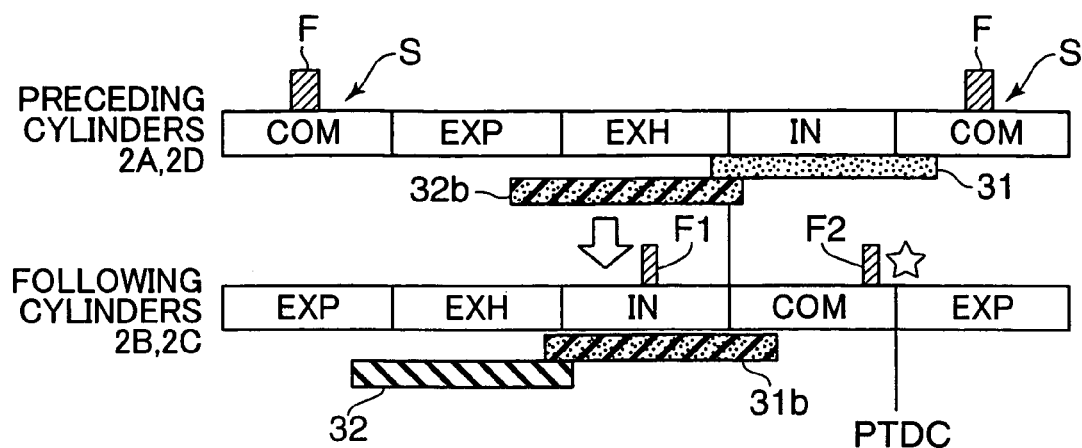
FIG. 16 is a diagram showing a further example of the combustion cycle of a preceding cylinder and a following cylinder.

FIG. 14 to FIG. 16 show control of intake/exhaust and combustion in accordance with the operating condition according to a further embodiment of the present invention.

In this embodiment also, the engine as a whole is constituted as shown in FIG. 1 or FIG. 8. Also, the control/drive system is constituted as in FIG. 3 and the operating condition identifier 41 included in the ECU 40 ascertains whether the operating condition is in the operating region A on the low load, low rotational speed side as shown in FIG. 14 is in the high load or high rotational speed side operating region B. However, in addition, when the operating condition is in the partial load region A in which the special operating mode is selected, a function is provided of ascertaining whether it is in the high load side region A102 of this region A or the region other than this i.e. the low load side region A101 of this partial load region A.

Also, when the operating condition is in the operating region A on the low load, low rotational speed side, the combustion condition controller 44 included in the ECU 40 controls the fuel injection rate in respect of the preceding cylinders (first and fourth cylinders 2A, 2D), by exercising control in the special operating mode, such as to make the air/fuel ratio a lean air/fuel ratio larger than the stoichiometric air/fuel ratio and sets the injection timing in the compression stroke such that the layering of the mixture is produced by the fuel injection and sets the ignition timing such that forced ignition is performed in the vicinity of the compression top dead center. On the other hand, in respect of the following cylinders (second and third cylinders 2B, 2C), it supplies fuel with respect to the burnt gas of lean air/fuel ratio introduced from the preceding cylinders and controls the fuel injection rate such that the air/fuel ratio is substantially the stoichiometric ratio and sets the injection timing such that fuel is injected in the intake stroke and deactivates forced ignition so that compression self-ignition is performed.

Also, in the low load side region A101 of the operating region A in which the control of the aforesaid special operating mode is executed, as shown in FIG. 15 by the solid line, the injection timing is set such that fuel is injected in the intake stroke of the following cylinders 2B, 2C and, in the high load side region A2 of the operating region A, the injection time of the fuel with respect to the following cylinders 2B, 2C is set to the latter half of the compression stroke of the following cylinders 2B, 2C i.e. to a time close to the compression top dead center PTDC, as shown by the broken line in FIG. 15, by relatively retarding the injection time of the fuel compared with the aforesaid low load side region A1. In FIG. 5, the times indicated by the symbols T31, T32b, T31b and T32 respectively indicate the valve-opening periods of the intake valve 31, second exhaust valve 32b, second intake valve 31b and exhaust valve 32.

Next, the operation of this embodiment will be described.

In the device of this embodiment also, in the low load, low rotational speed operating region A, the device is put into the special operating mode in which combustion is effected in the two-cylinder connected condition and, in the operating condition on the high load side or high rotational speed side, the device is put into the ordinary operating mode in which combustion is effected with the intake ports and exhaust ports of the respective cylinders put in an independent condition. Also, when in the special operating mode, combustion is performed in the preceding cylinders with a super-lean air/fuel ratio whereas in the following cylinders combustion is performed by compression self-ignition.

Also, in the operating region A in which control is performed in accordance with the special operating mode as described above, by adjusting the fuel ignition time in respect of the following cylinders 2B, 2C as described above in accordance with the operating condition, it is possible to ensure that compression self-ignition can be effectively performed over a wide operating range without occurrence of knocking.

Specifically, although, in the low speed side region A101 of the operating region A that was put in the special operating mode as described above, the conditions are such that compression self-ignition is more difficult to achieve than in the case of the high load side region A102, by setting the ignition time of the fuel at some point during the intake stroke as described above, this fuel and air (burnt gas of lean air/fuel ratio introduced from the preceding cylinders 2A, 2D) are thoroughly mixed so combustibility is promoted, with the result that compression self-ignition can be effectively performed even in the low speed region A101.

Also, although, in the high load side region A102 of the operating region A that was put in the aforesaid special operating mode, compression self-ignition occurs easily due to the higher temperature of the combustion chamber than in the low load side region A101, on the other hand, knocking of the following cylinders 2B, 2C tends to occur, so, by retarding the injection time of the fuel as described above in a period close to the compression top dead center PTDC, compression self-ignition is not performed until the mixture has been thoroughly activated after fuel injection, so that occurrence of knocking, in which self-ignition of the mixture occurs prior to propagation of the flame through the interior of the combustion chamber, is prevented.

Thus, in the operating region A in which compression self-ignition is performed in the following cylinders 2B, 2C, if it is found that an operating condition obtains in which knocking can easily occur i.e. the operating condition of the high load side operating region A102 as described above, it is arranged to suppress activation of the mixture by relatively retarding the injection time of the fuel with respect to the following cylinders 2B, 2C, so knocking, which occurs due to excessive ease of ignition of the mixture, can be effectively prevented. Furthermore, in the compression self-ignition region of the following cylinders 2B, 2C, if it is found that an operating condition obtains in which knocking is unlikely i.e. that the operating condition of the low load side region A101 described above obtains, activation of the mixture is promoted by relatively advancing the ignition time of the fuel with respect to the following cylinders 2B, 2C, so misfiring in the following cylinders 2B, 2C is effectively prevented and combustion by compression self-ignition can be reliably performed. In this way, the benefits are obtained that the thermal efficiency of the engine is improved and that engine output can be fully guaranteed.

In particular, when an operating condition obtains in which knocking is liable to occur in the compression self-ignition region of the following cylinders 2B, 2C, as shown in the above embodiment, if the injection time of the fuel with respect to the following cylinders 2B, 2C is set in the latter half of the compression stroke, activation of the mixture is effectively suppressed, thereby making it possible to reliably suppress occurrence of knocking as described above.

It should be noted that if it is found that an operating condition obtains in which knocking is liable to occur i.e. the operating condition of the high load side operating region A102 in the operating region A in which compression self-ignition of the following cylinders 2B, 2C is performed, as shown in FIG. 16, it may be arranged to inject the fuel in divided fashion into the following cylinders 2B, 2C and to set the latter injection time S2 of the fuel in this divided injection time in the latter half of the compression. By adopting such an arrangement, the advantage is thereby obtained that occurrence of knocking can be effectively prevented by suppressing the mixing of fuel corresponding to the injection of the latter period injected in the latter injection period F2 with air to a suitable degree, while maintaining combustibility by thoroughly mixing the fuel corresponding to the former injection period F1 of the aforementioned divided injection time i.e. the former injection period that was injected during the course of the intake stroke of the following cylinders 2B, 2C.

Also, it may be arranged that, in the operating region A of the following cylinders 2B, 2C where compression self-ignition is performed, the probability of occurrence of knocking is ascertained in accordance with the engine load etc and the latter injection period F2 in the aforementioned divided injection time of the fuel is retarded so as to approach more closely to the compression top dead center as the probability of occurrence of such knocking becomes higher. If it is arranged in this way for the latter injection period F2 to be changed in accordance with the probability of occurrence of knocking, it is possible to effectively prevent occurrence of knocking on the high load side of the engine, where the temperature in the combustion chamber tends to be higher, while effectively preventing occurrence of misfiring on the low load side of the engine, where the temperature in the combustion chamber tends to be lower.

Furthermore, it may be arranged that, in the operating region A where compression self-ignition is performed in the following cylinders 2B, 2C, if an operating condition obtains in which knocking is likely to occur, the fuel is injected into the following cylinders 2B, 2C in divided fashion and the amount of the latter injection period of the fuel in this divided injection is set to a value greater than the amount of injection in the former period thereof. This arrangement has the advantage that if, in the region where compression self-ignition is performed in the following cylinders, it is found that the operating condition is such that knocking is liable to occur due for example to a high temperature within the combustion chambers of the following cylinders 2B, 2C, activation of the mixture in the operating region A2 where the probability of knocking is high is effectively suppressed by setting the amount of injection of fuel in the latter period of the divided injection of the following cylinders 2B, 2C to a greater value than the amount of injection of fuel in the former period thereof, so occurrence of knocking can thereby be more reliably prevented.

Also, in the operating region A in which compression self-ignition is performed in the following cylinders 2B, 2C, preferably the probability of occurrence of knocking is ascertained and the ratio of the latter injection period amount with respect to the total injection mount of the fuel injected into the following cylinders is changed so as to increase as the probability of occurrence of such knocking becomes higher. With such a construction, in the compression self-ignition region of the following cylinders 2B, 2C, if it is arranged for the latter injection period amount of fuel to be changed in accordance with the probability of occurrence of knocking, the advantage is obtained that occurrence of knocking can be effectively prevented on the high load side of the engine, where the temperature in the combustion chamber tends to become high, while also effectively preventing occurrence of misfiring on the low load side of the engine, where the temperature in the combustion chamber tends to become low.

Also, in the above embodiment, in the operating region A wherein compression self-ignition is performed in the following cylinders 2B, 2C, the construction is such that, if the engine is in the high load operating region A2, it is determined that the engine is in a condition in which knocking is likely to occur, so it can be ascertained easily and appropriately whether or not the temperature in the combustion chambers of the following cylinders 2B, 2C is tending to become high, in accordance with the engine load. It can therefore be accurately ascertained from the engine load whether or not the engine is in an operating condition in which knocking is likely to occur in the following cylinders 2B, 2C and the fuel injection time in respect of the following cylinders 2B, 2C can be controlled appropriately in accordance with the result of this determination.

It should be noted that determination means to ascertain the octane value of the fuel employed could be provided so that it can be ascertained in accordance with the result of the determination by this determination means whether the engine is in a condition in which knocking is likely to occur in the compression self-ignition region of the following cylinders 2B, 2C. That is, since knocking is more likely to occur when the octane value of the fuel employed is lower, it may be concluded that the engine is in an operating condition in which knocking is likely to occur in the compression self-ignition region of the following cylinders 2B, 2C if this determination means ascertains that fuel of low octane value is being employed; the fuel-injection time in respect of the following cylinders 2B, 2C may then be appropriately controlled in accordance with the result of this determination.

Also, in the operating region A in which compression self-ignition is being performed in the following cylinders 2B, 2C, if the engine is in an operating condition in which knocking is likely to occur, it is desirable to adopt a construction in which swirl generating means is provided that generates swirling such that a high intensity of turbulence is maintained in the latter half of the compression stroke. With such a construction, in the compression self-ignition region of the following cylinders 2B, 2C, if the engine is in an operating condition in which knocking is likely to occur, amelioration of the drop in combustibility caused by retarding of the injection time of the fuel can be achieved by the swirling that is generated by this swirl generating means. There is therefore the advantage that the benefit of improvement of combustibility produced by maintaining a high intensity of turbulence in the latter half of the compression stroke due to this swirling and the benefit of suppression of knocking due to the fuel injection time in respect of the following cylinders being retarded so as to approach more closely to the compression top dead center etc can be achieved at same time.

Figure 17:
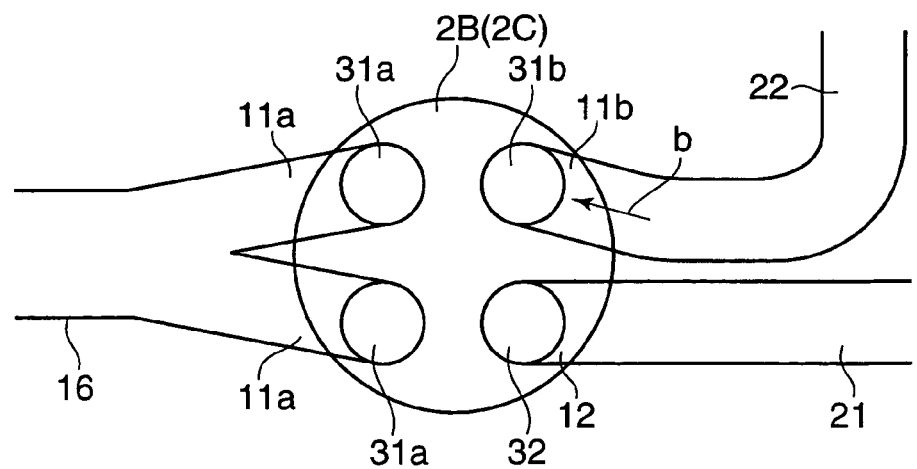
FIG. 17 is a diagram showing the specific construction of swirl generating means.

For example, as shown in FIG. 17, the leading end portion of the inter-cylinder gas passage 22 i.e. the downstream side of the inter-cylinder gas passage 22 that is connected with the second intake port 11b of the following cylinders 2B, 2C is arranged so as to be directed in the cylinder tangential direction of the following cylinders 2B, 2C in plan view. Thus, in the intake stroke of the following cylinders 2B, 2C, the burnt gas of the preceding cylinders 2A, 2D is introduced into the inter-cylinder gas passages 22 by opening of the second exhaust port 12b of the preceding cylinders 2A, 2D and burnt gas is introduced into the combustion chambers of the following cylinders 2B, 2C along the tangential directions thereof (direction of the arrow b in FIG. 17) from the aforementioned inter-cylinder gas passage 22 by opening of the second intake port 11b of the following cylinders 2B, 2C, thereby enabling swirl to be generated in the combustion chambers of the following cylinders 2B, 2C and maintaining the intensity of turbulence of this swirl at a high level in the latter half of the compression stroke. Combustibility in the following cylinders 2B, 2C can thereby be effectively improved.

Figure 18:
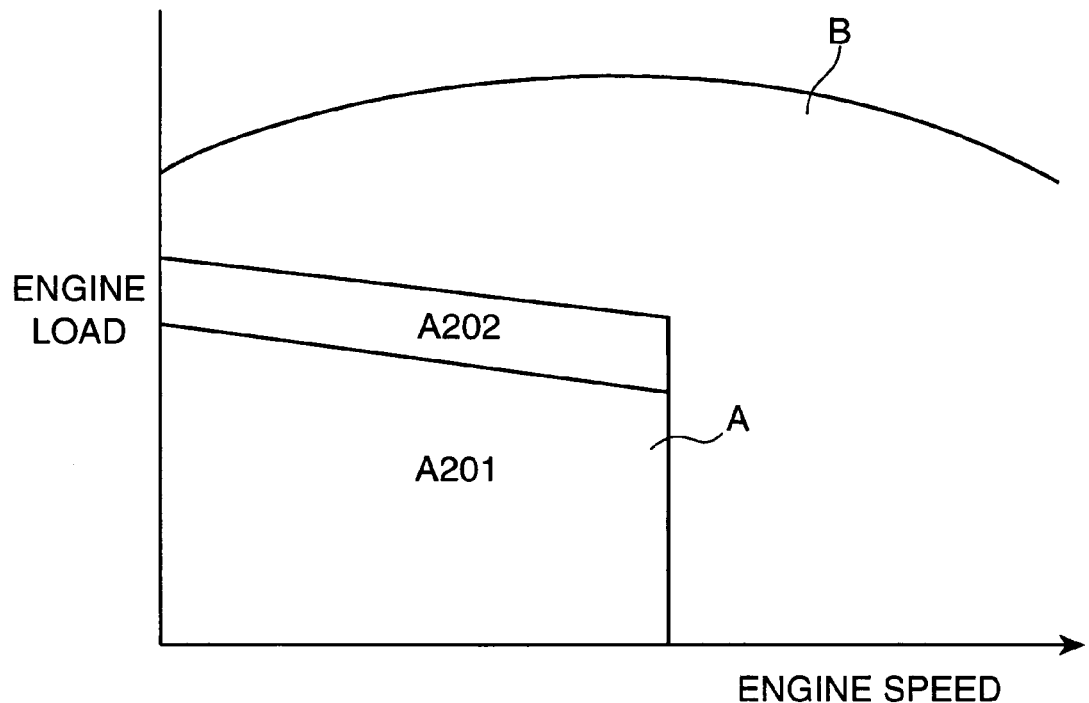
FIG. 18 is a diagram showing an example of the setting of the operating region for exercising control in accordance with the operating condition in accordance with yet a further embodiment.
Figure 19:
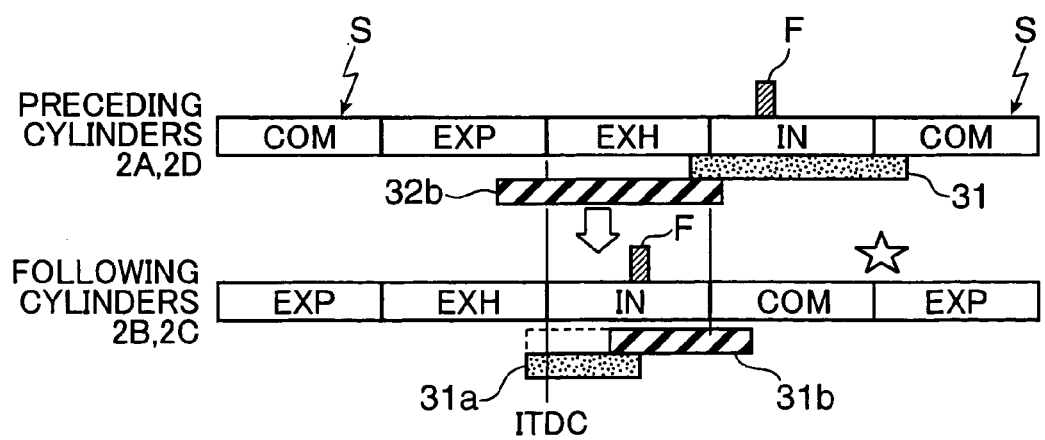
FIG. 19 is a diagram showing the combustion cycle and valve opening timing of a preceding cylinder and a following cylinder.

FIG. 18 and FIG. 19 show intake, exhaust and combustion control in accordance with operating condition in yet another embodiment of the present invention.

In this embodiment also, the engine as a whole is constructed as shown in FIG. 1 or FIG. 8. Also, the control/drive system is constructed as shown in FIG. 3 in which the operation condition determination means 41 included in the ECU 40 ascertains which region the operating condition is in, of the operating region A on the low load, low rotational speed side shown in FIG. 18 (operating region in which the special operating mode is selected) and the operating region B on the high load or high rotational speed side (operating condition in which the ordinary operating mode is selected). However, in addition, when the engine is in the operating region A in which the special operating mode is selected, it is arranged to ascertain, of this region A, whether the engine is in a high load side region A202 or a region A201 on the low load side thereof.

Also, the combustion condition controller 44 included in the ECU 40, when the operating condition is in the operating region A on the low load, low rotational speed side, as the control in the special operating mode, controls the fuel injection rate such that, in regard to the preceding cylinders (first and fourth cylinders 2A, 2D), the air/fuel ratio is made to be a lean air/fuel ratio that is larger than the stoichiometric air/fuel ratio and, in the compression stroke, sets an injection timing such that layering of the mixture is produced by fuel injection and sets an ignition timing such that forced ignition is performed in the vicinity of the compression top dead center. On the other hand, in regard to the following cylinders (second and third cylinders 2B, 2C), fuel is supplied with respect to the burnt gas of lean air/fuel ratio that is introduced from the preceding cylinders and the fuel injection rate is controlled such that substantially the stoichiometric air/fuel ratio is produced and fuel is injected in the intake stroke and forced ignition is deactivated so that compression self-ignition is performed.

Furthermore, in the above operating region A, the sum of the fuel injection rates in respect of pairs of cylinders comprising a preceding cylinder and a following cylinder is adjusted to a rate such as to produce the stoichiometric air/fuel ratio in respect of the rate of new air introduction into the preceding cylinder and the ratio of the fuel injection rate in respect of the preceding cylinders (first and fourth cylinders) 2A and 2D and the fuel injection rate in respect of the following cylinders (second and third cylinders) 2B and 2C is controlled in accordance with the operating condition such that compression self-ignition is fully satisfactorily performed, while preventing occurrence of knocking in the following cylinders.

Specifically, in the low load side region A201 of the operating region A, by making the fuel injection rate in respect of the preceding cylinders 2A, 2D and the fuel injection rate in respect of the following cylinders 2B, 2C substantially the same or by making the fuel injection rate of the following cylinders 2B, 2C a little larger, the air/fuel ratio during combustion in the preceding cylinders 2A, 2D becomes about twice the stoichiometric air/fuel ratio (A/F≈30, i.e. $\lambda$=about 2 expressed in terms of air excess ratio $\lambda$) or more than twice the stoichiometric air/fuel ratio (air excess ratio $\lambda$ is $\lambda$>2). As a result, in the region A201 on the aforesaid low load side in which misfiring of the following cylinders 2B, 2C tends to be liable to occur due to the total fuel injection rate being set to a relatively low value due to the low engine load, setting of the fuel injection rate in respect of the following cylinders 2B, 2C to an excessively low value is prevented and occurrence of the aforesaid misfiring is thereby prevented.

In this regard, in the high load side region A202 of the aforesaid operating region A, control is exercised such that the air/fuel ratio during combustion in the preceding cylinders is less than twice the stoichiometric air/fuel ratio (the air excess ratio λ is 1<λ<2), for example such that A/F≈25, by making the fuel injection rate in respect of the preceding cylinders 2A, 2D more than the fuel injection rate in respect of the following cylinders 2B, 2C; the air/fuel ratio of the preceding cylinders 2A, 2D is thereby made relatively richer than in the region A1 on the low load side. As a result, in the aforesaid region A202 on the high load side, where the temperature of the following cylinders 2B, 2C becomes excessively high due to the total fuel injection rate being set to a relatively high level due to the high engine load and, corresponding to this, knocking tends to be liable to occur in the following cylinders 2B, 2C, occurrence of the aforesaid knocking is prevented by the EGR effect by introduction of a large amount of burnt gas to the following cylinders 2B, 2C.

Also, in the high load side region A2 of the operating region A, as described above, if the fuel injection rate in respect of the preceding cylinders 2A, 2D is set larger than the fuel injection rate in respect of the following cylinders 2B, 2C, there is a risk that implementation of the aforementioned special operating mode control may become impossible, due to its becoming impossible to burn the fuel injected into the following cylinders 2B, 2C due to lowering of the oxygen concentration in the burnt gas introduced into the following cylinders 2B, 2C. Consequently, in the high load side region A2 of the aforesaid operating region A, control is exercised so as to introduce new air into the following cylinders 2B, 2C in addition to the burnt gas that is introduced from the preceding cylinders 2A, 2D, by temporary opening of a new air introduction intake valve (first intake valve 31a) for introducing new air into the following cylinders 2B, 2C.

That is, in the high load side region A2 of the aforesaid operating region A, after opening of the first intake valve 31a in the vicinity of the intake top dead center of the following cylinders 2B, 2C, this first intake valve 31a is put into the closed condition during the course of the subsequent intake stroke of the following cylinders 2B, 2C. Also, the burnt gas introduction valve (second intake valve 31b) of the following cylinders 2B, 2C is maintained in closed condition until immediately prior to the putting of the first intake valve 31a into the closed condition; only then is the burnt gas that was introduced from the preceding cylinders 2A, D introduced into the following cylinders 2B, 2C by opening of the burnt gas introduction valve.

Next, the operation of a device according to this embodiment will be described.

In the device according to this embodiment also, in the operating region A of low load, low rotational speed, the special operating mode is produced by performing combustion in the two-cylinder connected condition and, in the operating region on the high load side or high rotational speed side, ordinary operating mode is produced by conducting combustion in a condition with the intake ports and exhaust ports of the various cylinders made independent. Thus, when in the special operating mode, combustion is conducted in the preceding cylinders with a super-lean air/fuel ratio whereas in the following cylinders combustion is conducted by compression self-ignition.

In particular, compression self-ignition can be appropriately conducted over a wide operating region by adjusting, as described above, the ratio of the rate of fuel injection in respect of the preceding cylinders (first and fourth cylinders 2A, 2D) and the rate of fuel injection in respect of the following cylinders (second and third cylinders 2B, 2C) in the special operating mode in accordance with the operating condition.

That is, in the region A202 on the high load side of the operating region A that was put into the special operating mode, control is exercised such that the air/fuel ratio of the preceding cylinders 2A, 2D is made relatively rich i.e. such that it becomes a value of less than twice the stoichiometric air/fuel ratio, by setting the fuel injection rate in respect of the preceding cylinders 2A, 2D to be more than in the case of the region A201 on the low load side. In this way, knocking is suppressed by the EGR effect by increase of the amount of burnt gas constituents corresponding to EGR in the gas that is introduced into the following cylinders 2B, 2C, albeit the temperature of the gas that is introduced into the following cylinders 2B, 2C is raised compared with the case where the air/fuel ratio of the preceding cylinders 2A, 2D is made to be twice the stoichiometric air/fuel ratio (i.e. the case where the injection rates of the preceding cylinders and following cylinders are the same).

Thus, although the amount of new air in the burnt gas that is introduced into the following cylinders 2B, 2C is reduced by setting the air/fuel ratio of the preceding cylinders 2A, 2D to a value smaller than twice the stoichiometric air/fuel ratio in the aforesaid high load side region A202, in this case, thanks to the adoption of a construction in which new air is introduced into the following cylinders 2B, 2C in addition to the burnt gas introduced from the preceding cylinders 2A, 2D, the deficiency of new air in the following cylinders 2B, 2C in the high load side region A2 is eliminated, so compression self-ignition can be properly performed.

Specifically, as shown in FIG. 19, the amount of new air needed to perform compression self-ignition in the following cylinders 2B, 2C is ensured by adopting a construction in which new air introduced through the intake passage 15 and branch passage 16 is supplied to the following cylinders 2B, 2C by putting the new air introduction intake valve (first intake valve 31a) into an open condition whilst maintaining the burnt gas introduction valve (second intake valve 31b) of the following cylinders 2B, 2C in a closed condition in the vicinity of the intake top dead center (ITDC) of the following cylinders 2B, 2C. The burnt gas that is introduced from the preceding cylinders 2A, 2D can then be introduced into the following cylinders 2B, 2C by putting the first intake valve 31a in a closed condition during the intake stroke of the following cylinders 2B, 2C and putting the second intake valve 31b of the following cylinders 2B, 2C into an open condition prior to this.

As described above, in the high load side region A202 in the compression self-ignition region A, new air of comparatively low temperature can be efficiently introduced into the following cylinders 2B, 2C prior to introduction into the following cylinders 2B, 2C of the burnt gas extracted from the preceding cylinders 2A, 2D, by putting the new air introduction intake valve (first intake valve 31a) into an open condition in the vicinity of the intake top dead center (ITDC) of the following cylinders 2B, 2C. Furthermore, the air/fuel ratio of the following cylinders 2B, 2C can be prevented from becoming lean due to the introduction of new air into the following cylinders 2B, 2C in the low load region A201 in the compression self-ignition region A of the following cylinders 2B, 2C in which the oxygen concentration in the burnt gas introduced into the following cylinders 2B, 2C was maintained at a sufficiently high level by making the air/fuel ratio of the preceding cylinders 2A, 2D comparatively lean, by arranging that in the low load side region A201 in the compression self-ignition region (partial load region) A of the following cylinders 2B, 2C the new air introduction intake valve (first intake valve 31a) is maintained in an open condition.

Also, burnt gas extracted from the preceding cylinders 2A, 2C by stopping introduction of this new air after efficiently introducing new air into the following cylinders 2B, 2C by putting the aforesaid new air introduction intake valve (first intake valve 31a), which was opened in the high load side region A202 in the compression self-ignition region A of the following cylinders 2B, 2C, into the closed condition during the intake stroke of the following cylinders 2B, 2C can be smoothly introduced into the following cylinders 2B, 2C.

Furthermore, if, as shown in the above embodiment, in the high load side region A202 of the compression self-ignition region A of the following cylinders 2B, 2C, it is arranged to open the burnt gas introduction valve (second intake valve 31b) of the following cylinders 2B, 2C during the intake stroke and to open the new air introduction intake valve (first intake valve 31a) prior to the valve opening time of this burnt gas introduction valve (second intake valve 31b), for example in the vicinity of the intake top dead center (ITDC) of the following cylinders 2B, 2C, in the high load side region A202 in the aforesaid pressure self-ignition region A, new air can be efficiently introduced into the following cylinders 2B, 2C and the burnt gas introduced from the preceding cylinders 2A, 2D can be efficiently introduced into the following cylinders 2B, 2C by putting the aforesaid new air introduction intake valve (first intake valve 31a) into the closed condition.

Specifically, although, as shown by the broken line in FIG. 19, it would be possible to put the burnt gas introduction valve (second intake valve 31b) into the open condition in the vicinity of the intake top dead center ITDC of the following cylinders 2B, 2C, if this were done, the rate of introduction of new air would be decreased due to the new air supplied from the intake passage 15 and the burnt gas supplied through the inter-cylinder gas passage 22 into the following cylinders 2B, 2C being introduced simultaneously. It is therefore preferable to arrange that the new air should be efficiently introduced into the following cylinders 2B, 2C by maintaining the burn gas introduction valve (second intake valve 31b) in closed condition up to a point during the intake stroke of the following cylinders 2B, 2C, as described above. Also, if it is arranged that the burnt gas introduction valve is maintained in closed condition up to a point during the intake stroke of the following cylinders 2B, 2C, there is the advantage that compression self-ignition can be achieved by a rise of the internal temperature of the preceding cylinders 2A, 2D due to increase in the amount of internal EGR in the preceding cylinders 2A, 2D.

Also, if it is arranged that, in the high load side region A202 in the compression self-ignition region A of the following cylinders 2A, 2D, control is exercised so as to raise the ratio of the rate of introduction of new air with respect to the total rate of introduction of gas into the following cylinders 2B, 2C in response to enrichment of the air/gas ratio of the preceding cylinders 2A, 2D, by more than this compared with the low load side region A201, the advantage is obtained that, if the oxygen concentration in the burnt gas that is introduced into the following cylinders 2B, 2C drops in response to the air/fuel ratio of the preceding cylinders 2A, 2D being set to be comparatively rich in the high load side region A201 in the compression self-ignition region A of the following cylinders 2B, 2C, the engine output can be maintained at a fully satisfactory level and the occurrence of knocking can be effectively prevented by suppressing the rise in temperature in the following cylinders 2B, 2C, by appropriately conducting compression self-ignition of the following cylinders 2B, 2C by effectively eliminating insufficiency of new air in the following cylinders 2B, 2C, thanks to this raising of the ratio of the rate of introduction of new air with respect to the total gas introduction rate into the following cylinders 2B, 2C, Also, if it is arranged that the air/fuel ratio of the following cylinders 2B, 2C is controlled such that the oxygen concentration in the exhaust gas that is exhausted from the following cylinders 2B, 2C at least in the compression self-ignition region A of the following cylinders 2B, 2C is a value corresponding to the combustion condition of the stoichiometric air/fuel ratio, only burnt gas of the following cylinders 2B, 2C that was burnt with the stoichiometric air/fuel ratio while combustion in the preceding cylinders 2A, 2D is being conducted with a lean air/fuel ratio is fed out to the exhaust passage 20. There is therefore no need to provide a lean NOx catalyst as in a conventional lean-burn engine, so exhaust cleansing performance can be fully satisfactorily ensured simply by a three-way catalyst 24. Thus, since there is no need to provide a lean MOX catalyst, there is no need for temporary enrichment of the air/fuel ratio for purposes of release and reduction of NOx when the amount of NOx occluded by the lean NOx catalyst builds up, so compromise of the improvement in fuel costs is avoided. Furthermore, the problem of sulfur poisoning of the lean NOx catalyst cannot occur.

Figure 20:
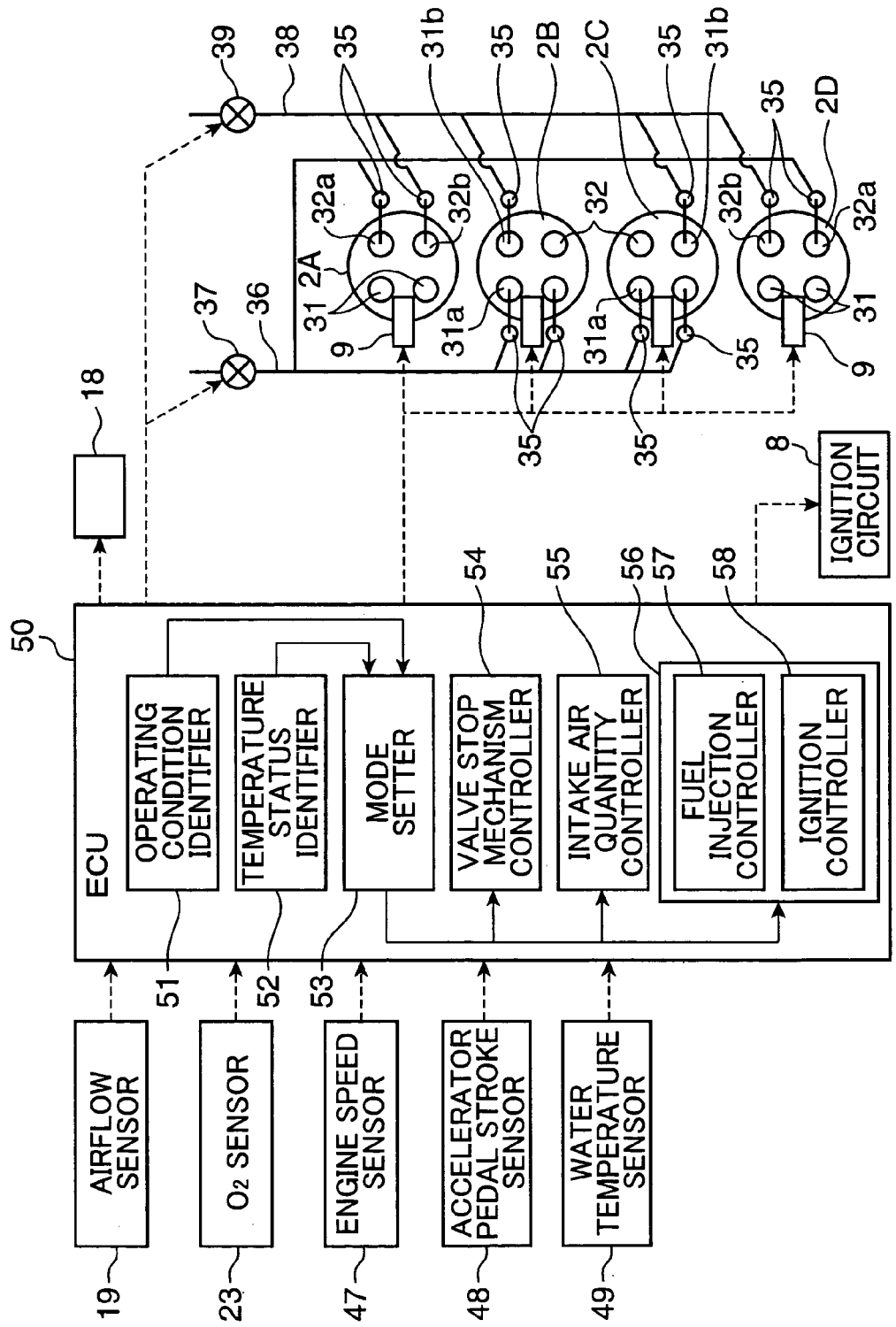
FIG. 20 is a block diagram of a control system showing yet a further embodiment.

FIG. 20 shows a drive/control system according to yet a further embodiment of the present invention. In this embodiment, the ECU 50 comprises as its functional elements operating condition identifier 51, temperature status identifier 52, mode setting means 53, valve stop mechanism controller 54, intake air quantity controller 55 and combustion controller 56.

Figure 21:
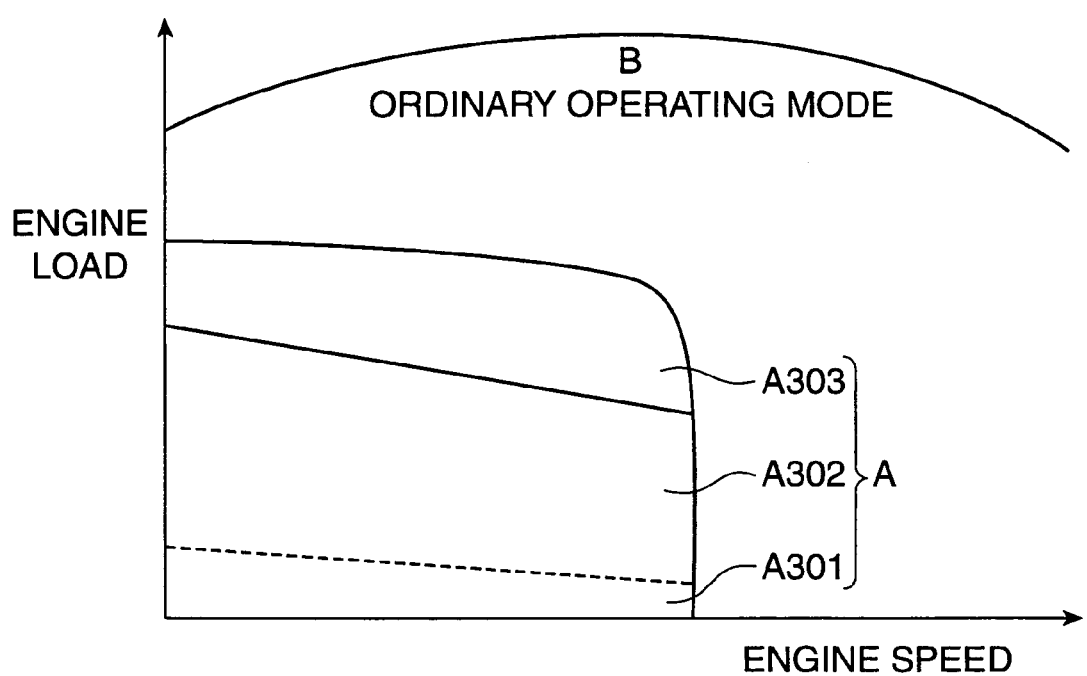
FIG. 21 is a diagram showing an example of the setting of the operating region for exercising control in accordance with the operating condition by means of a device according to the embodiment shown in FIG. 20.

The operating condition identifier 51 determines whether the operating condition is in the operating region A on the low load, low rotational speed side as shown in FIG. 21 or in the operating region B on the high load or high rotational speed side and furthermore, if the operating condition is in the special operating mode region A, determines whether it is in the low load side operating region A301, the intermediate load side operating region A302 or the high load side operating region A303 of this region A.

The temperature condition determining means 52 ascertains the temperature condition of the engine by means of a signal from a water temperature sensor 49 and ascertains whether or not compression self-ignition in the following cylinders will be difficult, based on this engine temperature and in particular on the temperature of the following cylinders. Specifically, the temperature status identifier 52 ascertains whether the water temperature (engine temperature) is low temperature below a prescribed value or is high temperature higher than the prescribed temperature. It should be noted that this temperature status identifier 52 is not restricted to ascertaining the temperature condition of the engine by means of a signal from the water temperature sensor 49 but could, apart from this, ascertain the temperature condition of the engine directly or indirectly or could ascertain the temperature condition of the engine by means of the exhaust gas exhausted from the cylinders, for example by the provision of an exhaust gas temperature sensor.

Based on the determination by the operating condition identifier 51, in the aforesaid special operating mode region A, the mode selection means 53 selects the special operating mode in which combustion is effected by introducing burnt gas exhausted from the preceding cylinders which are in the exhaust stroke directly into the following cylinders which are in the intake stroke and, in the aforesaid ordinary operating mode region B, selects the ordinary operating mode, in which combustion is performed independently in the respective cylinders.

Also, the mode setting means 53 performs setting such as to change over the combustion condition between the compression self-ignition mode and forced ignition mode in respect of the following cylinders 2B, 2C and performs setting so as to change over the combustion condition between the stratified charge combustion mode and uniform lean combustion mode in respect of the preceding cylinders 2A, 2D.

Specifically, when the mode setting means 53 selects the special operating mode and the operating condition identifier 51 ascertains that the engine operating condition is in the low load side operating region A301, at low temperature the forced ignition mode, in which combustion in these following cylinders 2B, 2C is effected by forced ignition, is selected, for the reason that, in accordance with the determination of the engine temperature condition by the temperature status identifier 52, it appears that compression self-ignition in the following cylinders 2B, 2C will be difficult; and, at high temperature, the compression self-ignition mode, in which combustion in the following cylinders is effected by compression self-ignition, is selected, for the reason that it appears that compression self-ignition in the following cylinders will be possible. That is, if for example the engine has not been fully warmed-up, with the result that the temperature of the combustion chambers of the following cylinders 2B, 2C is low, if, even in such circumstances, combustion by compression self-ignition were continued in the following cylinders 2B, 2C, there would be a risk of being unable to guarantee stable combustion, due to misfiring etc. Consequently, in such cases, forced ignition mode is selected as described above, to ensure that a stable combustion can be achieved.

Furthermore, if the mode setting means 53 ascertains, by means of the operating condition identifier 51, that the engine operating condition is in the intermediate or low load side operating region A301 or A302 of the special mode region A, it selects the stratified charge lean combustion mode in which the combustion in the preceding cylinders 2A, 2D is put into a stratified lean condition; when in the operating region A303, in which the engine load is on the high load side compared with the operating condition where this stratified charge lean combustion mode is selected, it selects the uniform lean combustion mode, in which the combustion in the preceding cylinders 2A, 2D is put into the uniform lean condition. Also, even in the intermediate or low load side operating regions A301, A302 in which the aforesaid stratified charge lean combustion mode is adopted, if the forced ignition mode is selected, a shift is effected to the uniform lean combustion mode. This "stratified charge lean combustion" means a combustion mode in which combustion is effected of a lean mixture with the injected fuel in a stratified form and "uniform lean combustion" means a combustion mode in which combustion is effected of a lean mixture with the injected fuel uniformly dispersed. Thus, control in which a changeover of the combustion mode in the preceding cylinders 2A, 2D is effected between stratified charge lean combustion and uniform lean combustion in accordance with the load region of the engine i.e. a changeover between stratified charge lean combustion mode and uniform lean combustion mode is effected is based on the following characteristics in each combustion mode.

Figure 22:
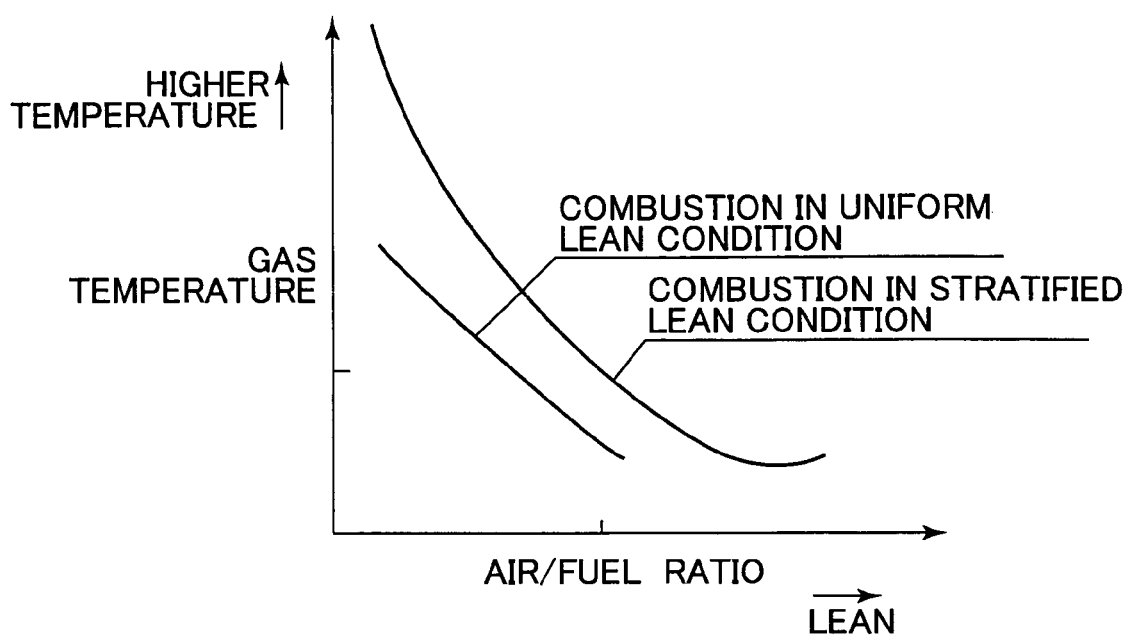
FIG. 22 is a view showing the relationship between burnt gas temperature and air/fuel ratio under the same load in stratified charge lean combustion and uniform lean combustion.

FIG. 22 shows the relationship between burnt gas temperature and air/fuel ratio under the same load in stratified charge lean combustion and uniform lean combustion. From this FIG. 22, it can be seen that, regarding the temperature of the burnt gas at the same air/fuel ratio, that of stratified charge lean combustion is higher than that of uniform lean combustion. Consequently, when high temperature burnt gas is to be introduced into the following cylinders 2B, 2C, the combustion mode in the preceding cylinders 2A, 2D is appropriately stratified charge lean combustion; contrariwise, when it is not desired to raise the temperature of the following cylinders 2B, 2C, the combustion mode in the preceding cylinders 2A, 2D should appropriately be uniform lean combustion. Also, since the burnt gas temperatures are thus different for the same air/fuel ratio, whereas uniform lean combustion has excellent thermal efficiency compared with stratified charge lean combustion and so exhibits excellent fuel cost characteristics, on the other hand, with uniform lean combustion, ignition becomes difficult as the air/fuel ratio becomes larger i.e. as a super-lean condition is approached, so there are limits to the extent to which the air/fuel ratio can be increased. Consequently, in order to improve fuel costs, uniform lean combustion, whose fuel costs characteristic is excellent, is appropriate in the range of air/fuel ratio where uniform lean combustion is feasible but, outside this range, stratified charge lean combustion, in which a super-lean air/fuel ratio can be set, is appropriate. It is further indicated that, in the case of both stratified charge lean combustion and uniform lean combustion, the temperature of the burnt gas rises as the air/fuel ratio becomes smaller. In order to achieve a higher temperature in the following cylinders 2B, 2C, it is therefore appropriate to set a small air/fuel ratio, whichever the combustion,mode. The relationship between the load region of the engine and the combustion mode that is adopted will be described later.

The valve deactivating mechanism controller 54 and intake air quantity controller 55 have the same function as the valve deactivating mechanism controller 42 and intake air quantity controller 43 in FIG. 3.

The combustion controller 56 comprises fuel injection controller 57 and ignition controller 58.

In this combustion controller 56, control of the combustion condition (fuel control and ignition control) is altered in accordance with the mode that is set by the mode setting means 53; it also performs appropriate changeover of the combustion mode in the preceding cylinders 2A, 2D and following cylinders 2B, 2C.

Specifically, when the stratified charge lean combustion mode is selected by the mode setting means 53, the fuel injection rate is controlled such that the air/fuel ratio in respect of the preceding cylinders 2A, 2D is a lean air/fuel ratio greater than the stoichiometric air/fuel ratio and is preferably a lean air/fuel ratio greater than substantially twice the stoichiometric air/fuel ratio (A/F≈30) and an injection time is set such that layering of the mixture is produced by injection of the fuel in the compression stroke and an ignition time is set such that forced ignition is performed in the vicinity of the compression top dead center.

On the other hand, in regard to the following cylinders 2B, 2C, fuel is supplied in respect of the burnt gas of lean air/fuel ratio introduced from the preceding cylinders 2A, 2D and the fuel injection rate is controlled such that substantially the stoichiometric air/fuel ratio is produced during combustion in the following cylinders 2B, 2C. Thus, in this special operating mode, when the temperature in the following cylinders 2B, 2C is comparatively high, the compression self-ignition mode is selected and an injection time is set such that a uniform mixture is produced by the fuel injection in the intake stroke and forced ignition is deactivated so that compression self-ignition may be performed. Also, when the temperature in the following cylinders 2B, 2C is comparatively low, so that the forced ignition mode is selected, the injection time is set such that fuel is injected in the compression stroke and the ignition time is set such that forced ignition is performed at a prescribed time in the vicinity of the compression top dead center. Also, when the forced ignition mode is selected as described above, the combustion mode in the preceding cylinders 2A, 2D is shifted from the stratified charge lean combustion mode to the uniform lean combustion mode and the fuel injection rate is controlled such as to produce in respect of the preceding cylinders 2A, 2D a lean air/fuel ratio that is larger than the stoichiometric air/fuel ratio, preferably a lean air/fuel ratio of substantially twice, or less, the stoichiometric air/fuel ratio and the injection time is set such that a uniform mixture is produced by uniform dispersion by injection of the fuel in the intake step and the ignition time is set such that forced ignition is performed in the vicinity of the compression top dead center.

In the special operating mode, if, with increase in engine load, a shift is effected from the stratified charge lean combustion mode to the uniform lean combustion mode (from A2 to A3) in response to increase in the total injection rate of fuel in respect of the preceding cylinders 2A, 2D and following cylinders 2B, 2C, the fuel injection rate etc is controlled such as to produce a smaller value of the air/fuel ratio than in the case of stratified charge lean combustion as described above (stratified charge lean combustion mode) in respect of the preceding cylinders 2A, 2D and an injection time is set such that a uniform mixture is produced by uniform dispersion by injection of the fuel in the intake stroke and an ignition time is set such that forced ignition is performed in the vicinity of the compression top dead center. In contrast, in respect of the following cylinders 2B, 2C, the aforesaid compression self-ignition mode is selected and, in the same way as described above, an ignition time is set such that a uniform mixture is produced by injection of fuel in the intake step and forced ignition is deactivated so that compression self-ignition may be performed.

Specifically, as described above, when a shift takes place to the uniform lean combustion mode, in respect of the preceding cylinders 2A, 2D, combustion is effected with an air/fuel ratio that is smaller than the air/fuel ratio in the aforesaid stratified charge lean combustion (stratified charge lean combustion mode) i.e. in a uniform lean condition that is enriched compared with combustion in the stratified lean condition. This air/fuel ratio, as described above, is a lean air/fuel ratio that is larger than the stoichiometric air/fuel ratio and is preferably a value of substantially twice the stoichiometric air/fuel ratio or smaller than this; that is, in terms of the air excess ratio λ, is set to at least 1 and preferably less than 2.

Control when the ordinary operating mode is set is the same as in the other embodiments described above.

Next, the operation of a device according to this embodiment is described.

In a device according to this embodiment also, in the operating region A of low load and low rotational speed, the device is put into a special operating mode in which combustion is performed with two cylinders in a connected condition and, in the operating region of high load or high rotational speed, the device is put into the ordinary operating mode in which combustion is conducted with the intake ports and exhaust ports of all the cylinders in an independent condition.

In the intermediate/low load side operating regions A301, A302 of this special operating mode region, the mode setting means 53 selects a combustion mode (stratified charge lean combustion mode) in which the combustion mode in the preceding cylinders 2A, 2D is in a stratified lean condition, in which fuel is injected in the compression stroke whilst the fuel injection rate is controlled such that the air/fuel ratio in the preceding cylinders 2A, 2D is a lean air/fuel ratio larger than the stoichiometric air/fuel ratio, preferably an air/fuel ratio larger than twice the stoichiometric air/fuel ratio and ignition is conducted at a prescribed ignition time such that stratified charge lean combustion is performed (see FIG. 5).

That is, in the intermediate/low load side operating regions A1, A2 of the engine, by conducting stratified charge lean combustion in the preceding cylinders 2A, 2D, combustion can be conducted under super-lean conditions in these intermediate/low load side operating regions A1, A2 where, comparatively speaking, torque is not required, thereby enabling fuel cost performance to be improved. Furthermore, when combustion is conducted in the stratified lean condition, compression self-ignition in the following cylinders 2B, 2C can be achieved smoothly and in stable fashion, since the burnt gas is at a higher temperature than in the case where combustion is conducted in the uniform lean condition.

Also, in the period in which the intake stroke of the preceding cylinders 2A, 2D and the exhaust stroke of the following cylinders 2B, 2C overlap, combustion is conducted while controlling the fuel injection rate such as to provide the stoichiometric air/fuel ratio by supplying fuel to this burnt gas while the burnt gas exhausted from the preceding cylinders 2A, 2D is being introduced into the following cylinders 2B, 2C through the gas passages 22.

In this case, as a rule, compression self-ignition mode is selected and, as shown in FIG. 5, fuel is injected in the following cylinders 2B, 2C in the intake stroke; the interior of the combustion chamber then assumes a suitably high temperature, high pressure condition in the vicinity of the top dead center of the compression stroke and compression self-ignition is thereby performed in a fully satisfactory fashion. The operation and effects which are thereby obtained are as already described in the description of the other embodiments.

Figure 23:
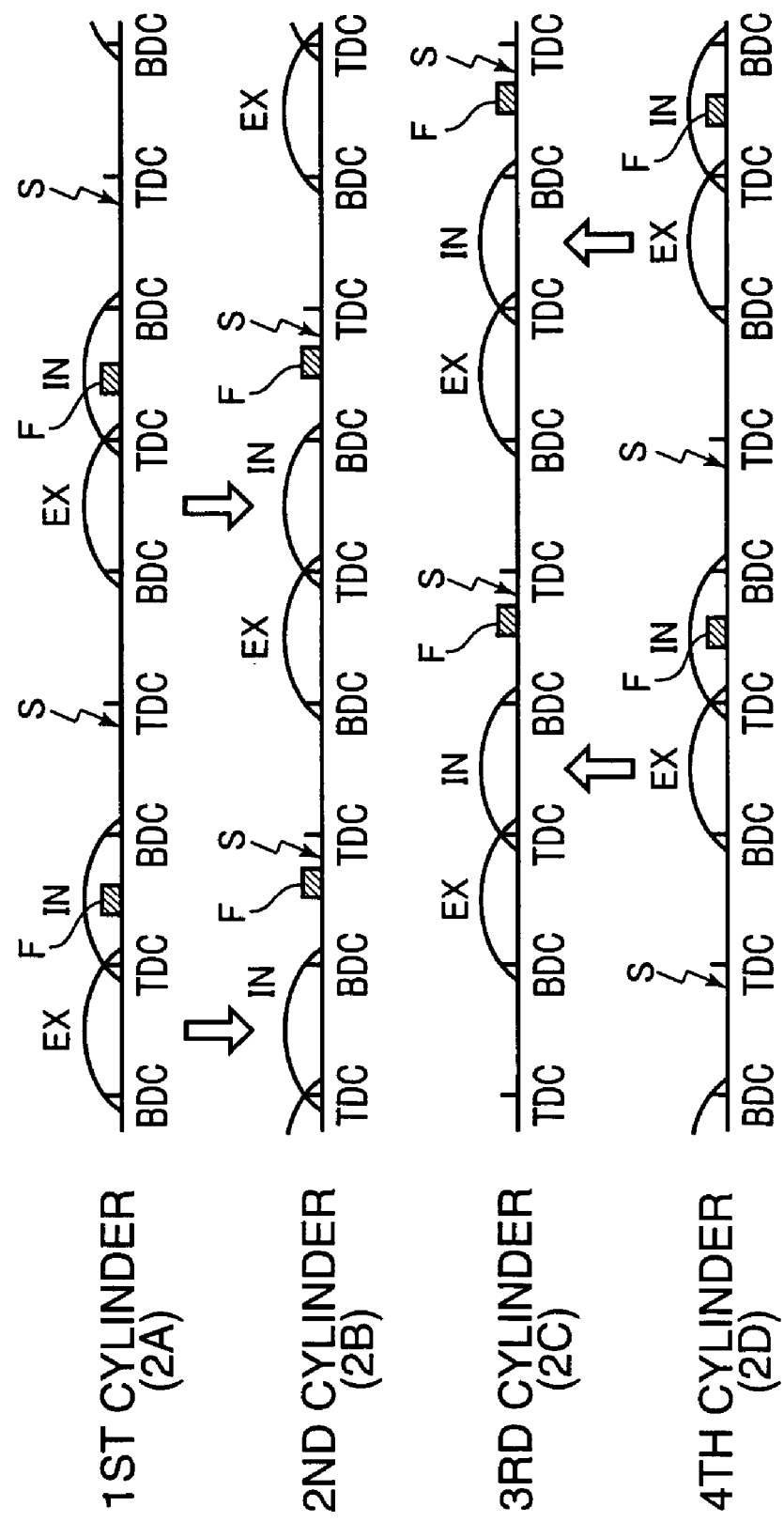
FIG. 23 is a view showing the exhaust stroke, intake stroke, fuel injection period and ignition period etc of each cylinder in the case of a special operating mode in which a preceding cylinder is made to perform uniform lean combustion while a following cylinder is made to perform forced ignition.

However, as described above, the water temperature sensor 49 detects the engine temperature, in particular the engine temperature of the following cylinders 2B, 2C constantly or at least in the low load operating region A301 of the engine and if the result of the detection by this water temperature sensor 49 is lower than the prescribed temperature at which stable compression self-ignition can be achieved in the following cylinders 2B, 2C, the temperature status identifier 52 concludes that compression self-ignition in the following cylinders 2B, 2C will be difficult and the mode setting means 53 therefore effects a shift from the compression self-ignition mode to the forced ignition mode and, as shown in FIG. 23, fuel is injected into the following cylinders 2B, 2C in the compression stroke and combustion is performed by performing forced ignition at a prescribed ignition time.

At this point, the mode setting means 53 changes over the combustion mode of the preceding cylinders 2A, 2D from the stratified charge lean combustion mode to the uniform combustion mode. That is, even in the low load operating region A301 of the special operating mode region A, if the temperature status identifier 52 concludes that compression self-ignition will be difficult in the following cylinders 2B, 2C, the mode setting means 53 shifts the combustion mode in the preceding cylinders 2A, 2D from stratified charge lean combustion to uniform lean combustion and the air/fuel ratio in the preceding cylinders 2A, 2D is set to an air fuel ratio value that is smaller than that during stratified charge lean combustion; that is, the fuel injection rate is controlled and fuel is injected in the intake stroke such that a lean air/fuel ratio that is larger than the stoichiometric air/fuel ratio, preferably an air/fuel ratio of substantially twice the stoichiometric air/fuel ratio or less than this, is produced in the preceding cylinders 2A, 2D, while effecting enrichment compared with the stratified lean condition. When fuel is thus injected in the intake stroke, it is uniformly dispersed in the combustion chamber by the gaseous current, resulting in a uniform fuel distribution. Ignition is thereby conducted at the prescribed ignition time and combustion is performed in a uniform lean condition (see FIG. 23).

That is, in the low load side operating region A301 of the engine, if the engine temperature of the following cylinders 2B, 2C is lower than the prescribed temperature, compression self-ignition cannot be performed in the following cylinders 2B, 2C in stable fashion, so combustion is effected by forced ignition in the following cylinders 2B, 2C and introduction of high temperature burnt gas into the following cylinders 2B, 2C is effected with an enriched air/fuel ratio in the preceding cylinders 2A, 2D in order that compression self-ignition can be achieved at an early stage in the following cylinders 2B, 2C.

In this way, by enriching the air/fuel ratio of the preceding cylinders, the burnt gas thereof can be raised in temperature, so the temperature in the following cylinders is raised and compression self-ignition in the following cylinders can be achieved at an early stage. While it might be thought that fuel costs would be adversely affected by lowering the air/fuel ratio in the preceding cylinders, in fact, deterioration of fuel costs is suppressed by changing over the combustion mode from stratified charge lean combustion to uniform lean combustion, which is of better fuel cost performance.

However, FIG. 22 shows that, even when the air/fuel ratio is low, stratified charge lean combustion makes it possible to introduce burnt gas at a higher temperature into the following cylinders 2B, 2C than does uniform lean combustion, making it possible to achieve compression self-ignition of the following cylinders 2B, 2C at an earlier stage in the case of combustion in the stratified lean condition. However, in this case, there may be concern regarding deterioration of fuel cost performance due to increase of the HC exhaust rate, so, in aiming for a balance of improvement in fuel costs performance and early achievement of compression self-ignition in the following cylinders 2B, 2C, it is preferable to perform combustion in the uniform lean condition in the preceding cylinders 2A, 2D, as in this embodiment.

Figure 25:
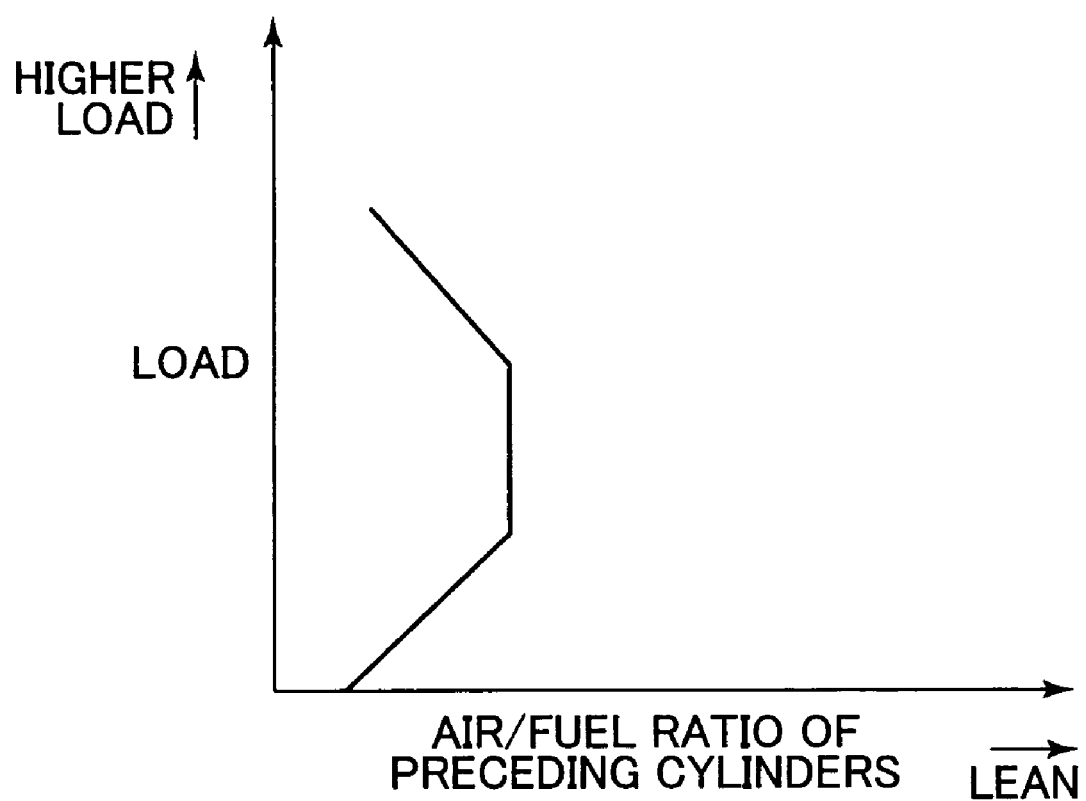
FIG. 25 is a view showing the relationship between load and air/fuel ratio in a preceding cylinder.

Also, in the low load operating region A301 of the engine, as shown in FIG. 25, control is effected such that the air/fuel ratio is small during combustion in the preceding cylinders 2A, 2D, in response to lowering of the engine load. That is, in view of the fact that the temperature in the following cylinders 2B, 2C becomes low as the engine load becomes lower, control is performed in such cases so as to effect further enrichment, by increasing the fuel injection rate. This raises the burnt gas temperature in the preceding cylinders 2A, 2D, so that compression self-ignition can be performed in a smooth and stable fashion in the following cylinders 2B, 2C without inviting deterioration of fuel costs.

Then, with gradual increase in the engine load, in the intermediate load operating region A302 of the engine, combustion is effected in the preceding cylinders 2A, 2D with a fixed air/fuel ratio in the super-lean condition and, with further increase in engine load, in the high load side operating region A303 of the engine, the air/fuel ratio in the preceding cylinders 2A, 2D is gradually reduced and combustion is performed in the uniform lean condition.

Figure 24:
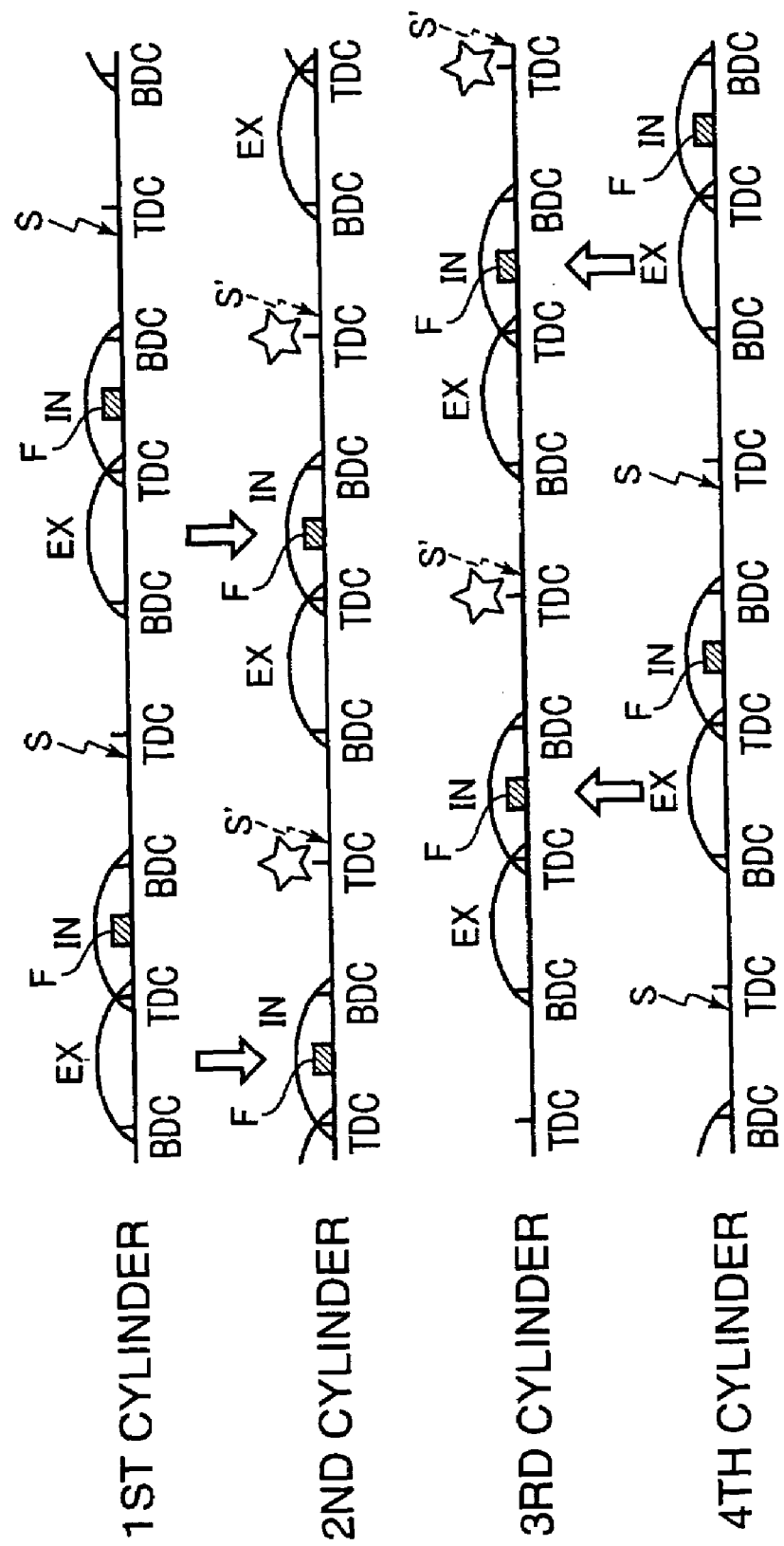
FIG. 24 is a view showing the exhaust stroke, intake stroke, fuel injection period and ignition period etc of each cylinder in the case of a special operating mode in which a preceding cylinder is made to perform uniform lean combustion while a following cylinder is made to perform compression self-ignition.

Specifically, in the high load side operating region A303 of the special operating mode region A, the mode setting means 53 selects uniform lean combustion (uniform lean combustion mode) as the combustion mode in the preceding cylinders 2A, 2D; the fuel injection rate is controlled and fuel injection is performed in the intake stroke such that, albeit the air/fuel ratio in the preceding cylinders 2A, 2D is a value smaller than that in the stratified charge lean combustion mode i.e. is richer than in the stratified lean condition, the air/fuel ratio in the preceding cylinders 2A, 2D is a lean air/fuel ratio larger than the stoichiometric air/fuel ratio and preferably substantially twice the stoichiometric air/fuel ratio or an air/fuel ratio smaller than this. Thus, when fuel is injected in the intake step, the distribution of the fuel becomes uniform by uniform dispersal within the combustion chamber by the gaseous current. Thus, ignition is performed at the prescribed ignition time and combustion is conducted under uniform lean conditions (see FIG. 24).

Specifically, as engine load becomes higher, in general, more torque is required and the fuel injection rate is increased. As this fuel injection rate is increased, the air/fuel ratio naturally decreases i.e. is enriched to a range where ignition under uniform lean conditions becomes possible. When the air/fuel ratio is decreased to a range at which ignition becomes possible under such uniform lean conditions, the temperature of the burnt gas becomes lower than in the case of stratified charge lean combustion so a shift is brought about to uniform lean combustion, which offers excellent fuel cost performance.

Thus, in the high load side operating region A303 in which high torque is required, in general the engine temperature becomes high, increasing the risk of knocking, so, in such cases, a changeover is effected to combustion under uniform lean conditions in which the burnt gas temperature is lower than in the case of combustion under stratified lean conditions, so occurrence of knocking can thereby be effectively suppressed. Also, in combustion under uniform lean conditions, fuel cost performance for the same load and same air/fuel ratio is better than in the case of combustion under stratified lean conditions, so a considerable improvement in the fuel cost performance can be achieved by adopting combustion under uniform lean conditions in the high load side operating region A303 where fuel injection is increased due to high torque being demanded.

Also, in the high load side operating region A303, the air/fuel ratio during combustion becomes smaller in the preceding cylinders 2A, 2D as the engine load becomes higher, so knocking can be more effectively suppressed since the EGR is also increased with this increase in fuel injection rate.

Figure 26:
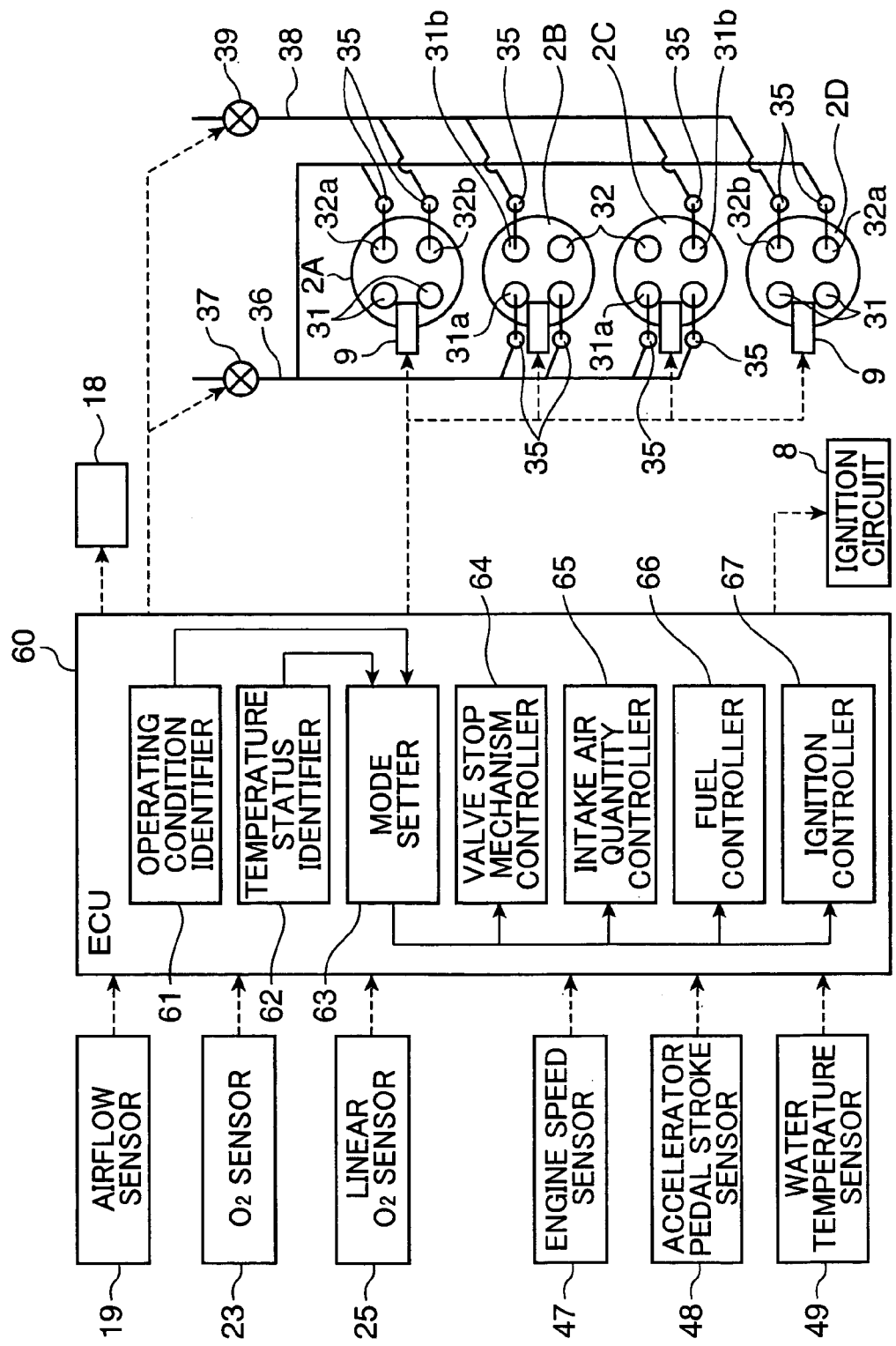
FIG. 26 is a block diagram of a control system showing yet a further embodiment.

FIG. 26 shows the drive/control system according to yet a further embodiment of the present invention. In this embodiment, the ECU 60 comprises operating condition identifier 61, temperature status identifier 62, mode setting means 63, valve stop mechanism controller 64, intake air quantity controller 65, fuel controller 66 and ignition controller 67.

The operating condition identifier 61 comprises a map for control purposes as shown in FIG. 4, like that of the operating condition identifier 41 in FIG. 3, whereby it determines whether the operating condition is in region A or B. The temperature status identifier 62 ascertains whether the water temperature (engine temperature) is a low temperature, below a prescribed value, or a high temperature, above the prescribed temperature.

In accordance with the determination by the operating condition identifier 61, the mode setting means 63 selects the special operating mode in the region A and selects the ordinary operating mode in the region B.

The valve stop mechanism controller 64 and intake air quantity controller 65 have the same functions as the valve stop mechanism controller 42 and intake air quantity controller 43 in FIG. 2.

Also, the fuel controller 66 and ignition controller 67 perform control of the combustion condition (control of fuel and control of the ignition time) in accordance with the mode set by the mode setting means 63.

That is, when the special operating mode is set, the fuel injection rate in respect of the preceding cylinders 2A, 2D is controlled such as to produce a lean air/fuel ratio greater than the stoichiometric air/fuel ratio, preferably substantially twice the stoichiometric air/fuel ratio or more than this and the injection time is set such as to achieve stratified charge combustion by fuel injection in the compression stroke and, furthermore, an ignition time is set whereby forced ignition is performed in the vicinity of the compression top dead center. On the other hand, the fuel injection rate, fuel injection time and the fuel injection valve 9 that performs this fuel injection are set such as to control the fuel ignition rate so as to produce the stoichiometric air/fuel ratio by supplying fuel to the burnt gas of lean air/fuel ratio and to supply this fuel by the preceding cylinders 2A, 2D in respect of the following cylinders 2B, 2C, i.e. so as to inject fuel of an amount appropriate to the following cylinders directly into the combustion chambers 4 during the exhaust stroke of the preceding cylinders 2A, 2D by means of the fuel injection valve 9 of the preceding cylinders 2A, 2D; in addition, forced ignition is deactivated so as to perform compression ignition in the following cylinders 2B, 2C.

In this way, in this embodiment, the fuel injection valves 9 of the preceding cylinders 2A, 2D, to be described, of the fuel injection valves 9 of the cylinders 2A to 2D are arranged to function as the second fuel injection means according to the present invention and the fuel controller according to the present invention is constituted by the fuel controller 46 and ignition controller 47 etc.

Control when the ordinary operating mode is set is the same as in the other embodiments, already described.

Figure 27:
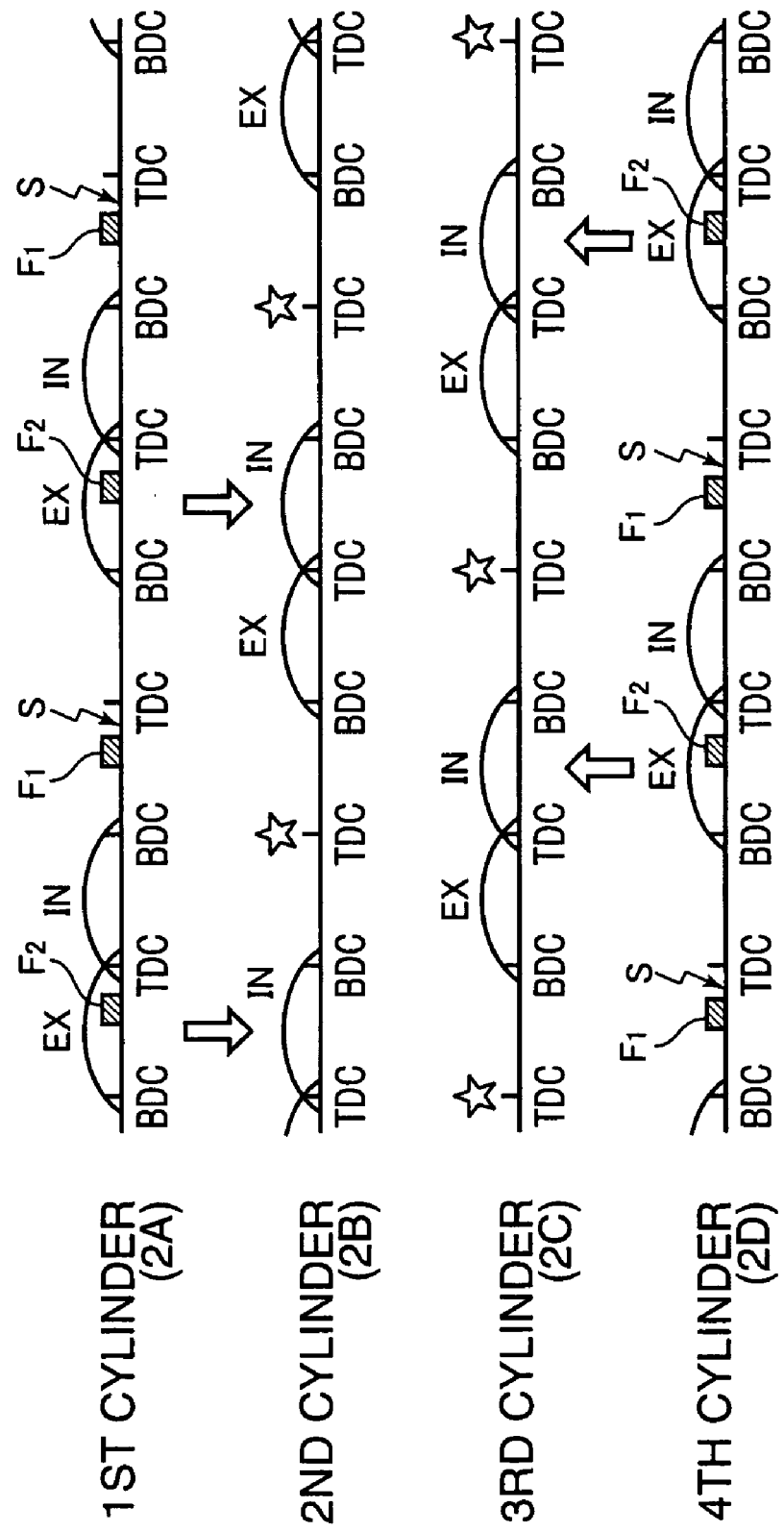
FIG. 27 is a view showing the exhaust stroke, intake stroke, fuel injection period and ignition period etc of each cylinder.

Next, the operation of a device according to this embodiment is described with reference to FIG. 27.

In the operating region A of low load, low rotational speed, the special operating mode is set and the condition in which two cylinders are connected (see FIG. 6) is produced.

In this condition, new air is introduced from the intake passage 15 in the respective intake strokes to the preceding cylinders 2A, 2D, fuel is injected in the compression stroke while controlling the fuel injection rate such that the air/fuel ratio in the preceding cylinders 2A, 2D is a lean air/fuel ratio greater than the stoichiometric air/fuel ratio and stratified charge combustion is performed with the lean air/fuel ratio by performing ignition at the prescribed ignition time.

After this, fuel for the following cylinders is directly injected into the combustion chambers 4 of the preceding cylinders 2A, 2D during the period in which the exhaust stroke of the preceding cylinders 2A, 2D and the intake stroke of the following cylinders 2B, 2C overlap and the fuel injection rate is controlled such that the burnt gas of the lean air/fuel ratio produces the stoichiometric air/fuel ratio ($F_2$ in FIG. 27); this burnt gas, containing fuel, is introduced into the following cylinders 2B, 2C (white arrow in FIG. 27) through the inter-cylinder gas passages 22 whilst being exhausted from the preceding cylinders 2A, 2D. Compression self-ignition is then performed in the following cylinders 2B, 2C by rise of the pressure and temperature within the combustion chambers in the vicinity of the top dead center of the compression stroke. Since the high temperature burnt gas that is exhausted from the preceding cylinders 2A, 2D is then immediately introduced into the following cylinders 2B, 2C through the short inter-cylinder gas passages 22, the temperature within the combustion chambers in the following cylinders 2B, 2C becomes high in the intake stroke and, by further rise in pressure and temperature from this condition in the compression stroke, the temperature within the combustion chambers is raised to such a degree as to enable thoroughly satisfactory self-ignition of the mixture in the vicinity of the top dead center in the latter period of the compression stroke.

The burnt gas after combustion in the following cylinders 2B, 2C is then exhausted to the exhaust passage 20, which is provided with a three-way catalyst 24.

In this way, due to the super-lean combustion in the preceding cylinders 2A, 2D and the combustion by compression self-ignition in the following cylinders 2B, 2C, the operation and benefits already described are obtained in the same way as in the case of the other embodiments.

In particular, with this embodiment, since injection of the fuel in an amount appropriate to the following cylinders is effected in the preceding cylinders 2A, 2D, the mixed gas and high temperature burnt gas are thoroughly mixed between the burnt gas being exhausted from the preceding cylinders 2A, 2D and being introduced into the following cylinders 2B, 2C and so are uniformly distributed; a uniform mixture distribution condition and mixture temperature satisfying the ideal compression self-ignition condition are therefore obtained. Self-ignition performance in the following cylinders 2B, 2C is therefore are improved and excellent combustion achieved.

Figure 28:
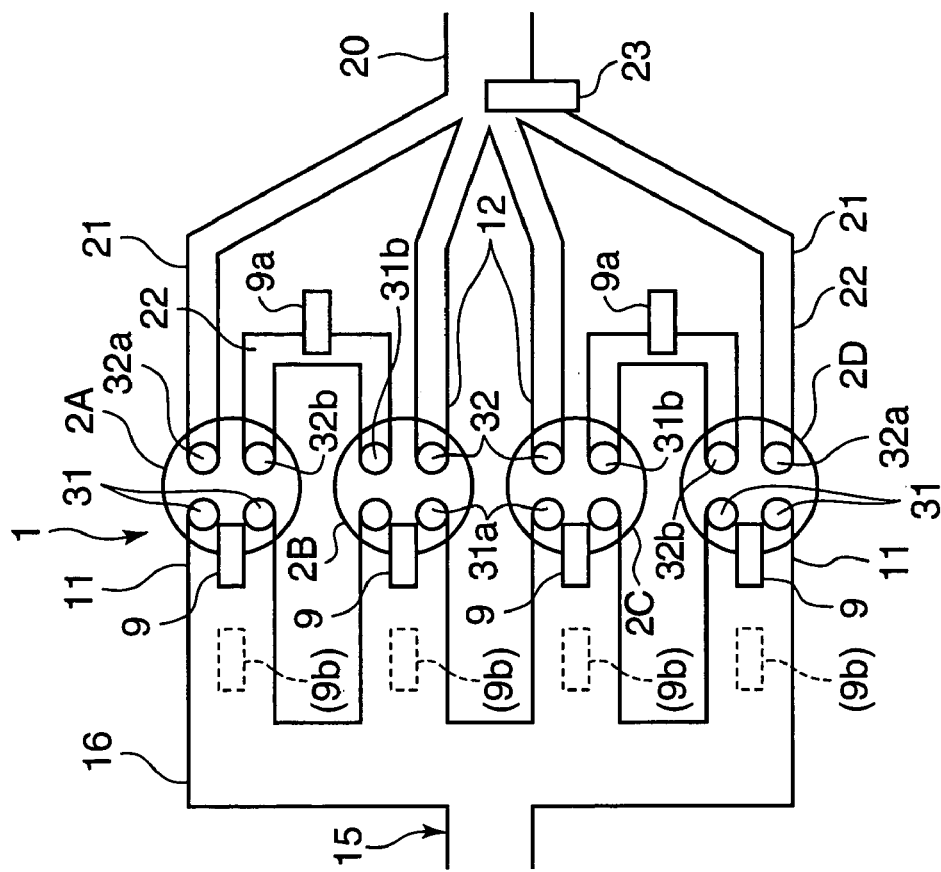
FIG. 28 is a diagrammatic plan view showing a modified example of an engine.

Although, in the above embodiment, it was arranged for fuel in an amount appropriate to the following cylinders to be injected into the preceding cylinders 2A, 2D in the special operating mode by using the fuel injection valves 9 of the cylinders, it would be possible for example as shown in FIG. 28 to arrange for a special-purpose fuel injection valve 9a (second fuel injection means) to be provided at some point along the inter-cylinder gas passages 22 and for fuel to be supplied to the burnt gas prior to its introduction into the following cylinders 2B, 2C after the exhaustion from the preceding cylinders 2A, 2D in an amount appropriate to the following cylinders. The essential point is that it should be possible to obtain a mixing effect between the mixture and high temperature burnt gas by supplying fuel in an amount appropriate to the following cylinders to the burnt gas of the preceding cylinders 2A, 2D prior to introduction thereof into the following cylinders 2B, 2C and that, as a result, the self-ignition performance is improved; the injection timing of the fuel in an amount appropriate to the following cylinders therefore does not matter so long as the arrangement is such that this fuel in an amount appropriate to the following cylinders can be supplied to the burnt gas with such a timing.

However, in the case of a direct injection engine, as in the embodiment described above, it is possible to inject the fuel during the exhaust stroke of these cylinders by using the fuel injection valves 9 of the preceding cylinders 2A, 2D, so, in this case, the provision of a special-purpose fuel injection valve for supplying fuel for the following cylinders as in FIG. 28 is unnecessary, so there is the advantage that a straightforward construction can be achieved in which the basic construction of a direct injection engine is utilized without modification.

In a construction in which, as in FIG. 28, a special-purpose fuel injection valve 9a is provided for supplying fuel in an amount appropriate to the following cylinders, for example instead of providing a fuel injection valve 9 in each cylinder, it would be possible to provide a fuel injection valve 9b in a branched intake passage 16 as shown by the broken line in this Figure and to perform fuel injection to the cylinders 2A to 2D in the case of the ordinary operating mode or fuel injection to the preceding cylinders 2A, 2D in the case of the special operating mode by port injection.

Also, when fuel in an amount appropriate to the following cylinders is supplied in respect of the burnt gas in the preceding cylinders, a construction may be adopted wherein a fuel injection valve capable of in-cylinder injection is provided at least in respect of the preceding cylinders, so fuel injection may be achieved by port injection for example by providing a fuel injection valve in the intake passages in respect of the following cylinders.

Figure 29:
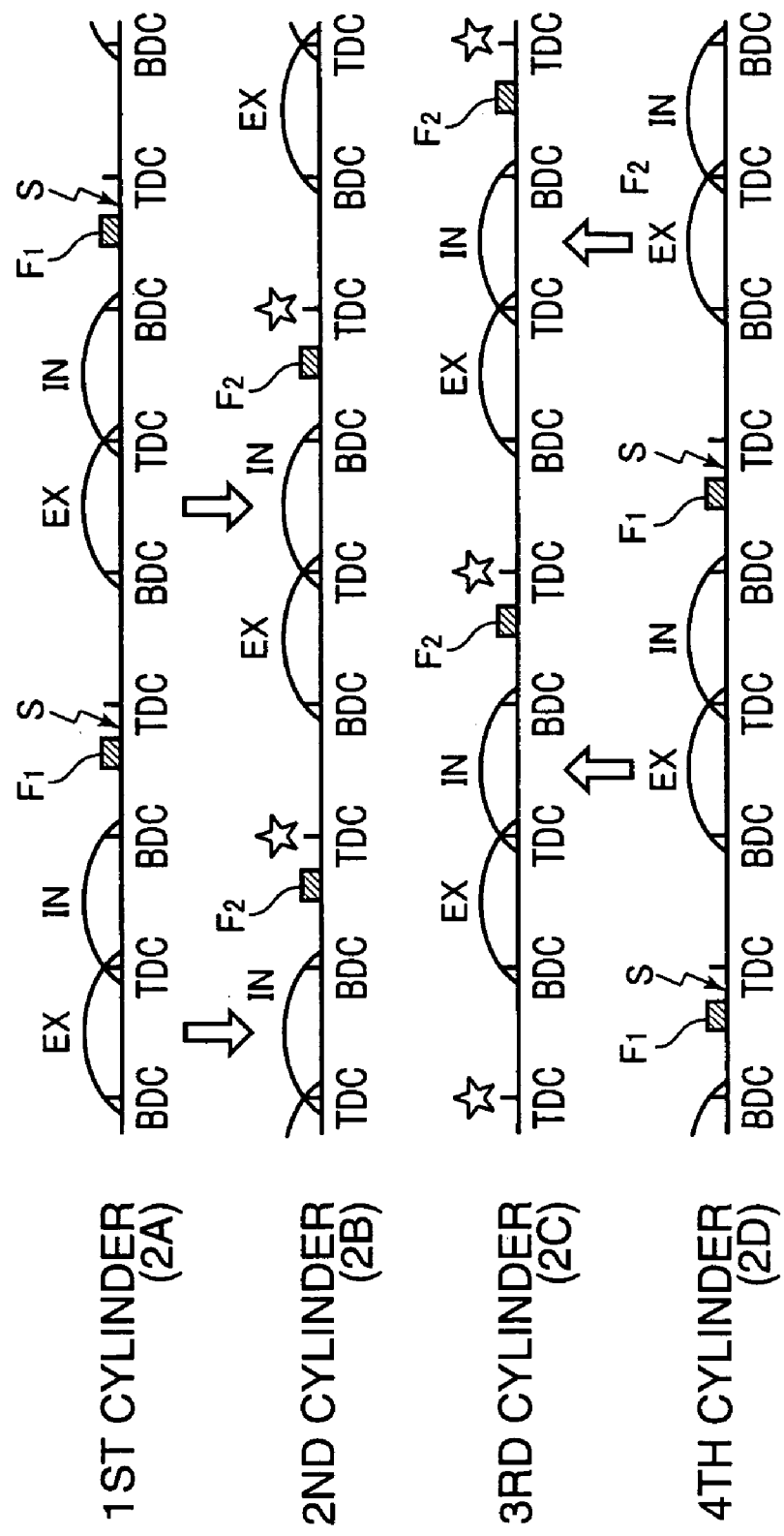
FIG. 29 is a view showing the exhaust stroke, intake stroke, fuel injection period and ignition period etc of each cylinder in the case of the modified example shown in FIG. 28.

Also, although, in the foregoing embodiments, it was arranged to supply fuel in an amount appropriate to the following cylinders into the preceding cylinders 2A, 2D in all cases in this special operating mode, it would be possible to ascertain the degree of self-ignition capability in the following cylinders 2B, 2C and, in the case of an operating condition in which this self-ignition capability is high, to perform compression ignition by supplying fuel in the intake stroke of the following cylinders 2B, 2C after introduction of the burnt gas of the preceding cylinders 2A, 2D into the following cylinders 2B, 2C as shown in FIG. 29 (this may be called the first injection mode), or, in the case of an operating condition in which the self-ignition capability is low, to supply fuel in amount appropriate to the following cylinders into the preceding cylinders 2A, 2D as described in the above embodiment (this may be called the second injection mode). For example, in an operating condition in which the temperature of the engine as determined by the temperature status identifier 42 is below a specified temperature, preferably it is arranged for combustion to be satisfactorily conducted by raising the self-ignition capability in the following cylinders 2B, 2C by performing the second injection mode.

It should be noted that the determination of the degree of self-ignition capability may be performed for example in the fuel controller 66 in accordance with information relating to the operating condition and apart from being determined in accordance with engine temperature as described above, could be determined in accordance with engine rotational speed or engine load etc. For example, it may be assumed that, in particular in a very low load region of the operating region A, the fuel injection rate will become low and the capability for self-ignition will diminish. Combustion can therefore be achieved by compression self-ignition in the following cylinders 2B, 2C in a fully satisfactory manner in such circumstances also, by arranging to perform the second ignition mode.

Also, although, in the above embodiments, the region A of low speed and low load is designated as a special operating mode region and combustion by compression self-ignition is arranged to be performed in all cases in the following cylinders in this special operating mode, it could be arranged to perform combustion by forced ignition in part of this region A.

Figure 30:
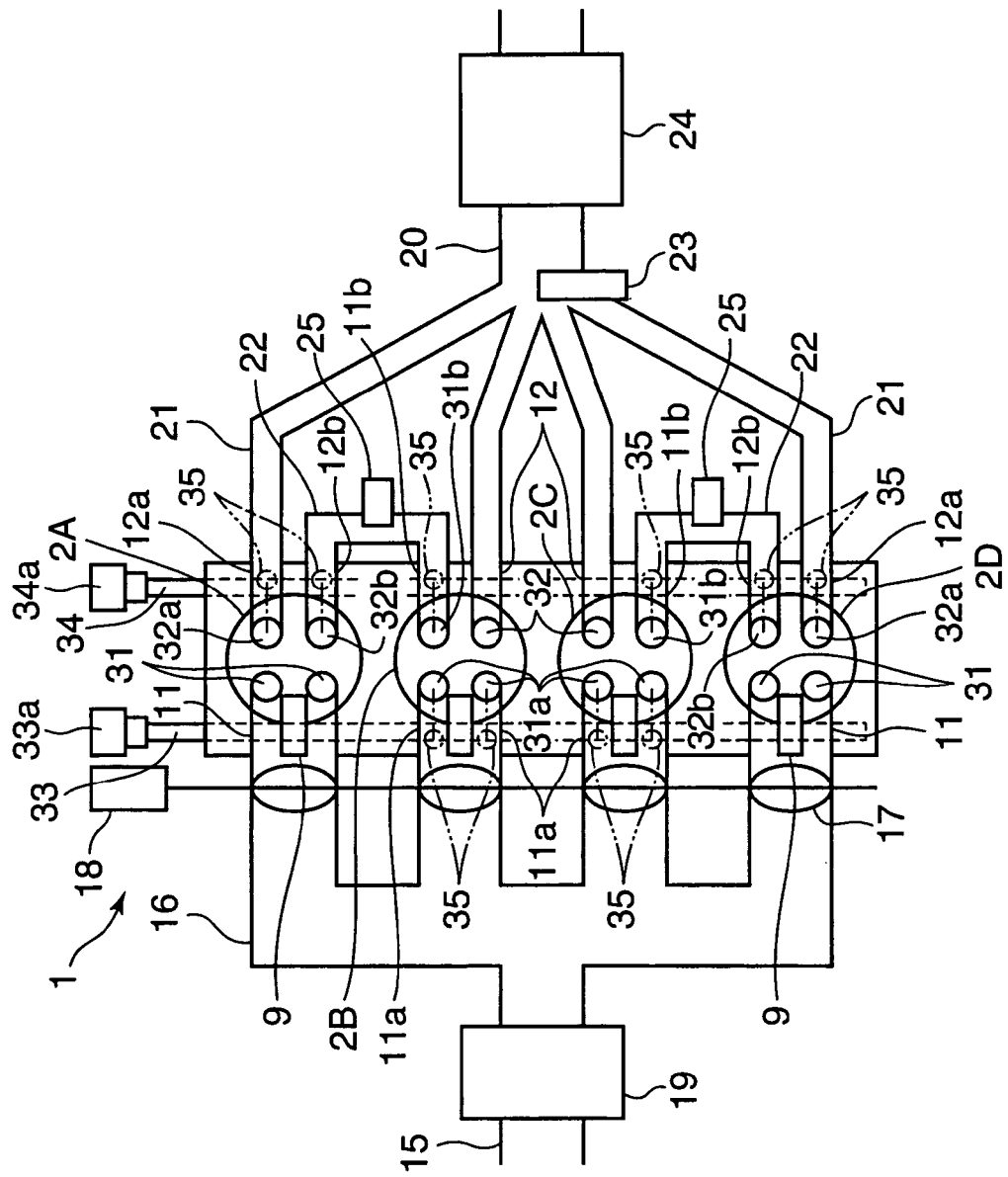
FIG. 30 is a diagrammatic plan view of an entire engine according to yet a further embodiment.
Figure 31:
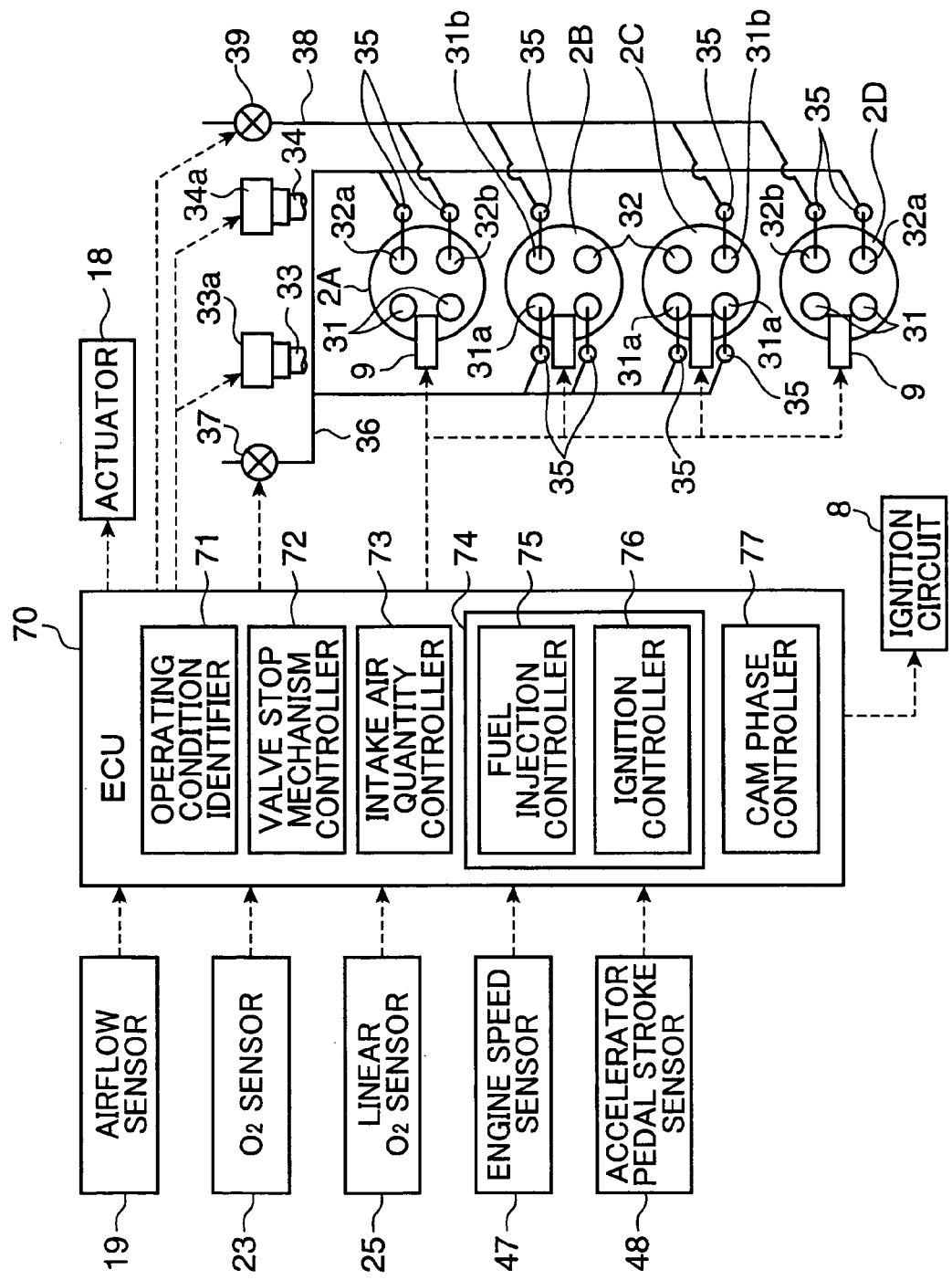
FIG. 31 is a block diagram of a control system of the same embodiment.

FIG. 30 and FIG. 31 show yet a further embodiment of the present invention.

In the overall construction shown in FIG. 30, the main engine body 1, the intake/exhaust ports and the intake/exhaust passages connected therewith, the inter-cylinder gas passages and the intake/exhaust valves etc that open and close the intake/exhaust ports are practically the same as those shown in FIG. 1 or FIG. 8. Furthermore, in this embodiment, it is arranged for the opening/closing times of the valves to be varied in accordance with conditions by means of cam phase varying mechanisms 33a, 34a provided in a valve moving mechanism for the intake/exhaust valves and for these to be closed off by a valve deactivating mechanism 35.

The cam phase varying mechanisms 33a, 34a are previously known mechanisms that vary the rotational phase of camshafts 33, 34 with respect to the rotational phase of the crankshaft. As shown in FIG. 1, the cam phase varying mechanism 33a is provided on the camshaft 33 and the cam phase varying mechanism 34a is provided on the camshaft 34, these being independently controlled (see FIG. 31). Consequently, the opening/closing time of the preceding cylinder intake valves 31 and following cylinder intake valves (first intake valves) 31a that are opened and closed by rotation of the camshaft 33 is varied in advance or in retardation overall by the cam phase varying mechanism 33a. In the same way, the opening/closing time of the burnt gas introduction valve (second intake valve) 31b, the following cylinder exhaust valve 32, the preceding cylinder exhaust valve (first exhaust valve) 32a and burnt gas exhaust valve (second exhaust valve) and 32b that are opened and closed by rotation of the cam shaft 34 is varied in advance or in retardation overall by the cam phase varying mechanism 34a.

The ECU 70 in FIG. 31 comprises operating condition identifier 71, valve stop mechanism controller 720, intake air quantity controller 73, fuel controller 74 and cam phase controller 77.

Figure 32:
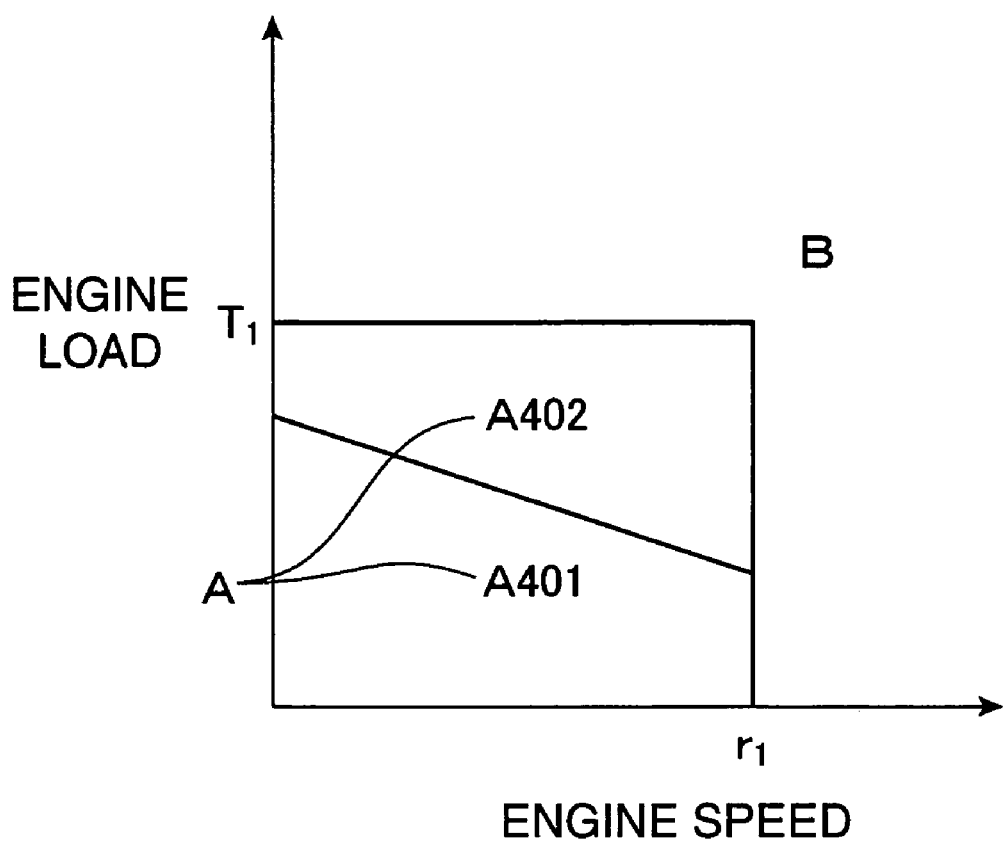
FIG. 32 is a diagram showing an example of the setting of the operating region for exercising control in accordance with the operating condition.

The operating condition determining means 71 ascertains whether the operating condition is in the operating region A on the low load, low rotational speed side shown in FIG. 32 (in which the engine load is less than T1 and the engine rotational speed is less than r1) or is in the operating region B on the high load side or high rotational speed side (in which the engine load exceeds T1 or the engine rotational speed exceeds r1) and furthermore, if the operating condition is in the operating region A, ascertains whether it is in the comparatively low load, low rotational speed region A401 thereof or is in the comparatively high load, high rotational speed region A402 thereof. Then, under the prescribed condition (for example condition in which the engine is fully warmed-up), operation is conducted in the special operating mode in which the cylinders are put in a two-cylinder connected condition in the operating region A and operation is conducted in the ordinary operating mode in which the cylinders are in an independent condition in the operating region B.

The valve deactivating mechanism controller 72 and intake air quantity controller 73 have the same function as the valve deactivating mechanism controller 42 and intake air quantity controller 43 in FIG. 3. Also, the combustion controller 74 comprises fuel injection controller 75 and ignition controller 76 and performs fuel injection and ignition control in accordance with the operating regions A, B in substantially the same way as the combustion controller 44 in FIG. 3.

The cam phase controller 77 controls the cam phase varying mechanisms 33*a*, 34*a* in accordance with the results of the determination by the operating condition identifier 71. The details of the control will be described later, but for example in the special operating mode the cam phase varying mechanism 34*a* is controlled in a direction such as to advance the phase of the cam 27 in the comparatively low load, low rotational speed region (region A401 in FIG. 32), so that it is set such that the opening/closing times of the burnt gas exhaust valve 32*b*, burnt gas introduction valve 31*b* and following cylinders' exhaust valves 32 that are actuated by rotation of the camshaft 34 all take place at an early stage. In contrast, in the comparatively high load, high rotational speed region (region A402 in FIG. 32), the cam phase varying mechanism 34*a* is controlled in a direction such as to delay the phase of the cam 27, so that it is set such that the opening/closing times of the burnt gas exhaust valve 32*b*, burnt gas introduction valve 31*b* and following cylinders' exhaust valves 32 that are actuated by rotation of the camshaft 34 are all delayed. It should be noted that the cam phase varying mechanisms of 33*a*, 34*a* act on the valves whilst they are activated, so that a valve that has been put into the deactivated condition by the valve deactivating mechanism 35 remains in the deactivated condition irrespective of control operation of the cam phase varying mechanisms 33*a*, 34*a*.

Next, the operation of this embodiment will be described with reference to FIG. 33 and FIG. 34.

In the device of this embodiment also, in the low load, low rotational speed operating region A, the device is put into the special operating mode in which combustion is conducted in the two-cylinder connected condition and, in the high load or high rotational speed operating region B, the device is put into the ordinary operating mode in which combustion is conducted with the intake ports and exhaust ports of the respective cylinders in an independent condition. When in the special operating mode, combustion is conducted in the preceding cylinders with a super-lean air/fuel ratio and in the following cylinders combustion is conducted by compression self-ignition.

However, even in the special operating mode, if the cylinder temperature of the following cylinders 2B, 2C is low, so that they are in a condition in which compression ignition is difficult, a changeover of the ignition of the following cylinders 2B, 2C to forced ignition by a spark plug 7 is effected. Also in the contrary situation in which the cylinder temperature of the following cylinders 2B, 2C is too high, resulting in a condition in which abnormal combustion such as knocking occurs, changeover is effected from the special operating mode to the ordinary operating mode. In both cases, the benefit of improvement in fuel costs etc is suppressed compared with the special operating mode using compression ignition. It is therefore desirable to expand the operating region that is suited to compression ignition in the special operating mode, in order to obtain such benefits to a greater extent.

The opening/closing times of the intake valve are set as follows in order to expand the operating region that is suited to compression ignition in the special operating mode.

FIG. 33 shows in detail the opening/closing times etc of the intake/exhaust valves and is a diagram showing the opening/closing time of the preceding cylinders' intake valves 31 and the burnt gas exhaust valves 32*b* of the preceding cylinders 2A, 2D in the special operating mode and the opening/closing times of the burnt gas introduction valves 31*b* of the following cylinders 2B, 2C and the following cylinders' exhaust valves 32. FIG. 33(*a*) is the case of the comparatively low load, low rotational speed region (region A401 in FIG. 32) of the operating condition in which the special operating mode is conducted and FIG. 33(*b*) is likewise the case of the comparatively high load, high rotational speed region (region A402 in FIG. 32). In these Figures, the horizontal axis shows the crank angle and T is the top dead center (TDC) while B is the bottom dead center (BDC). The interval between T and B is 108° CA. Also, the upper section shows the preceding cylinders 2A, 2D while the lower section shows the following cylinders 2B, 2C corresponding thereto. Also, the band-shaped portions indicate the open periods of the valves. The white arrow from the upper section to the lower section indicates a condition in which the burnt gas from the preceding cylinders 2A, 2D is fed into the following cylinders 2B, 2C, with the exhaust stroke of the preceding cylinders 2A, 2D and the intake stroke of the following cylinders 2B, 2C overlapping.

FIG. 33(*a*) shows in the upper section thereof the open period 80 of the burnt gas exhaust valve in which the burnt gas exhaust valves 32*b* of the preceding cylinders 2A, 2D are open and the open period 81 (shown shaded) of the preceding cylinders' intake valves in which the preceding cylinders' intake valves 31 are open. In the lower section thereof, it shows the open period 82 of the following cylinders' exhaust valves in which the following cylinders' exhaust valves 32 of the following cylinders 2B, 2C are open and the open period 83 of the burnt gas introduction valves in which the burnt gas introduction valves 31*b* are open. The open period 81 of the preceding cylinders' intake valves is set from about 10° CA before the TDC to about 55° CA after the BDC (total about 245° CA). This is a typical set value in prior art engines. In contrast, the open period 83 of the burnt gas introduction valves is set from about 45° CA before the TDC to substantially the BDC (total about 225° CA). Also, the open period 82 of the following cylinders' exhaust valves is set to about 80° CA before the BDC to about 25° CA before the TDC (total about 235° CA).

That is, the interval between the bottom dead center 96 of the following cylinders' intake stroke and the open period 97 of the burnt gas introduction valves (about 0° CA) is set to be shorter than the interval (about 55° CA) between the bottom dead center 92 of the preceding cylinders' intake stroke and the closed period 93 of the preceding cylinders' intake valves. Also the open period 83 of the burnt gas introduction valves is shorter than the open period 81 of the preceding cylinders' intake valves and the open period 82 of the following cylinders' exhaust valves. Thus, since, in the following cylinders 2B, 2C, the open period 83 of the burnt gas introduction valves is set to be short and the closed period 97 of the burnt gas introduction valves is set to be earlier and at a time close to the BDC, the period for which the burnt gas introduction valve 31*b* is open during ascent of the piston 3 beyond the BDC is non-existent or short. The effective compression ratio is therefore increased, approaching the geometrical compression ratio. With this increase in the effective compression ratio, the cylinder temperature of the following cylinders 2B, 2C tends to rise, causing the compression ignition capability to increase. It should be noted that what is introduced into the following cylinders 2B, 2C at this point is not new air throttled by the multi-linked throttle valves 17 but burnt gas exhausted from the preceding cylinders 2A, 2D, which easily flows into the combustion chambers 4, so these are satisfactorily filled even if the burnt gas introduction valves 31b are closed at an early stage.

Also, the open period 80 of the burnt gas introduction valves is set from about 80° CA before the BDC to about 25° CA before the TDC (total about 235° CA). The closed period 19 of the burnt gas exhaust valves is therefore set advanced by about 25° CA compared with the closed period 97 of the burnt gas introduction valves (corresponding to the TDC in the preceding cylinders 2A, 2D). This is earlier than the typical set value of a prior art engine (about 50° CA after the TDC). By closing the burnt gas exhaust valves 32b at an early stage, the amount of internal EGR of the preceding cylinders 2A, 2D is increased, thereby increasing the temperature of the burnt gas that is introduced into the following cylinders 2B, 2C.

As described above, the compression ignition capability is improved by raising the cylinder temperature of the following cylinders 2B, 2C by increasing the effective compression ratio of the following cylinders 2B, 2C and raising the temperature of the burnt gas that is introduced into the following cylinders 2B, 2C. In this way, the operating region in which combustion by compression ignition can be performed can be expanded further into the low load region.

Figure 33A:
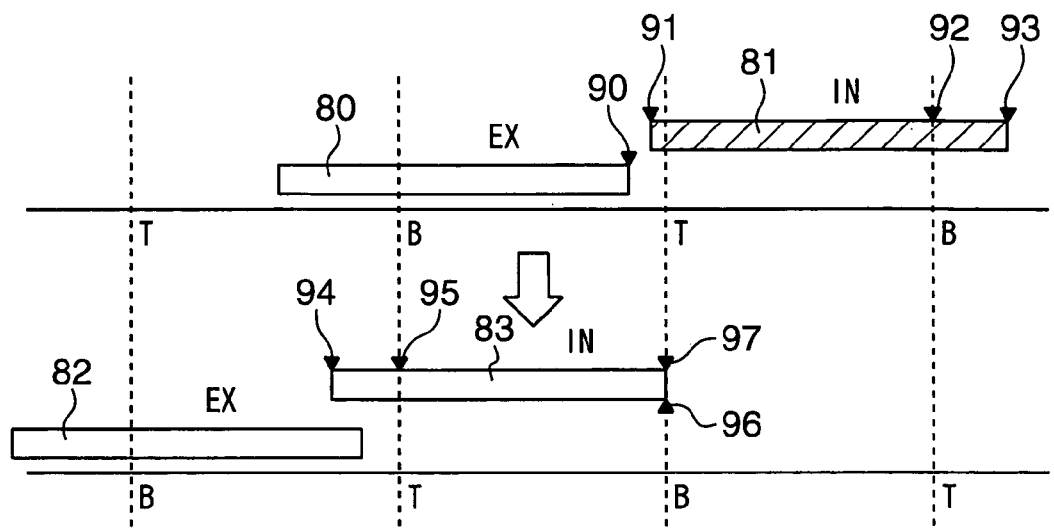
FIGS. 33(A) and 33(B) are diagrams showing the opening/closing times of an intake/exhaust valve in a special operating mode, (a) showing the case of comparatively low load, low rotational speed and (b) showing in like manner the case of comparatively high load, high rotational speed.
Figure 33B:
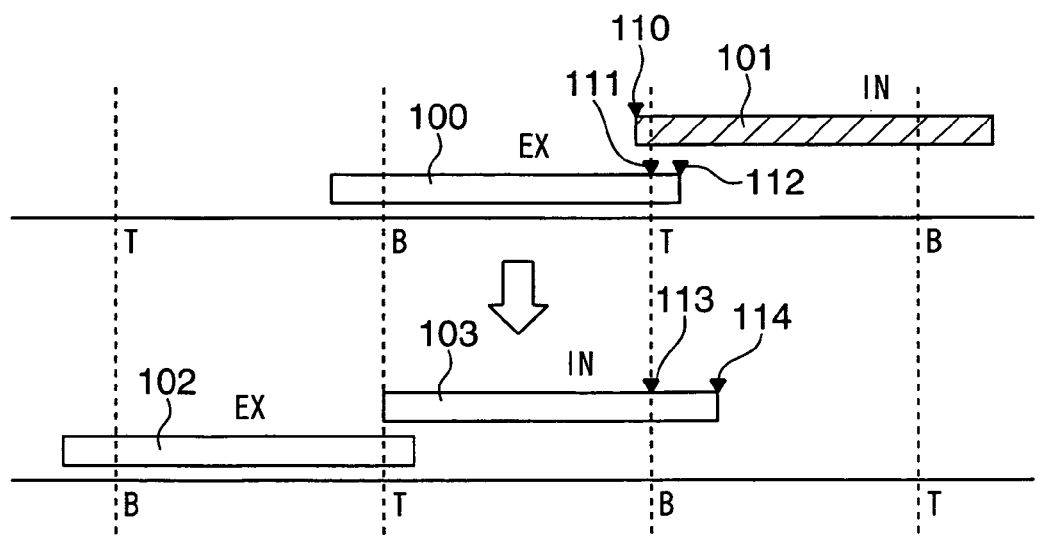

The upper section of FIG. 33(b) shows the open period 100 of the burnt gas exhaust valves for which the burnt gas exhaust valves 32b of the preceding cylinders 2A, 2D are open and the open period 101 (indicated by shading) of the preceding cylinders' intake valves, for which the preceding cylinders' intake valves 31 are open. The lower section thereof shows the open period 102 of the following cylinders' exhaust valves for which the following cylinders' exhaust valves 32 of the following cylinders 2B, 2C are open and the open period 103 of the burnt gas introduction valves for which the burnt gas introduction valves 31b are open. The open period 101 of the preceding cylinders' intake valves is set in the same way as the open period 81 of the preceding cylinders' intake valves of FIG. 33(a). In contrast, regarding the open period 100 of the burnt gas exhaust valves, the open period 102 of the following cylinders' exhaust valves and the open period 103 of the burnt gas introduction valves (respectively shown by white band lines), these are set such that the lengths of the respective periods are equal to the open period 80 of the burnt gas exhaust valves, open period 82 of the following cylinders' exhaust valves and open period 83 of the burnt gas introduction valves, while only the opening/closing times of each valve are set to be delayed by about 45° CA overall. This is achieved by delaying the phase of the camshaft 34 by about 45° CA by means of the cam phase controller 49, as described above (see FIG. 31).

The closed period 114 of the burnt gas introduction valves of FIG. 33(b) is delayed by about 45° CA from the closed period 97 of the burnt gas introduction valves of FIG. 33(a). As a result, even during the rise of the pistons 3 in the following cylinders 2B, 2C after having passed the following cylinders' intake stroke bottom dead center 113, the burnt gas introduction valves 31b are open for about 45° CA. The effective compression ratio of the following cylinders 2B, 2C is therefore reduced from that in the case of FIG. 33(a) and the cylinder temperature of the following cylinders 2B, 2C falls.

Also, the closed period 112 of the burnt gas exhaust valves is delayed by about 45° CA from the closed period 90 of the burnt gas exhaust valves of FIG. 33(a), being set to about 20° CA after the top dead center 111 of the preceding cylinders' exhaust stroke. Consequently, the internal EGR of the preceding cylinders 2A, 2D is reduced from that in the case of FIG. 33(a) and the temperature of the burnt gas that is introduced into the following cylinders 2B, 2C falls.

As described above, due to the lowering of the effective compression ratio of the following cylinders 2B, 2C and the fall in the temperature of the burnt gas introduced into the following cylinders 2B, 2C, the cylinder temperature of the following cylinders 2B, 2C falls, preventing occurrence of abnormal combustion such as knocking. In this way, the operating region in which combustion can be performed by compression ignition is extended further into the high load region.

Thus, in the special operating mode, the opening/closing times of the intake/exhaust valves are set in a direction such as to raise the cylinder temperature thereof in an operating region in which the cylinder temperature of the following cylinders 2B, 2C is comparatively low and in a direction such as to lower the cylinder temperature in an operating region in which this is comparatively high. The operating region in which combustion can be performed appropriately by compression ignition in the following cylinders 2B, 2C can thereby be expanded, making it possible to further promote the effect of improvement of fuel costs and exhaust gas cleansing.

Figure 34:
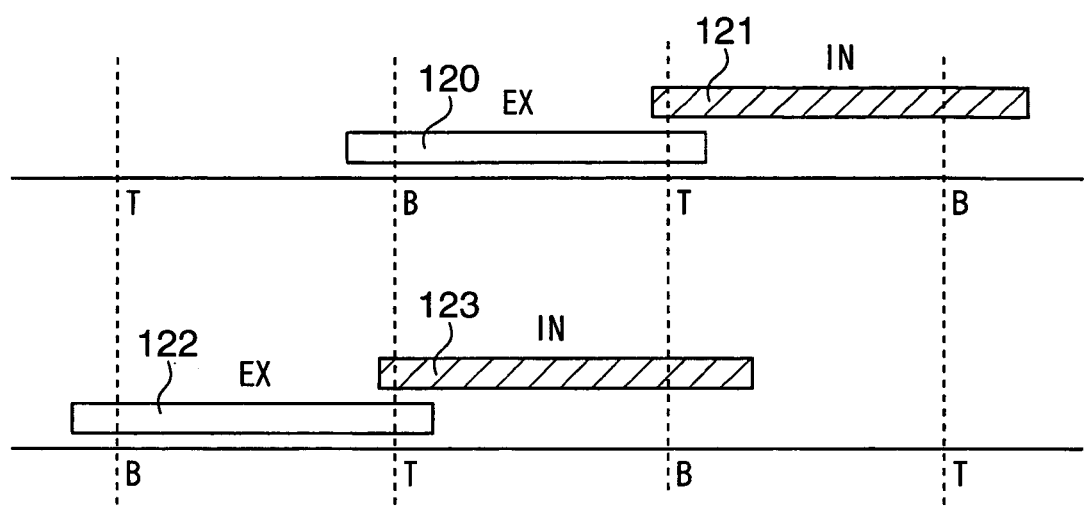
FIG. 34 is a diagram showing the opening/closing times of an intake/exhaust valve in the ordinary operating mode.

FIG. 34 is a diagram given in explanation of the opening/closing times of the preceding cylinders' intake valves 31 and the burnt gas exhaust valves 32b of the preceding cylinders 2A, 2D in the ordinary operating mode, and also of the opening/closing times of the burnt gas introduction valves 31b and following cylinders' exhaust valves 32 of the following cylinders 2B, 2C. The horizontal axis shows the crank angle, T being the top dead center (TDC) and B being the bottom dead center (BDC). The interval between T and B is 108° CA. Also, the upper section shows the preceding cylinders 2A, 2D while the first section shows the following cylinders 2B, 2C. In the ordinary operating mode, the cylinders operate independently, so combustion is performed by forced ignition when new air is introduced, both in the case of the preceding cylinders 2A, 2D and the following cylinders 2B, 2C. The upper section of FIG. 34 shows the open period 120 of the burnt gas exhaust valves in which the preceding cylinders' exhaust valves 32a of the preceding cylinders 2A, 2D are open and the open period 121 of the preceding cylinders' intake valves for which the preceding cylinders' intake valves 31 are open. The bottom section shows the open period 122 of the following cylinders' exhaust valves for which the bottom cylinders' exhaust valves 32 of the following cylinders 2B, 2C are open and the open period 123 of the following cylinders' intake valves for which the following cylinders' intake valves 31a are open.

The exhaustion of the preceding cylinders 2A, 2D and intake by the following cylinders 2B, 2C are performed by different valves than in the special operating mode, so this opening/closure is performed by means of a different cam. The open period of the 120 of the preceding cylinders' exhaust valves and the open period 123 of the following cylinders' intake valves can therefore be set independently from the opening period 80 of the burnt gas exhaust valves and the open period 83 of the burnt gas introduction valves of FIG. 33(a). In FIG. 34, the open period 121 of the preceding cylinders' intake valves and the open period 123 of the following cylinders' intake valves (shown shaded) are set from about 10° CA before TDC to about 55° CA after BDC (total about 245° CA). Also, the open period 120 of the preceding cylinders' exhaust valves and the open period 122 of the following cylinders' exhaust valves are set from about 30° CA before BDC to about 25° CA after TDC (total about 235° CA). These open periods correspond to typical settings of a prior art engine.

The open period 121 of the preceding cylinders' intake valves and the open period 123 of the following cylinders' intake valves can be varied forwards and backwards by the cam phase varying mechanism 33a and the open period 120 of the preceding cylinders' exhaust valves and the open period 122 of the following cylinders' exhaust valves can be varied forwards and backwards by means of the cam phase varying mechanism 34a. Consequently, the period for which the preceding cylinders' exhaust valves 32a and the preceding cylinders' intake valves 31 are both open (period in which the open period 120 of the preceding cylinders' exhaust valves and the open period 121 of the preceding cylinders' intake valves overlap: "valve overlap") can be varied by controlling the cam phase varying mechanisms 33a, 34a. The cam phase controller 49 controls the cam phase varying mechanisms 33a, 34a so that the valve overlap increases as the load increases, so that optimum combustion efficiency is obtained in accordance with the load. The same control is performed in respect of the following cylinders 2B, 2C.

In this way, in the ordinary operating mode, output performance can be ensured by effecting control to optimum intake/exhaust times in accordance with the load and by controlling the intake air rate and fuel injection rate such as to produce a stoichiometric air/fuel ratio or a ratio richer than this.

It should be noted that the patterns shown in FIGS. 33(a) and (b) and FIG. 34 are not restrictive of the respective valve opening periods of valve opening times and these may be suitably varied within the scope of the claims. For example, the closing time 97 of the burnt gas introduction valve of FIG. 33(a) may be set to be somewhat later than the bottom dead center 96 of the intake stroke of the following cylinders. Also, the opening periods 81, 101, 121 of the intake valves of the preceding cylinders of FIGS. 33(a) and (b) and FIG. 34 may be set to be different depending on the load (in this embodiment, this is effected by means of the cam phase varying mechanism 33a), or may be set to be the same as in this embodiment (in this case, the cam phase varying mechanism 33a need not be provided). Other specific set values may also be set to suitable values in accordance with the demanded engine performance.

Also, the operating region A in the special operating mode may be divided into three or more regions instead of into two regions A401, A402 and suitable valve opening/closing times set in accordance with the respective regions. Furthermore, it could be arranged to produce continuous variation rather than setting in stepwise fashion using divided regions.

Next, a modified example of this embodiment is described with reference to FIG. 35 to FIG. 38. In these Figures, parts which are the same as in the case of the first embodiment are given the same reference symbols and repeated description thereof is dispensed with.

Figure 35:
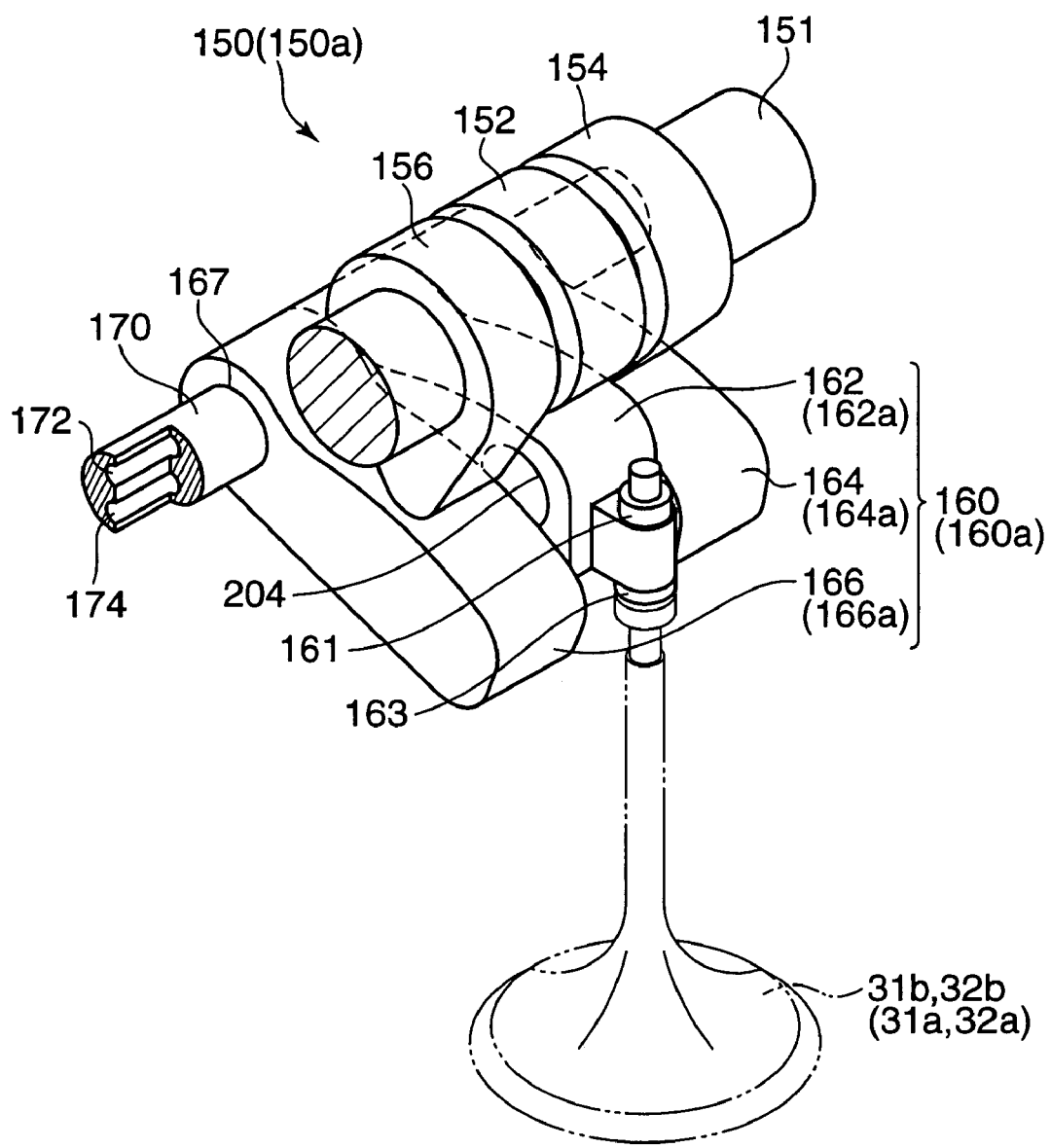
FIG. 35 is a partial perspective view showing a cam changeover mechanism employed in a yet a further embodiment.

FIG. 35 is a partial perspective view of a cam changeover mechanism 150 according to this embodiment, given in respect of the burnt gas introduction valves 31b etc indicated by the double-dotted chain lines. A camshaft 151 is arranged above the burnt gas introduction valves 31b. The camshaft 151 is arranged to rotate integrally with cams of three types, namely, a first cam 152, a second cam 154 and a third cam 156, having independent lift characteristics. A rocker arm set 160 supported on a rocker shaft 170 is provided between these cams and a burnt gas introduction valve 31b. The rocker arm set 160 is an assembly of rocker arms of three types, namely, a first rocker arm 162, second rocker arm 164 and third rocker arm 166. At the tip of the first rocker arm 162, there are provided a valve abutment section 163 and an adjustment screw 161 for fine adjustment of the position thereof in the axial direction; the valve abutment section 163 abuts the upper end of the valve shaft of for example the burnt gas introduction valve 31b at a suitable position. On the second rocker arm 164 and third rocker arm 166, there are provided springs, outside the drawing, that press these rocker arms against the first cam 154 and third cam 156. Consequently, when the rocker arms of the rocker arm set 160 are moveable independently, as shown, the upper surfaces of the rocker arms abut the peripheries of the first cam 152, second cam 154 and third cam 156 and are thereby vertically rocked about the rocker shaft 170 in accordance with the shape of the cam abutment sections (radius of rotation of the respective cams).

In the interior of the rocker arms set 160, there are provided five plungers, to be described, in two rows (see FIG. 36. A fourth plunger hole 204, which is one of the plunger holes thereof, is visible in FIG. 35). By the movement of these plungers, the first rocker arm 162 can be made integral with the second rocker arm 164 or third rocker arm 166 i.e. can be linked for joint movement therewith. A first passage 172 for the supply of hydraulic fluid and a second passage 174 for the supply of hydraulic fluid are provided that conduct oil for hydraulic operation of the plungers within the rocker shaft 170.

The first cam 152 is a cam for valve deactivation and has a circular peripheral shape concentric with the camshaft 151. Consequently, when the upper surface of the first rocker arm 162 is constantly in abutment with the peripheral surface of the first cam 152 (the second rocker arm 164 and third rocker arm 166 being detached), no rocking takes place even though the camshaft 151 is rotated. In other words, the burnt gas introduction valves 31b etc are deactivated in the closed condition.

The second cam 154 is a cam for low load (or low speed) and comprises a portion having the same peripheral shape as the first cam 152 and a portion having a peripheral shape that projects therefrom. Consequently, when the upper surface of the second rocker arm 164 is constantly in abutment with the peripheral surface of the second cam 154 (the third rocker arm 166, to be described, being detached), downward rocking is effected by a prescribed amount at a prescribed crank angle as the camshaft 151 rotates. Thus, if the first rocker arm 162 and second rocker arm 164 are then linked for joint movement, the operation of the first rocker arm 162 is the same as the rocking of the second rocker arm 164 by the second cam 154. In other words, the burnt gas introduction valve 31b is opened by a prescribed amount at a prescribed time.

The third cam 156 is a cam for high load (or high speed) and comprises a portion having the same peripheral shape as the second cam 154 and a portion having a peripheral shape that projects therefrom. Consequently, when the upper surface of the third rocker arm 166 is constantly in contact with the peripheral surface of the third cam 156, rocking takes place downwards by a prescribed amount at a prescribed crank angle as the camshaft 151 rotates. Thus, if the first rocker arm 162 and third rocker arm 166 are then linked for joint movement, the operation of the first rocker arm 162 is the same as the rocking of the third rocker arm 166 by the third cam 156. In other words, the burnt gas introduction valve 31b is opened by a prescribed amount at a prescribed time (the valve opening period includes the valve opening period when only the second rocker arm 164 is linked with the first rocker arm 162).

Figure 36A:
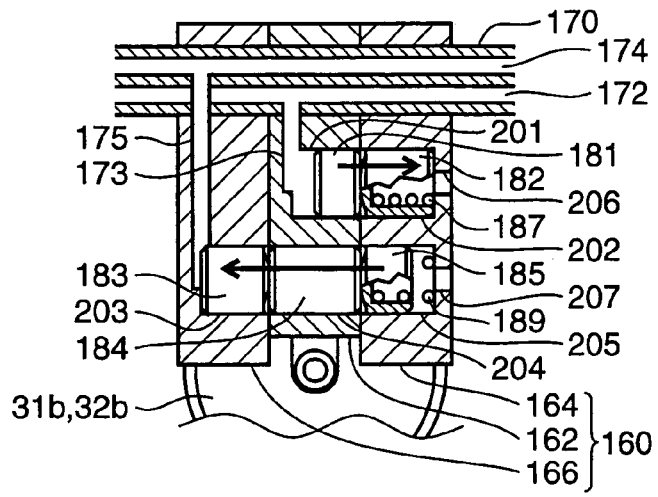
FIGS. 36(A), 36(B) and 36(C) are plunger action diagrams given in explanation of three types of cam changeover mechanism.
Figure 36B:
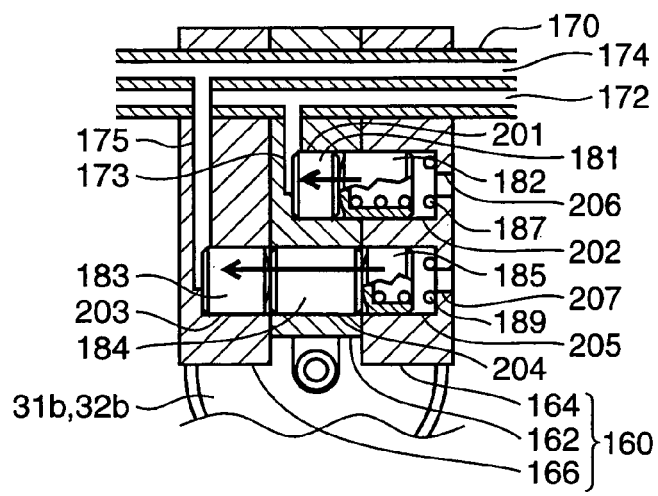
Figure 36C:
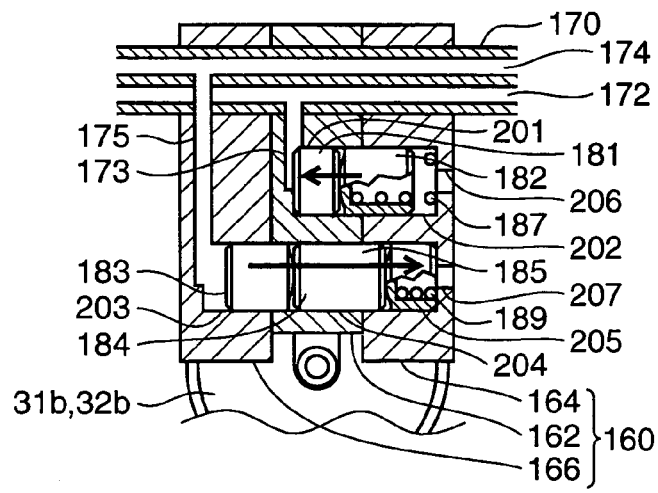

FIG. 36 is a diagram showing the operation of the five plungers provided in the interior of the rocker arm set 160. FIG. 36(a) shows the condition in which the first rocker arm 162 is detached from the second rocker arm 164 and third rocker arm 166; FIG. 36(b) shows the condition in which the first rocker arm 162 is linked with the second rocker arm 164 only; and FIG. 36(c) shows the condition in which the first rocker arm 162 is linked with the second rocker arm 164 and third rocker arm 166.

A first plunger hole 201 and a second plunger hole 204 are provided in the interior of the first rocker arm 162. The first plunger hole 201 is a concave recess of circular cross section opening towards the second rocker arm 164. At the bottom of the first plunger hole 201, a first hydraulic fluid inlet 173 is provided, leading from a first passage 172 for supply/discharge of hydraulic fluid. A first plunger 181 of cylindrical shape is fitted into the first plunger hole 201. The first plunger 181 slides smoothly within the first plunger hole 201 while sealing the hydraulic fluid that is fed by the first hydraulic fluid inlet 173 at its peripheral surface. The overall length of the first plunger 181 is shorter than the depth of the first plunger hole 201.

The fourth plunger hole 204 is a through-hole that communicates with the second rocker arm 164 and the third rocker arm 166. A cylindrical fourth plunger 184 is fitted into the fourth plunger hole 204. The overall length of the fourth plunger 184 is the same as the depth of the fourth plunger hole 204 (plate thickness of the first rocker arm 162). The fourth plunger 184 slides smoothly within the fourth plunger hole 204.

A second plunger hole 202 and a fifth plunger hole 205 are provided in the interior of the second rocker arm 164. The second plunger hole 202 is a concave recess of circular cross section opening towards the first rocker arm 162 and is of a diameter equal to that of the first plunger hole 201. An air escape hole 206 is provided at the bottom of the second plunger hole 202 to maintain the gaseous pressure of the interior at atmospheric pressure while allowing oil leakage to escape. A second plunger 182 of cylindrical shape having a bottom and of external diameter equal to that of the first plunger 181 is fitted into the second plunger hole 202. The second plunger 182 slides smoothly within the second plunger hole 202. The overall length of the second plunger 182 is equal to the depth of the second plunger hole 202. The end of the second plunger 182 that abuts the first plunger 181 is formed in spherical shape. A second plunger spring 187 is provided in a recess on the inside of the second plunger 182, so that the second plunger 182 is constantly biased towards the first plunger 181.

The fifth plunger hole 205 is a concave recess of circular cross section opening towards the first rocker arm 162 and is of diameter equal to that of the fourth plunger hole 204. An air escape hole 207 is provided at the bottom of the fifth plunger hole 205 to maintain the gaseous pressure of the interior at atmospheric pressure while allowing oil leakage to escape. A fifth plunger 185 of cylindrical shape having a bottom and of external diameter equal to that of the fourth plunger 184 is fitted into the fifth plunger hole 205. The fifth plunger 185 slides smoothly within the fifth plunger hole 205. The overall length of the fifth plunger 185 is shorter than the depth of the fifth plunger hole 205. The end of the fifth plunger 185 that abuts the fourth plunger 184 is formed in spherical shape. A fifth plunger spring 189 is provided in a recess on the inside of the fifth plunger 185, so that the fifth plunger 185 is constantly biased towards the fourth plunger 184.

A third plunger hole 203 is provided within the third rocker arm 166. The third plunger hole 203 is a concave recess of circular cross section opening towards the first rocker arm 162 and is at the same diameter as the first plunger hole 204. At the bottom of the third plunger hole 203, a second hydraulic fluid inlet 175 is provided, leading from a second passage 174 for supply/discharge of hydraulic fluid. A third plunger 183 of cylindrical shape equal in diameter to the fourth plunger 184 is fitted into the third plunger hole 203. The third plunger 183 slides smoothly within the third plunger hole 203 while sealing the hydraulic fluid that is fed by the second hydraulic fluid inlet 175 at its peripheral surface. The overall length of the third plunger 183 is equal to the depth of the third plunger hole 203. The end of the third plunger 183 that abuts the fourth plunger 184 is formed in spherical shape.

FIG. 36(a) shows the condition in which the first rocker arm 162 is detached from the second rocker arm 164 and third rocker arm 166 and hydraulic fluid pressure is supplied to the first passage 172 for supply/discharge of hydraulic fluid (hereinbelow this is termed "hydraulic pressure ON"), but hydraulic fluid pressure is not supplied to the second passage 174 for supply/discharge of hydraulic fluid (hereinbelow this is termed "hydraulic pressure OFF"). By turning the hydraulic pressure of the first hydraulic fluid inlet 173 that is fed from the first passage 172 for supply/discharge of hydraulic fluid ON, the first plunger 181 is pressed rightwards (direction of the arrow in the Figure). This pressing force is larger than the biasing force of the second plunger spring 187, so the first plunger 181 is moved rightwards integrally with the second plunger 182. Since the overall length of the second plunger 182 is equal to the depth of the second plunger hole 202, the contact point of the first plunger 181 and the second plunger 182 is on the mating plane of the first rocker arm 162 and second rocker arm 164.

On the other hand, the hydraulic pressure of the second hydraulic fluid inlet 175 that is fed from the second passage 174 for supply/discharge of hydraulic fluid is OFF, so the third plunger 183, fourth plunger 184 and fifth plunger 185 are moved leftwardly (direction of the arrow in the Figure) integrally, by the biasing force of the fifth plunger spring 189. Since the overall length of the third plunger 183 is equal to the depth of the third plunger hole 203, the contact point of the third plunger 183 and the fourth plunger 184 is on the mating plane of the first rocker arm 162 and third rocker arm 166. Furthermore, since the overall length of the fourth plunger 184 is equal to the depth of the fourth plunger hole 204, the contact point of the fourth plunger 184 and the fifth plunger 185 is on the mating plane of the first rocker arm 162 and of the second rocker arm 164.

Thus, since the contact point of the plungers is on the mating plane of the rocker arms, the first rocker arm 162 is in a condition detached from the second rocker arm 164 and third rocker arm 166. The first rocker arm 162 therefore performs operation in accordance with the first cam 152 that abuts the upper surface thereof i.e. rocking about the rocker shaft 170 is deactivated, as a result of which the burnt gas introduction valve 31a is deactivated in the closed condition.

FIG. 36(b) shows the condition in which the first rocker arm 162 is linked only with the second rocker arm 164 and both the first passage 172 for supply/discharge of hydraulic fluid and the second passage 174 for supply/discharge of hydraulic fluid are in the hydraulic pressure OFF condition. Since the first hydraulic fluid inlet 173 that is fed from the first passage 172 for supply/discharge of hydraulic fluid is in the hydraulic pressure OFF condition, the first plunger 181 and the second plunger 182 are moved leftwardly (direction of the arrow in the Figure) by the biasing force of the second plungers spring 187. Since the overall length of the first plunger 181 is shorter than the depth of the first plunger hole 201, part of the second plunger 182 enters the first plunger hole 201.

Furthermore, since the second hydraulic fluid inlet 175 that is fed from the second passage 174 for supply/discharge of hydraulic fluid is in the hydraulic pressure OFF condition, in the same way as in the case of FIG. 36(a), the contact point of the 180 third plunger 183 and the fourth plunger 184 is in the mating plane of the first rocker arm 162 and third rocker arm 166, while the contact point of the fourth plunger 184 and fifth plunger 185 is in the mating plane of the first rocker arm 162 and second rocker arm 164.

In this way, the first rocker arm 162 is linked with the second rocker arm 164 by entry of part of the second plunger 182 into the first plunger hole 201. Also, since the contact point of the third plunger 183 and the fourth plunger 184 is in the mating plane of the first rocker arm. 162 and third rocker arm 166, the first rocker arm 162 and the third rocker arm 166 are put in detached condition. The first rocker arm 162 therefore performs operation under the control of the second cam 154 that abuts the upper surface of the second rocker arm 164. That is, rocking takes place downwardly by a prescribed amount at a prescribed crank angle as the camshaft 151 rotates, thereby opening and closing the burnt gas introduction valve 31b.

FIG. 36(c) shows the condition in which the first rocker arm 162 is linked with the second rocker arm 164 and third rocker arm 166; the first passage 172 for supply/discharge of hydraulic fluid is in the hydraulic pressure OFF condition and the second passage 174 for supply/discharge of hydraulic fluid is in the hydraulic pressure ON condition. Since the hydraulic pressure of the first hydraulic fluid inlet 173 that is fed from the first passage 172 for supply/discharge of hydraulic fluid is OFF, in the same way as in FIG. 36(b), part of the second plunger 182 enters the first plunger hole 201.

Furthermore, since the hydraulic pressure of the second hydraulic fluid inlet 175 that is fed from the second passage 174 for supply/discharge of hydraulic fluid is ON, the third plunger 183 is pressed rightwardly (direction of the arrow in the Figure). The pressing force thereof is greater than the biasing force of the fifth plunger spring 189, so the third plunger 183 is moved rightwardly integrally with the fourth plunger 184 and fifth plunger 185. Since the overall length of the fifth plunger 185 is shorter than the depth of the fifth plunger hole 205, part of the fourth plunger 184 enters the fifth plunger hole 205 and, in addition, part of the third plunger 183 enters the fourth plunger hole 204.

Thus, since part of the second plunger 182 enters the first plunger hole 201 and part of the third plunger 183 enters the fourth plunger hole 204, the first rocker arm 162 is linked with the second rocker arm 164 and of the third rocker arm 166. Consequently, the first rocker arm 162 performs operation under the control of the third cam 156, which is of the largest radius of rotation and abuts the upper surface of the third rocker arm 166. That is, rocking takes place downwards by a prescribed amount at a prescribed crank angle as the camshaft 151 is rotated, thereby opening and closing the burnt gas introduction valve 31b. The period of this valve opening is longer than in the case of FIG. 36(b).

The above cam changeover mechanism 150 was provided for the burnt gas introduction valves 31b and burnt gas exhaust valves 32b, but a similar cam changeover mechanism 150a (shown in brackets in FIG. 35) is provided in respect of the following cylinders' intake valves 31a and preceding cylinders' exhaust valves 32a. However, in the case of the cam changeover mechanism 150a, the second cam 154 and third cam 156 are of the same shape. The rocker arm set 160a that abuts these cams comprises a first rocker arm 162a, second rocker arm 164a and third rocker arm 166a, as shown in FIG. 35. The cam changeover mechanism 150a effects changeover between a condition in which a deactivated condition is produced by detaching the first rocker arm 162a from the second rocker arm 164a and third rocker arm 166a, putting the following cylinders' intake valves 31a and preceding cylinders' exhaust valves 32a in the closed condition, and a condition in which the first rocker arm 162a is linked with the second rocker arm 164a and third rocker arm 166a, so that the following cylinders' intake valves 31a and preceding cylinders' exhaust valves 32a are opened and closed by rotation of the second cam 154 and third cam 156.

Figure 37A:
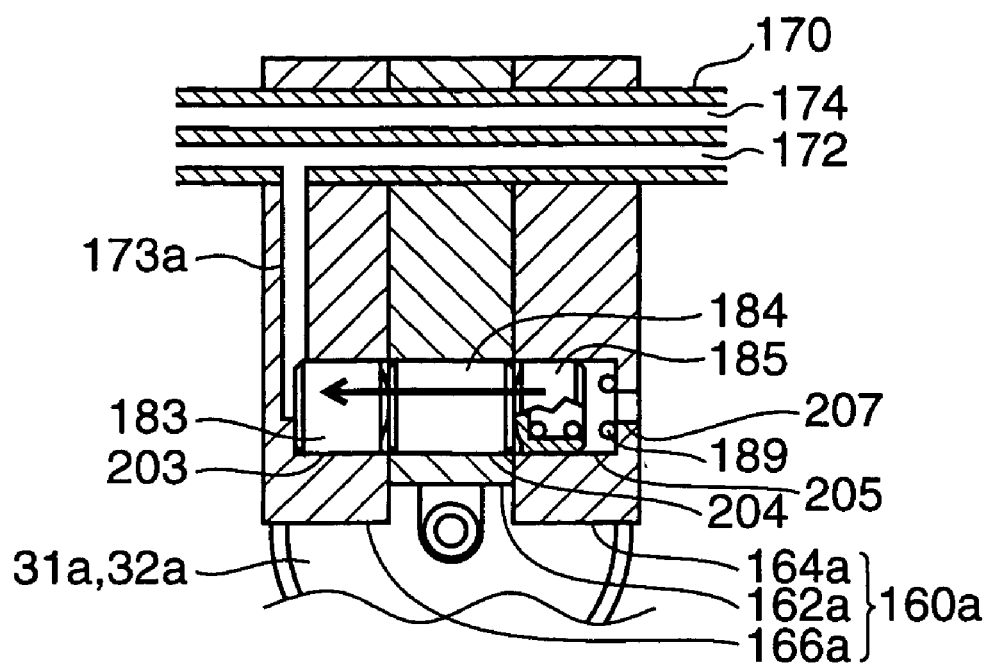
FIGS. 37(A) and 37(B) are plunger action diagrams given in explanation of two types of cam changeover mechanism.
Figure 37B:
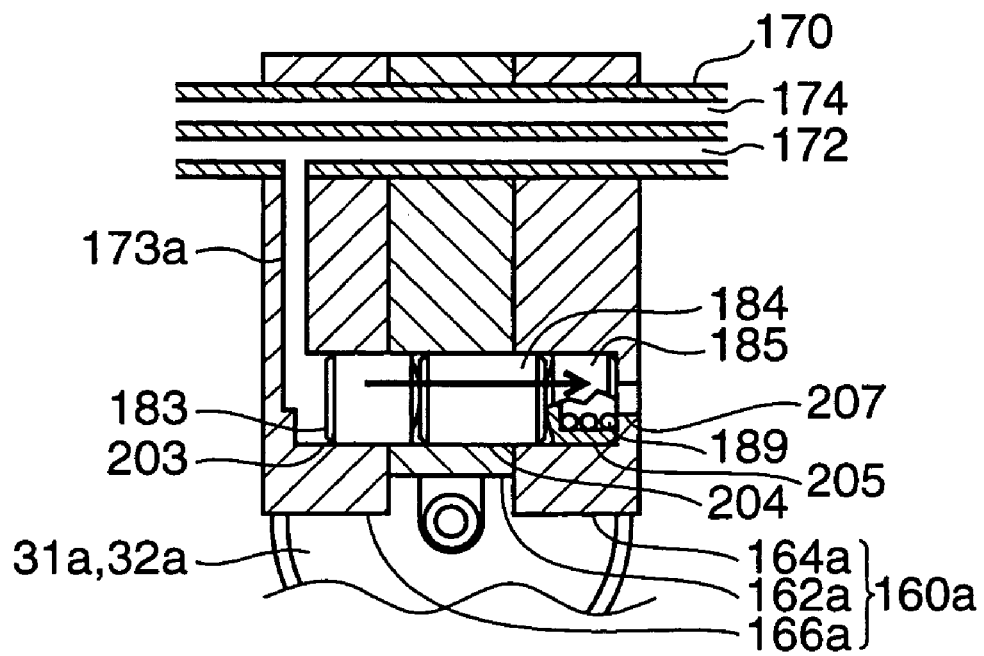

FIG. 37 is a diagram illustrating the operation of the three plungers provided within the rocker arm set 160a. FIG. 37(a) shows the condition in which the first rocker arm 162a is detached from the second rocker arm 164a and third rocker arm 166a and FIG. 37(b) shows the condition in which the first rocker arm 162a is linked with the second rocker arm 164a and third rocker arm 166a.

The plunger construction in the rocker arm set 160a is that provided by the construction represented by the third plunger 183, fourth plunger 184 and fifth plunger 185 of the rocker arm set 160 so a description of the detailed construction thereof is duplicated in the description of the rocker arm set 160 and so will be dispensed with. However, it differs from the rocker arm set 160 in that a first hydraulic fluid inlet 173a leads from a first passage 172 for supply/discharge of hydraulic fluid at the left end of the third plunger 183. Also, the second passage 174 for supply/discharge of hydraulic fluid may be dispensed with if it can be omitted structurally.

FIG. 37(a) shows the condition in which the first rocker arm 162 is detached from the second rocker arm 164 and third rocker arm 166 and the first passage 172 for supply/ discharge of hydraulic fluid is in the hydraulic pressure OFF condition. Since the first hydraulic fluid inlet 173a that is fed from the first passage 172 for supply/discharge of hydraulic fluid is in the hydraulic pressure OFF condition, the third plunger 183, fourth plunger 184 and fifth plunger 185 are moved leftwardly (direction of the arrow in the Figure) integrally by the biasing force of the third plunger spring 189. Consequently, the contact point of the third plunger 183 and the fourth plunger 184 is in the mating plane of the first rocker arm 162a and third rocker arm 166a and the contact point of the fourth plunger 184 and fifth plunger 185 is in the mating plane of the first rocker arm 162a and second rocker arm 174a.

Thus, since the contact points of the plungers are in the mating planes of the rocker arms, the first rocker arm 162a is detached from the second rocker arm 164a and third rocker arm 166a. Consequently, the first rocker arm 162a performs operation under the control of the first cam 152 abutting the upper surface thereof i.e. rocking about the rocker shaft 170 is deactivated, so the burnt gas introduction valve following cylinders' intake valve 31a and the preceding cylinders' exhaust valve 32a are deactivated in the closed condition.

FIG. 37(b) shows the condition in which the first rocker arm 162a is linked with the second rocker arm 164a and third rocker arm 166a and the first passage 172 for supply/ discharge of hydraulic fluid is in the hydraulic pressure ON condition. Since the first hydraulic fluid inlet 173*a* that is fed from the first passage 172 for supply/discharge of hydraulic fluid is in the hydraulic pressure ON condition, the third plunger 183 is pressed rightwardly (direction of the arrow in the Figure). Since the pressing force thereof is greater than the biasing force of the fifth plunger spring 189, the third plunger 183 is moved rightwardly integrally with the fourth plunger 184 and fifth plunger 185. Consequently, part of the fourth plunger 184 enters the fifth plunger hole 205 and part of the third plunger 183 enters the fourth plunger hole 204.

Thus, since part of the fourth plunger 184 enters the fifth plunger hole 205 and a part of the third plunger 183 enters the fourth plunger hole 204, the first rocker arm 162 is linked with the second rocker arm 164 and the third rocker arm 166. The first rocker arm 162 is therefore operated under the control of the second cam 154 and third cam 156 (of the same shape) that abut the upper surface of the second rocker arm 164*a* and third rocker arm 166*a*. Specifically, rocking takes place downwardly by a prescribed amount at a prescribed crank angle with rotation of the camshaft 151, causing the burnt gas introduction valve 31*b* to be opened and closed.

Figure 38:
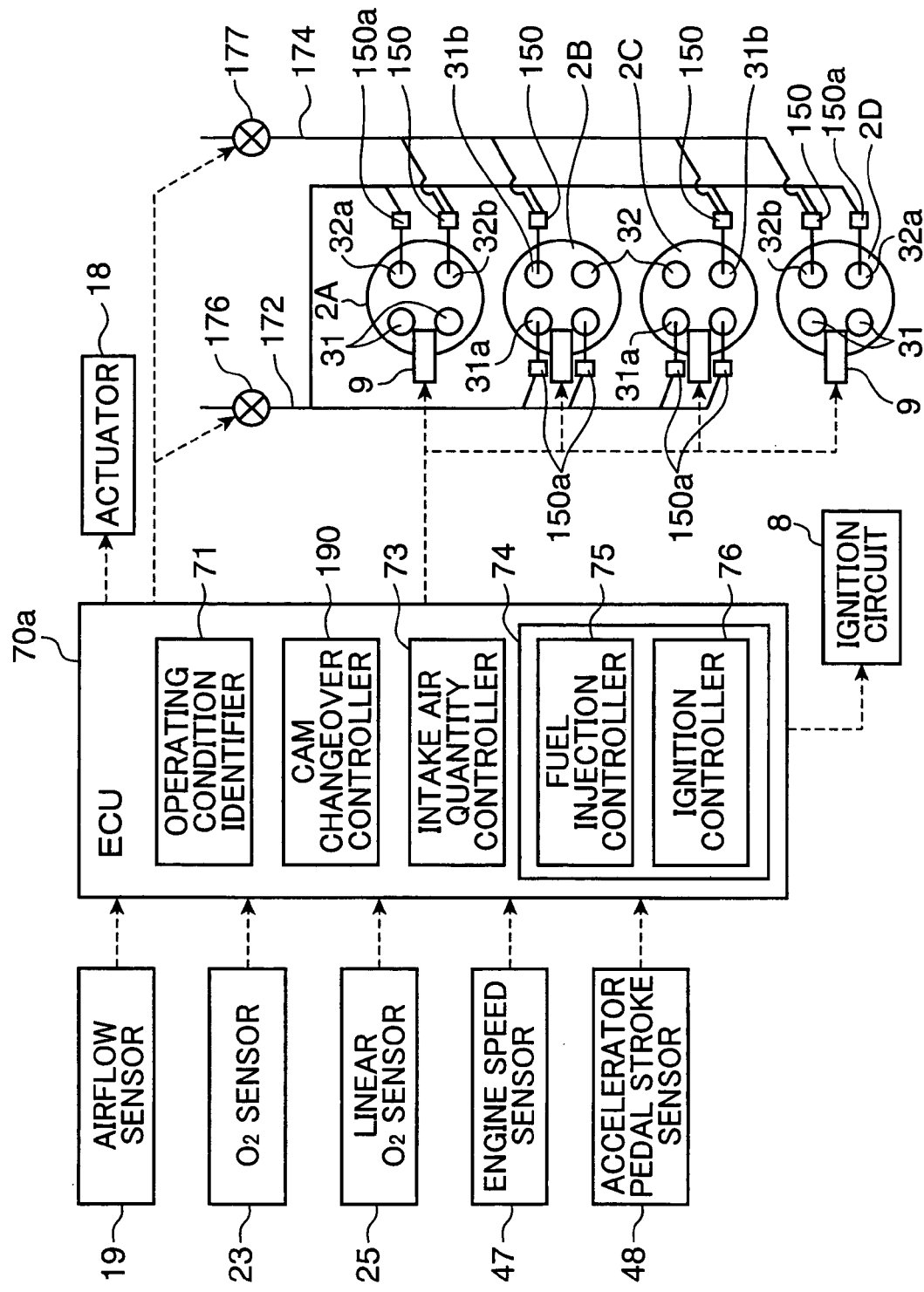
FIG. 38 is a block diagram of a control system in an embodiment employing a cam changeover mechanism.

FIG. 38 shows the construction of the drive and control systems when the cam changeover mechanism shown in FIG. 35 to FIG. 37 is employed. A first control valve 176 and second control valve 177 are control valves for control of (hydraulic pressure ON/OFF) of first hydraulic fluid and second hydraulic fluid fed to the first passage 172 for supply/discharge of hydraulic fluid and second passage 174 for supply/discharge of hydraulic fluid. A cam changeover mechanism 150 is provided at the burnt gas introduction valve 31*a* and burnt gas exhaust valve 32*b*; a cam changeover mechanism 150*a* is provided at the following cylinders' intake valve 31*a* and preceding cylinders' exhaust valve 32*a*.

The ECU 70*a* differs from the ECU70 shown in FIG. 31 in that instead of the valve deactivating mechanism controller 72 and cam phase controller 79 it comprises cam changeover controller 190.

The cam changeover controller 190 controls the cam changeover mechanism 150 and cam changeover mechanism 158 as follows by controlling the first control valve 176 and second control valve 177 in accordance with the special operating mode and ordinary operating mode or in accordance with the operating condition.

In the special operating mode, the low load, low speed region is:
First hydraulic pressure-OFF and second hydraulic pressure-OFF
Preceding cylinders' exhaust valves 32*a* and following cylinders' intake valves 31*a* in deactivated condition (FIG. 37(*a*))
Burnt gas exhaust valves 32*b* and burnt gas introduction valves 31*b* in operating condition under the control of the second cam 154 (low speed cam) (FIG. 36(*b*));

In the special operating mode, the high load, high speed region is:
First hydraulic pressure-OFF and second hydraulic pressure-ON
Preceding cylinders' exhaust valves 32*a* and following cylinders' intake valves 31*a* in deactivated condition (FIG. 37(*a*))
Burnt gas exhaust valves 32*b* and burnt gas introduction valves 31*b* in operating condition under the control of the third cam 156 (high speed cam) (FIG. 36(*c*));

The ordinary operating mode is:
First hydraulic pressure-ON and second hydraulic pressure-OFF
Preceding cylinders' exhaust valves 32*a* and following cylinders' intake valves 31*a* in operating condition under the control of the second cam 154 and third cam 156 (37(*b*))
Burnt gas exhaust valves 32*b* and burnt gas introduction valves 31*b* in deactivated condition (FIG. 36(*a*)).

Next, the operation of the device shown in FIG. 35 to FIG. 38 will be described; however, description of portions that have already been described with reference to the embodiment shown in FIG. 31 and FIG. 32 will be dispensed with. FIG. 39 is a diagram showing in detail the portions associated with the intake/exhaust strokes in this embodiment. FIG. 39(*a*) is the case of the comparatively low load, low rotational speed region (region A401 in FIG. 32) of an operating condition in which the special operating mode is being performed and FIG. 39(*b*) is the case of the comparatively high load, high rotational speed region (region A402 in FIG. 32) of this mode. Other notation is the same as in FIG. 33.

The top section of FIG. 39(*a*) shows the open period 230 (shown shaded) of the burnt gas exhaust valves for which the burnt gas exhaust valves 32*b* of the preceding cylinders 2A, 2D are open and the open period 231 of the preceding cylinders' intake valves for which the preceding cylinders' intake valves 31 are open. The bottom section shows the open period 232 of the following cylinders' exhaust valves for which the following cylinders' exhaust valves 32 of the following cylinders 2B, 2C are open and the open period 233 (shown shaded) of the burnt gas introduction valves. It also, directly below the open period 230 of the burnt gas exhaust valves and the open period 233 of the burnt gas introduction valves, the open period 250 of the burnt gas exhaust valves and open period 253 of the burnt gas introduction valves, to be described (both of these are for the case of comparatively high rotational speed, high load in the special operating mode) are shown for reference purposes by the double-dotted chain lines. Changeover of these open periods is performed by means of the cam changeover mechanisms 150, 150*a* and the cam changeover controller 190. The open period 231 of the preceding cylinders' intake valves is set from about 10° CA before TDC to about 55° CA after BDC (total about 245° CA). This is the typical set value of a prior art engine. In contrast, the open period 233 of the burnt gas introduction valves is set from substantially the TDC to the BDC (total about 180° CA). Also, the open period 232 of the following cylinders' exhaust valves is set from about 45° CA before BDC to about 10° CA after TDC (total about 235° CA).

That is, the interval (about 0° CA) between the following cylinders' intake stroke and bottom dead center 247 and the closure time 248 of the burnt gas introduction valves is set to be shorter than the interval (about 55° CA) between the preceding cylinders' intake stroke bottom dead center 242 and the closure time 243 of the preceding cylinders' intake valves. The open period 233 of the burnt gas introduction valves is shorter than the open period 231 of the preceding cylinders' intake valves and the open period 232 of the following cylinders' exhaust valves. Thus, since, in the following cylinders 2B, 2C, the open period 233 of the burnt gas introduction valves is set to be short and the opening time 248 of the burnt gas introduction valves is set early, at a time close to the BDC, even during rise of the piston 3 after the BDC, either there is no period for which the burnt gas introduction valves 31*b* are open, or such a period is short.

The effective compression ratio is therefore increased and is close to the geometrical compression ratio. With this increase in the effective compression ratio, the cylinder temperature of the following cylinders 2B, 2C tends to rise, increasing the compression ignition capability.

Also, the open period 230 of the burnt gas exhaust valves is set from about 45° CA before the BDC to about 20° CA before the TDC (total about 205° CA) Consequently, the opening time 241 of the burnt gas exhaust valves is set advanced by about 20° CA from the closure time 248 of the burnt gas introduction valves (corresponding to the TDC in the preceding cylinders 2A, 2D). This is earlier than the typical set value in a conventional engine (about 50° CA after the TDC). By closing the burnt gas exhaust valve 32b earlier, the internal EGR of the preceding cylinders 2A, 2D is increased, so the temperature of the burnt gas that is introduced into the following cylinders 2B, 2C rises.

Since the open period 232 of the following cylinders' exhaust valves is set from about 45° CA before the BDC to about 10° CA after the TDC (total about 235° CA), the following cylinders' exhaust valves 32 are open at the top dead center 244 of the following cylinders' exhaust stroke. On the other hand, the opening time 246 of the burnt gas introduction valve is set so as to be practically at the top dead center 245 of the following cylinders' intake stroke. That is, the opening time 246 of the burnt gas introduction valves is set to be at the top dead center 245 of the following cylinders' intake stroke, whilst the following cylinders' exhaust valves 32 are open until the following cylinders' exhaust stroke top dead center 244. Consequently, since the valve overlap in the vicinity of the top dead center 244 of the following cylinders' exhaust stroke is shortened, so-called "blow through" in which the burnt gas that is introduced into the following cylinders 2B, 2C is directly exhausted to the exhaust passages 20 through the following cylinders' exhaust valves 32 can be prevented and the effective compression ratio of the following cylinders 2B, 2C can be increased.

As described above, the cylinder temperature of the following cylinders 2B, 2C is increased and the compression ignition capability improved by increasing the effective compression ratio of the following cylinders 2B, 2C and raising the temperature of the burnt gas that is introduced into the following cylinders 2B, 2C. In this way, the operating region in which combustion by compression ignition can be performed is expanded further into the low load region.

Figure 39A:
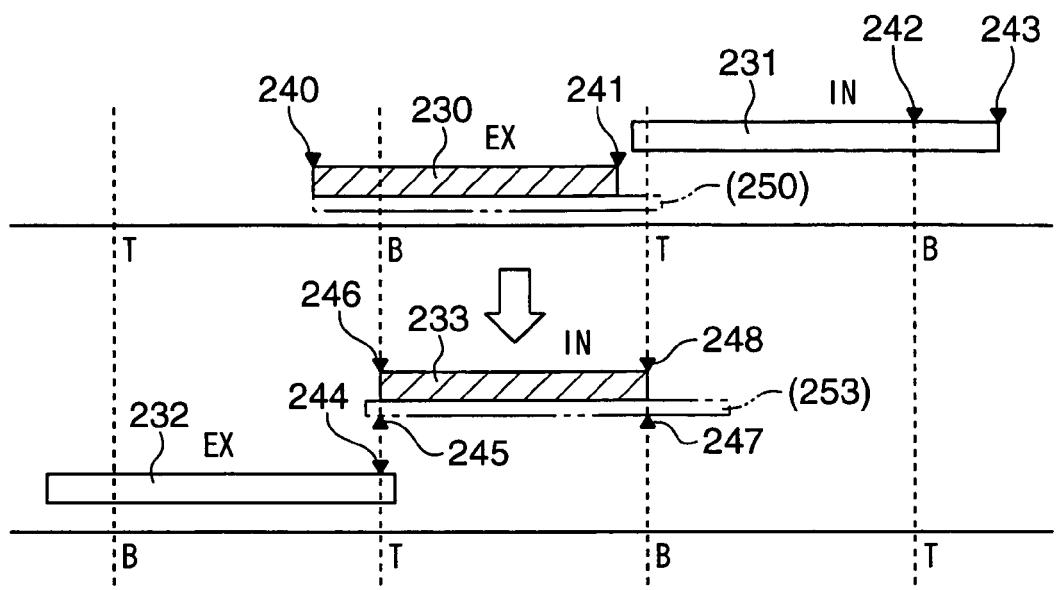
FIGS. 39(A) and 39(B) are diagrams showing the opening/closing times of an intake/exhaust valve in a special operating mode, (a) showing the case of comparatively low load, low rotational speed and (b) showing in like manner the case of comparatively high load, high rotational speed.
Figure 39B:
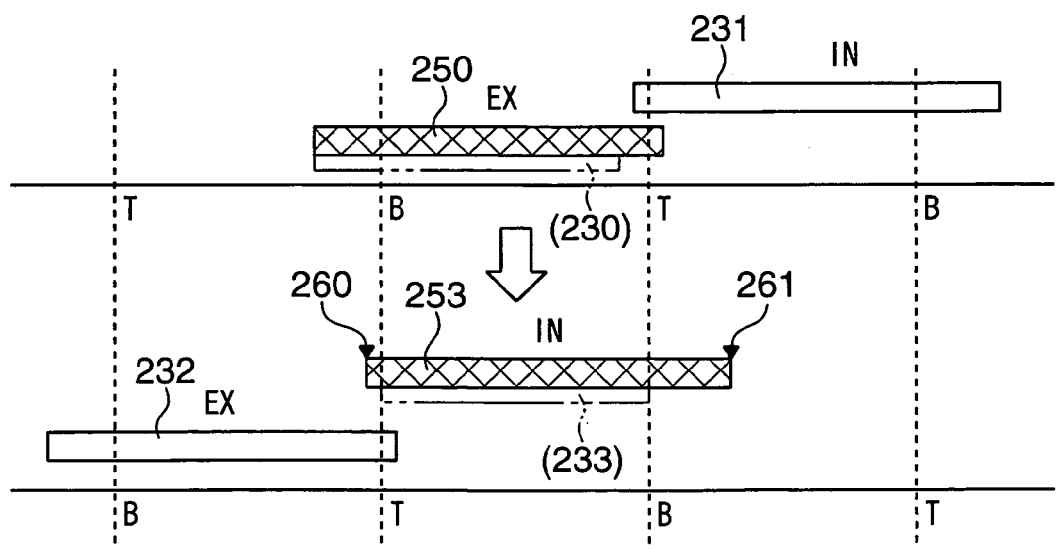

FIG. 39(b) is a diagram of the case of the region of comparatively high load and high rotational speed (region A402 in FIG. 32). The upper section thereof shows the open period 250 (shown cross-hatched) of the burnt gas exhaust valves, for which the burnt gas exhaust valves 32b of the preceding cylinders 2A, 2D are open and the open period 231 (common with FIG. 39(a)) of the preceding cylinders' intake valves. The lower section thereof shows the open period 232 (common with FIG. 39(a)) of the following cylinders' exhaust valves and the open period 253 (shown cross-hatched) of the burnt gas introduction valves, in which the burnt gas introduction valves 31b are open. Also, directly below the open period 250 of the burnt gas exhaust valves and the open period 253 of the burnt gas introduction valves, the open period 230 of the burnt gas exhaust valves and the open period 233 of the burnt gas introduction valves of FIG. 39(a) are shown with double-dotted chain lines for reference.

The open period 253 of the burnt gas introduction valves is set from about 10° CA before the TDC to about 55° CA after the BDC. That is, valve opening takes place 10° CA earlier than the open period 233 of the burnt gas introduction valves in the low load, low rotational speed region and valve closure takes place 55° later. Consequently, the effective compression ratio of the following cylinders 2B, 2C is reduced compared with the case of FIG. 39(a) and the cylinder temperature of the following cylinders 2B, 2C is lowered.

Also, the open period 250 of the burnt gas exhaust valves is set from about 45° CA before the BDC to about 10° CA after the TDC. That is, it is about 30° CA longer than the open period 230 of the burnt gas exhaust valves of FIG. 39(a). Internal EGR of the preceding cylinders 2A, 2D is therefore reduced compared with FIG. 39(a), so the temperature of the burnt gas that is introduced into the following cylinders 2B, 2C falls.

As described above, the cylinder temperature of the following cylinders 2B, 2C is lowered and abnormal combustion such as knocking is prevented by decreasing the effective compression ratio of the following cylinders 2B, 2C and lowering the temperature of the burnt gas that is introduced into the following cylinders 2B, 2C. In this way, the operating region in which combustion by compression ignition can be performed is further expanded into the high load region.

It should be noted that the pattern shown in FIGS. 39(a) and (b) is not restrictive of the opening periods and closure periods and these may be suitably altered within the scope of the claims. For example, the closure time 248 of the burnt gas introduction valves in FIG. 39(a) may be set to be somewhat later than the bottom dead center 247 of the following cylinders' intake stroke. Other specific set values may be set to suitable values in accordance with the demanded engine performance.

In these embodiments, constructions were adopted in which an arrangement with three-way cam changeover, an arrangement with two-way cam changeover and an arrangement with no cam changeover were combined in accordance with the location of arrangement of the intake/exhaust valves and their respective functions, but the combinations thereof are not restricted to these; for example, three-way cam changeover could be employed by applying three-way cams and rocker arm sets 160 to all of the valves. Also, the open period 231 of the preceding cylinders' intake valves and the open period 232 of the following cylinders' exhaust valves, which were taken as fixed in the second embodiment, could be varied by cam changeover.

FIG. 40 to FIG. 44 show yet a further embodiment of the present invention.

Figure 40:
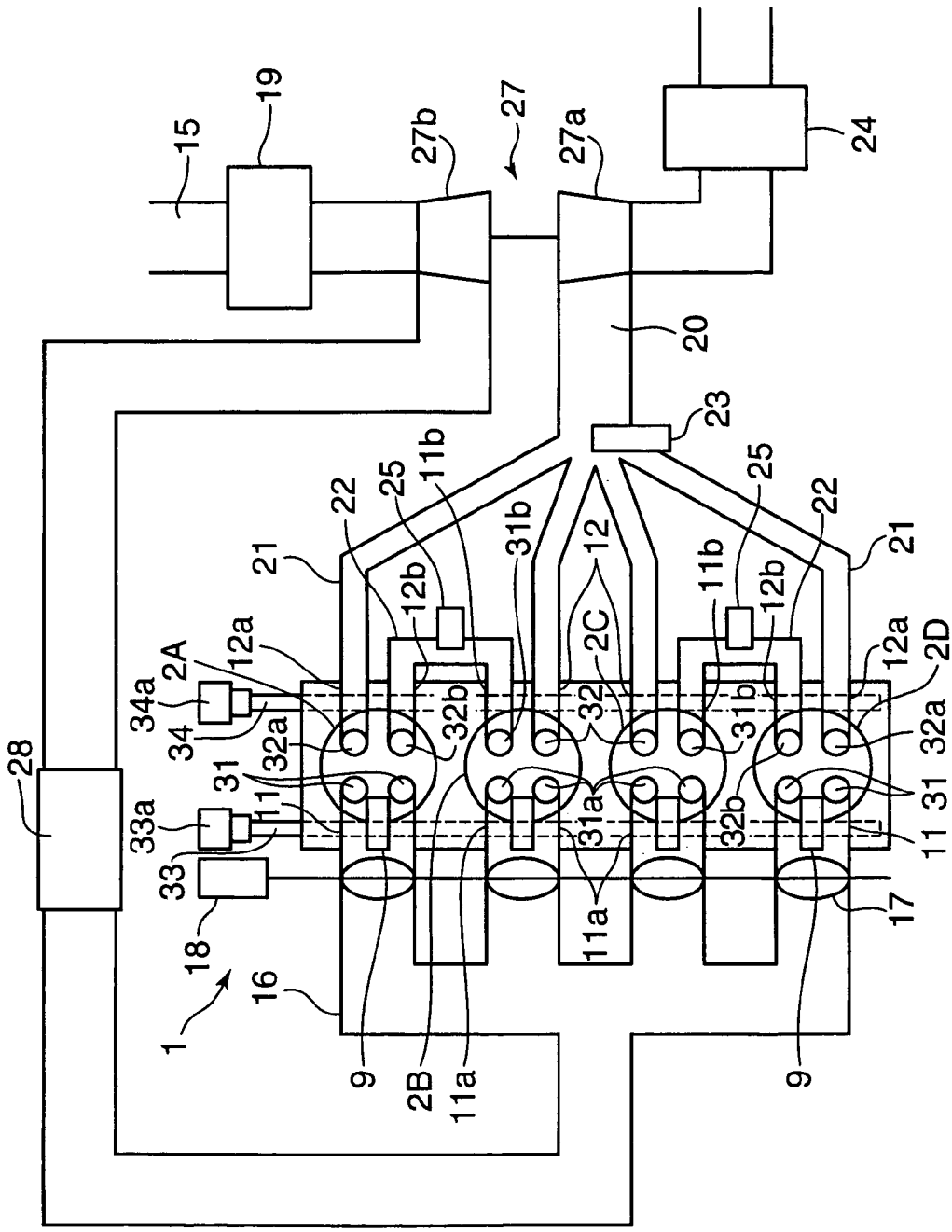
FIG. 40 is a diagrammatic plan view of an entire engine according to yet a further embodiment.
Figure 41:
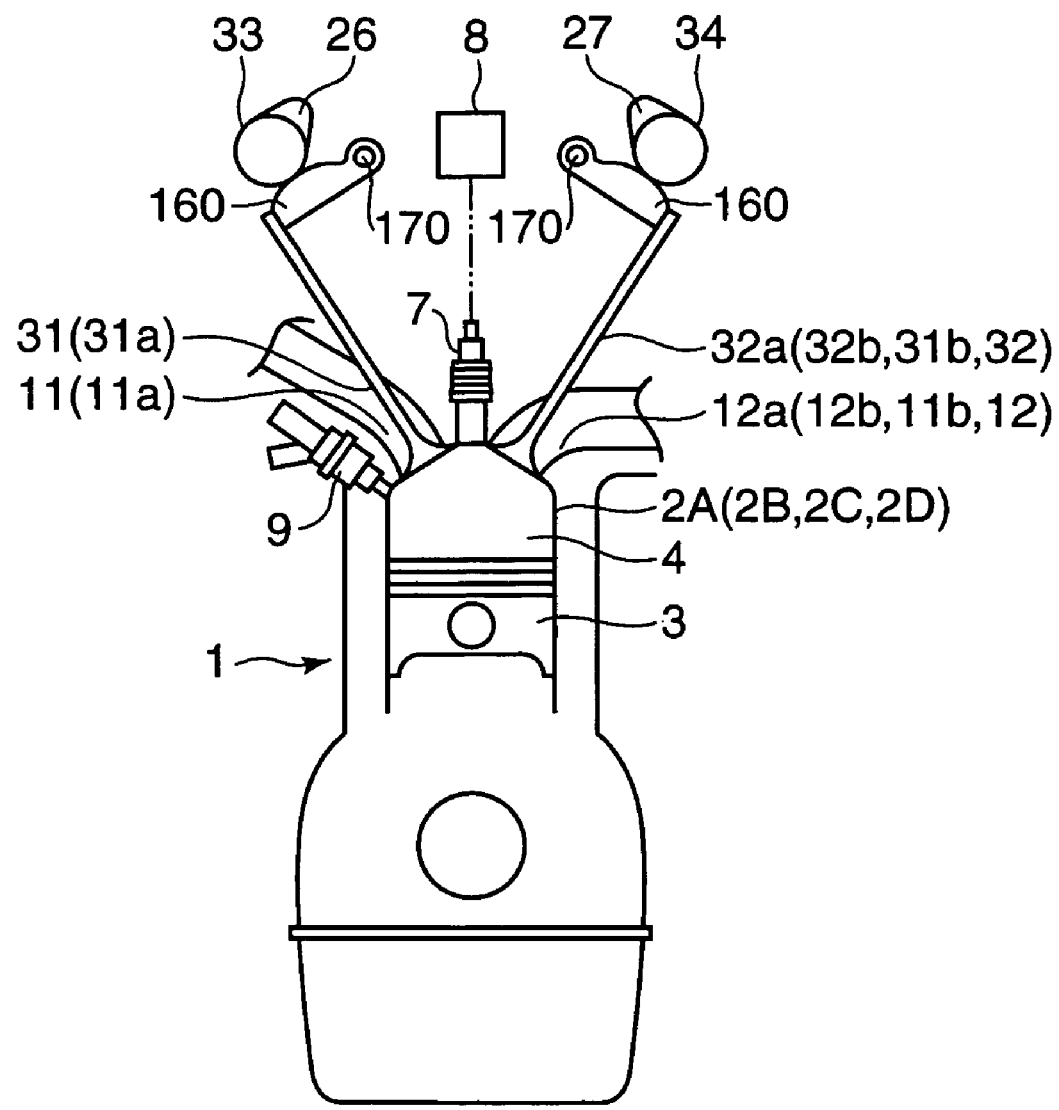
FIG. 41 is a diagrammatic cross-sectional view of the main engine unit etc according to this embodiment.

In the overall construction of the engine shown in FIG. 40, the main engine body, intake/exhaust ports, intake/exhaust passages connected thereto and the intake/exhaust valves that open and close the inter-cylinder gas passages and intake/exhaust ports are constructed in the same way as in the case of the embodiments shown in FIG. 30. In addition, the cam phase varying mechanisms 33a and 34a that are provided in respect of the camshafts 33 and 34 are constructed in the same way as in the case of the embodiment shown in FIG. 30. Upstream of the merging section in the intake passage 15, there are provided an airflow sensor 19 that detects the amount of the intake current, a compressor 27b of a turbo supercharger 27 that performs supercharging utilizing the energy of the exhaust gas, and an inter-cooler 28. Also, in the exhaust passage 10, there are provided an $O_2$ sensor 23, turbine 27a of the turbo supercharger 27 and a three-way catalyst 24.

Figure 42:
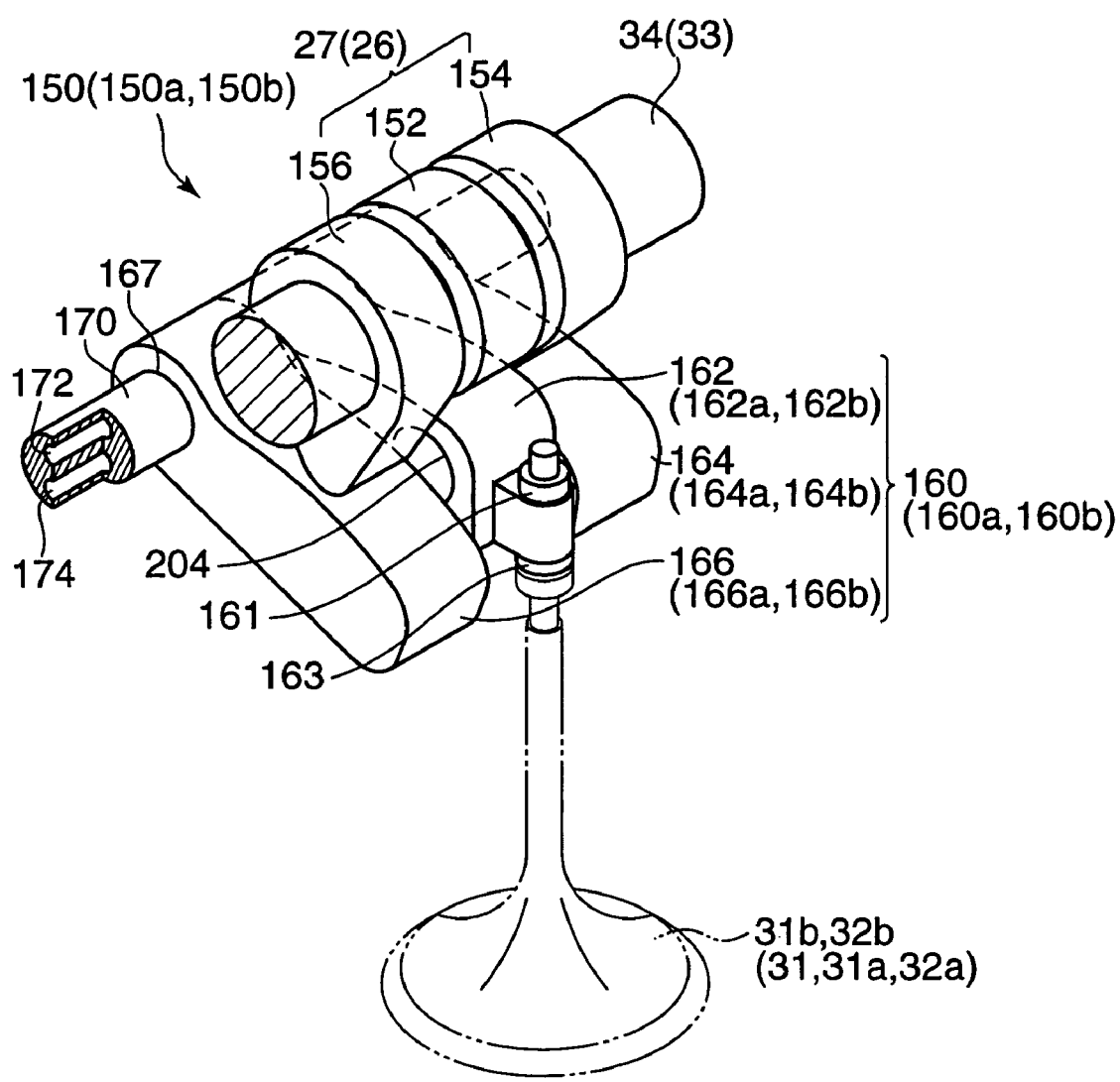
FIG. 42 is a partial perspective view showing a cam changeover mechanism employed in this embodiment.

Also, as shown in FIG. 42, in respect of the burnt gas introduction valves 31*b* etc, there are provided cam changeover mechanisms 150 that change the rocking condition of the rocker arm sets 160 by cam changeover; by means of these mechanisms, it is arranged to be possible to vary the opening/closing times of the burnt gas introduction valves 31*b* etc shown by the double-dotted chain lines or to deactivate these in the closed condition.

A camshaft 34 is arranged above the burnt gas introduction valves 31*b*. Cams 27 are arranged so as to rotate integrally with this camshaft 34. The cams 27 comprise three cams having independent lift characteristics, namely, a first cam 152, second cam 154 and third cam 156. A rocker arm set 160 that is supported by a rocker shaft 170 is provided between these cams and the burnt gas introduction valves 31*b*. This rocker arm set 160 is of the same construction as that illustrated in FIG. 36, described above.

The cam changeover mechanism 150 is provided for the burnt gas introduction valves 31*b* and burnt gas exhaust valves 32*b*, but a similar cam changeover mechanism 150*a* and rocker arm set 160*a* (shown in brackets in FIG. 42) are also provided for the following cylinders' intake valves 31*a* and preceding cylinders' exhaust valves 32*a*. However, in the cam changeover mechanism 150*a*, the second cam 154 and third cam 156 are of the same shape. The rocker arm set 160*a* that abuts these cams is of the same construction as that illustrated in FIG. 35 and FIG. 37 described above.

In addition, a similar cam changeover mechanism 150*b* is also provided for the preceding cylinders' intake valves 31 (shown in brackets in FIG. 42). In the cam changeover mechanism 150*b*, the first cam 152 is not a deactivation cam but is a cam for low load, having a projection. Also, the second cam 154 and third cam 156 are of the same shape, being cams for high load. The rocker arm set 160*b* that abuts these cams comprises a first rocker arm 162*b*, second rocker arm 164*b* and third rocker arm 166*b*, as shown in brackets in FIG. 42. The cam changeover mechanism 150*b* changes over between a condition in which the preceding cylinders' intake valves 31 are opened for a comparatively short period by detachment of the first rocker arm 162*b* from the second rocker arm 164*b* and third rocker arm 166*b* and a condition in which the first rocker arm 162*b* is linked with the second rocker arm 164*b* or third rocker arm 166*b*, so that the preceding cylinders' intake valves 31 are opened for a comparatively long period by rotation of the second cam 154 or third cam 156.

Figure 43A:
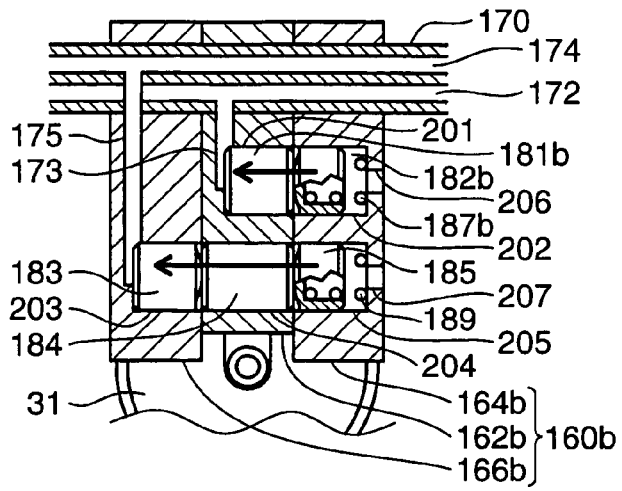
FIGS. 43(A), 43(B), and 43(C) are plunger action diagrams for a cam changeover mechanism.
Figure 43B:
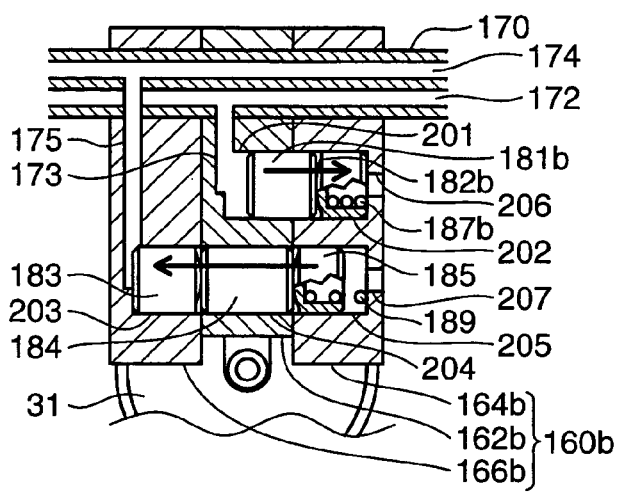
Figure 43C:
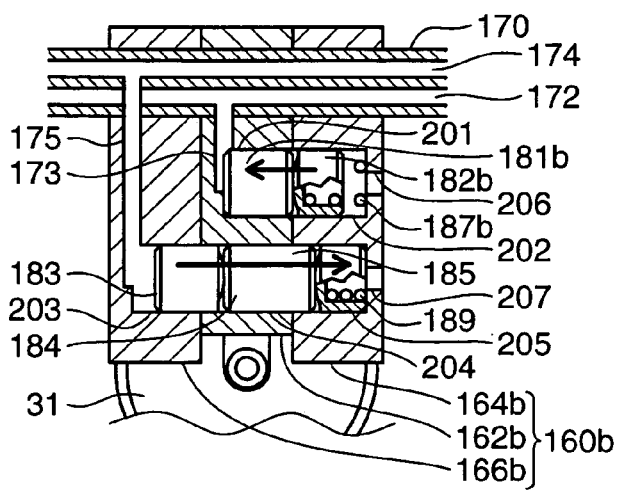

FIG. 43 is a diagram showing the operation of the three plungers provided in the interior of the rocker arm cassette 160*b*. FIG. 43(*a*) shows the condition in which the first rocker arm 162*b* is detached from the second rocker arm 164*b* and the third rocker arm 166*b*; FIG. 43(*b*) shows the condition in which the first rocker arm 162*b* is linked with the second rocker arm 164*b* only; and FIG. 43(*c*) shows the condition in which the first rocker arm 162*b* is linked with the second rocker arm 164*b* and the third rocker arm 166*b*.

In the plunger construction in the rocker arm set 160, the plunger construction in the rocker arm set 160*b* is altered in respect of the overall length of the first plunger 181 and second plunger 182 and the specification of the second plunger spring 187; these will therefore respectively be referred to as the first plunger 181*b*, second plunger 182*b* and second plunger spring 187*b*. Due to this construction, the cam changeover condition produced by the cam changeover mechanism 150*b* by the combination of the hydraulic pressure of the first passage 172 for supply/discharge of hydraulic fluid and the second passage 174 for supply/discharge of hydraulic fluid being turned ON and OFF differs from that of the cam changeover mechanism 150.

FIG. 43(*a*) shows the condition in which the first rocker arm 162*b* is detached from the second rocker arm 164*b* and the third rocker arm 166*b* and the first passage 172 for supply/discharge of hydraulic fluid and the second passage 174 for supply/discharge of hydraulic fluid are both in the hydraulic pressure OFF condition. FIG. 43(*b*) shows the condition in which the first rocker arm 162*b* is linked with the second rocker arm 164*b* only and the first passage 172 for supply/discharge of hydraulic fluid is in the hydraulic pressure ON condition while the second passage 174 for supply/discharge of hydraulic fluid is in the hydraulic pressure OFF condition. FIG. 43(*c*) shows the condition in which the first rocker arm 162*b* is linked with the second rocker arm 164*b* and the third rocker arm 166*b* and the first passage 172 for supply/discharge of hydraulic fluid is in the hydraulic pressure OFF condition while the second passage 174 for supply/discharge of hydraulic fluid is in the hydraulic pressure ON condition.

Figure 44:
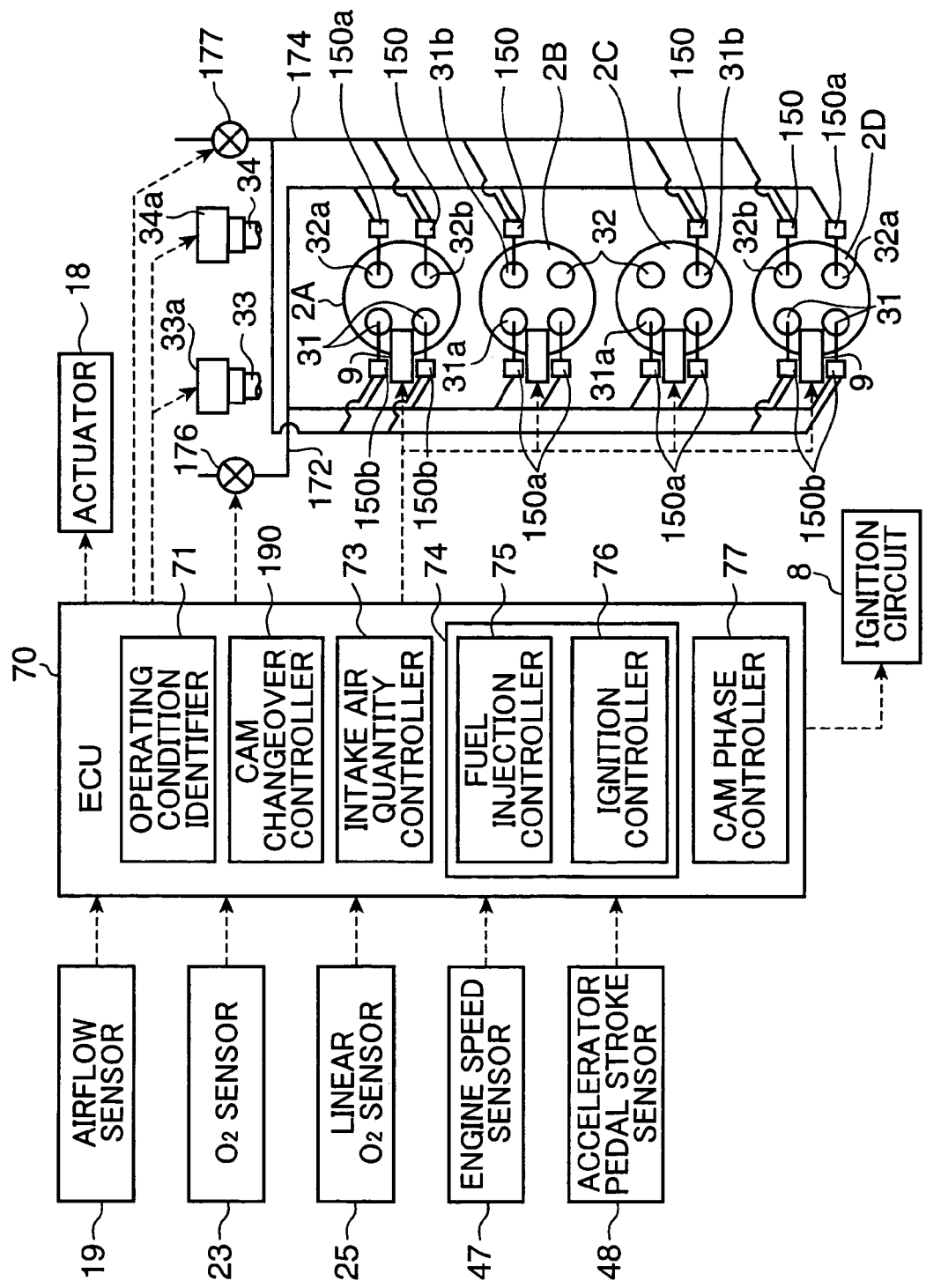
FIG. 44 is a block diagram of a control system.

FIG. 44 shows the construction of the drive and control systems in this embodiment; in this Figure, the ECU 70*b* comprises a operating condition identifier 71, cam changeover controller 190, intake air quantity controller 73, combustion controller 74 and cam phase controller 77.

Figure 45:
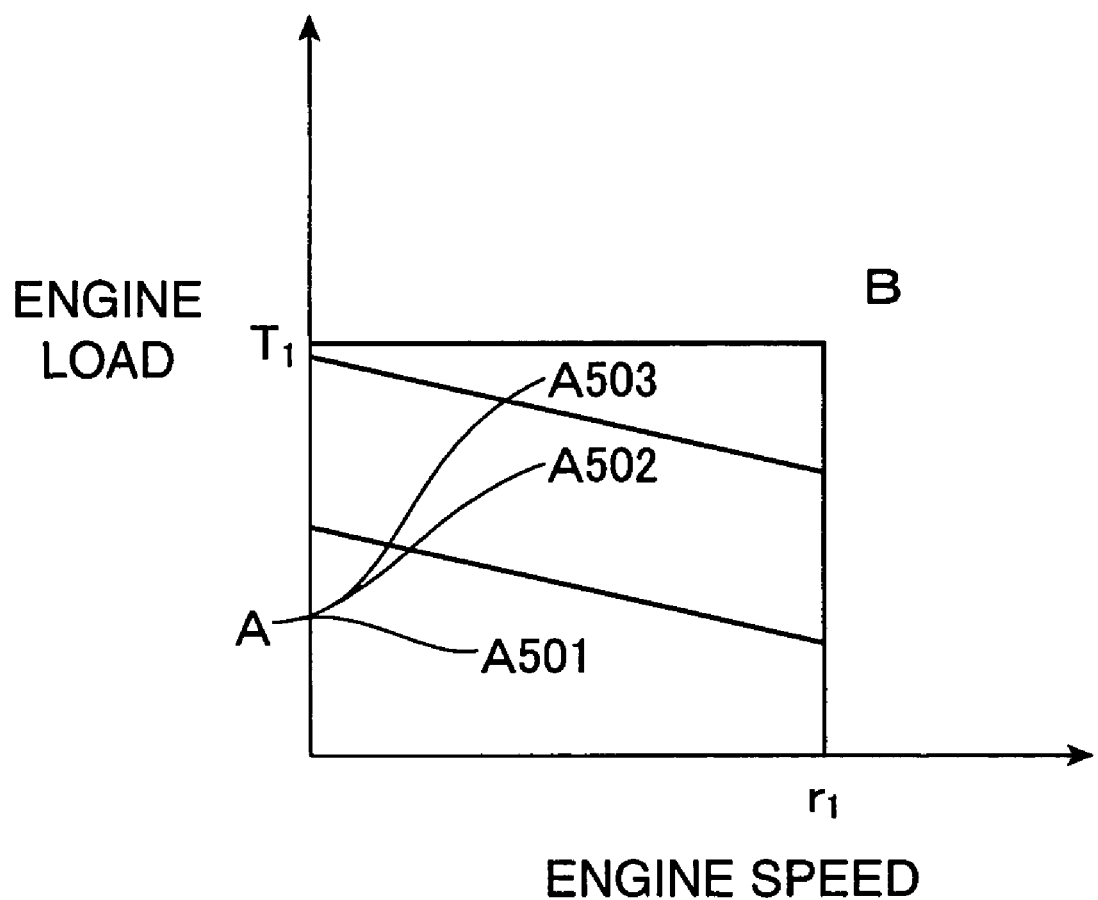
FIG. 45 is a diagram showing an example of the setting of the operating region for exercising control in accordance with the operating condition.

By examining the engine operating condition (engine rotational speed and engine load) using the signals from the engine speed sensor 77 and accelerator pedal stroke sensor 78 etc, the operating condition identifier 71 ascertains whether the operating condition is in the operating region A on the low load, low rotational speed side (engine load less than T1 and engine rotational speed less than r1) as shown in FIG. 45 or is in the operating region B on the high load or high rotational speed side (engine load greater than T1 or engine rotation speed greater than r1). In the operating region A, the operating region A501 is a region of comparatively low load, low rotational speed, the operating region A503 is a region of comparatively high load, high rotational speed and operating region A502 is an intermediate region thereof. Under prescribed conditions (for example condition in which the engine is fully warmed-up), operation is performed in the special operating mode, in which the cylinders are put in two-cylinder connected condition, in the operating region A and operation is conducted in the ordinary operating mode in which the respective cylinders are in independent condition, in the operating region B.

The cam changeover controller 190 controls the cam changeover mechanism 150 and cam changeover mechanism 150*a* as follows by controlling the first control valve 176 and second control valve 177 in accordance with whether the engine is in the special operating mode or the ordinary operating mode or in accordance with the operating region.

In the special operating mode, the low/intermediate regions (regions A501, A502) are:
  First hydraulic pressure-OFF and second hydraulic pressure-OFF
  Preceding cylinders' exhaust valves 32*a* and following cylinders' intake valves 31*a* in deactivated condition (FIG. 37(*a*)) under the control of the first cam 152;
  Burnt gas exhaust valves 32*b* and burnt gas introduction valves 31*b* in operating condition under the control of the second cam 154 (low load cam) (FIG. 36(*b*));
  Preceding cylinders' intake valves 31 in operating condition (FIG. 43(*a*)) under the control of the first cam 152 (low load cam);

In the special operating mode, the high load region (region A503) is:
  First hydraulic pressure-OFF and second hydraulic pressure-ON
  Preceding cylinders' exhaust valves 32a and following cylinders' intake valves 31a in deactivated condition (FIG. 37(a)) under the control of the first cam 152;
  Burnt gas exhaust valves 32b and burnt gas introduction valves 31b in operating condition under the control of the third cam 156 (high load cam) (FIG. 36(c));
  Preceding cylinders' intake valves 31 in operating condition (FIG. 43(b)) under the control of the second cam 154b (high load cam);

The ordinary operating mode (region B) is:
  First hydraulic pressure-ON and second hydraulic pressure-OFF
  Preceding cylinders' exhaust valves 32a and following cylinders' intake valves 31a in operating condition under the control of the second cam 154 and third cam 156 (37(b));
  Burnt gas exhaust valves 32b and burnt gas introduction valves 31b in deactivated condition (FIG. 36(a)) under the control of the first cam 152;
  Preceding cylinders' intake valves 31 in operating condition (FIG. 43(c)) under the control of the third cam 156b (high load cam).

The air intake rate controller 73 controls the air intake rate in the same way as the air intake rate controller 73 in FIG. 38.

The combustion controller 74 comprises fuel injection controller 75 and ignition controller 76. In the low/intermediate load region of the special operating mode (region A501 and A502 of FIG. 45), in respect of the preceding cylinders (first and fourth cylinders 2A, 2D), it controls the fuel injection rate such that the air/fuel ratio is a lean air/fuel ratio greater than the stoichiometric air/fuel ratio, preferably substantially twice or more the stoichiometric air/fuel ratio, and, in respect of the following cylinders (second and third cylinders 2B, 2C), it supplies fuel in respect of the burnt gas of lean air/fuel ratio that is introduced from the preceding cylinders and controls the fuel injection rate such that the air/fuel ratio is an air/fuel ratio of substantially the stoichiometric air/fuel ratio, or leaner than this. These fuel injections are performed in the intake stroke, so that combustion by compression self-ignition is performed in both the preceding cylinders 2A, 2D and the following cylinders 2B, 2C.

Also, in the high load region of the special operating mode (region A503 of FIG. 4), the fuel injection rate in respect of the preceding cylinders (first and fourth cylinders 2A, 2D) is controlled such that the air/fuel ratio is a lean air/fuel ratio larger than the stoichiometric air/fuel ratio, preferably substantially twice or more the stoichiometric air/fuel ratio and the ignition timing is set such as to produce forced ignition in the vicinity of the compression top dead center. In respect of the following cylinders (second and third cylinders 2B, 2C), fuel is supplied in respect of the burnt gas of lean air/fuel ratio that is introduced from the preceding cylinders, and the fuel injection rate is controlled and the injection timing with which fuel is injected in the intake stroke is set such that the air/fuel ratio is substantially the stoichiometric air/fuel ratio. Combustion is performed by compression self-ignition or forced ignition, in accordance with the operating condition.

Control in the case of the ordinary operating mode is the same as in the case of the other embodiments described above.

Also, the cam phase controller 77 controls the cam phase varying mechanisms 33a, 34a in accordance with the results of the operating condition identifier 71. The details of the control action are described later, but for example in the special operating mode, in the low load region (region A501 of FIG. 45), the cam phase varying mechanism 33a is controlled so as to delay the phase of the cam 26 and the cam phase varying mechanism 34a is controlled so as to advance the phase of the cam 27. There is therefore an overall delay in the opening/closure times of the preceding cylinders' intake valves 31a and following cylinders' intake valves 31a that are operated by rotation of the camshaft 33 and an overall advancement of the opening/closure times of the burnt gas exhaust valves 32b, burnt gas introduction valves 31b and following cylinders' exhaust valves 32 that are operated by rotation of the cam shaft 34. In contrast, in the medium/high load region (regions A502, A503 of FIG. 45) or the ordinary operating mode region (region B of FIG. 45), the phases of the cams 26, 27 are controlled respectively in the opposite direction, with the result that the opening/closure times of the preceding cylinders' intake valves 31 and following cylinders' intake valves 31a are, overall, advanced, and that the opening/closure times of the burnt gas discharge valves 32b, burnt gas introduction valves 31b and following cylinders' exhaust valves 32 are, overall, delayed. It should be noted that, since the cam phase varying mechanisms 33a, 34a operate on the valves during operation thereof, valves which are in a deactivated condition are maintained in this deactivated condition irrespective of control by the cam phase varying mechanisms 33a, 34a.

Next, the operation of a device according to this embodiment will be described with reference to FIG. 46 to FIG. 48.

In a device according to this embodiment, in the operating region A of low load, low rotational speed, the device put into the special operating mode in which combustion is conducted in a condition with two cylinders connected and in the high load or high rotational speed operating region the device is put in the ordinary operating mode in which combustion is conducted in a condition with the intake ports and exhaust ports of the respective cylinders independent. Also, when in the special operating mode, combustion is conducted with a super-lean air/fuel ratio in the preceding cylinders and combustion is conducted by compression self-ignition in the following cylinders.

That is, even in the operating region in the special operating mode in which compression self-ignition is performed, when in a condition in which the cylinder temperature is low and compression self-ignition is difficult, all of the cylinders are changed over to forced ignition. Also, contrariwise, if the cylinder temperature of the following cylinders 2B, 2C becomes too high, producing a condition in which abnormal combustion such as knocking tends to occur the device is changed over from the special operating mode to the ordinary operating mode. In both cases, the benefit of improved fuel costs etc is suppressed compared with the special operating mode using compression self-ignition. Consequently, in order to obtain these benefits to a greater extent, it is desirable to expand the operating region in the special operating mode that is suitable for compression self-ignition and, in addition, it is desirable to expand the operating region in the preceding cylinders 2A, 2D that is suitable for compression self-ignition.

The opening/closure times of the intake/exhaust valves are set as follows in order to expand the operation region that is suitable for compression self-ignition in compression self-ignition in the special operating mode, in particular in the preceding cylinders 2A, 2D.

Figure 46A:
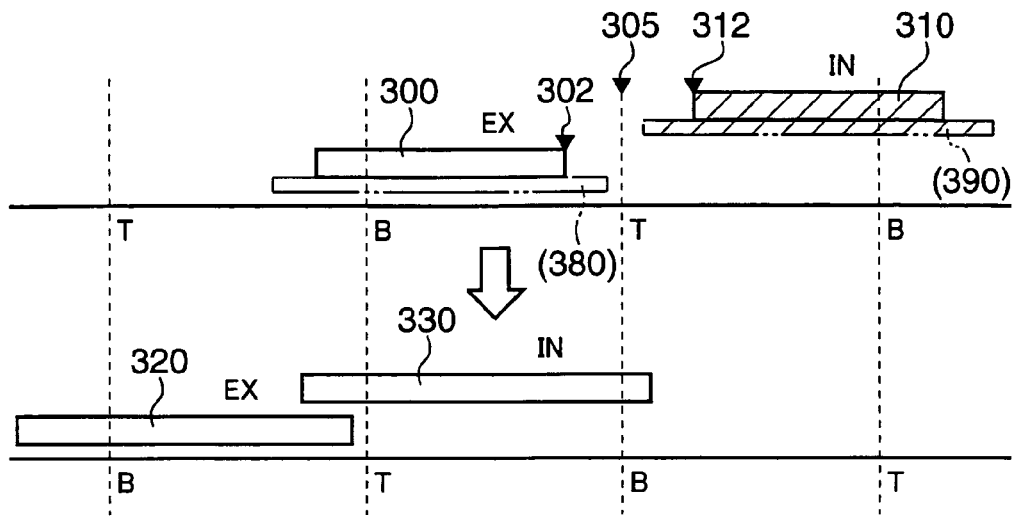
FIGS. 46(A) and 46(B) are diagrams showing the opening/closing times of an intake/exhaust valve in a special operating mode, (a) showing the case of comparatively low load and (b) showing in like manner the case of intermediate load.
Figure 46B:
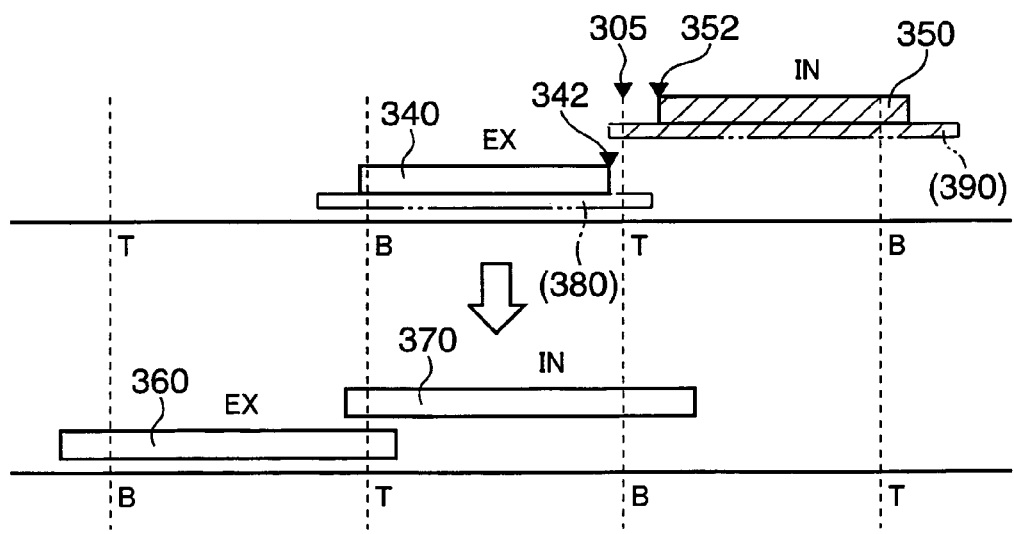

FIG. 46 is a diagram showing the opening/closure times of the preceding cylinders' intake valves 31 and burnt gas exhaust valves 32b of the preceding cylinders 2A, 2D in the special operating mode and the opening/closure times of the burnt gas introduction valves 31b of the following cylinders 2B, 2C and the following cylinders' exhaust valves 32, showing the intake/exhaust stroke portion in detail. FIG. 46(a) is the case of the comparatively low load region (region A501 of FIG. 45) and FIG. 46(b) is the case of the intermediate load region (region A502 of FIG. 45), of the operating region in which the special operating mode is performed. In these Figures, the horizontal axis shows the crank angle, T is the top dead center (TDC) and B is the bottom dead center (BDC). The interval between DNB is 180° CA. Also, the upper section shows the preceding cylinders 2A, 2D and the lower section shows the following cylinders 2B, 2C corresponding to these. Also, the portions indicated by band lines show the open periods of the respective valves. The white arrows from the upper section to the lower section indicate the condition in which the exhaust strokes of the preceding cylinders 2A, 2D and the intake strokes of the following cylinders 2B, 2C overlap and gas burnt in the preceding cylinders 2A, 2D is conducted into the following cylinders 2B, 2C.

FIG. 46(a) shows in the upper section thereof the open period 300 of the burnt gas exhaust valves, for which the burnt gas exhaust valves 32b of the preceding cylinders 2A, 2D are open and the open period 310 (shown shaded) of the preceding cylinders' intake valves, for which the preceding cylinders' intake valves 31 are open. Both of these open periods are produced by the low load cam. Below the respective band lines, the open periods produced by the high load cam (open period 380 of the burnt gas exhaust valves and open period 390 of the preceding cylinders' intake valves) are shown for reference. The bottom section shows the open period 320 of the following cylinders' exhaust valves for which the following cylinders' exhaust valves 32 of the following cylinders 2B, 2C are open and the open period 330 of the burnt gas introduction valves, for which the burnt gas introduction valves 31b are open. The open period 300 of the burnt gas exhaust valves of the preceding cylinders is set from about 35° CA before the BDC to about 40° CA before the TDC (total about 175° CA). In particular, the closure time 302 of the burnt gas exhaust valves is set to be earlier than the TDC. This is a setting that is shorter and earlier than the generally set values for a conventional engine (from 30° CA before the BDC to about 25° CA after the TDC). Also, the open period 310 of the preceding cylinders' intake valves is set from about 50° CA after the TDC to about 45° CA after the BDC (total about 175° CA). This is a setting that is shorter and later than the generally set values of a conventional engine (from 10° CA before the TDC to about 55° CA after the BDC). By means of these settings, a condition is produced (hereinbelow called "minus overlap") in which all of the intake/exhaust valves are closed, from the closure time 302 of the burnt gas exhaust valves to the open time 312 of the preceding cylinders' intake valves. In FIG. 46(a), the minus overlap of the preceding cylinders is about 90° CA, on both sides of the TDC. Also, in the preceding cylinders 2A, 2D, the fuel injection time 305 of the preceding cylinders is set in the vicinity of the TDC, so that combustion by compression self-ignition is performed.

The open period 320 of the following cylinders' exhaust valves and the open period 330 of the burnt gas introduction valves are typical set values, but overall they are set to occur earlier. Also, the fuel injection rates of the following cylinders 2B, 2C are set to be leaner than the actual air/fuel ratio.

Thanks to the settings as above, in the preceding cylinders 2A, 2D, there is a large minus overlap, so there is a considerable amount of internal EGR. If there is a large amount of internal EGR, the shift to the following intake stroke and compression stroke occurs in a condition in which there is a large amount of burnt gas in the preceding cylinders, so the cylinder temperature is raised and compression self-ignition is facilitated. Combustion in the preceding cylinders 2A, 2D occurs by compression self-ignition, so a fuel consumption improvement effect and exhaust gas cleaning effect are produced by the high degree of thermal efficiency and suppression of generation of NOx.

If the amount of internal EGR of the preceding cylinders 2A, 2D is increased in this way, on the other hand, the amount of new air in the following cylinders 2B, 2C is liable to become insufficient. However, in this embodiment, it is arranged to be possible to introduce sufficient oxygen into the following cylinders 2B, 2C even if there is a considerable amount of internal EGR in the preceding cylinders 2A, 2D, by increasing the absolute amount of new air (in particular oxygen), by performing supercharging using the turbo supercharger 50. Also, the intake temperature is raised by the supercharging, so the capability for compression self-ignition of the preceding cylinders 2A, 2D is increased. Thus, by performing supercharging, the insufficiency of new air in the following cylinders 2B, 2C resulting from increase in the internal EGR of the preceding cylinders 2A, 2D is mitigated and the compression self-ignition capability in the preceding cylinders 2A, 2D is improved, thereby expanding the operating range in which compression self-ignition can be performed in the preceding cylinders.

Also, since the fuel injection time 305 of the preceding cylinders 2A, 2D is set later than the closure time 302 of the burnt gas exhaust valves and in the vicinity of the TDC of these cylinders, the fuel is injected into the preceding cylinders 2A, 2D in which a considerable amount of burnt gas is still present. Activation of the injected fuel by the high temperature is therefore achieved and, since the fuel is injected early, in the vicinity of the TDC, activation is promoted to a fully satisfactory extent and compression self-ignition capability is improved. It should be noted that direct exhaustion of the injected fuel from the burnt gas exhaust valves 32b is prevented by performing the fuel ignition after the open period 302 of the burnt gas exhaust valves.

Furthermore, since the air/fuel ratio even in the following cylinders 2B, 2C is set to be leaner than substantially the stoichiometric air/fuel ratio, thermal efficiency is higher than if substantially the stoichiometric air/fuel ratio were set, so a large improvement in fuel costs is obtained. Also, since generation of NOx is suppressed in both the preceding cylinders 2A, 2D and the following cylinders 2B, 2C to very great extent by the lean air/fuel ratio and the compression self-ignition, exhaust gas cleansing performance is satisfied simply by the provision of a three-way catalyst 24 (which may, if necessary, be combined with an oxygen catalyst) in the exhaust passage 20a. In other words, a comparatively expensive lean NOx catalyst for reduction treatment of the NOx is unnecessary, making it possible to lower costs.

FIG. 46(b) is the case of the intermediate load region (region A502 of FIG. 45); the upper section thereof shows the open period 340 of the burnt gas exhaust valves and the open period 350 (shown shaded) of the preceding cylinders' intake valves; the lower section thereof shows the open period 360 of the following cylinders' exhaust valves and the open period 370 of the burnt gas introduction valves. Overall, the setting of the open period 340 of the burnt gas exhaust valves, the open period 360 of the following cylinders' exhaust valves and the open period 370 of the burnt gas introduction valves is delayed by 30° CA in comparison with the open period 300 of the burnt gas exhaust valves, the open period 320 of the following cylinders' exhaust valves and the open period 330 of the burnt gas introduction valves of FIG. 46(a). This is achieved by delaying the face of the camshaft 34 by 30° CA by means of the cam phase varying mechanism 34a. In contrast, the open period 350 of the preceding cylinders' intake valves is set to advanced by 25° CA with respect to the open period 310 of the preceding cylinders' intake valves of FIG. 46(a). This is achieved by advancing the phase of the camshaft 33 by 25° CA by means of the cam phase varying mechanism 33a. Consequently, the closure time 342 of the burnt gas exhaust valves is about 10° CA before the TDC and the opening time 352 of the preceding cylinders' intake valves is about 25° CA after the TDC. This minus overlap is about 35° CA, which is 55° CA shorter than in the condition of FIG. 46(a).

In this way, the minus overlap is shortened with increase in the load (from the operating region A1 to A2), so the internal EGR ratio of the preceding cylinders 2A, 2D is decreased. Consequently, the ratio of new air is increased with increase in load, so ample new air for performing the combustion is guaranteed in respect of the fuel injection rate, which has been increased due to the demanded output.

Figure 47:
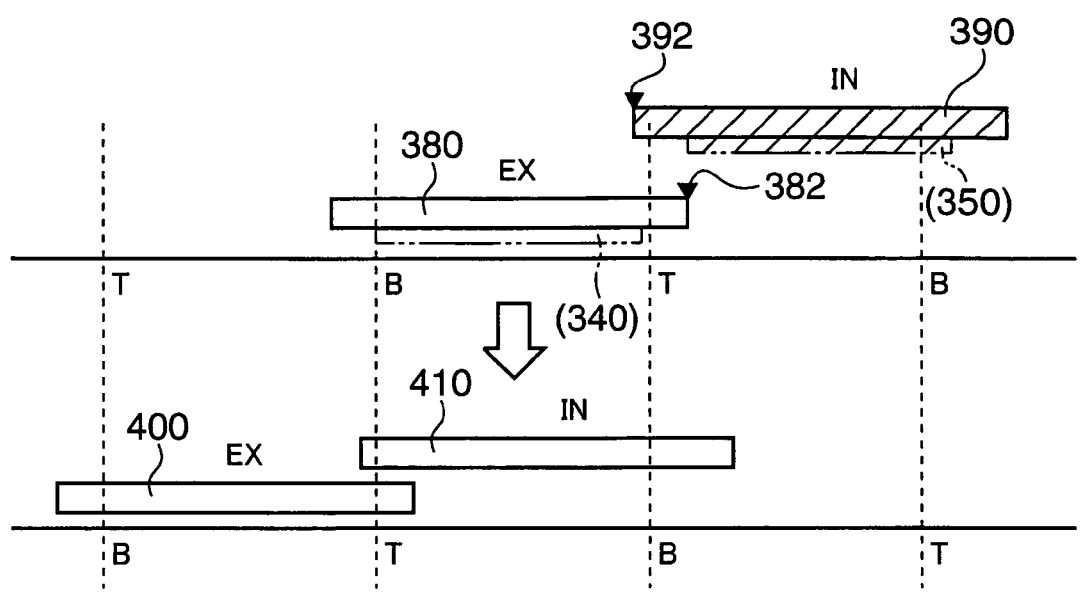
FIG. 47 is a diagram showing the opening/closing times of an intake/exhaust valve in a special operating mode, showing the case of comparatively high load.
Figure 48:
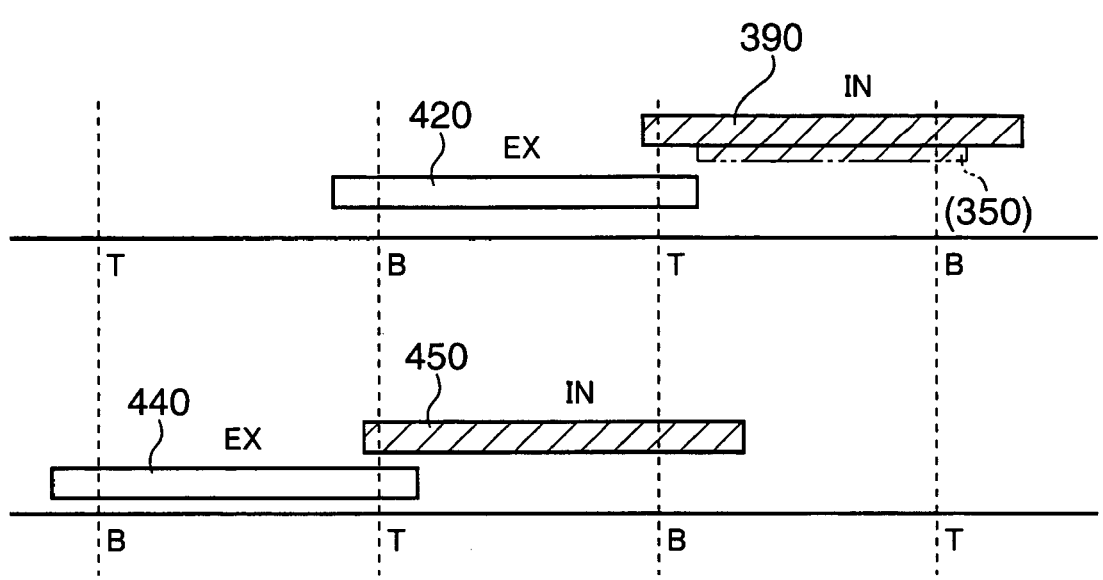
FIG. 48 is a diagram showing the opening/closing times of an intake/exhaust valve in the ordinary operating mode.

FIG. 47 is the case of the comparatively high load region (region A503 of FIG. 45) of the operating condition in which the special operating mode is performed. The notation is the same as in the case of FIG. 46 (and also in the similar drawings below.). The upper section thereof shows the open period 380 of the burnt gas exhaust valves and the closed period 390 (shown shaded) of the preceding cylinders' intake valves. These are both open periods produced by the high load cam and are changed over by the cam changeover mechanisms 150, 150b from the condition of FIG. 46. The open periods produced by the low load cam (open period 340 of the burnt gas exhaust valves and open period 350 of the preceding cylinders' intake valves are shown for reference below the respective and a lines. Also, the cam phase varying mechanism 33a is set in the same way as in FIG. 46(b) and the cam phase varying mechanism 34a is set lagging the phase of the camshaft 34 by a further 5° CA from the condition of FIG. 46(b). As a result, the open period 380 of the burnt gas exhaust valves is set from about 30° CA before the BDC to about 25° CA after the TDC (total about 235° CA) and the open period 390 of the preceding cylinders' intake valves is set from about 10° CA before the TDC to about 55° CA after the BDC (total about 245° CA). Consequently, the closure period 382 of the burnt gas exhaust valves is set lagging by about 35° CA from the open period 392 of the preceding cylinders' intake valves. During this interval, both valves are open (hereinbelow this is termed "overlap"). These settings correspond to the typical set values of conventional engine intake/exhaust valves. Also, in the preceding cylinders 2A, 2D, combustion is performed by forced ignition after making the air/fuel ratio leaner than in the case of the regions A1, A2. Fuel injection is changed over in the latter period of the compression stroke. Also, in the following cylinders 2B, 2C, combustion is performed by compression self-ignition in a condition in which the air/fuel ratio is substantially the stoichiometric air/fuel ratio.

Thanks to such a setting, intake in the preceding cylinders 2A, 2D and exhaust of burnt gas are fully satisfactorily performed in the valve-open period. In particular, since, in general, overlap is set, the internal EGR amount is small, so there is an ample intake of new air, so the required output can be obtained. The capability for compression self-ignition decreases with decrease in the amount of internal EGR, but stable combustion is obtained by changing over to combustion by forced ignition. Thus a further improvement in regard to fuel costs is achieved, since the air/fuel ratio in the preceding cylinders 2A, 2D is set to be richer and the following cylinders 2B, 2C that are performing combustion by compression self-ignition, and whose thermal efficiency is correspondingly improved, are set rather richer. Also, since the combustion in the following cylinders is arranged to be performed substantially with the stoichiometric air/fuel ratio, fully satisfactory exhaust gas cleansing performance can be obtained merely by the provision of a three-way catalyst 24 arranged in the exhaust passage 20a.

FIG. 46 is a diagram showing the opening/closing times of the preceding cylinders' intake valves 31 and burnt gas exhaust valves 32b of the preceding cylinders 2A, 2D in the ordinary operating mode and the opening/closing times of the burnt gas introduction valves 31b and the following cylinders' exhaust valves 32 of the following cylinders 2B, 2C. Since, in the ordinary operating mode, the cylinders are operated independently, combustion is performed by forced ignition by introducing new air into both the preceding cylinders 2A, 2D and the following cylinders 2B, 2C. The upper section shows the open period 420 of the burnt gas exhaust valves, for which the preceding cylinders' exhaust valves 32a of the preceding cylinders 2A, 2D are open and the open period 390 (shown shaded) of the preceding cylinders' intake valves, for which the preceding cylinders' intake valves 31 are open. The bottom section shows the open period 440 of the following cylinders' exhaust valves, for which the following cylinders' exhaust valves 32 of the following cylinders 2B, 2C are open and the open period 450 of the following cylinders' intake valves, for which the following cylinders' intake valves 31a are open.

Exhaustion of the preceding cylinders 2A, 2D and intake in the following cylinders 2B, 2C are performed by different valves than in the special operating mode, so their opening/closure is performed by different cams. Consequently, the open period 420 of the preceding cylinders' exhaust valves and the open period 450 of the following cylinders' intake valves are set independently of the open period of the burnt gas exhaust valves and burnt gas introduction valves. In FIG. 48, the valves employed are different, but the set values of the respective periods are the same as in the case of FIG. 47(b). Also, the open period 390 of the leading valves' intake valves and the open period 450 of the following valves' intake valves can be varied forwards and backwards by the cam phase varying mechanism 33a and the open period 420 of the preceding cylinders' exhaust valves and the open period 440 of the following cylinders' exhaust valves can be varied forwards and backwards by means of the cam phase varying mechanism 34a. Overlap with the preceding cylinders can therefore be varied by controlling the cam phase varying mechanisms 33a, 34a. The cam phase controller 49 is arranged such that the optimum thermal efficiency is obtained in accordance with the load by controlling the cam phase varying mechanisms 33a, 34a such as to produce a greater degree of valve overlap as the load is increased. The same control is performed in respect of the following cylinders 2B, 2C.

Thus, in the ordinary operating mode, output performance is ensured by exercising control to achieve the optimum intake/exhaust times, depending on the load, and controlling the air intake rates and fuel injection rates such as to provide the stoichiometric air/fuel ratio or a ratio richer than this.

Next, a second example of control of intake/exhaust etc using a device according to this embodiment is described with reference to FIG. 49. In this example, the basic construction and basic control configuration are the same as in the case of the first embodiment, but the phase of the camshafts 33, 34 is varied by means of the cam phase varying mechanisms 33a, 34a without changing over between a low load cam and high load cam.

Figure 49A:
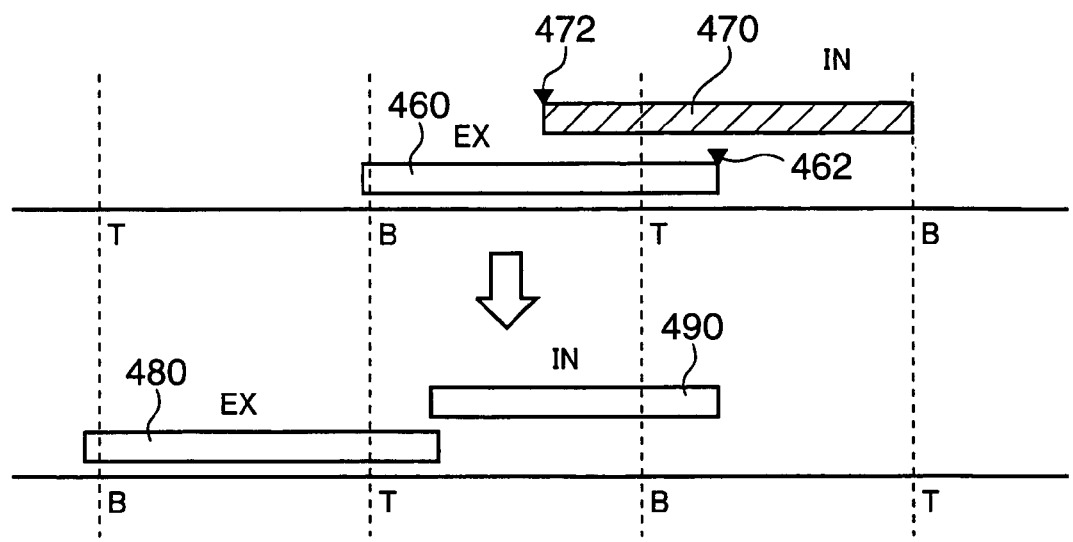
FIGS. 49(A) and 49(B) are diagrams showing the opening/closing times of an intake/exhaust valve in a special operating mode according to a second example of the control of intake/exhaust etc using a device as shown in FIG. 40 to FIG. 44, (a) showing the case of comparatively low load and (b) showing in like manner the case of a comparatively high load.

FIG. 49(a) shows the case of a comparatively low load region (region A501 in FIG. 45) of the operating region in which special operating mode is being performed. The upper section thereof shows the open period 460 of the burnt gas discharge valves and the open period 470 of the preceding cylinders' intake valves; the lower section thereof shows the open period 480 of the following cylinders' exhaust valves and the open period 490 of the burnt gas introduction valves. The open period 460 of the burnt gas exhaust valves is set from about 5° CA before the BDC to about 50° CA after the TDC (total about 235° CA). The open period 470 of the preceding cylinders intake valves is set from about 65° CA before the TDC to about the BDC (total about 245° CA). Consequently, a large overlap of 115° CA is set from the opening time 472 of the preceding cylinders' intake valves to the closure time 462 of the burnt gas exhaust valves.

If such a large overlap is set, backflow of burnt gas takes place from the burnt gas exhaust valves 32b towards the preceding cylinders' intake valves 31 during the period of this overlap and internal EGR is increased. Consequently, a fuel costs improvement effect as described in the first embodiment is obtained and exhaust cleansing is promoted. It should be noted that, although increase of the overlap period would tend to invite occurrence of interference of the valve and the upper surface of the piston 3, since, in this embodiment, a long stroke configuration (stroke>cylinder bore diameter) is employed, the period for which the piston 3 is in the vicinity of the top dead center is shortened, thereby preventing such interference.

When, with further increase in engine load, the condition of the region A502 of FIG. 45 is entered, the open period 460 of the burnt gas exhaust valves is shifted towards the leading side and the open period 470 of the preceding cylinders' intake valves is shifted towards the delayed side by the cam phase varying mechanisms 33a, 34a. That is, the overlap period is shortened and the amount of internal EGR is decreased. Consequently, the ratio of new air is increased, so that the required output can be obtained.

Figure 49B:
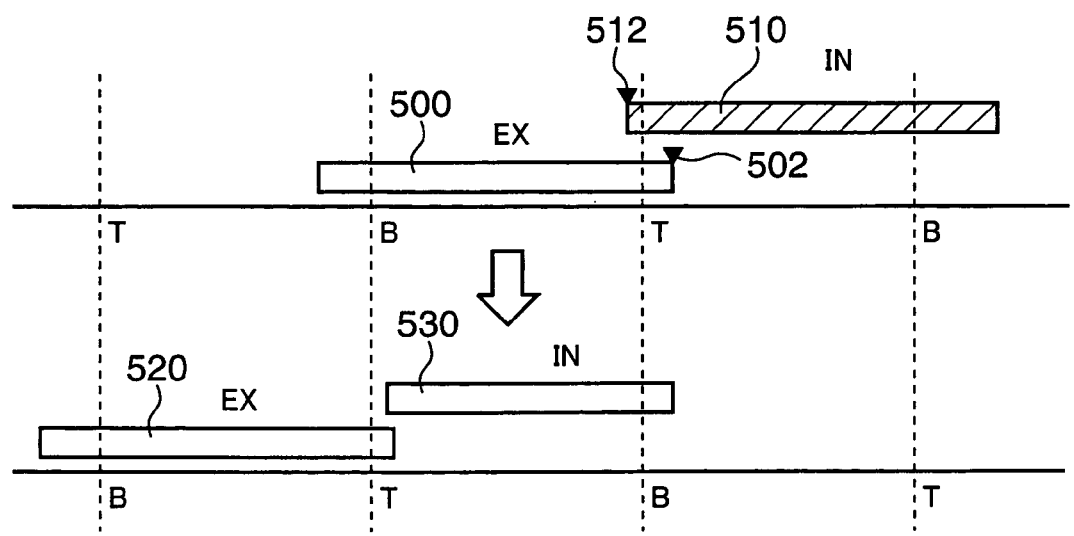

FIG. 49(b) shows the case of even higher load i.e. the region A503 of FIG. 45. The upper section thereof shows the open period 500 of the burnt gas exhaust valves and the open period 510 (shown shaded) of the preceding cylinders' intake valves and the bottom section shows the open period 520 of the following cylinders' exhaust valves and the open period 530 of the burnt gas introduction valves. These are obtained by shifting the phase of the camshaft 33 by 55° CA in the lagging direction by means of the cam phase varying mechanism 33a and shifting the phase of the camshaft 34 by 30° CA in the leading direction by means of the cam phase varying mechanism 34a. Consequently, the opening time 512 of the preceding cylinders' intake valves is about 10° CA before the BDC and the closure time 502 of the burnt gas exhaust valves is about 20° CA after the BDC and the overlap is set at 30° CA (corresponding to the typical set value of a conventional engine). The amount of internal EGR is therefore decreased and the ratio of new air is increased, so the demanded output can be obtained.

Next, a third example of control of intake/exhaust etc using a device according to this embodiment will be described with reference to FIG. 50. The basic construction and basic control configuration of this example are the same as in the case of,the second example; the phase of the camshafts 33, 34 is varied by the cam phase varying mechanisms 33a, 34a, without changing over between a low load cam and a high load cam.

Figure 50A:
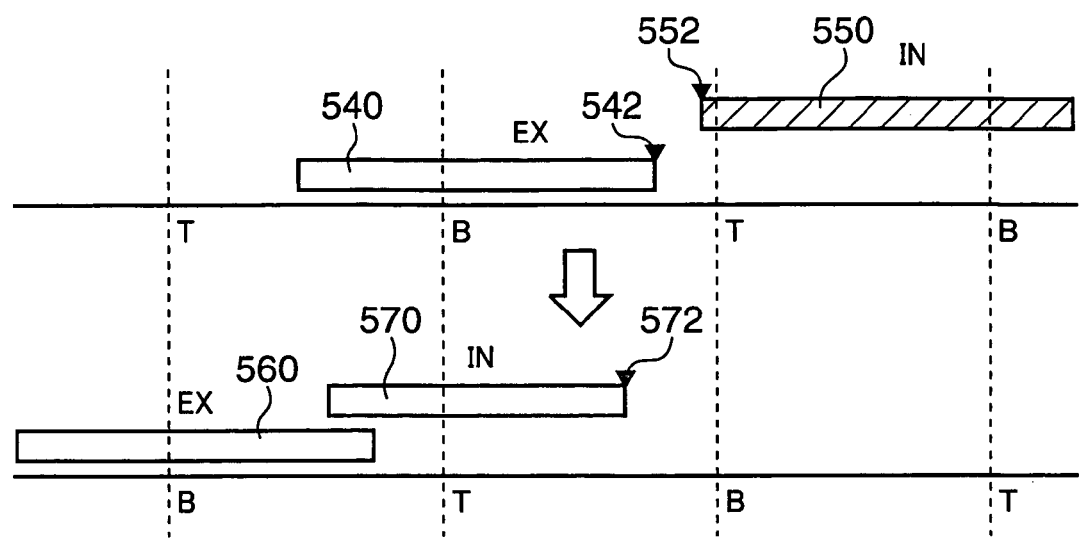
FIGS. 50(A) and 50(B) are diagrams showing the opening/closing times of an intake/exhaust valve in a special operating mode according to a third example of the control of intake/exhaust etc using a device as shown in FIG. 40 to FIG. 44, (a) showing the case of comparatively low load and (b) showing in like manner the case of a comparatively high load.

FIG. 50(a) shows the case of a comparatively low load region (region A1 in FIG. 8) in the operating condition in which the special operating mode is performed. The upper section thereof shows the open period 540 of the burnt gas exhaust valves and the open period 550 (shown shaded) of the preceding cylinders' intake valves and the bottom section shows the open period 560 of the following cylinders' exhaust valves and the open period 570 of the burnt gas introduction valves. The open period 540 of the burnt gas exhaust valves is set from about 95° CA before the BDC to about 40° CA before the TDC (total about 235° CA). The open period 550 of the preceding cylinders' intake valves is set from about 10° CA before the TDC to about 55° CA after the BDC (total about 245° CA). Also, the open period 560 of the following cylinders' exhaust valves is set from about 100° CA before the BDC to about 45° CA before the TDC (total about 235° CA). The open period 570 of the burnt gas introduction valves is set from about 75° CA before the TDC to about 60° CA before the BDC (total about 195° CA).

Considering solely the preceding cylinders 2A, 2D, a minus overlap of 30° CA from the closure time 542 of the burnt gas exhaust valves to the opening time 552 of the preceding cylinders' intake valves is therefore set. However, since the closure time 572 of the burnt gas introduction valves is set earlier than the closure time 542 of the burnt gas exhaust valves, burnt gas cannot enter the following cylinders 2B, 2C from the preceding cylinders 2A, 2D after the closure time 572 of the burnt gas introduction valves. Consequently, even if the burnt gas exhaust valves 32b are open, the same condition is produced as if they were closed. That is, in fact, the 50° CA from the closure time 572 of the burnt gas introduction valves to the opening time 552 of the preceding cylinders' intake valves corresponds to a minus overlap. Internal EGR of the preceding cylinders 2A, 2D is increased by this large minus overlap, so a fuel cost improvement effect as detailed in the first embodiment is obtained and exhaust cleansing is promoted.

When the engine load further increases so that the condition of the region A502 of FIG. 45 is entered, the open period 540 of the burnt gas exhaust valves is shifted to the delayed side by the cam phase varying mechanism 34a. That is, the minus overlap period is shortened and the internal EGR amount is decreased. Consequently, the ratio of new air is increased, so that the required output can be obtained.

Figure 50B:
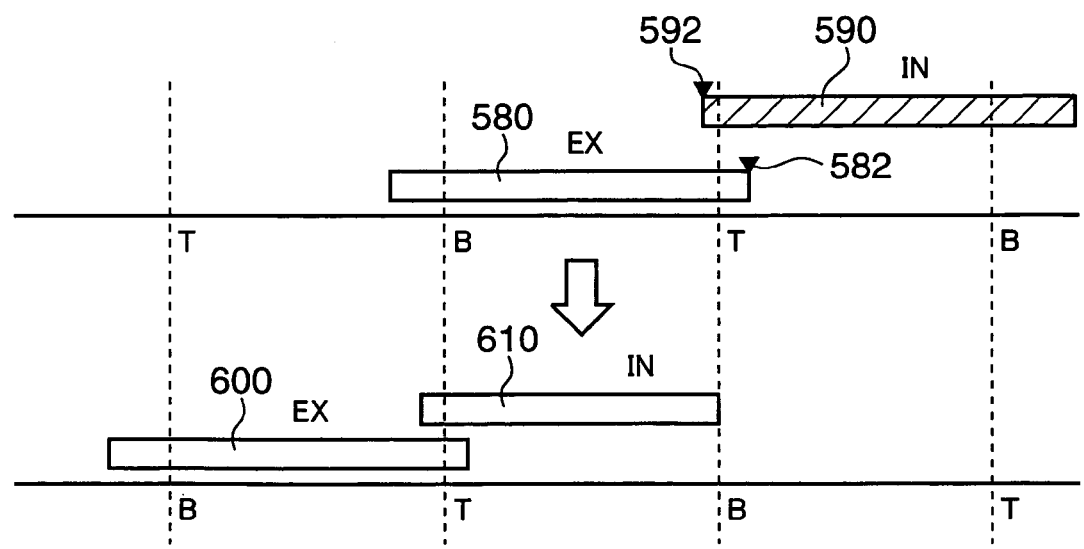

FIG. 50(b) shows the case where the load becomes even higher so that the region A503 of FIG. 45 is entered. The upper section shows the open period 580 of the burnt gas exhaust valves and the open period 590 (shown shaded) of the preceding cylinders' intake valves, while the lower section shows the open period 600 of the following cylinders' exhaust valves and the open period 610 of the burnt gas introduction valves. These are obtained by shifting the phase of the camshaft 34 towards the delayed side with respect to the condition of FIG. 50(a) by 60° CA by means of the cam phase varying mechanism 34a. The opening time 592 of the preceding cylinders' intake valves therefore becomes about 10° CA before the BDC and the closure time 582 of the burnt gas exhaust valves becomes about 20° CA after the BDC, so that an overlap of 30° CA is set (corresponding to the typical set value of a conventional engine). The amount of internal EGR is therefore decreased and the ratio of new air is increased, so the required output can be obtained.

Next, control of the intake/exhaust etc using the device of this embodiment will be described with reference to a fourth example, with reference to FIG. 51. The basic construction and basic control configuration of this embodiment are the same as in the first embodiment but, depending on conditions, there is partial operation of the following cylinders' intake valves 31a, which were deactivated in the first example in the special operating mode. The mechanism by which this is produced is partial projection of the peripheral shape of the first cam 152a of the cam changeover mechanism 150a provided for the following cylinders' intake valves 31a.

Figure 51A:
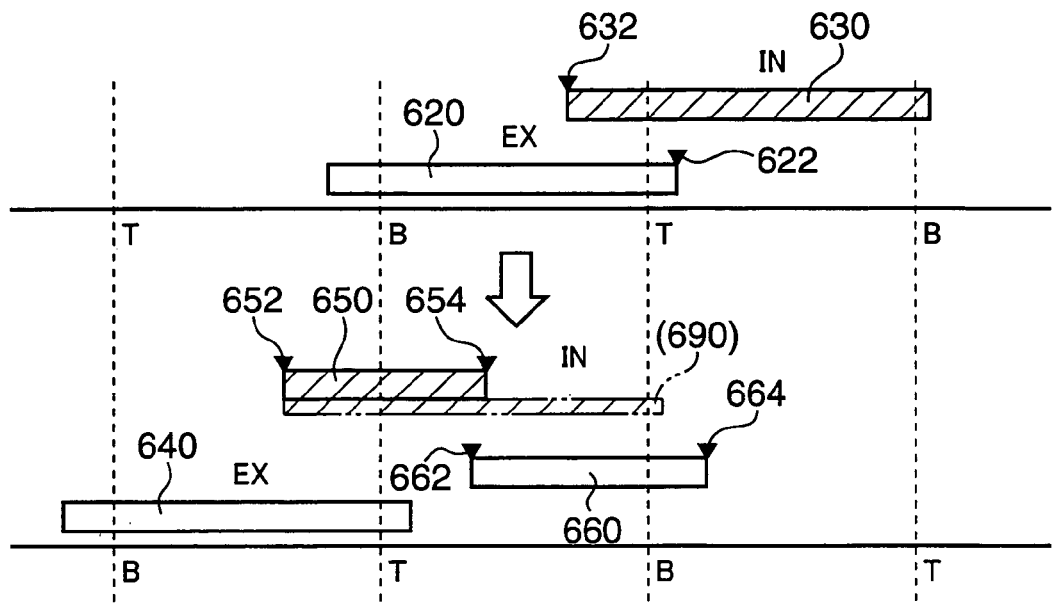
FIGS. 51(A) and 51(B) are diagrams showing the opening/closing times of an intake/exhaust valve in a special operating mode according to a fourth example of the control of intake/exhaust etc using a device as shown in FIG. 40 to FIG. 44, (a) showing the case of comparatively low load and (b) showing in like manner the case of an intermediate load.

FIG. 51(a) is the case of a comparatively low load region (region A501 of FIG. 45) of the operating region in which the special operating mode is performed. The upper section thereof shows the open period 620 of the burnt gas exhaust valves and the open period 630 (shown shaded) of the preceding cylinders' intake valves and the lower section shows the open period 644 of the following cylinders' exhaust valves, the open period 650 (shown shaded) of the following cylinders' intake valves and the open period 660 of the burnt gas introduction valves. Directly below the open period 650 of the following cylinders' intake valves, the open period 690 of the following cylinders' intake valves in the ordinary operating mode (condition in which the cams are changed over) is shown for reference. The open period 620 of the burnt gas exhaust valves is set from about 35° CA before the BDC to about 20° CA after the TDC (total about 235° CA). The open period 630 of the preceding cylinders' intake valves is set from about 55° CA before the TDC to about 10° CA after the BDC (total about 245° CA). Consequently, a large overlap of 75° CA from the opening time 632 of the preceding cylinders' intake valves to the closure time 622 of the burnt gas exhaust valves is set.

If a large overlap is set in this way, the burnt gas flows back from the burnt gas exhaust valves 32b to the preceding cylinders' intake valves 31 during this overlap period, increasing the internal EGR. Consequently, a fuel costs improvement effect as detailed in the first embodiment is obtained and exhaust cleansing is promoted. It should be noted that, although increase of the overlap period would tend to invite occurrence of interference of the valve and the upper surface of the piston 3, since, in this embodiment, a long stroke configuration (stroke>cylinder bore diameter) is employed, the period for which the piston 3 is in the vicinity of the top dead center is shortened, thereby preventing such interference.

In addition, new air is arranged to be introduced in the following cylinders 2B, 2C separately from the burnt gas that is introduced from the preceding cylinders 2A, 2D, by providing an open period 650 of the following cylinders' intake valves. The open period 650 of the following cylinders' intake valves is set from about 65° CA before the TDC to about 70° CA after the TDC (total about 135° CA). Also, the open period 660 of the burnt gas introduction valves is set from about 120° CA before the BDC to about 40° CA after the BDC (total about 160° CA). Consequently, new air or burnt gas intake is performed during the period from the opening time 652 of the following cylinders' intake valves to the closure time 664 of the burnt gas exhaust valves in the following cylinders 2B, 2C.

Even if the oxygen in the burnt gas that is introduced into the following cylinders 2B, 2C is diminished by increase in the amount of internal EGR in the preceding cylinders 2A, 2D, thanks to the provision of the open period 650 of the following cylinders' intake valves, the oxygen is supplemented by new air separately introduced into the following cylinders 2B, 2C, raising the generated output in the following cylinders 2B, 2C. Also, due to this effect, the limit of increase of the amount of internal EGR in the preceding cylinders 2A, 2D is raised, so the region in which compression self-ignition can be achieved in the preceding cylinders 2A, 2D is further expanded.

Also, since the open time 662 of the burnt gas introduction valves is set on the delayed side from the TDC of the following cylinders 2B, 2C and the opening time 652 of the following cylinders' intake valves is set earlier than the opening time 662 of the burnt gas introduction valves and earlier than the TDC of the following cylinders 2B, 2C, the burnt gas that was introduced is prevented from being directly exhausted through the following cylinders' intake valves.

Figure 51B:
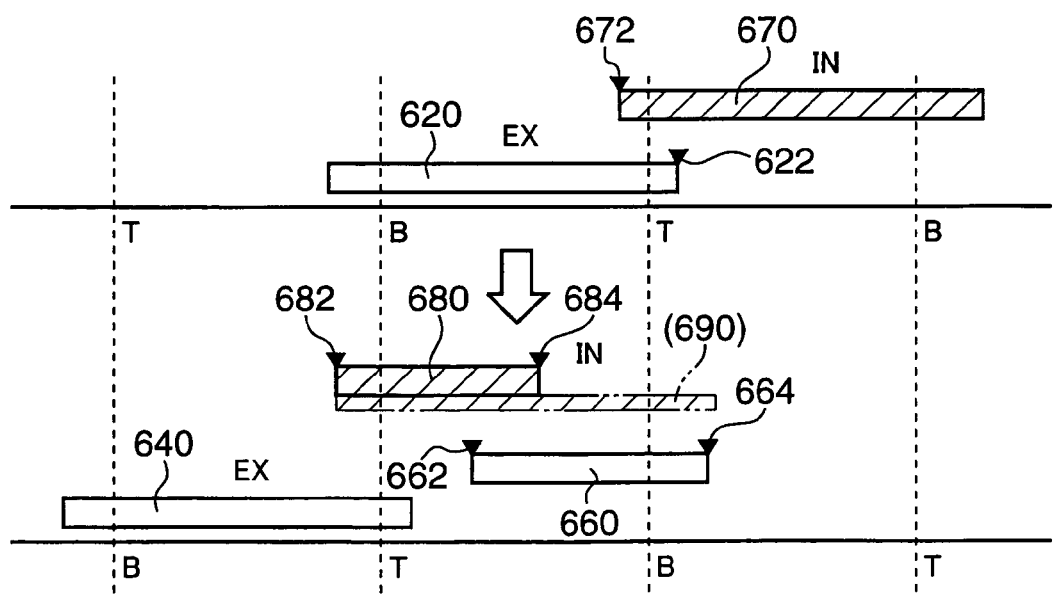

FIG. 51(b) shows the case where the load is even higher and the region A502 of FIG. 45 is entered. The upper section thereof shows the open period 620 of the burnt gas exhaust valves and the open period 670 (shown shaded) of the preceding cylinders' intake valves and the bottom section shows the open period 640 of the following cylinders' exhaust valves, the open period 680 (shown shaded) of the following cylinders' intake valves and the open period 660 of the burnt gas introduction valves. These are obtained by shifting the phase of the camshaft 33 in the lagging direction by means of the cam phase varying mechanism 33a by 35° CA with respect to the condition of FIG. 51(a). Consequently, the opening time 672 of the preceding cylinders' intake valves becomes about 20° CA before the BDC and the opening time 622 of the burnt gas exhaust valves becomes about 20° CA after the BDC, thereby diminishing the overlap to 40° CA. The amount of internal EGR is therefore reduced and the ratio of new air is increased, so the required output at high load can be obtained. It should be noted that if the load is further increased, entering the region A503 of FIG. 45, the phase of the camshaft 33 is further delayed by 10° CA and a changeover to combustion by forced ignition is effected.

It should be noted that instead of dividing the running region A in the special operating mode into three regions A501 to A503 it could be divided into more than these and opening/closure times could be set appropriate to these respective regions. In addition, the changes could be effected continuously rather than being set in stepwise fashion by the divisions. Instead of providing a running region B in the ordinary operating mode, the entire region could be treated as running region A.

Although various embodiments of the present invention have been described above, the present invention is not restricted to these embodiments and could be modified in various ways. Further embodiments are described below.

Figure 52:
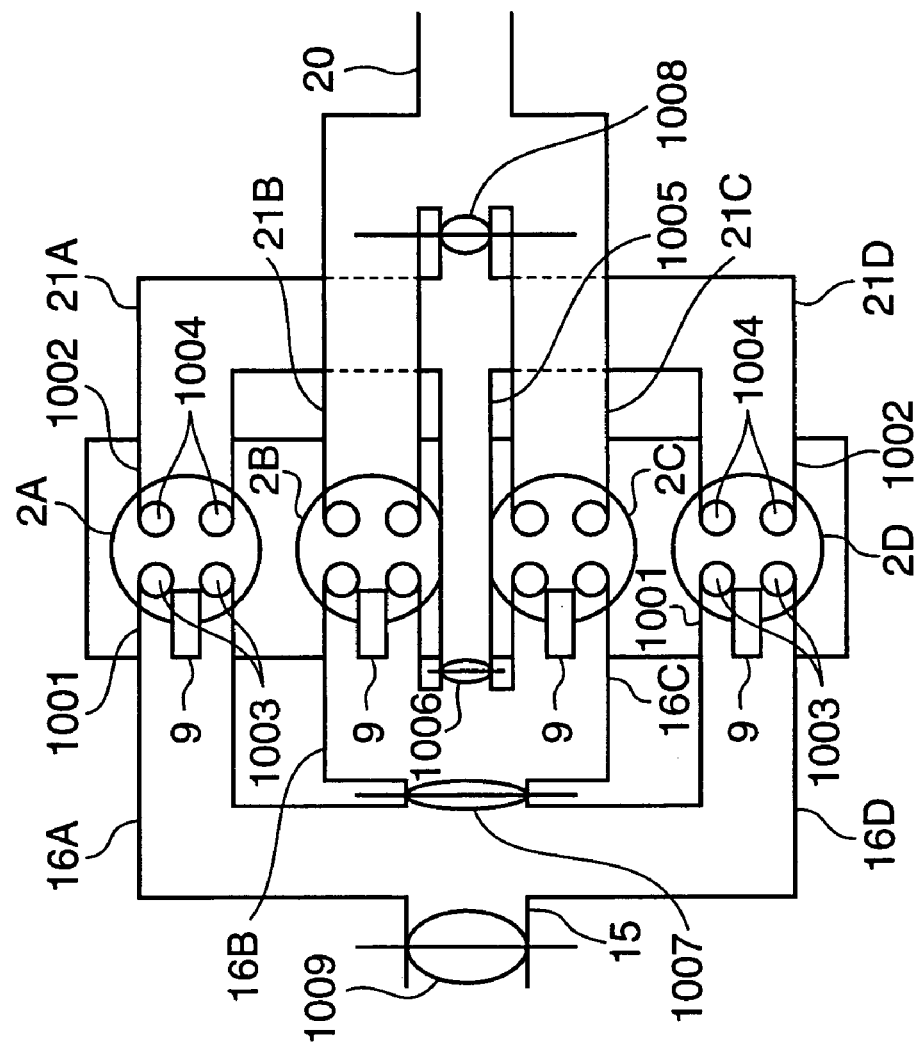
FIG. 52 is a diagrammatic plan view of an entire engine showing yet a further embodiment.

(1) Instead of a valve deactivating mechanism as described above, flow path changeover means could be constituted as in FIG. 52.

Specifically, in this Figure, in the cylinders 2A to 2D of the main engine body there are respectively provided intake ports 1001 and exhaust ports 1002, intake valves 1003 and exhaust valves 1004 that are provided at these ports being constantly operated by being opened and closed under the control of a valve operating mechanism, outside the Figure. Branch intake passages 16A to 16D are connected with the intake ports 1001 of the cylinders 2A to 2D; branch exhaust passages 21A to 21D are connected with the exhaust ports 1002 of the cylinders 2A to 2D and an inter-cylinder gas passage 1005 is connected between the merging section of the branch exhaust passages 21A to 21D with respect to the preceding cylinders (first and fourth cylinders) 2A and 2D and the merging section of the branch exhaust passages 21B, 21C of the following cylinders (second and third cylinders) 2B, 2C and a first opening/closure valve 1007 is provided in this inter-cylinder gas passage 1005.

Also, in respect of the preceding cylinders 2A, 2D, the merging section of the branch intake passages 16A, 16D is always linked with the upstream section of the intake passages and, in respect of the following cylinders 2B, 2C, in the linkage section between the merging section of the branch intake passages 16B, 16C and the upstream section of the intake passages, a second opening/closure valve 1007 is provided that opens and closes this linkage section. Furthermore, in respect of the following cylinders 2B, 2C, the merging section of the branch exhaust passages 21B, 21C is always linked with the downstream section of the exhaust passages and, in respect of the preceding cylinders 2A, 2D, in the linkage section between the merging section of the branch exhaust passages 21A, 21D and the downstream section of the exhaust passages, a third opening/closure valve 1008 is provided that opens and closes this linkage section.

The aforesaid opening/closure valves 1006, 1007 and 1008 are controlled as follows by controller, outside the Figure, depending on whether the operating condition is in the operating region A on the low load, low rotational speed side or whether it is in the operating region B on the high load or high rotational speed side:

Operating region A: first opening/closure valve 1006 in the open condition, second and third opening/closure valves 1007, 1008 in closed condition; and Operating region B: first opening/closure valve 1006 in the closed condition, second and third opening/closure valves 1007, 1008 in open condition.

In this way, a flow path changeover means is constituted by the opening/closure valves 1006, 1007, 1008 and the controller that controls these.

A throttle valve 1009 is provided on the upstream side of the merging section of the intake passages.

In this embodiment also, in the operating region A, the device is put into the two-cylinder connected condition, such that, between a pair of cylinders whose exhaust stroke and intake stroke overlap, the burnt gas exhausted from the preceding cylinders 2A, 2D is directly introduced through the inter-cylinder gas passage 1005 to the following cylinders 2B, 2C and the gas that is exhausted from these following cylinders 2B, 2C is fed to the exhaust passage 20. And in the operating region B, the intake ports 1001 and exhaust ports 1002 of the cylinders 2A to 2D are independent, so that new air is introduced into the intake ports 1001 of each of the cylinders from the intake passages and exhaust gas that is exhausted from the exhaust ports 1002 of each of the cylinders is fed to the aforementioned exhaust passage 20. The control of fuel injection from the fuel injection valves 9 and the control of ignition etc are the same as in the basic embodiment.

(2) The device according to the present invention could also be applied to multi-cylinder engines other than four-cylinder engines. Thus, although, for example in the case of a six-cylinder engine, the exhaust stroke of one cylinder cannot fully overlap the intake stroke of another cylinder, in such cases, it could be arranged for the exhaust stroke of one cylinder to lead the intake stroke of another cylinder and to constitute a pair of leading/following cylinders in which the two strokes of the two cylinders partially overlap.

(3) In addition to a construction as shown in the above embodiments, it could be arranged for EGR to be performed solely in respect of the preceding cylinders. If this is done, NOx can be effectively diminished, since production of NOx in the preceding cylinders is suppressed and, in the following cylinders, the burnt gas introduced from the preceding cylinders suppresses production of NOx in the same way as EGR.

It should be noted that the term "lean air/fuel ratio" has been used and the word "lean" is mean to be thin but the actual value of air/fuel ratio is large.

INDUSTRIAL APPLICABILITY

With the control device according to the present invention, burnt gas exhausted from the exhaustion stroke of the preceding cylinder in a pair of cylinders whose exhaustion stroke and intake stroke overlap is arranged to be directly introduced into the intake stroke of the following cylinder through an inter-cylinder gas passage and gas exhausted from this following cylinder is arranged to be fed to an exhaust passage and combustion is arranged to be performed by forced ignition in the preceding cylinders in a condition with a lean air/fuel ratio, while in the following cylinder fuel is supplied to the burnt gas of lean air/fuel ratio introduced from the preceding cylinder and combustion is arranged to be performed by compression ignition, so fuel costs can be improved by improvement of thermal efficiency by lean combustion and by decrease in pumping loss in the preceding cylinder while, in the following cylinder, the combustion contributes to the work efficiently by performing combustion rapidly by compression ignition; fuel costs can be considerably improved by means of this and lowering of pumping loss.

In particular, compression ignition can easily be implemented without requiring separate heating means or high pressure compression etc, by utilizing the heat of the burnt gas of high temperature that is introduced into the following cylinder from the preceding cylinder. Furthermore, since the burnt gas that is introduced into the following cylinder and the fuel are uniformly distributed, simultaneous compression ignition can be satisfactorily performed, making it possible to perform combustion at a high rate and thereby raising thermal efficiency.

The invention claimed is:

1. A control device for a multi-cylinder spark ignition engine having cylinders arranged to perform a cycle consisting of intake, compression, expansion and exhaustion strokes with prescribed phase differences, characterized in that a gas flow path is constituted in a two-cylinder connected condition, at least in a low load, low rotational speed region, such that burnt gas exhausted from a preceding cylinder which is a cylinder on the exhaust stroke side in a pair of cylinders whose exhaustion stroke and intake stroke overlap is directly introduced into a following cylinder which is a cylinder on the intake stroke side through an inter-cylinder gas passage and gas exhausted from this following cylinder is fed to an exhaust passage; and said control device comprising combustion controller that controls combustion in each cylinder such that at least in part of the operating region in which said two-cylinder connected condition is produced, combustion is performed by forced ignition in said preceding cylinder in a condition at an air/fuel ratio larger by a prescribed amount than the stoichiometric air/fuel ratio while fuel is supplied to the following cylinder in an amount corresponding to the burnt gas generated by combustion in this preceding cylinder, and combustion is performed by compression self-ignition in the following cylinder.

2. The control device for a spark ignition engine according to claim 1, characterized in that the air/fuel ratio of the following cylinder in said two-cylinder connected condition is made to be at or below the stoichiometric air/fuel ratio and a three-way catalyst or oxidation catalyst is provided in the exhaust passage connected with this following cylinder.

3. The control device for a spark ignition engine according to claim 1, characterized in that a fuel injection valve is provided that injects fuel directly into said preceding cylinder and, when in said two-cylinder connected condition, fuel is injected in the compression stroke from said fuel injection valve and stratified charge combustion is performed by forced ignition while keeping a lean air/fuel ratio in the preceding cylinder.

4. The control device for a spark ignition engine according to claim 3, characterized in that the air/fuel ratio of the preceding cylinder in said two-cylinder connected condition is twice or more the stoichiometric air/fuel ratio.

5. The control device for a spark ignition engine according to claim 3, characterized in that the air/fuel ratio of the following cylinder in said two-cylinder connected condition is an air/fuel ratio larger than the stoichiometric air/fuel ratio.

6. The control device for a spark ignition engine according to any of claims 1 to 5, characterized in that when in said two-cylinder connected condition uniform combustion is performed by injecting fuel in the following cylinder in the intake stroke.

7. The control device for a spark ignition engine according to claim 1, characterized in that it comprises flow path changeover means for changing over the flow paths of new air and gas, in a high load, high rotational speed operating region, such that the intake port and exhaust port of each of the cylinders are made to be independent, so that new air is introduced into the intake port of each cylinder from an intake passage and exhaust gas exhausted from the exhaust port of each cylinder is fed to said exhaust passage; and said combustion controller is arranged to set the air/fuel ratio of each of the cylinders to the stoichiometric air/fuel ratio or less than this and to cause combustion to be performed by forced ignition in each of the cylinders in said high load, high rotational speed operating region.

8. The control device for a spark ignition engine according to claim 7, characterized in that, in said preceding cylinder, there are provided an intake port that communicates with said intake passage, a first exhaust port that communicates with said exhaust passage and a second exhaust port that communicates with the inter-cylinder gas passage and, in said following cylinder there are provided a first intake port that communicates with said intake passage, a second intake port that communicates with said inter-cylinder gas passage and an exhaust port that communicates with said exhaust passage; and as said flow path changeover means, there are provided a valve deactivating mechanism that changes over the operating condition and deactivated condition respectively of the first and second exhaust valves that open and close the first and second exhaust ports of said preceding cylinder and of the first and second intake valves that open and close the first and second intake ports of the following cylinder; and a valve stop mechanism controller that, in a low load, low rotational speed region, puts said first exhaust valve and said first intake valve in deactivated condition and puts said second exhaust valve and said second intake valve in operating condition and, in a high load, high rotational speed operating condition, puts said first exhaust valve and said first intake valve in operating condition and said second exhaust valve and said second intake valve in deactivated condition.

9. The control device for a spark ignition four-cycle engine according to claim 1, characterized in that said combustion controller which exercise the control mode whereby combustion is performed in said two-cylinder connected condition as the special operating mode, and said combustion controller, in at least part of the operating region of the region corresponding to said special operating mode, controls the fuel supply rate in respect of both the leading and following cylinders such that the fuel supply rate in the preceding cylinder is greater, while the air/fuel ratio during combustion in said following cylinder is substantially the stoichiometric air/fuel ratio, thereby making the air/fuel ratio when combustion is conducted in the preceding cylinder a value of less than twice the stoichiometric air/fuel ratio and conducting combustion in the preceding cylinder by forced ignition and conducting combustion in the following cylinder by compression self-ignition.

10. The control device for a spark ignition four-cycle engine according to claim 9, characterized in that, in said special operating mode, in the intermediate speed region of the operating region in which the following cylinder is made to perform compression self-ignition, the air/fuel ratio when conducting combustion in the preceding cylinder is made to be a value of substantially twice the stoichiometric air/fuel ratio, or more than said stoichiometric air/fuel ratio.

11. The control device for a spark ignition four-cycle engine according to claim 10, characterized in that, in said special operating mode, in the operating region on the lower speed side than the intermediate speed region of the operating region in which the following cylinder is made to perform compression self-ignition, the air/fuel ratio when conducting combustion in the preceding cylinder is made to be a value of less than twice the stoichiometric air/fuel ratio.

12. The control device for a spark ignition four-cycle engine according to claim 10, characterized in that, in said special operating mode, in the operating region on the higher speed side than the intermediate speed region of the operating region in which the following cylinder is made to perform compression self-ignition, the air/fuel ratio when conducting combustion in the preceding cylinder is made to be a value of less than twice the stoichiometric air/fuel ratio.

13. The control device for a spark ignition four-cycle engine according to claim 9, characterized in that, in said special operating mode, in the intermediate load region of the operating region in which the following cylinder is made to perform compression self-ignition, the air/fuel ratio when conducting combustion in the preceding cylinder is made to be a value of substantially twice the stoichiometric air/fuel ratio, or more than the stoichiometric air/fuel ratio.

14. The control device for a spark ignition four-cycle engine according to claim 9, characterized in that, in said special operating mode, in the intermediate speed/intermediate load region of the operating region in which the following cylinder is made to perform compression self-ignition, the air/fuel ratio when conducting combustion in the preceding cylinder is made to be a value of substantially twice the stoichiometric air/fuel ratio, or more than the stoichiometric air/fuel ratio.

15. The control device for a spark ignition four-cycle engine according to claim 9, characterized in that, in said special operating mode, in the operating region in which the following cylinder is made to perform compression self-ignition, the air/fuel ratio when conducting combustion in the preceding cylinder is made smaller as the load becomes lower.

16. The control device for a spark ignition four-cycle engine according to claim 9, characterized in that, when the engine temperature is low, in the entire operating region in which the following cylinder is made to perform compression self-ignition in said special operating mode, the air/fuel ratio when conducting combustion in the preceding cylinder is made to be less than twice the stoichiometric air/fuel ratio.

17. The control device for a spark ignition engine according to claim 1, wherein said combustion controller executes control in which combustion is conducted in said two-cylinder connected condition in a control mode as a special operating mode; and said combustion condition; and said combustion controller including a fuel injection controller that, in an operating region in which the following cylinder is made to perform compression self-ignition in said special operating mode, relatively retards the injection time of the fuel to the following cylinder in an operating condition in which knocking is likely to occur, compared with an operating condition where knocking is unlikely to occur.

18. The control device for a spark ignition engine according to claim 17, characterized in that, in an operating region in which the following cylinder is made to perform compression self-ignition in said special operating mode, in an operating condition in which knocking is likely to occur, the injection time of the fuel to the following cylinder is set more on the retarded side of the compression stroke as the likelihood of knocking increases.

19. The control device for a spark ignition engine according to claim 17, characterized in that, in an operating region in which the following cylinder is made to perform compression self-ignition in said special operating mode, in an operating condition in which knocking is likely to occur, injection of fuel into the following cylinder is performed in divided fashion and the latter injection time of the fuel in said divided injection is set in the latter half of the compression.

20. The control device for a spark ignition engine according to claim 19, characterized in that, in a region in which the following cylinder is made to perform compression self ignition, the likelihood of occurrence of knocking or the intensity of knocking is ascertained and the latter injection time in said divided fuel injection is retarded so as to approach more closely the compression top dead center as the likelihood of occurrence of said knocking or the intensity of knocking increases.

21. The control device for a spark ignition engine according to claim 3, characterized in that, in a region in which the following cylinder is made to perform compression self-ignition, in an operating condition in which knocking is likely to occur, injection of fuel into the following cylinder is performed in divided fashion and the latter injection rate of the fuel in said divided injection is set to a larger value than the former injection rate.

22. The control device for a spark ignition engine according to claim 21, characterized in that, in a region in which the following cylinder is made to perform compression self-ignition, the likelihood of occurrence of knocking is ascertained and the ratio of the latter injection period rate with respect to the total injection rate of fuel injected in the following cylinder is changed so as to be larger as the likelihood of occurrence of such knocking becomes higher.

23. The control device for a spark ignition engine according to claim 17, characterized in that, in a region in which the following cylinder is made to perform compression self-ignition, when the engine is in an operating region on the high load side, a condition in which knocking is likely to occur is identified.

24. The control device for a spark ignition engine according to claim 17, characterized in that, if fuel of low octane value is employed, the region in which the following cylinder is made to perform compression self-ignition is identified as a condition in which knocking is likely to occur.

25. The control device for a spark ignition engine according to claim 17, characterized in comprising swirl generating means that generates swirl such that a strong intensity of turbulence is maintained in the latter half of the compression stroke in a region in which the following cylinder is made to perform compression self-ignition, in an operating condition in which knocking is likely to occur.

26. The control device for a spark ignition engine according to claim 25, characterized in that swirl is generated in the combustion chamber by directing the tip portion of the inter-cylinder gas passage in the cylinder tangential direction of the following cylinder in plan view and introducing burnt gas into the following cylinder from said inter-cylinder gas passage in the intake stroke of the following cylinder.

27. The control device for a spark ignition engine according to claim 1, characterized in that the combustion controller exercises control whereby combustion is conducted in said two-cylinder connected condition as a special operating mode; and said combustion controller effects a control such that:

in at least part of the operating region in which said special operating mode is involved, combustion is conducted by compression self-ignition in the following cylinder, and the air/fuel ratio of the preceding cylinder is made relatively lower in a high load region in the region in which said compression self-ignition is performed compared with the region on the low load side and a new air introduction intake valve that introduces new air into the following cylinder is opened so that new air is introduced into the following cylinder in addition to the burnt gas that is fed from said preceding cylinder.

28. The control device for a spark ignition engine according to claim 27, characterized in that in a region on the low load side in the operating region in which the following cylinder is made to perform compression self-ignition in said special operating mode, the new air introduction intake valve is maintained in closed condition; and, in a region on the high load side in said compression self-ignition region, the new air introduction intake valve is opened in the vicinity of the intake top dead center of the following cylinder and is closed during the course of the intake stroke of the following cylinder.

29. The control device for a spark ignition engine according to claim 27, characterized in that, in a region on the high load side in the operating region in which the following cylinder is made to perform compression self-ignition in said special operating mode, the burnt gas introduction valve of the following cylinder is opened during the course of the intake stroke and the new air introduction intake valve is opened prior to the opening time of said burnt gas introduction valve.

30. The control device for a spark ignition engine according to claim 27, characterized in that, in a region on the high load side in the operating region in which the following cylinder is made to perform compression self-ignition, control is exercised such as to increase the ratio of the new air intake rate with respect to the total gas rate introduced into the following cylinder, in response to enrichment of the air/fuel ratio of the preceding cylinder, compared with a region on the low load side thereof.

31. The control device for a spark ignition engine according to claim 27, characterized in that, at least in a region in which the following cylinder is made to perform compression self-ignition, the air/fuel ratio of the following cylinder is controlled such that the oxygen concentration in the exhaust gas that is exhausted from the following cylinder is a value corresponding to the combustion condition of the stoichiometric air/fuel ratio.

32. The control device for a spark ignition engine according to claim 1, characterized in that control is exercised such as to make the control mode whereby combustion is conducted in said two-cylinder connected condition a special operating mode; and said combustion controller controls such that the total injection quantity of fuel injected into the two cylinders consisting of said preceding cylinder and following cylinder is increased in response to increase in engine load; and control is exercised such that in said following cylinder, combustion is conducted by compression self-ignition in at least part of the operating region in which said special operating mode is involved and, in said preceding cylinder, stratified charge lean combustion is conducted with the injected fuel put in a stratified condition in an intermediate/low load region of the operating region in which compression self-ignition of said following cylinder is performed, and control is exercised such that, on the high load side of the operating region in which said stratified charge lean combustion is conducted, uniform lean combustion is conducted in a condition with the injected fuel uniformly dispersed.

33. The control device for a spark ignition engine according to claim 32, characterized in that, in the operating region on the high load side in which combustion is conducted in a uniform lean condition in said preceding cylinder, the air/fuel ratio of said preceding cylinder is made to be a value of substantially twice the stoichiometric air/fuel ratio, or a value smaller than said stoichiometric air/fuel ratio.

34. The control device for a spark ignition engine according to claim 32, characterized in that, in a low load operating region of the intermediate/low load operating region in which stratified charge lean combustion is conducted in said preceding cylinder, the air/fuel ratio of said preceding cylinder is made to be a value of substantially twice the stoichiometric air/fuel ratio, or a value smaller than said stoichiometric air/fuel ratio.

35. The control device for a spark ignition engine according to claim 32, characterized in that, in a low load operating region of the intermediate/low load operating region in which stratified charge lean combustion is conducted in said preceding cylinder, if compression self-ignition in said following cylinder is difficult, control is exercised such that the air/fuel ratio of said preceding cylinder is made to be substantially twice the stoichiometric air/fuel ratio or a value smaller than said stoichiometric air/fuel ratio and the combustion mode in the preceding cylinder is shifted from the stratified charge lean condition to said uniform lean condition and the ignition mode in said following cylinder is shifted from compression self-ignition to forced ignition.

36. The control device for a spark ignition engine according to claim 1, characterized in that the flow paths of intake and exhaust are arranged to be capable of being changed over, these flow paths being capable of being changed over between an ordinary operating mode in which each of the cylinders are put in an independent condition in which combustion is conducted respectively independently and a special operating mode in which combustion is conducted in said two-cylinder connected condition, and said control device comprising:

first fuel injection means that supplies fuel independently to each of the cylinders in said ordinary operating mode;

second fuel injection means whereby it is made possible to supply fuel in an amount corresponding to that of the following cylinder to said burnt gas prior to introduction thereof into the following cylinder after completion of combustion in said preceding cylinder, when in said special operating mode; and wherein said combustion controller, when in said ordinary operating mode, conducts combustion in at an air/fuel ratio in each cylinder, made to be equal to the stoichiometric air/fuel ratio by supplying fuel by said first fuel injection means and, when in the special operating mode, said combustion controller conducts combustion in the preceding cylinder by forced ignition in a condition at an air/fuel ratio greater by a prescribed amount than the stoichiometric air/fuel ratio, by supplying fuel by said first fuel injection means, and said combustion controller controls combustion in each cylinder such as to conduct combustion in the following cylinder by compression self-ignition by introducing gas in a condition of the stoichiometric air/fuel ratio by supplying fuel to said burnt gas by said second fuel injection means.

37. The control device for a spark ignition engine according to claim 36, characterized in that said first fuel injection means is arranged such as to inject fuel directly into the combustion chamber in respect of said preceding cylinder; and the first fuel injection means of said preceding cylinder also serves as said second fuel injection means, when in said special operating mode, by constituting said fuel controller such that supply of fuel for the following cylinder to said burnt gas is performed by said first fuel injection means of the preceding cylinder during the exhaustion stroke of said cylinder.

38. The control device for a spark ignition engine according to claim 37, characterized in that said first fuel injection means is arranged such that fuel is injected into an intake passage in respect of said following cylinder.

39. The control device for a spark ignition engine according to claim 36, characterized in that said second fuel injection means is provided at some point along said inter-cylinder gas passage and fuel is supplied thereby to said burnt gas in an amount corresponding to that of the following cylinder after exhaustion from the preceding cylinder prior to introduction thereof into the following cylinder.

40. The control device for a spark ignition engine according to claim 36, characterized in that said fuel controller, when in said special operating mode, is capable of changing over the fuel injection mode between the first injection mode in which combustion is conducted by compression ignition by supplying fuel to said burnt gas in an amount corresponding to the following cylinder by the first fuel injection means of the following cylinder after introduction of burnt gas into the following cylinder from said preceding cylinder; and a second injection mode in which combustion is conducted by compression self-ignition by supplying fuel to said burnt gas in an amount corresponding to the following cylinder by said second fuel injection means prior to introduction thereof into the following cylinder after completion of combustion in said preceding cylinder, and is constituted such as to determine the degree of capability of self-ignition of the following cylinder from information relating to the operating condition and to be capable of changing over said injection mode in accordance with the results of the determination.

41. The control device for a spark ignition engine according to claim 40, characterized in that said combustion controller is constituted such as to put said injection mode into the second injection mode when in an operating condition wherein the degree of capability for self-ignition of the following cylinder is low.

42. The control device for a spark ignition engine according to claim 41, characterized in that said fuel injection means is constituted such as to determine that the operating condition is the condition in which the degree of capability for self ignition is low if the cylinder temperature is below a specified temperature after warming up operation.

43. The control device for a spark ignition engine according to claim 41, characterized in that said combustion controller is constituted such as to determine that the operating condition is one in which the degree of capability for self-ignition is low when in a very low load region.

44. The control device for a spark ignition engine according to claim 1, characterized in that there are provided a preceding cylinder intake valve for introducing new air into said preceding cylinder and a burnt gas introduction valve for introducing burnt gas into said following cylinder from said inter-cylinder gas passage when in said two-cylinder connected condition; and in at least a prescribed region on the low load side of said operating region that is in a two-cylinder connected condition, the interval between the intake stroke bottom dead center of said following cylinder and the closure time of said burnt gas introduction valve is set to be shorter than the interval between the intake stroke bottom dead center of said preceding cylinder and the closure time of said preceding cylinder intake valve.

45. The control device for a spark ignition engine according to claim 44, characterized in that there is provided a following cylinder exhaust valve that exhausts exhaust gas of said following cylinder; and in at least a prescribed region on the low load side of said operating region that is in a two-cylinder connected condition, the opening time of said burnt gas introduction valve is set to be the intake stroke top dead center of said following cylinder, while said following cylinder exhaust valve is open until the top dead center of the exhaust stroke of said following cylinder.

46. The control device for a spark ignition engine according to claim 44, characterized in that, in a prescribed region on the high load side of said operating region that is in a two-cylinder connected condition, the closure time of said burnt gas introduction valve is set on the delayed side from said time when in the prescribed region on the low load side.

47. The control device for a spark ignition engine according to claim 44, characterized in that, in a prescribed region on the high load, high rotational speed side of said operating region that is in a two-cylinder connected condition, the closure time of said burnt gas introduction valve is set on the delayed side from said time when in the prescribed region on the low load, low rotational speed side.

48. The control device for a spark ignition engine according to claim 44, characterized in that a burnt gas exhaust valve is provided that exhausts burnt gas of said preceding cylinder to said inter-cylinder gas passage when in said two-cylinder connected condition; and in the operating region that is in said two-cylinder connected condition, the closure time of said burnt gas exhaust valve is set on the advancing side of the closure time of said burnt gas introduction valve and while maintaining the open period of said burnt gas exhaust valve and the open period of said burnt gas introduction valve at fixed prescribed values, the opening time of said burnt gas exhaust valve and the opening time of said burnt gas introduction valve are set so as to vary forwards and backwards in accordance with engine load while maintaining the difference of these times fixed.

49. The control device for a spark ignition engine according to claim 1, characterized in that there are provided a preceding cylinder intake valve that introduces new air into said preceding cylinder and a burnt gas introduction valve that introduces burnt gas into said following cylinder from said inter-cylinder gas passage, when in said two-cylinder connected condition; and in at least a prescribed region on the low load side of the operating region that is in said two-cylinder connected condition, the open period of said burnt gas introduction valve is set so as to be shorter than the open period of said preceding cylinder intake valve.

50. The control device for a spark ignition engine according to claim 1, characterized in that combustion is conducted by compression self ignition in said preceding cylinder while increasing the amount of internal EGR of said preceding cylinder in a prescribed region on the comparatively low load side of the operating region in which combustion is conducted by compression self-ignition in the following cylinder and in said two-cylinder connected condition and wherein the internal EGR ratio is decreased with increase in load.

51. The control device for a spark ignition engine according to claim 50, characterized in that, in part or all of the operating region in which combustion is conducted by compression self ignition in both said preceding cylinder and said following cylinder, the closure time of the burnt gas exhaust valve that exhausts burnt gas to said inter-cylinder gas passage in the exhaust stroke provided in said preceding cylinder is set earlier than the top dead center of the exhaust stroke of said preceding cylinder.

52. The control device for a spark ignition engine according to claim 51, characterized in that, in part or all of the operating region in which combustion is conducted by compression self ignition in both said preceding cylinder and said following cylinder, said combustion controller sets the injection time of fuel into said preceding cylinder later than the closure time of said burnt gas exhaust valve and in the vicinity of the top dead center of the exhaust stroke.

53. The control device for a spark ignition engine according to claim 51, characterized in that, in part or all of the operating region in which combustion is conducted by compression self ignition in both said preceding cylinder and said following cylinder, said combustion controller exercises control such that the air/fuel ratio in said following cylinder is substantially a lean air/fuel ratio.

54. The control device for a spark ignition engine according to claim 53, characterized in that the catalyst provided in said exhaust passage for cleaning exhaust gas consists solely of a three-way catalyst or solely of a three-way catalyst and oxidation catalyst.

55. The control device for a spark ignition engine according to claim 50, characterized in that it comprises a burnt gas introduction valve provided in said following cylinder for introducing burnt gas from said inter-cylinder gas passage in the intake stroke when in said two-cylinder connected condition, and a following cylinder intake valve provided in said following cylinder for introducing new air in the intake stroke when in said two-cylinder connected condition; and in part all of the operating region in which combustion is conducted by compression self-ignition in both said preceding cylinder and said following cylinder, the opening time of said burnt gas introduction valve is set on the delayed side of the top dead center of the intake stroke of the following cylinder, and said following cylinder intake valve is arranged to open earlier than the opening time of said burnt gas introduction valve.

56. The control device for a spark ignition engine according to claim 55, characterized in that said preceding cylinder is of the long stroke type and in that it comprises a preceding cylinder intake valve that introduces new air in the intake stroke when in said two-cylinder connected condition; and in part or all of the operating region in which combustion is conducted by compression self-ignition in both said preceding cylinder and said following cylinder, the closure time of said burnt gas exhaust valve and said burnt gas introduction valve is set on the delayed side of the top dead center of the exhaust stroke of said preceding cylinder, and the opening time of said preceding cylinder intake valve is set earlier than the top dead center of the intake stroke of the preceding cylinder.

57. The control device for a spark ignition engine according to claim 50, characterized in that it comprises a supercharger that supercharges the intake to said preceding cylinder, and in part or all of the operating region in which combustion is conducted by compression self-ignition in at least said preceding cylinder and said following cylinder, supercharging is performed using said supercharger.

58. The control device for a spark ignition engine according to claim 50, characterized in that, in a prescribed region on the comparatively high load side of said operating region in which combustion is conducted by compression self-ignition in said following cylinder, said combustion controller conduct combustion by forced ignition in said preceding cylinder, and set the air/fuel ratio of said preceding cylinder to be substantially larger than that when in an operating region in which combustion is conducted by compression self-ignition in both said preceding cylinder and said following cylinder.

59. A control device for a multi-cylinder spark ignition engine having cylinders arranged to perform a cycle consisting of intake, compression, expansion and exhaustion strokes with prescribed phase differences, characterized in that a gas flow path is constituted in a two-cylinder connected condition, at least in a low load, low rotational speed region, such that burnt gas exhausted from a leading cylinder which is a cylinder on the exhaust stroke side in a pair of cylinders whose exhaustion stroke and intake stroke overlap is directly introduced into a following cylinder which is a cylinder on the intake stroke side through an inter-cylinder gas passage and gas exhausted from the following cylinder is fed to an exhaust passage; and a three-way catalyst is provided in the exhaust passage connected with the following cylinder; and said control device comprising combustion control means that controls combustion in each cylinder such that at least in part of the operating region in which said two-cylinder connected condition is produced, combustion is performed in said leading cylinder in a condition at an air/fuel ratio larger by a prescribed amount than the stoichiometric air/fuel ratio while fuel is supplied to the following cylinder in an amount corresponding to the burnt gas generated by combustion in the leading cylinder, and combustion is performed by compression self-ignition at least in the following cylinder while an amount of fuel injection in each of said cylinders is controlled in a manner that a total air/fuel ratio of both of the leading cylinder and the following cylinder is made to be larger than stoichiometric.

60. A control device for a four cycled multi-cylinder spark ignition engine having cylinders arranged to perform a cycle consisting of intake, compression, expansion and exhaustion strokes with prescribed phase differences, and each of said cylinders having an ignition plug, characterized in that an inter-cylinder gas passage is provided between a leading cylinder and a following cylinder in a two-cylinder connected condition such that burnt gas exhausted from the leading cylinder which is a cylinder on the exhaust stroke side in a pair of cylinders whose exhaustion stroke and intake stroke overlap is introduced into the following cylinder which is a cylinder on the intake stroke side;

characterized in that said leading cylinder is provided with an intake port that communicates with said intake passage, a first exhaust port that communicates with said exhaust passage and a second exhaust port that communicates with the inter-cylinder gas passage, and said following cylinder is provided with a first intake port that communicates with said intake passage, a second intake port that communicates with said inter-cylinder gas passage and an exhaust port that communicates with said exhaust passage;

characterized in that a first and a second exhaust valve that open and close the first and second exhaust ports of said leading cylinder and a first and a second intake valve that open and close the first and second intake ports of the following cylinder are provided and said first and second exhaust valves and said first and second intake valves are selectively operated between an activating state and a deactivating state, and said control device comprising combustion control means that controls a fuel injection and ignition in each cylinder in such a manner that:

in a low load, low rotational speed region, said first exhaust valve and said first intake valve are set in deactivated condition and said second exhaust valve and said second intake valve in operating condition so that the two-cylinder connected condition in which burnt gas exhausted from the leading cylinder which is a cylinder on the exhaust stroke side is introduced into the following cylinder which is a cylinder on the intake stroke side through an inter-cylinder gas passage is established;

characterized in that a three-way catalyst is provided in the exhaust passage to react with the exhaust gas exhausted from the exhaust port of said following cylinder in said two-cylinder connecting condition, and when said two-cylinder connected condition is established, such that combustion is performed in said leading cylinder at an air/fuel ratio larger by a prescribed amount than the stoichiometric air/fuel ratio while fuel is supplied to the following cylinder in an amount corresponding to the burnt gas generated by combustion in the leading cylinder, and combustion is performed in said following cylinder at a stoichiometric air/fuel ratio by compression self-ignition.

61. The control device for a spark ignition four-cycle engine according to claim 60, characterized in that said combustion controller which exercise the control mode whereby combustion is performed in said two-cylinder connected condition as the special operating mode, and said combustion controller, in at least part of the operating region of the region corresponding to said special operating mode, controls the fuel supply rate in respect of both the leading and following cylinders such that the fuel supply rate in the preceding cylinder is greater, while the air/fuel ratio during combustion in said following cylinder is substantially the stoichiometric air/fuel ratio, thereby making the air/fuel ratio when combustion is conducted in the preceding cylinder a value of less than twice the stoichiometric air/fuel ratio and conducting combustion in the preceding cylinder by forced ignition and conducting combustion in the following cylinder by compression self-ignition.

62. The control device for a spark ignition engine according to claim 60, wherein said combustion controller executes control in which combustion is conducted in said two-cylinder connected condition in a control mode as a special operating mode; and said combustion condition; and said combustion controller including a fuel injection controller that, in an operating region in which the following cylinder is made to perform compression self-ignition in said special operating mode, relatively retards the injection time of the fuel to the following cylinder in an operating condition in which knocking is likely to occur, compared with an operating condition where knocking is unlikely to occur.

63. The control device for a spark ignition engine according to claim 60, characterized in that the combustion controller exercises control whereby combustion is conducted in said two-cylinder connected condition as a special operating mode; and said combustion controller effects a control such that:

in at least part of the operating region in which said special operating mode is involved, combustion is conducted by compression self-ignition in the following cylinder, and the air/fuel ratio of the preceding cylinder is made relatively lower in a high load region in the region in which the compression self-ignition is performed compared with the region on the low load side and a new air introduction intake valve that introduces new air into the following cylinder is opened so that new air is introduced into the following cylinder in addition to the burnt gas that is fed from said preceding cylinder.

64. The control device for a spark ignition engine according to claim 60, characterized in that control is exercised such as to make the control mode whereby combustion is conducted in said two-cylinder connected condition a special operating mode; and said combustion controller controls such that the total injection quantity of fuel injected into the two cylinders consisting of said preceding cylinder and following cylinder is increased in response to increase in engine load; and control is exercised such that in said following cylinder, combustion is conducted by compression self-ignition in at least part of the operating region in which said special operating mode is involved and, in said preceding cylinder, stratified charge lean combustion is conducted with the injected fuel put in a stratified condition in an intermediate/low load region of the operating region in which compression self-ignition of said following cylinder is performed, and control is exercised such that, on the high load side of the operating region in which the stratified charge lean combustion is conducted, uniform lean combustion is conducted in a condition with the injected fuel uniformly dispersed.

65. The control device for a spark ignition engine according to claim 60, characterized in that the flow paths of intake and exhaust are arranged to be capable of being changed over, these flow paths being capable of being changed over between an ordinary operating mode in which each of the cylinders are put in an independent condition in which combustion is conducted respectively independently and a special operating mode in which combustion is conducted in said two-cylinder connected condition, and said control device comprising:

first fuel injection means that supplies fuel independently to each of the cylinders in said ordinary operating mode;

second fuel injection means whereby it is made possible to supply fuel in an amount corresponding to that of the following cylinder to said burnt gas prior to introduction thereof into the following cylinder after completion of combustion in said preceding cylinder, when in said special operating mode; and wherein said combustion controller, when in said ordinary operating mode, conducts combustion in at an air/fuel ratio in each cylinder, made to be equal to the stoichiometric air/fuel ratio by supplying fuel by said first fuel injection means and, when in the special operating mode, said combustion controller conducts combustion in the preceding cylinder by forced ignition in a condition at an air/fuel ratio greater by a prescribed amount than the stoichiometric air/fuel ratio, by supplying fuel by said first fuel injection means, and said combustion controller controls combustion in each cylinder such as to conduct combustion in the following cylinder by compression self-ignition by introducing gas in a condition of the stoichiometric air/fuel ratio by supplying fuel to said burnt gas by said second fuel injection means.

66. The control device for a spark ignition engine according to claim 60, characterized in that there are provided a preceding cylinder intake valve for introducing new air into said preceding cylinder and a burnt gas introduction valve for introducing burnt gas into said following cylinder from said inter-cylinder gas passage when in said two-cylinder connected condition; and in at least a prescribed region on the low load side of said operating region that is in a two-cylinder connected condition, the interval between the intake stroke bottom dead center of said following cylinder and the closure time of said burnt gas introduction valve is set to be shorter than the interval between the intake stroke bottom dead center of said preceding cylinder and the closure time of said preceding cylinder intake valve.

67. The control device for a spark ignition engine according to claim 60, characterized in that there are provided a preceding cylinder intake valve that introduces new air into said preceding cylinder and a burnt gas introduction valve that introduces burnt gas into said following cylinder from said inter-cylinder gas passage, when in said two-cylinder connected condition; and in at least a prescribed region on the low load side of the operating region that is in said two-cylinder connected condition, the open period of said burnt gas introduction valve is set so as to be shorter than the open period of said preceding cylinder intake valve.

68. The control device for a spark ignition engine according to claim 60, characterized in that combustion is conducted by compression self-ignition in said preceding cylinder while increasing the amount of internal EGR of said preceding cylinder in a prescribed region on the comparatively low load side of the operating region in which combustion is conducted by compression self-ignition in the following cylinder and in said two-cylinder connected condition and wherein the internal EGR ratio is decreased with increase in load.

69. A control device for a multi-cylinder spark ignition engine having cylinders arranged to perform a cycle consisting of intake, compression, expansion and exhaustion strokes with prescribed phase differences, characterized in that a gas flow path is formed in a two-cylinder connected condition, at least in a low load, low rotational speed region, such that burnt gas exhausted from a preceding cylinder which is a cylinder on the exhaust stroke side in a pair of cylinders whose exhaustion stroke and intake stroke overlap is directly introduced into a following cylinder which is a cylinder on the intake stroke side through an inter-cylinder gas passage and gas exhausted from the following cylinder is fed to an exhaust passage; and said control device comprising a control unit that controls combustion in each cylinder such that at least in part of the operating region in which said two-cylinder connected condition is established, combustion is performed by forced ignition in said preceding cylinder in a condition at an air/fuel ratio larger by a prescribed amount than the stoichiometric air/fuel ratio and fuel is supplied to the following cylinder in an amount corresponding to the burnt gas generated by combustion in the preceding cylinder, and combustion is performed by compression self-ignition in the following cylinder.

70. The control device for a spark ignition four-cycle engine according to claim 69, characterized in that said combustion controller which exercise the control mode whereby combustion is performed in said two-cylinder connected condition as the special operating mode, and said combustion controller, in at least part of the operating region of the region corresponding to said special operating mode, controls the fuel supply rate in respect of both the leading and following cylinders such that the fuel supply rate in the preceding cylinder is greater, while the air/fuel ratio during combustion in said following cylinder is substantially the stoichiometric air/fuel ratio, thereby making the air/fuel ratio when combustion is conducted in the preceding cylinder a value of less than twice the stoichiometric air/fuel ratio and conducting combustion in the preceding cylinder by forced ignition and conducting combustion in the following cylinder by compression self-ignition.

71. The control device for a spark ignition engine according to claim 69, wherein said combustion controller executes control in which combustion is conducted in said two-cylinder connected condition in a control mode as a special operating mode; and said combustion condition; and said combustion controller including a fuel injection controller that, in an operating region in which the following cylinder is made to perform compression self-ignition in said special operating mode, relatively retards the injection time of the fuel to the following cylinder in an operating condition in which knocking is likely to occur, compared with an operating condition where knocking is unlikely to occur.

72. The control device for a spark ignition engine according to claim 69, characterized in that the combustion controller exercises control whereby combustion is conducted in said two-cylinder connected condition as a special operating mode; and said combustion controller effects a control such that:

in at least part of the operating region in which said special operating mode is involved, combustion is conducted by compression self-ignition in the following cylinder, and the air/fuel ratio of the preceding cylinder is made relatively lower in a high load region in the region in which the compression self-ignition is performed compared with the region on the low load side and a new air introduction intake valve that introduces new air into the following cylinder is opened so that new air is introduced into the following cylinder in addition to the burnt gas that is fed from said preceding cylinder.

73. The control device for a spark ignition engine according to claim 69, characterized in that control is exercised such as to make the control mode whereby combustion is conducted in said two-cylinder connected condition a special operating mode; and said combustion controller controls such that the total injection quantity of fuel injected into the two cylinders consisting of said preceding cylinder and following cylinder is increased in response to increase in engine load; and control is exercised such that in said following cylinder, combustion is conducted by compression self-ignition in at least part of the operating region in which said special operating mode is involved and, in said preceding cylinder, stratified charge lean combustion is conducted with the injected fuel put in a stratified condition in an intermediate/low load region of the operating region in which compression self-ignition of said following cylinder is performed, and control is exercised such that, on the high load side of the operating region in which the stratified charge lean combustion is conducted, uniform lean combustion is conducted in a condition with the injected fuel uniformly dispersed.

74. The control device for a spark ignition engine according to claim 69, characterized in that the flow paths of intake and exhaust are arranged to be capable of being changed over, these flow paths being capable of being changed over between an ordinary operating mode in which each of the cylinders are put in an independent condition in which combustion is conducted respectively independently and a special operating mode in which combustion is conducted in said two-cylinder connected condition, and said control device comprising:

first fuel injection means that supplies fuel independently to each of the cylinders in said ordinary operating mode;

second fuel injection means whereby it is made possible to supply fuel in an amount corresponding to that of the following cylinder to said burnt gas prior to introduction thereof into the following cylinder after completion of combustion in said preceding cylinder, when in said special operating mode; and wherein said combustion controller, when in said ordinary operating mode, conducts combustion in at an air/fuel ratio in each cylinder, made to be equal to the stoichiometric air/fuel ratio by supplying fuel by said first fuel injection means and, when in the special operating mode, said combustion controller conducts combustion in the preceding cylinder by forced ignition in a condition at an air/fuel ratio greater by a prescribed amount than the stoichiometric air/fuel ratio, by supplying fuel by said first fuel injection means, and said combustion controller controls combustion in each cylinder such as to conduct combustion in the following cylinder by compression self-ignition by introducing gas in a condition of the stoichiometric air/fuel ratio by supplying fuel to said burnt gas by said second fuel injection means.

75. The control device for a spark ignition engine according to claim 69, characterized in that there are provided a preceding cylinder intake valve for introducing new air into said preceding cylinder and a burnt gas introduction valve for introducing burnt gas into said following cylinder from said inter-cylinder gas passage when in said two-cylinder connected condition; and in at least a prescribed region on the low load side of said operating region that is in a two-cylinder connected condition, the interval between the intake stroke bottom dead center of said following cylinder and the closure time of said burnt gas introduction valve is set to be shorter than the interval between the intake stroke bottom dead center of said preceding cylinder and the closure time of said preceding cylinder intake valve.

76. The control device for a spark ignition engine according to claim 69, characterized in that there are provided a preceding cylinder intake valve that introduces new air into said preceding cylinder and a burnt gas introduction valve that introduces burnt gas into said following cylinder from said inter-cylinder gas passage, when in said two-cylinder connected condition; and in at least a prescribed region on the low load side of the operating region that is in said two-cylinder connected condition, the open period of said burnt gas introduction valve is set so as to be shorter than the open period of said preceding cylinder intake valve.

77. The control device for a spark ignition engine according to claim 69, characterized in that combustion is conducted by compression self-ignition in said preceding cylinder while increasing the amount of internal EGR of said preceding cylinder in a prescribed region on the comparatively low load side of the operating region in which combustion is conducted by compression self-ignition in the following cylinder and in said two-cylinder connected condition and wherein the internal EGR ratio is decreased with increase in load.

* * * * *